(12) United States Patent
Wenzel et al.

(10) Patent No.: US 12,529,492 B2
(45) Date of Patent: Jan. 20, 2026

(54) BUILDING CONTROL SYSTEM WITH PREDICTIVE CONTROL OF CARBON EMISSIONS USING MARGINAL OPERATING EMISSIONS RATE

(71) Applicant: Johnson Controls Tyco IP Holdings LLP, Milwaukee, WI (US)

(72) Inventors: Michael J. Wenzel, Grafton, WI (US); Mohammad N. Elbsat, Milwaukee, WI (US); Kirk H. Drees, Cedarburg, WI (US)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 299 days.

(21) Appl. No.: 17/826,916

(22) Filed: May 27, 2022

(65) Prior Publication Data

US 2022/0390137 A1    Dec. 8, 2022

Related U.S. Application Data

(63) Continuation-in-part of application No. 17/686,320, filed on Mar. 3, 2022, which is a continuation-in-part
(Continued)

(51) Int. Cl.
    *F24F 11/64*    (2018.01)
    *F24F 11/47*    (2018.01)
    (Continued)

(52) U.S. Cl.
    CPC .............. *F24F 11/64* (2018.01); *F24F 11/47* (2018.01); *F24F 2130/10* (2018.01); *F24F 2140/60* (2018.01)

(58) Field of Classification Search
    CPC .. F24F 11/47; G05B 2219/2642; G06Q 50/06
    See application file for complete search history.

(56) References Cited

U.S. PATENT DOCUMENTS 6,988,671 B2   1/2006   DeLuca
7,025,281 B2   4/2006   DeLuca
(Continued)

FOREIGN PATENT DOCUMENTS

CA   2455689 A1   7/2005
CA   2957726 A1   3/2016
(Continued)

OTHER PUBLICATIONS

Noakes et al., "Appraising healthcare ventilation design from combined infection control and energy perspective," HVAC & R Research, Aug. 2012, (20 pages).
(Continued)

*Primary Examiner* — Vincent H Tran
(74) *Attorney, Agent, or Firm* — Foley & Lardner LLP

(57) ABSTRACT

A cascaded control system for coordinating and controlling carbon emissions associated with operating building equipment distributed across a plurality of subsystems includes a first controller configured to generate carbon emissions targets for each of a plurality of subsystems using a predictive control process that accounts for an aggregate carbon emissions of the plurality of subsystems predicted to result from the carbon emissions targets. The cascaded control system also includes a plurality of second controllers, each corresponding to one of the plurality of subsystems and configured to generate control decisions for building equipment of the corresponding subsystem that are predicted to cause the building equipment to achieve the carbon emissions targets for the corresponding subsystem; and operate the building equipment of the corresponding subsystem using the control decisions.

21 Claims, 44 Drawing Sheets

Related U.S. Application Data of application No. 17/668,791, filed on Feb. 10, 2022, now Pat. No. 12,261,434.

(60) Provisional application No. 63/220,878, filed on Jul. 12, 2021, provisional application No. 63/194,771, filed on May 28, 2021.

(51) Int. Cl.
  *F24F 130/10* (2018.01)
  *F24F 140/60* (2018.01)

(56) References Cited

U.S. PATENT DOCUMENTS

| | | | |
|---|---|---|---|
| 7,099,895 B2 | 8/2006 | Dempsey | |
| 7,150,408 B2 | 12/2006 | DeLuca | |
| 7,222,494 B2 | 5/2007 | Peterson et al. | |
| 7,311,752 B2 | 12/2007 | Tepper et al. | |
| 7,394,370 B2 | 7/2008 | Chan | |
| 7,580,775 B2 | 8/2009 | Kulyk et al. | |
| 7,788,189 B2 | 8/2010 | Budike, Jr. | |
| 7,817,046 B2 | 10/2010 | Coveley et al. | |
| 7,894,946 B2 | 2/2011 | Kulyk et al. | |
| 7,941,096 B2 | 5/2011 | Perkins et al. | |
| 8,049,614 B2 | 11/2011 | Kahn et al. | |
| 8,405,503 B2 | 3/2013 | Wong | |
| 8,473,080 B2 | 6/2013 | Seem et al. | |
| 8,527,108 B2 | 9/2013 | Kulyk et al. | |
| 8,527,109 B2 | 9/2013 | Kulyk et al. | |
| 8,862,448 B2 | 10/2014 | Holmes et al. | |
| 8,867,993 B1 | 10/2014 | Perkins et al. | |
| 8,918,223 B2 | 12/2014 | Kulyk et al. | |
| 8,984,464 B1 | 3/2015 | Mihal et al. | |
| 9,075,909 B2 | 7/2015 | Almogy et al. | |
| 9,110,647 B2 | 8/2015 | Kulyk et al. | |
| 9,383,736 B2 | 7/2016 | Honda et al. | |
| 9,436,179 B1 | 9/2016 | Turney et al. | |
| 9,447,985 B2 | 9/2016 | Johnson | |
| 9,465,392 B2 | 10/2016 | Bradley et al. | |
| 9,547,353 B1 | 1/2017 | Marr et al. | |
| 9,618,224 B2 | 4/2017 | Emmons et al. | |
| 9,703,339 B2 | 7/2017 | Kulyk et al. | |
| 9,741,233 B2 | 8/2017 | Laufer et al. | |
| 9,810,441 B2 | 11/2017 | Dean-Hendricks et al. | |
| 9,852,481 B1 | 12/2017 | Turney et al. | |
| 9,915,438 B2 | 3/2018 | Cheatham et al. | |
| 10,068,116 B2 | 9/2018 | Good et al. | |
| 10,071,177 B1 | 9/2018 | Kellogg | |
| 10,139,877 B2 | 11/2018 | Kulyk et al. | |
| 10,175,681 B2 | 1/2019 | Wenzel et al. | |
| 10,198,779 B2 | 2/2019 | Pittman et al. | |
| 10,251,610 B2 | 4/2019 | Parthasarathy et al. | |
| 10,302,318 B1 | 5/2019 | Chambers | |
| 10,318,266 B2 | 6/2019 | Ribbich et al. | |
| 10,359,748 B2 | 7/2019 | Elbsat et al. | |
| 10,418,833 B2 | 9/2019 | Wenzel et al. | |
| 10,444,210 B2 | 10/2019 | Rawat et al. | |
| 10,528,020 B2 | 1/2020 | Drees | |
| 10,572,230 B2 | 2/2020 | Lucas et al. | |
| 10,628,135 B2 | 4/2020 | Sharma et al. | |
| 10,706,375 B2 | 7/2020 | Wenzel et al. | |
| 10,871,756 B2 | 12/2020 | Johnson et al. | |
| 10,908,578 B2 | 2/2021 | Johnson et al. | |
| 10,921,768 B2 | 2/2021 | Johnson et al. | |
| 10,977,010 B2 | 4/2021 | Sharma et al. | |
| 11,101,651 B2 | 8/2021 | Pavlak et al. | |
| 11,137,163 B2 | 10/2021 | Nasis | |
| 11,156,978 B2 | 10/2021 | Johnson et al. | |
| 11,181,289 B2 | 11/2021 | Federspiel et al. | |
| 11,193,691 B1 | 12/2021 | Guyer et al. | |
| 11,274,842 B2 | 3/2022 | Gamroth et al. | |
| 11,436,386 B2 | 9/2022 | Motahar | |
| 11,668,481 B2 | 6/2023 | Granger et al. | |
| 2003/0040812 A1 | 2/2003 | Gonzales et al. | |
| 2003/0055798 A1 | 3/2003 | Hittle et al. | |
| 2004/0011066 A1 | 1/2004 | Sugihara et al. | |
| 2006/0271210 A1 | 11/2006 | Subbu et al. | |
| 2007/0101688 A1 | 5/2007 | Wootton et al. | |
| 2007/0150333 A1 | 6/2007 | Hurst et al. | |
| 2007/0202798 A1 | 8/2007 | Billiotte et al. | |
| 2007/0203860 A1 | 8/2007 | Golden et al. | |
| 2007/0219645 A1 | 9/2007 | Thomas et al. | |
| 2008/0206767 A1 | 8/2008 | Kreiswirth et al. | |
| 2008/0243273 A1 | 10/2008 | Robert et al. | |
| 2009/0065596 A1 | 3/2009 | Seem et al. | |
| 2009/0078120 A1 | 3/2009 | Kummer et al. | |
| 2009/0096416 A1* | 4/2009 | Tonegawa | B60L 53/665 |
| | | | 320/109 |
| 2009/0117798 A1 | 5/2009 | Takashima et al. | |
| 2009/0126382 A1 | 5/2009 | Rubino et al. | |
| 2009/0173336 A1 | 7/2009 | Leifer et al. | |
| 2009/0265106 A1 | 10/2009 | Bearman et al. | |
| 2009/0292465 A1 | 11/2009 | Kaldewey et al. | |
| 2009/0319090 A1 | 12/2009 | Dillon et al. | |
| 2010/0017045 A1* | 1/2010 | Nesler | B60L 53/665 |
| | | | 700/295 |
| 2010/0047115 A1 | 2/2010 | Krichtafovitch et al. | |
| 2010/0063832 A1 | 3/2010 | Brown | |
| 2010/0070093 A1 | 3/2010 | Harrod et al. | |
| 2010/0175556 A1 | 7/2010 | Kummer et al. | |
| 2010/0187443 A1 | 7/2010 | Leben | |
| 2010/0198611 A1 | 8/2010 | Ruoff et al. | |
| 2010/0262313 A1 | 10/2010 | Chambers et al. | |
| 2010/0274612 A1 | 10/2010 | Walker et al. | |
| 2011/0011105 A1 | 1/2011 | Valiya Naduvath et al. | |
| 2011/0018502 A1 | 1/2011 | Bianciotto et al. | |
| 2011/0093249 A1 | 4/2011 | Holmes et al. | |
| 2011/0106501 A1* | 5/2011 | Christian | H04L 67/51 |
| | | | 703/1 |
| 2011/0172981 A1 | 7/2011 | Al-Hashimi et al. | |
| 2011/0190946 A1 | 8/2011 | Wong et al. | |
| 2011/0204720 A1 | 8/2011 | Ruiz et al. | |
| 2011/0231320 A1 | 9/2011 | Irving | |
| 2012/0042356 A1 | 2/2012 | Kubota et al. | |
| 2012/0053740 A1 | 3/2012 | Venkatakrishnan et al. | |
| 2012/0112883 A1 | 5/2012 | Wallace et al. | |
| 2012/0130547 A1 | 5/2012 | Fadell et al. | |
| 2012/0130556 A1 | 5/2012 | Marhoefer | |
| 2012/0173293 A1 | 7/2012 | Motley et al. | |
| 2012/0199003 A1 | 8/2012 | Melikov et al. | |
| 2012/0203386 A1 | 8/2012 | Fakos et al. | |
| 2012/0240113 A1 | 9/2012 | Hur | |
| 2012/0259469 A1 | 10/2012 | Ward et al. | |
| 2013/0013123 A1 | 1/2013 | Ozaki | |
| 2013/0085614 A1 | 4/2013 | Wenzel et al. | |
| 2013/0110295 A1 | 5/2013 | Zheng et al. | |
| 2013/0116803 A1 | 5/2013 | Gmach et al. | |
| 2013/0162037 A1 | 6/2013 | Kim et al. | |
| 2013/0166268 A1 | 6/2013 | Leonard et al. | |
| 2013/0204443 A1 | 8/2013 | Steven et al. | |
| 2013/0238144 A1 | 9/2013 | Shahapurkar et al. | |
| 2013/0245847 A1 | 9/2013 | Steven et al. | |
| 2013/0247059 A1 | 9/2013 | Amsterdam et al. | |
| 2013/0290511 A1 | 10/2013 | Tu et al. | |
| 2013/0297084 A1* | 11/2013 | Kubota | H01M 10/465 |
| | | | 700/286 |
| 2014/0039689 A1 | 2/2014 | Honda et al. | |
| 2014/0039709 A1 | 2/2014 | Steven et al. | |
| 2014/0114867 A1 | 4/2014 | Volkmann et al. | |
| 2014/0156093 A1 | 6/2014 | Brian et al. | |
| 2014/0167917 A2 | 6/2014 | Wallace et al. | |
| 2014/0236869 A1 | 8/2014 | Fujimaki et al. | |
| 2014/0260692 A1 | 9/2014 | Sharp | |
| 2014/0277603 A1 | 9/2014 | Ditlow et al. | |
| 2014/0277767 A1 | 9/2014 | Othman | |
| 2014/0283682 A1 | 9/2014 | Hamann et al. | |
| 2014/0324404 A1 | 10/2014 | De La Torre-Bueno | |
| 2014/0356229 A1 | 12/2014 | Farren | |
| 2015/0028114 A1 | 1/2015 | Rosen | |
| 2015/0053366 A1 | 2/2015 | Melsheimer | |
| 2015/0097688 A1 | 4/2015 | Bruck et al. | |
| 2015/0109442 A1 | 4/2015 | Derenne et al. | |
| 2015/0149257 A1 | 5/2015 | Bielat et al. | |
| 2015/0190538 A1 | 7/2015 | Olvera et al. | |

(56) References Cited

U.S. PATENT DOCUMENTS

| | | |
|---|---|---|
| 2015/0227848 A1 | 8/2015 | Amid et al. |
| 2015/0278968 A1 | 10/2015 | Steven et al. |
| 2015/0316902 A1 | 11/2015 | Wenzel et al. |
| 2015/0316903 A1 | 11/2015 | Asmus et al. |
| 2015/0316907 A1 | 11/2015 | Elbsat et al. |
| 2015/0331972 A1 | 11/2015 | Mcclure et al. |
| 2015/0354874 A1 | 12/2015 | Cur et al. |
| 2016/0066068 A1 | 3/2016 | Schultz et al. |
| 2016/0079826 A1* | 3/2016 | Paiz .................... H02J 15/007 310/74 |
| 2016/0091904 A1 | 3/2016 | Horesh et al. |
| 2016/0092986 A1 | 3/2016 | Lian et al. |
| 2016/0109149 A1 | 4/2016 | Heller |
| 2016/0116181 A1 | 4/2016 | Aultman et al. |
| 2016/0147205 A1 | 5/2016 | Kaufman |
| 2016/0195866 A1 | 7/2016 | Turney et al. |
| 2016/0201933 A1 | 7/2016 | Hester et al. |
| 2016/0210337 A1 | 7/2016 | Constandt |
| 2016/0218543 A1 | 7/2016 | Ishida et al. |
| 2016/0306934 A1 | 10/2016 | Sperry et al. |
| 2016/0313019 A1 | 10/2016 | Mengle et al. |
| 2016/0313751 A1 | 10/2016 | Risbeck et al. |
| 2016/0377306 A1 | 12/2016 | Drees et al. |
| 2017/0003676 A1 | 1/2017 | Yoshida et al. |
| 2017/0011150 A1 | 1/2017 | Sons et al. |
| 2017/0016644 A1 | 1/2017 | Nagarathinam et al. |
| 2017/0039339 A1 | 2/2017 | Bitran et al. |
| 2017/0082305 A1 | 3/2017 | Law |
| 2017/0097163 A1 | 4/2017 | Law et al. |
| 2017/0097616 A1 | 4/2017 | Cozad et al. |
| 2017/0102162 A1 | 4/2017 | Drees et al. |
| 2017/0102675 A1 | 4/2017 | Drees |
| 2017/0103483 A1 | 4/2017 | Drees et al. |
| 2017/0104337 A1 | 4/2017 | Drees |
| 2017/0104345 A1 | 4/2017 | Wenzel et al. |
| 2017/0104449 A1 | 4/2017 | Drees |
| 2017/0123440 A1 | 5/2017 | Mangsuli et al. |
| 2017/0147722 A1 | 5/2017 | Greenwood |
| 2017/0176030 A1 | 6/2017 | Emmons et al. |
| 2017/0193792 A1 | 7/2017 | Bermudez Rodriguez et al. |
| 2017/0206334 A1 | 7/2017 | Huang |
| 2017/0211837 A1 | 7/2017 | Gupta et al. |
| 2017/0234559 A1 | 8/2017 | Federspiel et al. |
| 2017/0246331 A1 | 8/2017 | Lloyd |
| 2017/0300657 A1 | 10/2017 | Barrett et al. |
| 2017/0312379 A1 | 11/2017 | Stibich et al. |
| 2017/0350611 A1 | 12/2017 | Su et al. |
| 2017/0351832 A1 | 12/2017 | Cahan et al. |
| 2017/0352119 A1 | 12/2017 | Pittman et al. |
| 2018/0004171 A1 | 1/2018 | Patel et al. |
| 2018/0004172 A1 | 1/2018 | Patel et al. |
| 2018/0031533 A1 | 2/2018 | Rawat et al. |
| 2018/0052431 A1 | 2/2018 | Shaikh et al. |
| 2018/0052970 A1 | 2/2018 | Boss et al. |
| 2018/0087791 A1 | 3/2018 | Monkkonen et al. |
| 2018/0100663 A1 | 4/2018 | Crimins et al. |
| 2018/0110416 A1 | 4/2018 | Masuda et al. |
| 2018/0117209 A1 | 5/2018 | Clack et al. |
| 2018/0150601 A1 | 5/2018 | Astigarraga |
| 2018/0157535 A1 | 6/2018 | Dushok |
| 2018/0185533 A1 | 7/2018 | Lalicki |
| 2018/0204162 A1 | 7/2018 | Endel et al. |
| 2018/0224814 A1 | 8/2018 | Elbsat et al. |
| 2018/0285800 A1 | 10/2018 | Wenzel et al. |
| 2018/0299151 A1 | 10/2018 | Ajax et al. |
| 2018/0318746 A1 | 11/2018 | Thomas |
| 2018/0329374 A1* | 11/2018 | Kelly .................... G06Q 10/04 |
| 2018/0340704 A1 | 11/2018 | Turney et al. |
| 2018/0341255 A1 | 11/2018 | Turney et al. |
| 2018/0357577 A1 | 12/2018 | Elbsat et al. |
| 2018/0372355 A1 | 12/2018 | Mosamkar et al. |
| 2018/0372362 A1 | 12/2018 | Turney et al. |
| 2019/0023099 A1 | 1/2019 | Li et al. |
| 2019/0052120 A1 | 2/2019 | Huang et al. |
| 2019/0056126 A1 | 2/2019 | Law et al. |
| 2019/0066236 A1 | 2/2019 | Wenzel |
| 2019/0079473 A1 | 3/2019 | Kumar et al. |
| 2019/0096233 A1 | 3/2019 | Bruck et al. |
| 2019/0108746 A1 | 4/2019 | Chang et al. |
| 2019/0148023 A1 | 5/2019 | Sadilek et al. |
| 2019/0182069 A1 | 6/2019 | Gervais |
| 2019/0209806 A1 | 7/2019 | Allen et al. |
| 2019/0216957 A1 | 7/2019 | Hawkins et al. |
| 2019/0219293 A1 | 7/2019 | Wenzel et al. |
| 2019/0235453 A1 | 8/2019 | Turney et al. |
| 2019/0249897 A1 | 8/2019 | Alcala Perez et al. |
| 2019/0271978 A1 | 9/2019 | Elbsat et al. |
| 2019/0295034 A1 | 9/2019 | Wenzel et al. |
| 2019/0311332 A1 | 10/2019 | Turney et al. |
| 2019/0321504 A1 | 10/2019 | Dayton |
| 2019/0325368 A1 | 10/2019 | Turney et al. |
| 2019/0328920 A1 | 10/2019 | Stibich et al. |
| 2019/0331358 A1 | 10/2019 | Ritmanich et al. |
| 2019/0338974 A1 | 11/2019 | Turney et al. |
| 2019/0339661 A1 | 11/2019 | Pancholi et al. |
| 2019/0340709 A1 | 11/2019 | Elbsat et al. |
| 2019/0347622 A1 | 11/2019 | Elbsat et al. |
| 2020/0009280 A1 | 1/2020 | Kupa |
| 2020/0041158 A1 | 2/2020 | Turney et al. |
| 2020/0090089 A1 | 3/2020 | Aston et al. |
| 2020/0090289 A1 | 3/2020 | Elbsat et al. |
| 2020/0096958 A1 | 3/2020 | Kelly et al. |
| 2020/0096985 A1 | 3/2020 | Wenzel et al. |
| 2020/0103127 A1 | 4/2020 | Chen et al. |
| 2020/0110531 A1 | 4/2020 | Sarang et al. |
| 2020/0124307 A1 | 4/2020 | Ota et al. |
| 2020/0125045 A1 | 4/2020 | Risbeck et al. |
| 2020/0132328 A1 | 4/2020 | Boettcher et al. |
| 2020/0141734 A1 | 5/2020 | Casarez et al. |
| 2020/0149768 A1 | 5/2020 | Turney et al. |
| 2020/0176124 A1 | 6/2020 | Chatterjea et al. |
| 2020/0176125 A1 | 6/2020 | Chatterjea et al. |
| 2020/0193346 A1 | 6/2020 | Elbsat et al. |
| 2020/0200416 A1 | 6/2020 | Granger et al. |
| 2020/0218991 A1 | 7/2020 | Alanqar et al. |
| 2020/0227159 A1 | 7/2020 | Boisvert et al. |
| 2020/0301408 A1 | 9/2020 | Elbsat et al. |
| 2020/0319610 A1 | 10/2020 | Ray et al. |
| 2020/0327371 A1 | 10/2020 | Sharma et al. |
| 2020/0334967 A1 | 10/2020 | Sharma et al. |
| 2020/0348038 A1 | 11/2020 | Risbeck et al. |
| 2020/0355391 A1 | 11/2020 | Wenzel et al. |
| 2020/0356087 A1 | 11/2020 | Elbsat et al. |
| 2020/0371482 A1 | 11/2020 | Alanqar et al. |
| 2020/0372588 A1* | 11/2020 | Shi .................... G06N 20/00 |
| 2020/0406778 A1* | 12/2020 | Langton .................... B60L 3/12 |
| 2021/0010701 A1 | 1/2021 | Nesler et al. |
| 2021/0011443 A1 | 1/2021 | Mcnamara et al. |
| 2021/0011444 A1 | 1/2021 | Risbeck et al. |
| 2021/0018211 A1 | 1/2021 | Ellis et al. |
| 2021/0025613 A1 | 1/2021 | Knatchbull-Hugessen et al. |
| 2021/0043330 A1 | 2/2021 | Ikeshima |
| 2021/0072742 A1 | 3/2021 | Wu et al. |
| 2021/0108821 A1 | 4/2021 | Turney et al. |
| 2021/0125114 A1* | 4/2021 | Lin .................... H02J 3/466 |
| 2021/0148592 A1 | 5/2021 | Turney et al. |
| 2021/0173366 A1 | 6/2021 | Turney et al. |
| 2021/0209532 A1 | 7/2021 | Wenzel et al. |
| 2021/0270490 A1 | 9/2021 | Turney et al. |
| 2021/0284040 A1 | 9/2021 | Grunkemeyer et al. |
| 2021/0302052 A1 | 9/2021 | Trinh |
| 2021/0313075 A1 | 10/2021 | Mc Namara et al. |
| 2021/0322613 A1 | 10/2021 | Lacaze et al. |
| 2021/0356916 A1 | 11/2021 | Wenzel et al. |
| 2021/0364181 A1 | 11/2021 | Risbeck et al. |
| 2021/0373973 A1 | 12/2021 | Ekins et al. |
| 2021/0393834 A1 | 12/2021 | Wellig |
| 2022/0011731 A1 | 1/2022 | Risbeck et al. |
| 2022/0035326 A1 | 2/2022 | Peters et al. |
| 2022/0042704 A1 | 2/2022 | Drees et al. |
| 2022/0054687 A1 | 2/2022 | Forzani et al. |
| 2022/0062463 A1 | 3/2022 | Ramer et al. |
| 2022/0065479 A1 | 3/2022 | Douglas et al. |
| 2022/0092500 A1 | 3/2022 | Drees et al. |

(56) References Cited

U.S. PATENT DOCUMENTS

| | | | |
|---|---|---|---|
| 2022/0118875 A1* | 4/2022 | Astorg | B60L 53/64 |
| 2022/0137580 A1 | 5/2022 | Burroughs et al. | |
| 2022/0172830 A1 | 6/2022 | Brooks et al. | |
| 2022/0203287 A1 | 6/2022 | Wenger et al. | |
| 2022/0203288 A1 | 6/2022 | Wenger et al. | |
| 2022/0205962 A1 | 6/2022 | Vanderkoy | |
| 2022/0207215 A1 | 6/2022 | Liu et al. | |
| 2022/0221184 A1 | 7/2022 | Gupta et al. | |
| 2022/0228756 A1 | 7/2022 | Gupta et al. | |
| 2022/0254483 A1 | 8/2022 | Boisvert et al. | |
| 2022/0277851 A1 | 9/2022 | Wellig | |
| 2022/0282886 A1 | 9/2022 | Hriljac et al. | |
| 2022/0293261 A1 | 9/2022 | Mcbrady et al. | |
| 2022/0305438 A1 | 9/2022 | Wenger et al. | |
| 2022/0305881 A1 | 9/2022 | Neu et al. | |
| 2022/0381471 A1 | 12/2022 | Wenzel et al. | |
| 2022/0404049 A1 | 12/2022 | Chang et al. | |
| 2022/0404051 A1 | 12/2022 | Chang et al. | |
| 2023/0020417 A1 | 1/2023 | Elbsat et al. | |
| 2023/0248869 A1 | 8/2023 | Bell | |
| 2023/0250988 A1 | 8/2023 | Risbeck et al. | |
| 2023/0253787 A1* | 8/2023 | Wenzel | H02J 3/003 700/291 |
| 2023/0324864 A1 | 10/2023 | Bursch et al. | |
| 2024/0165286 A1 | 5/2024 | Bonutti et al. | |

FOREIGN PATENT DOCUMENTS

| | | |
|---|---|---|
| CA | 3043996 A1 | 2/2018 |
| CN | 2644960 Y | 9/2004 |
| CN | 1916514 A | 2/2007 |
| CN | 101194129 A | 6/2008 |
| CN | 201173923 Y | 12/2008 |
| CN | 101387428 A | 3/2009 |
| CN | 101692025 A | 4/2010 |
| CN | 201517972 U | 6/2010 |
| CN | 201558243 U | 8/2010 |
| CN | 101861552 A | 10/2010 |
| CN | 202568950 U | 12/2012 |
| CN | 203727247 U | 7/2014 |
| CN | 105805888 A | 7/2016 |
| CN | 106415139 A | 2/2017 |
| CN | 106975279 A | 7/2017 |
| CN | 107250928 A | 10/2017 |
| CN | 107252594 A | 10/2017 |
| CN | 107477782 A | 12/2017 |
| CN | 107613895 A | 1/2018 |
| CN | 207035361 U | 2/2018 |
| CN | 107787469 A | 3/2018 |
| CN | 107917484 A | 4/2018 |
| CN | 108507057 A | 9/2018 |
| CN | 108779925 A | 11/2018 |
| CN | 108980988 A | 12/2018 |
| CN | 109196286 A | 1/2019 |
| CN | 109405151 A | 3/2019 |
| CN | 110529988 A | 12/2019 |
| CN | 110671798 A | 1/2020 |
| CN | 110822616 A | 2/2020 |
| CN | 110991764 A | 4/2020 |
| EP | 1 156 286 A2 | 11/2001 |
| EP | 3 186 687 A4 | 7/2017 |
| EP | 3 497 377 A1 | 6/2019 |
| FR | 3031800 A1 | 7/2016 |
| JP | 2010-128976 A | 6/2010 |
| JP | 2012-533720 A | 12/2012 |
| JP | 2015-152175 A | 8/2015 |
| JP | 2016-138705 A | 8/2016 |
| JP | 06-455326 B2 | 1/2019 |
| KR | 20160137767 A | 12/2016 |
| KR | 20170096092 A | 8/2017 |
| KR | 20170115913 A | 10/2017 |
| KR | 101865143 B1 | 6/2018 |
| KR | 20200047457 A | 5/2020 |
| WO | WO-2005/071815 A1 | 8/2005 |
| WO | WO-2009/157847 A1 | 12/2009 |
| WO | WO-2012/161804 A1 | 11/2012 |
| WO | WO-2013/130956 A1 | 9/2013 |
| WO | WO-2013/186282 A2 | 12/2013 |
| WO | WO-2016/047103 A1 | 3/2016 |
| WO | WO-2016/105347 A1 | 6/2016 |
| WO | WO-2017/109206 A1 | 6/2017 |
| WO | WO-2017/203031 A1 | 11/2017 |
| WO | WO-2018/160412 A1 | 9/2018 |
| WO | WO-2018/226564 A1 | 12/2018 |
| WO | WO-2019/050154 A1 | 3/2019 |
| WO | WO-2019/051893 A1 | 3/2019 |
| WO | WO-2019/157514 A2 | 8/2019 |
| WO | WO-2020/170338 A1 | 8/2020 |
| WO | WO-2022/251700 A1 | 12/2022 |

OTHER PUBLICATIONS

Chang et al., "A cost-effectiveness assessment of the operational parameters of central HVAC systems during pandemics," Building Simulation, Nov. 2022, vol. 16 (pp. 667-682).

Noakes et al., "Modeling infection risk and energy use of upper-room Ultraviolet Germicidal Irradiation systems in multi-room environments," Jan. 2015, Science and Technology for the Built Environment, vol. 21, No. 1 (pp. 99-111).

Villafruela et al., "Comparison of air change efficiency, contaminant removal effectiveness and infection risk as IAQ indices in isolation rooms," Energy and Buildings, Mar. 2012, vol. 57 (pp. 210-219).

Xu et al., "Simulation-based trade-off modeling for indoor infection risk of airborne diseases, energy consumption, and thermal comfort," Journal of Building Engineering, Jan. 2023, vol. 76, No. 107137 (pp. 1-16).

Yan et al., "Evaluating SARS-CoV-2 airborne quanta transmission and exposure risk in a mechanically ventilated multi zone office building," Building and Environment, Feb. 2022, vol. 219, No. 109184 (pp. 1-15).

Afram et al., "Theory and Application of HVAC Control Systems—A review of Model Predictive Control (MPC)," Building and Environment, Feb. 2014, vol. 72 (pp. 343-355).

Ahn et al., "Optimal Control Development for Chilled Water Plants Using a Quadratic Representation," Energy and Buildings, Apr. 2001, vol. 33, No. 4 (pp. 371-378).

Alvarado et al., "A Methodology to Monitor Airborne PM10 Dust Particles Using a Small Unmanned Aerial Vehicle," Sensors, 2017, vol. 17 (25 pages).

Burer et al., "Non-convex Mixed-Integer Nonlinear Programming: A Survey," Surveys in Operations Research and Management Science, Jul. 2012, vol. 17, No. 2 (pp. 97-106).

Cantoni, A., "Optimal Curve Fitting with Piecewise Linear Functions," IEEE Transactions on Computers, Jan. 1971, vol. 20, No. (pp. 59-67).

Corbin et al., "A Model Predictive Control Optimization Environment for Real-Time Commercial Building Application," Journal of Building Performance Simulation, 2013, (Published online: Jan. 11, 2012) vol. 6, No. 3 (pp. 159-174).

Drgona et al., "All you Need to Know about Model Predictive Control for Buildings," Annual Reviews in Control, 2020, vol. 50 (pp. 190-232).

EPO Notice of Opposition to a European Patent issued in Appl. Ser. No. EP 16165681.4 dated May 2, 2023 (48 pages).

EPO Notice of Opposition to a European Patent issued in Appl. Ser. No. EP 16165681.4 dated May 2, 2023 (51 pages).

EPO Notice of Opposition to a European Patent with Consolidated List issued in EP Appl. Ser. No. 16165681.4 dated May 2, 2023 (4 pages).

EPO Office Action on EP Appl. Ser. No. 16165681.4 dated Apr. 6, 2021 (7 pages).

EPO Search Opinion EP Appl. Ser. No. EP 22177772.5 dated Sep. 26, 2022 (6 pages).

Extended European Search Report on EP Appl. Ser. No. 16165681.4 dated Oct. 20, 2016 (5 pages).

Extended European Search Report on EP Appl. Ser. No. 22177772.5 dated Sep. 26, 2022 (11 pages).

(56) References Cited

OTHER PUBLICATIONS

Hackner, J.R., "HVAC system dynamics and energy use in existing buildings," Doctoral Dissertation, University of Madison, Wisconsin, 1984 (174 pages).
Haves et al., "Model Predictive Control of HVAC Systems: Implementation and Testing at the University of California, Merced," Technical Report, U.S. Department of Energy Office of Scientific and Technical Information, Jun. 29, 2010 (140 pages).
Huang et al., "A New Model Predictive Control Scheme for Energy and Cost Savings in Commercial Buildings: An Airport Terminal Building Case Study," Building and Environment, Jul. 2015, vol. 89 (pp. 203-216).
International Search Report and Written Opinion on PCT Appl. Ser. No. PCT/US2023/012719 dated May 22, 2023 (20 pages).
Kelman et al., "Analysis of Local Optima in Predictive Control for Energy Efficient Buildings," Journal of Building Performance Simulation, Apr. 16, 2012, vol. 6, No. 3 (pp. 236-255).
Koehler et al., "Building Temperature Distributed Control via Explicit MPC and 'Trim and Respond' Methods," European Control Conference (ECC), Jul. 17-19, 2013, Zurich, Switzerland (pp. 4334-4339).
Kwadzogah et al., "Model Predictive Control for HVAC Systems—A Review," 2013 IEEE International Conference on Automation Science and Engineering, Model Predictive Control for HVAC Systems—A Review, 2013 IEEE International Conference on Automation Science and Engineering (CASE), Madison, WI, United States, Aug. 17-20, 2013 (pp. 442-447).
Mckenna et al., "A Trnsys model of a building HVAC system with GSHP and PCM thermal energy storage—component modelling and validation," Proceedings of BS2013: 13th Conference of International Building Performance Simulation Association, Chambéry, France, Aug. 26-28, 2013 (pp. 3336-3343).
Mossolly et al., "Optimal Control Strategy for a Multizone Air Conditioning System Using a Genetic Algorithm," Energy, Jan. 2009, vol. 34, No. 1 (pp. 58-66).
Nassif et al., "Optimization of HVAC Control System Strategy Using Two-Objective genetic Algorithm," International Journal of HVA C&R Research, vol. 11, No. 3 (pp. 459-486).
Sourbon et al., "Dynamic Thermal Behaviour of Buildings with Concrete Core Activation," Dissertation, Arenberg Doctoral School of Science, Engineering & Technology, Katholieke Universiteit Leuven—Faculty of Engineering Celestijnenlaan: 300A box 2421, B-3001 Heverlee (Belgium) Sep. 2012 (416 pages).
Stluka et al., "Energy Management for Buildings and Microgrids," 2011 50th IEEE Conference on Decision and Control and European Control Conference (CDCECC) Orlando, FL, USA, Dec. 12-15, 2011 (pp. 5150-5157).
Strurznegger, D., "Model Predictive Building Climate Control, Steps Towards Practice," Doctoral Thesis, Automatic Control Laboratory, Zurich, Switzerland, 2014 (176 pages).
Sun et al., Optimal Control of Building HVAC&R Systems Using Complete Simulation-Based Sequential Quadratic Programming (CSB-SQP), Building and Environment, May 2005, vol. 40, No. 5 (pp. 657-669).
Third Party Observation Report on EP Appl. Ser. No. 16165681.4 dated Jan. 15, 2020 (8 pages).
Third Party Observation Report on EP Appl. Ser. No. 16165681.4 dated Oct. 5, 2018 (6 pages).
Verhelst et al., "Study of the Optimal Control Problem Formulation for Modulating Air-to-Water Heat Pumps Connected to a Residential Floor Heating System," Energy and Buildings, Feb. 2012, vol. 45 (pp. 43-53).
Verhelst, C., "Model Predictive Control of Ground Coupled Heat Pump Systems in Office Buildinqs," Dissertation, Arenberg Doctoral School of Science, Engineering & Technology, Katholieke Universiteit Leuven—Faculty of Engineering Celestijnenlaan : 300A box 2421, B-3001 Heverlee (Belgium) Apr. 20, 2012 (316 pages).
Wang et al., "Model-Based Optimal Control of VAV Air-Conditioning System Using Genetic Algorithm," Building and Environment, Aug. 2000, vol. 35, No. 6 (pp. 471-487).
Wang et al., "Supervisory and Optimal Control of Building HVAC Systems: A Review," HVAC&R Research, Jan. 2008, vol. 14, No. 1 (pp. 3-32).
Xi et al., "Support Vector Regression Model Predictive Control on a HVAC Plant," Control Engineering Practice, Aug. 2007, vol. 15, No. 8 (pp. 897-908).
Yao et al., "Global Optimization of a Central Air-Conditioning System Using Decomposition-Coordination Method," Energy and Buildings, May 2010, vol. 42, No. 5 (pp. 570-583).
Chinese Office Action on CN Appl. No. 202080061895.3 dated Sep. 25, 2023 (12 pages).
International Search Report and Written Opinion on PCT Appl. No. PCT/US2023/020060 dated Sep. 15, 2023 (20 pages).
EPO Provisional Opinion Accompanying the Partial Search Result for PCT Appl. Ser. No. PCT/US2023/012719 dated Mar. 28, 2023 (15 pages).
European Office Action on EP Appl. No. 20750965.4 dated Mar. 31, 2023 (5 pages).
CoolingLogic, "CoolingLogic: Up early, saving billions." URL: http://coolinglogic.com/documents/MarketingFlyer_FINAL_HiRes8.5x11.pdf, retrieved from internet Oct. 27, 2022 (1 page).
Incomplete File of Communication with Various Companies, etc. in 2016-2021, URL: http://coolinglogic.com/documents/22072101_Letters_and_Signature_Receipts.pdf, published, as one document, on: Jul. 21, 2022 (211 pages).
International Search Report and Written Opinion on PCT Appl. No. PCT/US2022/031438 dated Nov. 8, 2022 (18 pages).
International Search Report and Written Opinion on PCT Appl. No. PCT/US2022/040332 dated Nov. 22, 2022 (18 pages).
Johnson Heating and Cooling L.L.C., "Divine Grace Building Automation (Images)," URL: http://cooljohnson.com/Building-Automation-Systems-Michigan/Oakland-County-Michigan/Building-Automation-Images.html, retrieved from internet Oct. 27, 2022 (8 pages).
Johnson Heating and Cooling L.L.C., "Divine Grace Building Automation," URL: http://cooljohnson.com/Building-Automation-Systems-Michigan/Oakland-County-Michigan/Building-Automation-Divine-Grace.html, retrieved from internet Oct. 27, 2022 (3 pages).
Johnson Heating and Cooling L.L.C., "Excel Rehabilitation Building Automation," URL: http://cooljohnson.com/Building-Automation-Systems-Michigan/Waterford-Michigan/Building-Automation-System--Excel.html, retrieved from internet Oct. 27, 2022 (2 pages).
Johnson Heating and Cooling L.L.C., "Intertek Testing Services Building Automation," URL: http://cooljohnson.com/Building-Automation-Systems-Michigan/Plymouth-Michigan/Building-Automation-System-Plymouth-Michigan.html, retrieved from internet Oct. 27, 2022 (8 pages).
Johnson Heating and Cooling L.L.C., "JLA Medical Building Building Automation," URL: http://cooljohnson.com/Building-Automation-Systems-Michigan/Waterford-Michigan/Building-Automation-System--JLA.html, retrieved from internet Oct. 27, 2022 (3 pages).
Johnson Heating and Cooling L.L.C., "Mosaic Christian Building Automation (Images)," URL: http://cooljohnson.com/Building-Automation-Systems-Michigan/Detroit/Building-Automation-Images.html, retrieved from internet Oct. 27, 2022 (12 pages).
Johnson Heating and Cooling L.L.C., "Mosaic Christian Building Automation," URL: http://cooljohnson.com/Building-Automation-Systems-Michigan/Detroit/Mosaic-Christian.html, retrieved from internet Oct. 27, 2022 (5 pages).
Johnson Heating and Cooling L.L.C., "Shepherd's Gate Lutheran Church Building Automation," URL: http://cooljohnson.com/Building-Automation-Systems-Michigan/Shelby-Township-Michigan/Building-Automation-Systems-SG.html, retrieved from internet Oct. 27, 2022 (3 pages).
Johnson Heating and Cooling L.L.C., "St. Clair County Residence Building Automation," URL: http://cooljohnson.com/Building-Automation-Systems-Michigan/St-Clair-Michigan/Building-Automation-System-St-Clair-Michigan.html, retrieved from internet Oct. 27, 2022 (4 pages).
Johnson Heating and Cooling L.L.C., "St. Joseph Mercy Oakland U. C. Building Automation," URL: http://cooljohnson.com/Building-

(56) References Cited

OTHER PUBLICATIONS

Automation-Systems-Michigan/Waterford-Michigan/Building-Automation-Systems-SJMO.html, retrieved from internet Oct. 27, 2022 (2 pages).
Johnson Heating and Cooling L.L.C., "Waterford Internal Medicine Building Automation," URL: http://cooljohnson.com/Building-Automation-Systems-Michigan/Waterford-Michigan/Building-Automation-Systems-WIM.html, retrieved from internet Oct. 27, 2022 (3 pages).
Johnson Heating and Cooling, LLC, "Building Automation Clawson Michigan 2.0," URL: http://cooljohnson.com/Building-Automation-Systems-Michigan/Clawson-Michigan/Building-Automation-Clawson-Manor-2.html, retrieved from the internet Oct. 27, 2022 (6 pages).
Johnson Heating and Cooling, LLC, "Building Automation Images Clawson Michigan 2.0," URL: http://cooljohnson.com/Building-Automation-Systems-Michigan/Clawson-Michigan/Building-Automation-Clawson-Manor-2-Images.html, retrieved from the internet Oct. 27, 2022 (14 pages).
Johnson Heating and Cooling, LLC, "Building Automation System Clawson Michigan Clawson Manor," URL: http://cooljohnson.com/Building-Automation-Systems-Michigan/Clawson-Michigan/Building-Automation-System-Clawson-Manor.html; retrieved from the internet Oct. 27, 2022 (3 pages).
Johnson Heating and Cooling, LLC, "Building Automation System in Michigan Images," URL: http://cooljohnson.com/Building-Automation-Systems-Michigan/Macomb-County-Michigan/Building-Automation-Images.html; retrieved from the internet Oct. 27, 2022 (13 pages).
Johnson Heating and Cooling, LLC, "Building Automation System in Michigan," URL: http://cooljohnson.com/Building-Automation-Systems-Michigan/Macomb-County-Michigan/Building-Automation-Confidential-Customer.html; retrieved from the internet, Oct. 27, 2022 (4 pages).
Johnson Solid State LLC, "Building Automation Equipment," URL: http://cooljohnson.com/Video/Building_Automation/Confidential_Customer_BLD_2/Building_Automation_Equipment.mp4, retrieved from internet Oct. 27, 2022 (35 pages).
Johnson Solid State LLC, "Building Automation GUI," URL: http://cooljohnson.com/Video/Building_Automation/Confidential_Customer_BLD_2/Building_Automation_GUI.mp4, retrieved from internet Oct. 27, 2022 (24 pages).
Johnson Solid State LLC, "Cooling Logic Overview," URL: http://coolinglogic.com/documents/CoolingLogic_Overview_High_Quality.mp4, retrieved from internet Oct. 27, 2022 (16 pages).
Johnson Solid State LLC, "So what is CoolingLogic™?" URL: http://coolinglogic.com/Coolinglogic-How-it-Works.html, retrieved from the internet Oct. 27, 2022 (3 pages).
Johnson, David, "A Method to Increase HVAC System Efficiency And Decrease Energy Consumption," White Paper: Johnson Solid State, LLC, URL: http://coolinglogic.com/documents/16102106_White_Paper_High_Resolution_Protected.pdf, Sep. 24, 2016 (51 pages).
Johnson, David, "CoolingLogic™: Mosaic Christian Church A Case Study," Report: Johnson Solid State, LLC, URL: http://coolinglogic.com/documents/19020301_Mosaic_Christian_Coolinglogic_Case_Study.pdf, Feb. 2, 2019 (140 pages).
Johnson, David, "Excel Rehabilitation Building Automation: Building Automation System User Manual ," URL: http://cooljohnson.com/Building-Automation-Systems-Michigan/Waterford-Michigan/Building-Automation-System-Excel-Manual.html, 2012 (10 pages).
Johnson, David, "Temperature Control System and Methods for Operating Same," Pre-Publication printout of U.S. Appl. No. 15/231,943, filed Aug. 9, 2016, URL: http://coolinglogic.com/documents/16080901_CIP_As_Filed.pdf (99 pages).
Johnson, David., "CoolingLogic™: Changing the Way You Cool," Report: Johnson Solid State, LLC, URL: http://coolinglogic.com/documents/18111303_Changing_the_way_you_Cool.pdf, Nov. 7, 2018 (12 pages).

Invitation to Pay Additional Fees and, Where Applicable, Protest Fee on PCT Appl. No. PCT/US2022/031438 dated Sep. 2, 2022 (14 pages).
Azimi et al., "HVAC filtration for controlling infectious airborne disease transmission in indoor environments: Predicting risk reductions and operational costs," Building and Environment, May 2013, vol. 70 (pp. 150-160).
Beggs et al., "Potential for airborne transmission of infection in the waiting areas of healthcare premises: stochastic analysis using a Monte Carlo model," BMC Infectious Diseases, Aug. 2010, vol. 10 (11 pages).
Ben-David et al., "Interplay of ventilation and filtration: Differential analysis of cost function combining energy use and indoor exposure to PM2.5 and ozone," Building and Environment, Aug. 2017, vol. 128 (pp. 320-335).
Gao et al., "Potential impact of a ventilation intervention for influenza in the context of a dense indoor contact network in Hong Kong," Science of the Total Environment, Apr. 2016, vols. 569-570 (pp. 373-381).
Chinese Office Action on CN Appl. No. 202080057416.0 dated Dec. 30, 2022 (12 pages).
U.S. Appl. No. 17/582,988, filed Jan. 24, 2022, Johnson Controls Tyco IP Holdings LLP.
U.S. Appl. No. 17/686,320, filed Mar. 3, 2022, Johnson Controls Tyco IP Holdings LLP.
U.S. Appl. No. 17/733,786, filed Apr. 29, 2022, Johnson Controls Tyco IP Holdings LLP.
Aghniaey et al., "The Assumption of Equidistance in the Seven-Point Thermal Sensation Scale and a Comparison between Categorical and Continuous Metrics," University of Georgia College of Engineering, Jan. 18, 2019, 4 pages.
Aliabadi et al., "Preventing Airborne Disease Transmission: Review of Methods for Ventilation Design in Health Care Facilities," SAGE-Hindawi Access to Research Advances in Preventive Medicine, Feb. 2011, vol. 2011, 21 pages.
Azimi et al, "HVAC filtration for controlling infectious airborne disease transmission in indoor environments: Predicting risk reductions and operational costs," Building and Environment, May 13, 2013, 70, pp. 150-160.
Batterman et al., "Review and Extension of CO2-Based Methods to Determine Ventilation Rates with Application to School Classrooms," International Journal of Environmental Research and Public Health, Feb. 4, 22 pages.
Chen et al., "Occupant Feedback Based Model Predictive Control for Thermal Comfort and Energy Optimization: A Chamber Experimental Evaluation," Applied Energy, 2016, 164, pp. 341-351.
Ching, "An empirical drag coefficient model for simulating the dispersion and deposition of bioaerosol particles in ventilated environments," The Hong Kong Polytechnic University Department of Building Services Engineering, Jun. 2016, 345 pages.
Copeland, "The Impact of Patient Room Design on Airborne Hospital-Acquired Infections (HAI)," Thesis, Kent State University, Degree of Masters of Science in Architecture and Environmental Design, May 2016, 61 pages.
EPA—U.S. Environmental Protection Agency, "Greenhouse Gases Equivalences Calculator—Calculations and References", URL: https://www.epa.gov/energy/greenhouse-gases-equivalencies-calculator-calculations-and-references, retrieved from the internet Sep. 30, 3031, 32 pages.
Hubert et al., Modeling for Residential Electricity Optimization in Dynamic Pricing Environments, IEEE Transactions on Smart Grid, IEEE, USA, Dec. 1, 2012, vol. 3, No. 4 (pp. 2224-2231).
International Preliminary Report on Patentability on PCT Appl. Ser. No. PCT/US2020/041770 dated Jan. 27, 2022 (8 pages).
International Preliminary Report on Patentability on PCT Appl. Ser. No. PCT/US2020/041792 dated Jan. 27, 2022 (9 pages).
International Preliminary Report on Patentability on PCT Appl. Ser. No. PCT/US2020/041845 dated Jan. 27, 2022 (12 pages).
International Preliminary Report Patentability on PCT Appl. Ser. No. PCT/US2018/039119 dated Jan. 2, 2020 (7 pages).
International Search Report and Written Opinion on International Appl. Ser. No. PCT/US2018/039119 dated Oct. 5, 2018 (9 pages).

(56) References Cited

OTHER PUBLICATIONS

International Search Report and Written Opinion on PCT Appl. Ser. No. PCT/US2020/041770, dated Nov. 3, 2020, 13 pages.
International Search Report and Written Opinion on PCT Appl. Ser. No. PCT/US2020/041792, dated Sep. 30, 15 pages.
International Search Report and Written Opinion on PCT Appl. Ser. No. PCT/US2020/041845, dated Jan. 13, 2021, 20 pages.
Joe et al., "Methodology for Modeling the Microbial Contamination of Air Filters," PLoS One 9(2) e88514, URL: https://doi.org/10.1371/journal.pone.0088514, Feb. 11, 2014, 9 pages.
Kanaan et al., "New airborne pathogen transport model for upper-room UVGI spaces conditioned by chilled ceiling and mixed displacement ventilation: Enhancing air quality and energy performance," Energy Conversion and Management, Apr. 12, 2014, 85, pp. 50-61.
Kang et al., "Novel Modeling and Control Strategies for a HVAC System Including Carbon Dioxide Control," Energies, Jun. 2, 2014, 7, pp. 3599-3617.
Kumar, "A Simulation Framework to Characterize the Effect of Ventilation Control on Airborne Infectious Disease Transmission in Schools," Thesis, Graduate School of The University of Texas at Austin, May 2019, 53 pages.
Lampinen, "Thermodynamics of Humid Air," Sep. 2015, 39 Pages.
Liao et al., "A Probabilistic Transmission Dynamic Model to Assess Indoor Airborne Infection Risks," Risk Analysis, 2005, vol. 25, No. 5, pp. 1097-1107.
Ljung, System Identification: Theory for the User, 1999, 2nd ed., Prentice Hall PTR, Upper Saddle River, 63 pages.
Luo, "Maximizing Thermal Comfort and International Design: Predicting Thermal Comfort in Mixed-mode Office Building in the UK," Loughborough University, Jan. 18, 2019, 4 pages.
Noakes et al., "Applying the Wells-Riley equation to the risk of airborne infection in hospital environments: The importance of stochastic and proximity effects," Indoor Air 2008, The 11th Intl Conference on Indoor Air Quality and CI, Aug. 17-22, 2008, Copenhagen, Denmark, 9 pages.
Noakes et al., "Mathematical models for assessing the role of airflow on the risk of airborne infection in hospital wards," Journal of the Royal Society Interface, 2009, 6, S791-S800, 10 pages.
Noakes et al., "Modelling the transmission of airborne infections in enclosed spaces," Epidemiol. Infect, 2006, vol. 134, pp. 1082-1091.
Stephens, "HVAC filtration and the Wells-Riley approach to assessing risks of infectious airborne diseases," The National Air Filtration Association (NAFA) Foundation, Mar. 1, 2012, 47 pages.
Sudhakaran et al., "Temperature, Relative Humidity, and Carbon-Dioxide Modulation in a Near-Zero Energy Efficient Retrofit House," Purdue University, 2016, 11 pages.
Sze et al., "Review and Comparison Between the Wells-Riley and Dose-Response Approaches to Risk Assessment of Infectious Respiratory Diseases," Indoor Air, 2010, 20, pp. 2-16.
Weekly et al., "Modeling and Estimation of the Humans' Effect on the CO2 Dynamics Inside a Conference Room," IEEE Transactions on Control Systems Technology, Sep. 2015, 23.5, 12 pages.
PCT Invitation to Pay Additional Fees and Where Applicable, Protest Fee for Appl. Ser. No. PCT/US2023/020060 dated Jul. 18, 2023 (14 pages).
Yang et al., "Multi-Objective Particle Swarm Optimization for decision-making in building automation," Power and Energy Society General Meeting, Jul. 24, 2011, IEEE (pp. 1-5).
U.S. Appl. No. 17/668,791, filed Feb. 10, 2022, Johnson Controls Tyco IP Holdings LLP.
U.S. Appl. No. 63/194,771, filed May 28, 2021, Johnson Controls Tyco IP Holdings LLP.
U.S. Appl. No. 63/220,878, filed Jul. 12, 2021, Johnson Controls Tyco IP Holdings LLP.
Chinese Office Action on CN Appl. No. 202080061895.3 dated Jan. 20, 2023 (6 pages).
Chinese Office Action on CN Appl. No. 202080057416.0 dated Aug. 30, 2023 (37 pages).
Cai et al., "Nationwide assessment of energy costs and policies to limit airborne infection risks in U.S. schools," Journal of Building Engineering, Jul. 2021, vol. 45 (pp. 1-12).
European Office Action on EP Appl. No. 20751421.7 dated Jul. 16, 2024 (5 pages).
Faulkner et al., "Tradeoffs among indoor air quality, financial costs, and CO2 emissions for HVAC operation strategies to mitigate indoor virus in U.S. office buildings," Building and Environment, Mar. 2022, vol. 221 (pp. 1-15).
Lee et al., "Life-Cycle Cost Simulation of In-Duct Ultraviolet Germicidal Irradiation Systems," Eleventh International IBPSA Conference, Glasgow, Scotland, Jul. 27-30, 2009 (pp. 1159-1166).
European Office Action on EP Application No. 20750965.4 dated Sep. 9, 2025 (5 pages).
European Office Action on EP Application No. 20751421.7 dated Sep. 3, 2025 (8 pages).

\* cited by examiner

BUILDING CONTROL SYSTEM WITH PREDICTIVE CONTROL OF CARBON EMISSIONS USING MARGINAL OPERATING EMISSIONS RATE

CROSS-REFERENCE TO RELATED PATENT APPLICATIONS

This application claims the benefit of and priority to U.S. Provisional Patent Application No. 63/194,771, filed May 28, 2021, the entire disclosure of which is incorporated by reference herein. This application is also a continuation-in-part of U.S. patent application Ser. No. 17/686,320, filed Mar. 3, 2022, which is a continuation in part of U.S. patent application Ser. No. 17/668,791, filed Feb. 10, 2022, and claims the benefit of and priority to U.S. Provisional Patent Application No. 63/220,878, filed Jul. 12, 2021, all of which are incorporated by reference herein.

BACKGROUND

The present disclosure relates generally to modular energy units and building equipment with sustainable energy features, for example features relating to reducing carbon emissions and/or reaching carbon neutrality for building operations. Energy consumption associated with buildings, including with heating and cooling buildings, accounts for a large percentage of worldwide energy consumption. Additionally, because of links between energy consumption and production and carbon dioxide emissions (and emission of other pollutants), energy consumption and generation relating to building operations currently adds a significant amount of carbon dioxide to the atmosphere, which contributes to climate change.

Due to the environmental and ecological effects of carbon dioxide emissions, a technical challenge exists to reduce or eliminate carbon emissions associated with building operations or to achieve carbon neutrality for building operations. For example, a building owner may have a desire (due to consumer demands, regulatory requirements, personal convictions, etc.) to reduce carbon emissions or achieve carbon neutrality for a building or campus. Due to connectivity to and reliance on utility grids, which most building owners have no control over, building owners typically do not have the technological capabilities to significantly reduce their carbon footprint using existing technologies. Although solar panels, wind turbines, batteries, etc. can be installed by a building owner, such products are typically provided as separate components which are difficult for a building owner to install and integrate into existing building system. Accordingly, systems and methods for integrated, modular, easy-to-install solutions for optimally addressing carbon emissions of buildings would be desirable. Wide-scale deployment of such solutions can have positive effects on the environment while also reducing operational costs for building owners.

SUMMARY

One implementation of the present disclosure is a cascaded control system for coordinating and controlling carbon emissions associated with operating building equipment distributed across a plurality of subsystems. The cascaded control system includes a first controller configured to generate carbon emissions targets for each of a plurality of subsystems and a plurality of second controllers, each corresponding to one of the plurality of subsystems and configured to generate control decisions for building equipment of the corresponding subsystem that are predicted to cause the building equipment to achieve the carbon emissions targets for the corresponding subsystem and operate the building equipment of the corresponding subsystem using the control decisions.

In some embodiments, the first controller generates the carbon emissions targets based on time-varying values of an emission rate associated with power from a utility grid. One or more devices of the building equipment consume the power. In some embodiments, the first controller generates the carbon emissions targets using a predictive control process that accounts for an aggregate carbon emissions of the plurality of subsystems predicted to result from the carbon emissions targets and further accounts for comfort of occupants of one or more buildings served by the building equipment based on a number of curtailments predicted to occur to meet the carbon emissions targets. In some embodiments, the first controller generates the carbon emissions targets using a multi-objective optimization process having multiple objectives including a carbon objective based on the aggregate carbon emissions of the plurality of low level subsystems and a comfort objective. The multiple objectives may include a cost of purchasing a resource consumed by the building equipment.

In some embodiments, the first controller accounts generates the carbon emissions targets based on both carbon emissions associated with the plurality of subsystems and other carbon emissions uncontrollable by the cascaded control system. The other carbon emissions may result from transportation of goods or people. In some embodiments, the first controller is configured to generate the carbon emissions target based on a budget or goal for total emission over a time period.

Another implementation of the present disclosure is a method for controlling building equipment to reduce or eliminate carbon emissions. The method includes generating time-varying setpoints for the building equipment by processing an objective function that accounts for total carbon emissions or emissions savings predicted to result from resource consumption over a future time horizon based on time-varying values of carbon emissions per unit of resource consumption and operating the building equipment in accordance with the time-varying setpoints.

In some embodiments, the time-varying setpoints for the building equipment are carbon emissions targets for each of a plurality of subsystems of the building equipment. Operating the building equipment accordance with the time-varying setpoints includes determining control decisions for the building equipment predicted to cause the building equipment to achieve the carbon emissions targets for the plurality subsystems. The time-varying values of carbon emissions per unit of resource consumption includes values of a marginal operating emissions rate.

In some embodiments, the method includes predicting the time-varying values of carbon emissions based on historical emissions rate data and weather forecasts. In some embodiments, the building equipment includes a battery and operating the building equipment includes charging the battery. In some embodiments, the building equipment includes air conditioning equipment. Operating the building equipment in accordance with the time-varying setpoints includes pre-cooling a building during a first time period to reduce operations of the air conditioning equipment in a subsequent second time period, when the time-varying values of carbon emissions per unit of resource consumption are predicted to be higher in the first time period than the subsequent time period.

Another implementation of the present disclosure is a method that includes obtaining a time-varying marginal operating emissions rate indicating carbon emissions associated with power consumed from a utility, operating equipment in an energy storage mode when the time-varying marginal operating emissions rate is less than a first value, and operating equipment in an energy discharge mode when the time-varying marginal operating emissions rate is greater than a second value.

In some embodiments, the method also includes performing a control process based on an objective function that uses the time-varying marginal operating emissions rate to determine time-varying setpoints for the equipment in the energy storage mode and the energy discharge mode. The control process may be a cascaded control process. In some embodiments, the equipment includes heating and/or cooling equipment and the energy storage mode includes pre-cooling or pre-heating a building. In some embodiments, the equipment includes a battery, the energy storage mode includes charging the battery, and the energy discharge mode includes discharging the battery. The second value may be greater than the first value and may be equal to the first value. In some embodiments, the method includes determining the first value and the second value by performing an optimization.

DETAILED DESCRIPTION

Building and HVAC System

Figure 1:
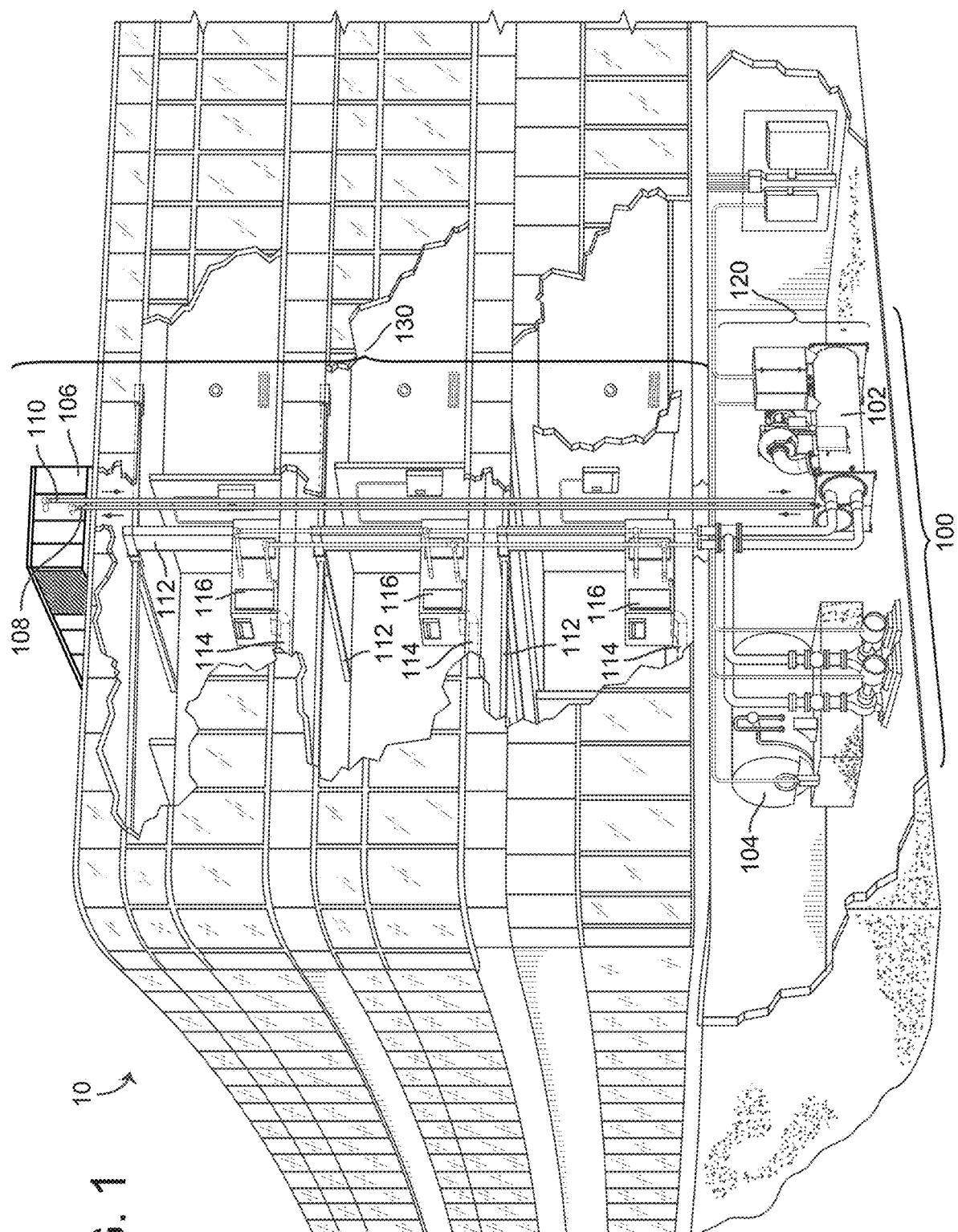
FIG. 1 is a drawing of a building equipped with a HVAC system, according to some embodiments.

Referring now to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes a HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 can include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Central Energy Facility

Figure 2:
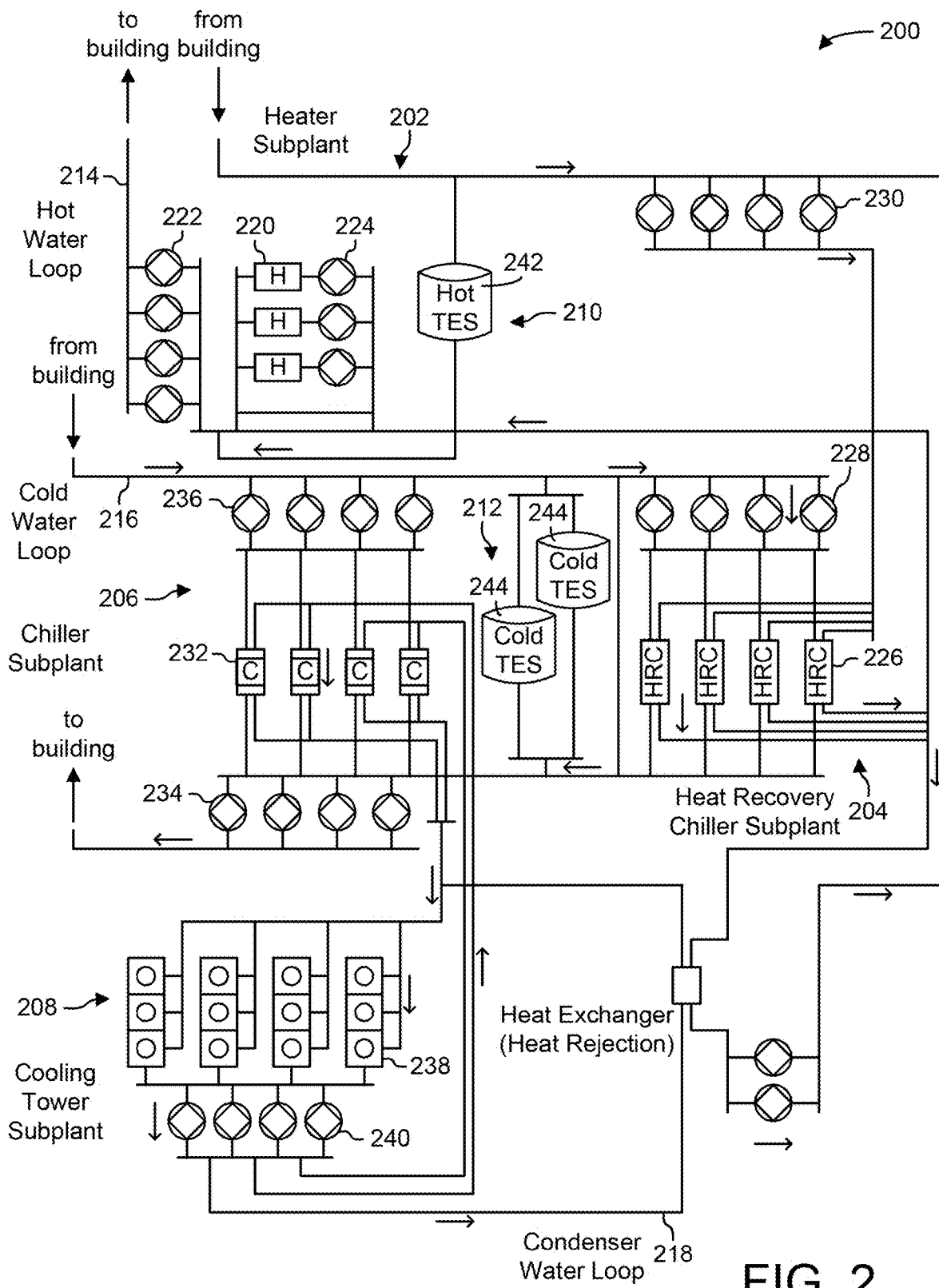
FIG. 2 is a drawing of a central energy facility (CEF) which can be used to provide heating or cooling to the building of FIG. 1, according to some embodiments.

Referring now to FIG. 2, a block diagram of a central energy facility (CEF) 200 is shown, according to some embodiments. In various embodiments, CEF 200 may supplement or replace waterside system 120 in HVAC system 100 or can be implemented separate from HVAC system 100. When implemented in HVAC system 100, CEF 200 can include a subset of the HVAC devices in HVAC system 100 (e.g., boiler 104, chiller 102, pumps, valves, etc.) and may operate to supply a heated or chilled fluid to AHU 106. The HVAC devices of CEF 200 can be located within building 10 (e.g., as components of waterside system 120) or at an offsite location.

CEF 200 is shown to include a plurality of subplants 202-212 including a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, hydrogen, etc.) from utilities to serve thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, $CO_2$, etc.) can be used in place of or in addition to water to serve thermal energy loads. In other embodiments, subplants 202-212 may provide heating and/or cooling directly to the building or campus without requiring an intermediate heat transfer fluid. These and other variations to CEF 200 are within the teachings of the present disclosure.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in CEF 200 (e.g., pumps 222, 224, 228, 230, 234, 236, and/or 240) or pipelines in CEF 200 include an isolation valve associated therewith. Isolation valves can be integrated with the pumps or positioned upstream or downstream of the pumps to control the fluid flows in CEF 200. In various embodiments, CEF 200 can include more, fewer, or different types of devices and/or subplants based on the particular configuration of CEF 200 and the types of loads served by CEF 200.

Central Energy Facility with Battery Unit and Predictive Control

Figure 3:
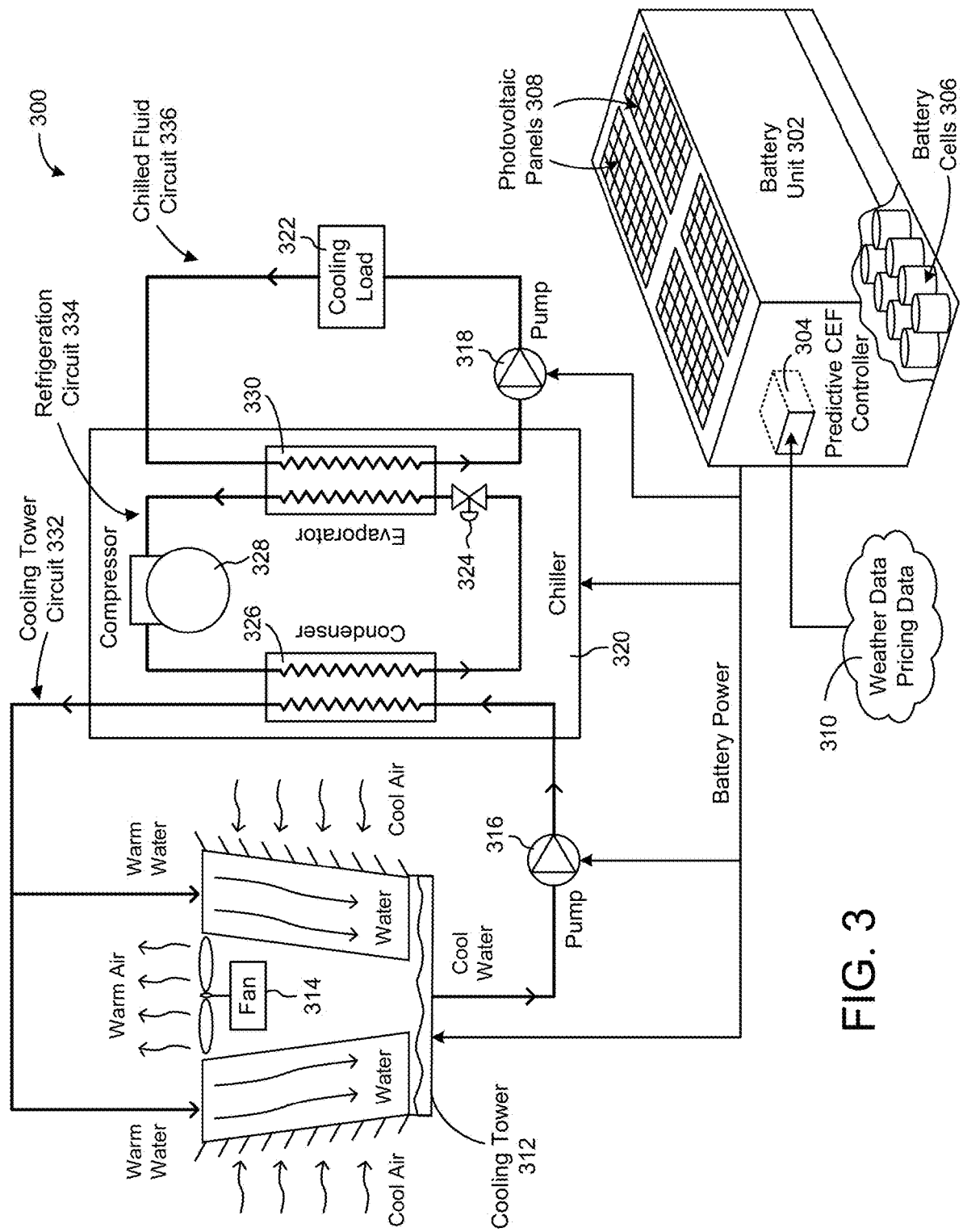
FIG. 3 is a drawing of a CEF with a battery unit and a predictive CEF controller, according to some embodiments.

Referring now to FIG. 3, a central energy facility (CEF) 300 with a battery unit 302 and predictive CEF controller 304 is shown, according to some embodiments. CEF 300 can be configured to provide cooling to a cooling load 322. Cooling load 322 can include, for example, a building zone, a supply airstream flowing through an air duct, an airflow in an air handling unit or rooftop unit, fluid flowing through a heat exchanger, a refrigerator or freezer, a condenser or evaporator, a cooling coil, or any other type of system, device, or space which requires cooling. In some embodiments, a pump 318 circulates a chilled fluid to cooling load 322 via a chilled fluid circuit 336. The chilled fluid can absorb heat from cooling load 322, thereby providing cooling to cooling load 322 and warming the chilled fluid.

CEF 300 is shown to include a cooling tower 312 and a chiller 320. Cooling tower 312 can be configured to cool the water in cooling tower circuit 332 by transferring heat from the water to outside air. In some embodiments, a pump 316 circulates water through cooling tower 312 via cooling tower circuit 332. Cooling tower 312 may include a fan 314 which causes cool air to flow through cooling tower 312. Cooling tower 312 places the cool air in a heat exchange relationship with the warmer water, thereby transferring heat from warmer water to the cooler air. Cooling tower 312 can provide cooling for a condenser 326 of chiller 320. Condenser 326 can transfer heat from the refrigerant in refrigeration circuit 334 to the water in cooling tower circuit 332. Although cooling tower circuit 332 is shown and described as circulating water, it should be understood that any type of coolant or working fluid (e.g., water, glycol, $CO_2$, etc.) can be used in cooling tower circuit 332.

Chiller 320 is shown to include a condenser 326, a compressor 328, an evaporator 330, and an expansion device 324. Compressor 328 can be configured to circulate a refrigerant between condenser 326 and evaporator 330 via refrigeration circuit 334. Compressor 328 operates to compress the refrigerant to a high pressure, high temperature state. The compressed refrigerant flows through condenser 326, which transfers heat from the refrigerant in refrigeration circuit 334 to the water in cooling tower circuit 332. The cooled refrigerant then flows through expansion device 324, which expands the refrigerant to a low temperature, low pressure state. The expanded refrigerant flows through evaporator 330, which transfers heat from the chilled fluid in chilled fluid circuit 336 to the refrigerant in refrigeration circuit 334.

In some embodiments, CEF 300 includes multiple chillers 320. Each of chillers 320 can be arranged in parallel and configured to provide cooling for the fluid in chilled fluid circuit 336. The set of chillers 320 may have a cooling capacity of approximately 1-3 MW or 1000-6000 tons in some embodiments. Similarly, CEF 300 can include multiple cooling towers 312. Each of the cooling towers 312 can be arranged in parallel and configured to provide cooling for the water in cooling tower circuit 332. Although only cooling components are shown in FIG. 3, it is contemplated that CEF 300 can include heating components in some embodiments. For example, CEF 300 may include one or more boilers, heat recovery chillers, steam generators, or other devices configured to provide heating. In some embodiments, CEF 300 includes some or all of the components of CEF 200, as described with reference to FIG. 2.

Still referring to FIG. 3, CEF 300 is shown to include a battery unit 302. In some embodiments, battery unit 302 includes one or more photovoltaic (PV) panels 308. PV panels 308 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form PV panels 308. Each PV panel 308 may include a plurality of linked photovoltaic cells. PV panels 308 may combine to form a photovoltaic array.

In some embodiments, PV panels 308 are configured to maximize solar energy collection. For example, battery unit 302 may include a solar tracker (e.g., a GPS tracker, a sunlight sensor, etc.) that adjusts the angle of PV panels 308 so that PV panels 308 are aimed directly at the sun throughout the day. The solar tracker may allow PV panels 308 to receive direct sunlight for a greater portion of the day and may increase the total amount of power produced by PV panels 308. In some embodiments, battery unit 302 includes a collection of mirrors, lenses, or solar concentrators configured to direct and/or concentrate sunlight on PV panels 308. The energy generated by PV panels 308 may be stored in battery cells 306 and/or used to power various components of CEF 300.

In some embodiments, battery unit 302 includes one or more battery cells 306. Battery cells 306 are configured to store and discharge electric energy (i.e., electricity). In some embodiments, battery unit 302 is charged using electricity from an external energy grid (e.g., provided by an electric utility). The electricity stored in battery unit 302 can be discharged to power one or more powered components of CEF 300 (e.g., cooling tower 312, fan 314, chiller 320, pumps 316-318, etc.). Advantageously, battery unit 302 allows CEF 300 to draw electricity from the energy grid and charge battery unit 302 when energy prices are low and discharge the stored electricity when energy prices are high to time-shift the electric load of CEF 300. In some embodiments, battery unit 302 has sufficient energy capacity (e.g., 6-12 MW-hours) to power CEF 300 for approximately 4-6 hours when operating at maximum capacity such that battery unit 302 can be utilized during high energy cost periods and charged during low energy cost periods.

In some embodiments, predictive CEF controller 304 performs an optimization process to determine whether to charge or discharge battery unit 302 during each of a plurality of time steps that occur during an optimization period. Predictive CEF controller 304 may use weather and pricing data 310 to predict the amount of heating/cooling required and the cost of electricity during each of the plurality of time steps. Predictive CEF controller 304 can optimize an objective function that accounts for the cost of electricity purchased from the energy grid over the duration of the optimization period. In some embodiments, the objective function also accounts for the cost of operating various components of CEF 300 (e.g., cost of natural gas used to fuel boilers). Predictive CEF controller 304 can determine an amount of electricity to purchase from the energy grid and an amount of electricity to store or discharge from battery unit 302 during each time step. The objective function and the optimization performed by predictive CEF controller 304 are described in greater detail with reference to FIGS. 4-5.

Predictive CEF Control System

Figure 4:
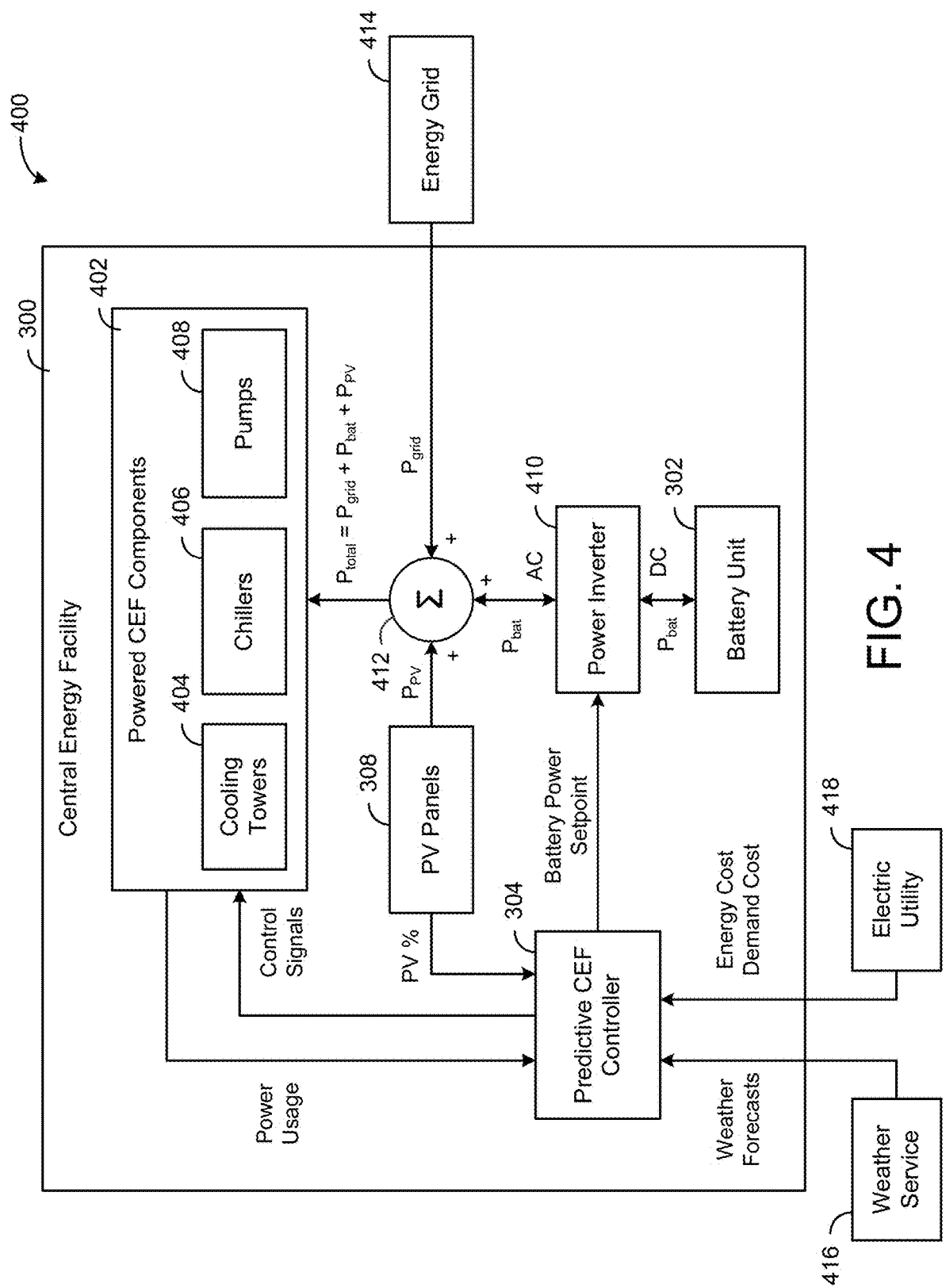
FIG. 4 is a block diagram of a predictive CEF control system including the battery unit and predictive CEF controller of FIG. 3, according to some embodiments.

Referring now to FIG. 4, a block diagram of a predictive CEF control system 400 is shown, according to some embodiments. Several of the components shown in control system 400 may be part of CEF 300. For example, CEF 300 may include powered CEF components 402, battery unit 302, predictive CEF controller 304, power inverter 410, and a power junction 412. Powered CEF components 402 may include any component of CEF 300 that consumes power (e.g., electricity) during operation. For example, powered CEF components 402 are shown to include cooling towers 404, chillers 406, and pumps 408. These components may be similar to cooling tower 312, chiller 320, and pumps 316-318, as described with reference to FIG. 3.

Power inverter 410 may be configured to convert electric power between direct current (DC) and alternating current (AC). For example, battery unit 302 may be configured to store and output DC power, whereas energy grid 414 and powered CEF components 402 may be configured to consume and provide AC power. Power inverter 410 may be used to convert DC power from battery unit 302 into a sinusoidal AC output synchronized to the grid frequency of energy grid 414 and/or powered CEF components 402. Power inverter 410 may also be used to convert AC power from energy grid 414 into DC power that can be stored in battery unit 302. The power output of battery unit 302 is shown as $P_{bat}$. $P_{bat}$ may be positive if battery unit 302 is providing power to power inverter 410 (i.e., battery unit 302 is discharging) or negative if battery unit 302 is receiving power from power inverter 410 (i.e., battery unit 302 is charging).

In some instances, power inverter 410 receives a DC power output from battery unit 302 and converts the DC power output to an AC power output that can be provided to powered CEF components 402. Power inverter 410 may synchronize the frequency of the AC power output with that of energy grid 414 (e.g., 50 Hz or 60 Hz) using a local oscillator and may limit the voltage of the AC power output to no higher than the grid voltage. In some embodiments, power inverter 410 is a resonant inverter that includes or uses LC circuits to remove the harmonics from a simple square wave in order to achieve a sine wave matching the frequency of energy grid 414. In various embodiments, power inverter 410 may operate using high-frequency transformers, low-frequency transformers, or without transformers. Low-frequency transformers may convert the DC output from battery unit 302 directly to the AC output provided to powered CEF components 402. High-frequency transformers may employ a multi-step process that involves converting the DC output to high-frequency AC, then back to DC, and then finally to the AC output provided to powered CEF components 402.

The power output of PV panels 308 is shown as $P_{PV}$. The power output $P_{PV}$ of PV panels 308 can be stored in battery unit 302 and/or used to power powered CEF components 402. In some embodiments, PV panels 308 measure the amount of power $P_{PV}$ generated by PV panels 308 and provides an indication of the PV power to predictive CEF controller 304. For example, PV panels 308 are shown providing an indication of the PV power percentage (i.e., PV %) to predictive CEF controller 304. The PV power percentage may represent a percentage of the maximum PV power at which PV panels 308 are currently operating.

Power junction 412 is the point at which powered CEF components 402, energy grid 414, PV panels 308, and power inverter 410 are electrically connected. The power supplied to power junction 412 from power inverter 410 is shown as $P_{bat}$. $P_{bat}$ may be positive if power inverter 410 is providing power to power junction 412 (i.e., battery unit 302 is discharging) or negative if power inverter 410 is receiving power from power junction 412 (i.e., battery unit 302 is charging). The power supplied to power junction 412 from energy grid 414 is shown as $P_{grid}$ and the power supplied to power junction 412 from PV panels 308 is shown as $P_{PV}$. $P_{bat}$, $P_{PV}$, and $P_{grid}$ combine at power junction 412 to form $P_{total}$ (i.e., $P_{total} = P_{grid} + P_{bat} + P_{PV}$). $P_{total}$ may be defined as the power provided to powered CEF components 402 from power junction 412. In some instances, $P_{total}$ is greater than $P_{grid}$. For example, when battery unit 302 is discharging, $P_{bat}$ may be positive which adds to the grid power $P_{grid}$ and the PV power $P_{PV}$ when $P_{bat}$ and $P_{PV}$ combine with $P_{grid}$ to form $P_{total}$. In other instances, $P_{total}$ may be less than $P_{grid}$. For example, when battery unit 302 is charging, $P_{bat}$ may be negative which subtracts from the grid power $P_{grid}$ and the PV power $P_{PV}$ when $P_{bat}$, $P_{PV}$, and $P_{grid}$ combine to form $P_{total}$.

Predictive CEF controller 304 can be configured to control powered CEF components 402 and power inverter 410. In some embodiments, predictive CEF controller 304 generates and provides a battery power setpoint $P_{sp,bat}$ to power inverter 410. The battery power setpoint $P_{sp,bat}$ may include a positive or negative power value (e.g., kW) which causes power inverter 410 to charge battery unit 302 (when $P_{sp,bat}$ is negative) using power available at power junction 412 or discharge battery unit 302 (when $P_{sp,bat}$ is positive) to provide power to power junction 412 in order to achieve the battery power setpoint $P_{sp,bat}$.

In some embodiments, predictive CEF controller 304 generates and provides control signals to powered CEF components 402. Predictive CEF controller 304 may use a multi-stage optimization technique to generate the control signals. For example, predictive CEF controller 304 may include an economic controller configured to determine the optimal amount of power to be consumed by powered CEF components 402 at each time step during the optimization period. The optimal amount of power to be consumed may minimize a cost function that accounts for the cost of energy consumed by CEF 300. The cost of energy may be based on time-varying energy prices from electric utility 418. In some embodiments, predictive CEF controller 304 determines an optimal amount of power to purchase from energy grid 414 (i.e., a grid power setpoint $P_{sp,grid}$) and an optimal amount of power to store or discharge from battery unit 302 (i.e., a battery power setpoint $P_{sp,bat}$) at each of the plurality of time steps. Predictive CEF controller 304 may monitor the actual power usage of powered CEF components 402 and may utilize the actual power usage as a feedback signal when generating the optimal power setpoints.

Predictive CEF controller 304 may include a tracking controller configured to generate temperature setpoints (e.g., a zone temperature setpoint $T_{sp,zone}$, a chilled water temperature setpoint $T_{sp,chw}$, etc.) that achieve the optimal amount of power consumption at each time step. In some embodiments, predictive CEF controller 304 uses equipment models for powered CEF components 402 to determine an amount of heating or cooling that can be generated by CEF components 402 based on the optimal amount of power consumption. Predictive CEF controller 304 can use a zone temperature model in combination with weather forecasts from a weather service 416 to predict how the temperature of the building zone $T_{zone}$ will change based on the power setpoints and/or the temperature setpoints.

In some embodiments, predictive CEF controller 304 uses the temperature setpoints to generate the control signals for powered CEF components 402. The control signals may include on/off commands, speed setpoints for fans of cooling towers 404, power setpoints for compressors of chillers 406, chilled water temperature setpoints for chillers 406, pressure setpoints or flow rate setpoints for pumps 408, or other types of setpoints for individual devices of powered CEF components 402. In other embodiments, the control signals may include the temperature setpoints (e.g., a zone temperature setpoint $T_{sp,zone}$, a chilled water temperature setpoint $T_{sp,chw}$, etc.) generated by predictive CEF controller 304. The temperature setpoints can be provided to powered CEF components 402 or local controllers for powered CEF components 402 which operate to achieve the temperature setpoints. For example, a local controller for chillers 406 may receive a measurement of the chilled water temperature $T_{chw}$ from chilled water temperature sensor and/or a measurement the zone temperature $T_{zone}$ from a zone temperature sensor. The local controller can use a feedback control process (e.g., PID, ESC, MPC, etc.) to increase or decrease the amount of cooling provided by chillers 406 to drive the measured temperature(s) to the temperature setpoint(s). Similar feedback control processes can be used to control cooling towers 404 and/or pumps 408. The multi-stage optimization performed by predictive CEF controller 304 is described in greater detail with reference to FIG. 5.

Predictive CEF Controller

Figure 5:
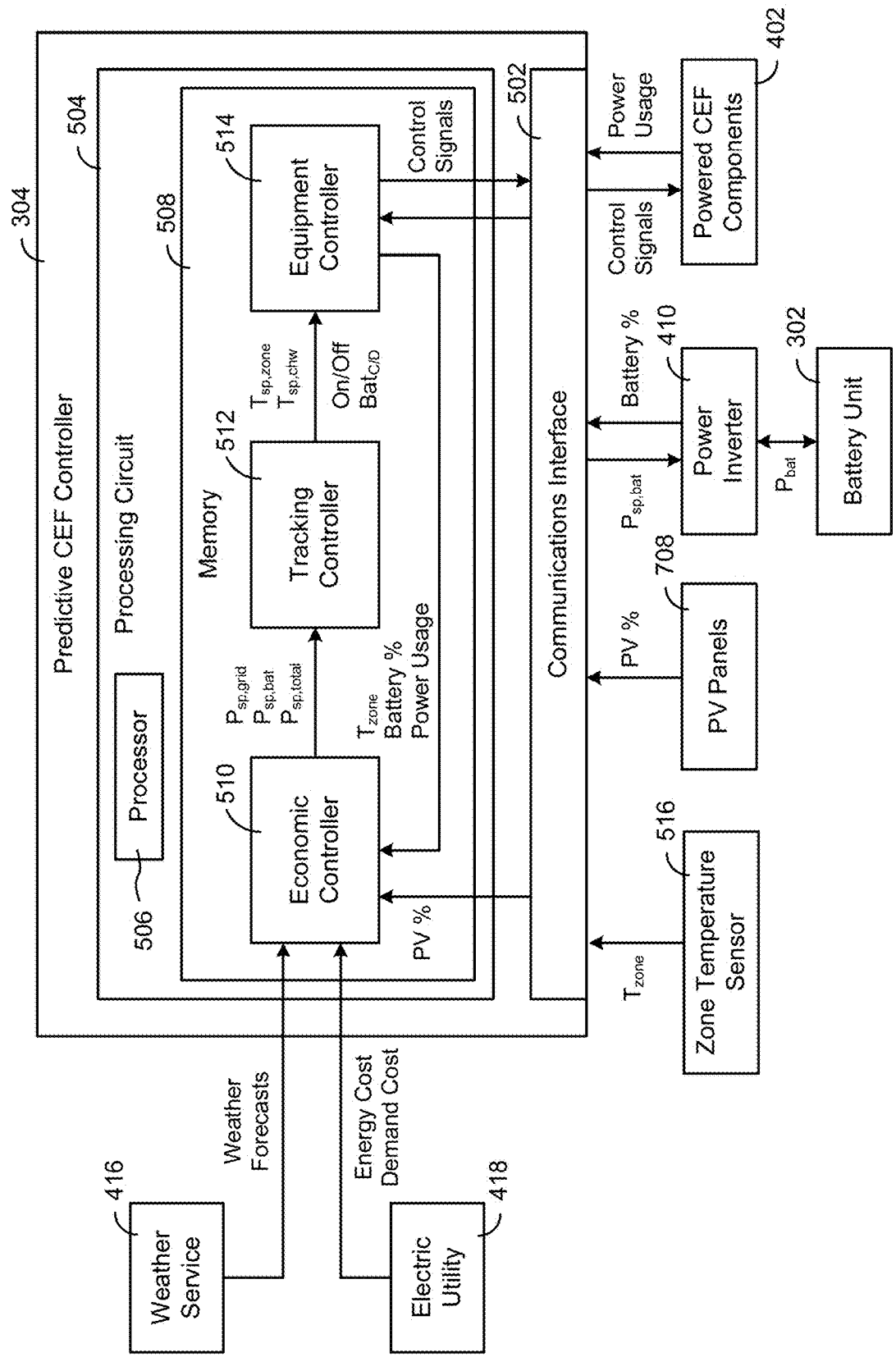
FIG. 5 is a block diagram illustrating the predictive CEF controller of FIG. 3 in greater detail, according to some embodiments.

Referring now to FIG. 5, a block diagram illustrating predictive CEF controller 304 in greater detail is shown, according to an exemplary embodiment. Predictive CEF controller 304 is shown to include a communications interface 502 and a processing circuit 504. Communications interface 502 may facilitate communications between controller 304 and external systems or devices. For example, communications interface 502 may receive measurements of the zone temperature $T_{zone}$ from zone temperature sensor 516 and measurements of the power usage of powered CEF components 402. In some embodiments, communications interface 502 receives measurements of the state-of-charge (SOC) of battery unit 302, which can be provided as a percentage of the maximum battery capacity (i.e., battery %). Communications interface 502 can receive weather forecasts from a weather service 416 and predicted energy costs and demand costs from an electric utility 418. In some embodiments, predictive CEF controller 304 uses communications interface 502 to provide control signals powered CEF components 402 and power inverter 410.

Communications interface 502 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 502 can include an Ethernet card and port for sending and receiving data via an Ethernet-based communications link or network. In another example, communications interface 502 can include a Wi-Fi transceiver for communicating via a wireless communications network or cellular or mobile phone communications transceivers.

Processing circuit 504 is shown to include a processor 506 and memory 508. Processor 506 may be a general purpose or specific purpose processor, an application specific integrated circuit (ASIC), one or more field programmable gate arrays (FPGAs), a group of processing components, or other suitable processing components. Processor 506 is configured to execute computer code or instructions stored in memory 508 or received from other computer readable media (e.g., CDROM, network storage, a remote server, etc.).

Memory 508 may include one or more devices (e.g., memory units, memory devices, storage devices, etc.) for storing data and/or computer code for completing and/or facilitating the various processes described in the present disclosure. Memory 508 may include random access memory (RAM), read-only memory (ROM), hard drive storage, temporary storage, non-volatile memory, flash memory, optical memory, or any other suitable memory for storing software objects and/or computer instructions. Memory 508 may include database components, object code components, script components, or any other type of information structure for supporting the various activities and information structures described in the present disclosure. Memory 508 may be communicably connected to processor 506 via processing circuit 504 and may include computer code for executing (e.g., by processor 506) one or more processes described herein. When processor 506 executes instructions stored in memory 508 for completing the various activities described herein, processor 506 generally configures controller 304 (and more particularly processing circuit 504) to complete such activities.

Still referring to FIG. 5, predictive CEF controller 304 is shown to include an economic controller 510, a tracking controller 512, and an equipment controller 514. Controllers 510-514 can be configured to perform a multi-state optimization process to generate control signals for power inverter 410 and powered CEF components 402. In brief overview, economic controller 510 can optimize a predictive cost function to determine an optimal amount of power to purchase from energy grid 414 (i.e., a grid power setpoint $P_{sp,grid}$), an optimal amount of power to store or discharge from battery unit 302 (i.e., a battery power setpoint $P_{sp,bat}$), and/or an optimal amount of power to be consumed by powered CEF components 402 (i.e., a CEF power setpoint $P_{sp,total}$) at each time step of an optimization period. Tracking controller 512 can use the optimal power setpoints $P_{sp,grid}$, $P_{sp,bat}$, and/or $P_{sp,total}$ to determine optimal temperature setpoints (e.g., a zone temperature setpoint $T_{sp,zone}$, a chilled water temperature setpoint $T_{sp,chw}$, etc.) and an optimal battery charge or discharge rate (i.e., $Bat_{C/D}$). Equipment controller 514 can use the optimal temperature setpoints $T_{sp,zone}$ or $T_{sp,chw}$ to generate control signals for powered CEF components 402 that drive the actual (e.g., measured) temperatures $T_{zone}$ and/or $T_{chw}$ to the setpoints (e.g., using a feedback control technique). Each of controllers 510-514 is described in detail below.

Economic Controller

Economic controller 510 can be configured to optimize a predictive cost function to determine an optimal amount of power to purchase from energy grid 414 (i.e., a grid power setpoint $P_{sp,grid}$), an optimal amount of power to store or discharge from battery unit 302 (i.e., a battery power setpoint $P_{sp,bat}$), and/or an optimal amount of power to be consumed by powered CEF components 402 (i.e., a CEF power setpoint $P_{sp,total}$) at each time step of an optimization period. An example of a predictive cost function which can be optimized by economic controller 510 is shown in the following equation:

$$\min(J) = \sum_{k=1}^{h} C_{ec}(k) P_{chiller}(k) \Delta t + \sum_{k=1}^{h} C_{ec}(k) P_{HRC}(k) \Delta t + \sum_{k=1}^{h} C_{gas}(k) F_{gas}(k) \Delta t + C_{DC} \max_{k}(P_{grid}(k)) - \sum_{k=1}^{h} C_{ec}(k) P_{bat}(k) \Delta t$$

where $C_{ec}(k)$ is the cost per unit of electricity (e.g., $/kWh) purchased from electric utility 418 during time step k, $P_{chiller}(k)$ is the power consumption (e.g., kW) of one or more chillers of CEF 300 during time step k, $P_{HRC}(k)$ is the power consumption of one or more heat recovery chillers (HRCs) of CEF 300 at time step k, $F_{gas}(k)$ is the natural gas consumption of one or more boilers of CEF 300 at time step k, $C_{gas}(k)$ is the cost per unit of natural gas consumed by CEF 300 at time step k, $C_{DC}$ is the demand charge rate (e.g., $/kW), where the max( ) term selects the maximum electricity purchase of CEF 300 (i.e., the maximum value of $P_{grid}(k)$) during any time step k of the optimization period, $P_{bat}(k)$ is the amount of power discharged from battery unit 302 during time step k, and $\Delta t$ is the duration of each time step k. Economic controller 510 can optimize the predictive cost function J over the duration of the optimization period (e.g., from time step k=1 to time step k=h) to predict the total cost of operating CEF 300 over the duration of the optimization period.

The first and second terms of the predictive cost function J represent the cost of electricity consumed by powered CEF components 402 over the duration of the optimization period. The values of the parameter $C_{ec}(k)$ at each time step k can be defined by the energy cost information provided by electric utility 418. In some embodiments, the cost of electricity varies as a function of time, which results in different values of $C_{ec}(k)$ at different time steps k. The variables $P_{chiller}(k)$ and $P_{HRC}(k)$ are decision variables which can be optimized by economic controller 510. In some embodiments, the total power consumption $P_{total}(k)$ of powered CEF components 402 at time step k is equal to the sum of $P_{chiller}(k)$ and $P_{HRC}(k)$ (i.e., $P_{total}(k)$ $P_{chiller}(k)+P_{HRC}(k)$). Accordingly, the first two terms of the predictive cost function can be replaced with the summation $\Sigma_{k=1}^{h} C_{ec}(k) P_{total}(k) \Delta t$ in some embodiments.

The third term of the predictive cost function J represents the cost of the fuel (e.g., natural gas) consumed by CEF 300 over the duration of the optimization period. The values of $C_{gas}(k)$ at each time step k can be defined by the energy cost information provided by a natural gas utility. In some embodiments, the cost of gas varies as a function of time, which results in different values of $C_{gas}(k)$ at different time steps k. The variable $F_{gas}(k)$ is a decision variable which can be optimized by economic controller 510.

The fourth term of the predictive cost function J represents the demand charge. Demand charge is an additional charge imposed by some utility providers based on the maximum power consumption during an applicable demand charge period. For example, the demand charge rate $C_{DC}$ may be specified in terms of dollars per unit of power (e.g., $/kW) and may be multiplied by the peak power usage (e.g., kW) during a demand charge period to calculate the demand charge. In the predictive cost function J, the demand charge rate $C_{DC}$ may be defined by the demand cost information received from electric utility 418. The variable $P_{grid}(k)$ is a decision variable which can be optimized by economic controller 510 in order to reduce the peak power usage max($P_{grid}(k)$) that occurs during the demand charge period. Load shifting may allow economic controller 510 to smooth momentary spikes in the electric demand of CEF 300 by storing energy in battery unit 302 when the power consumption of powered CEF components 402 is low. The stored energy can be discharged from battery unit 302 when the power consumption of powered CEF components 402 is high in order to reduce the peak power draw $P_{grid}$ from energy grid 414, thereby decreasing the demand charge incurred.

The final term of the predictive cost function J represents the cost savings resulting from the use of battery unit 302. Unlike the previous terms in the cost function J, the final term subtracts from the total cost. The values of the parameter $C_{ec}(k)$ at each time step k can be defined by the energy cost information provided by electric utility 418. In some embodiments, the cost of electricity varies as a function of time, which results in different values of $C_{ec}(k)$ at different time steps k. The variable $P_{bat}(k)$ is a decision variable which can be optimized by economic controller 510. A positive value of $P_{bat}(k)$ indicates that battery unit 302 is discharging, whereas a negative value of $P_{bat}(k)$ indicates that battery unit 302 is charging. The power discharged from battery unit 302 $P_{bat}(k)$ can be used to satisfy some or all of the total power consumption $P_{total}(k)$ of powered CEF components 402, which reduces the amount of power $P_{grid}(k)$ purchased from energy grid 414 (i.e., $P_{grid}(k)=P_{total}(k)-P_{bat}(k)-P_{PV}(k)$). However, charging battery unit 302 results in a negative value of $P_{bat}(k)$ which adds to the total amount of power $P_{grid}(k)$ purchased from energy grid 414.

In some embodiments, the power $P_{PV}$ provided by PV panels 308 is not included in the predictive cost function J because generating PV power does not incur a cost. However, the power $P_{PV}$ generated by PV panels 308 can be used to satisfy some or all of the total power consumption $P_{total}(k)$ of powered CEF components 402, which reduces the amount of power $P_{grid}(k)$ purchased from energy grid 414 (i.e., $P_{grid}(k)=P_{total}(k)-P_{bat}(k)-P_{PV}(k)$). The amount of PV power $P_{PV}$ generated during any time step k can be predicted by economic controller 510. Several techniques for predicting the amount of PV power generated by PV panels are described in U.S. patent application Ser. No. 15/247,869, U.S. patent application Ser. No. 15/247,844, and U.S. patent application Ser. No. 15/247,788. Each of these patent applications has a filing date of Aug. 25, 2016, and the entire disclosure of each of these patent applications is incorporated by reference herein.

Economic controller 510 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 510 can use battery unit 302 to perform load shifting by drawing electricity from energy grid 414 when energy prices are low and/or when the power consumed by powered CEF components 402 is low. The electricity can be stored in battery unit 302 and discharged later when energy prices are high and/or the power consumption of powered CEF components 402 is high. This enables economic controller 510 to reduce the cost of electricity consumed by CEF 300 and can smooth momentary spikes in the electric demand of CEF 300, thereby reducing the demand charge incurred.

Economic controller 510 can be configured to impose constraints on the optimization of the predictive cost function J. In some embodiments, the constraints include constraints on the temperature $T_{zone}$ of a building zone served by CEF 300. Economic controller 510 can be configured to maintain the actual or predicted temperature $T_{zone}$ between a minimum temperature bound $T_{min}$ and a maximum temperature bound $T_{max}$ (i.e., $T_{min} \leq T_{zone} \leq T_{max}$) at all times. The parameters $T_{min}$ and $T_{max}$ may be time-varying to define different temperature ranges at different times (e.g., an occupied temperature range, an unoccupied temperature range, a daytime temperature range, a nighttime temperature range, etc.).

In order to ensure that the zone temperature constraint is satisfied, economic controller 510 can model the temperature $T_{zone}$ of the building zone as a function of the decision variables optimized by economic controller 510. In some embodiments, economic controller 510 models the temperature of the building zone using a heat transfer model. For example, the dynamics of heating or cooling the building zone can be described by the energy balance:

$$C\frac{dT_{zone}}{dt} = -H(T_{zone} - T_a) + \dot{Q}_{HVAC} + \dot{Q}_{other}$$

where C is the thermal capacitance of the building zone, H is the ambient heat transfer coefficient for the building zone, $T_{zone}$ is the temperature of the building zone, $T_a$ is the ambient temperature outside the building zone (e.g., the outside air temperature), $\dot{Q}_{HVAC}$ is the amount of heating applied to the building zone by CEF 300, and $\dot{Q}_{other}$ is the external load, radiation, or other disturbance experienced by the building zone. In the previous equation, $\dot{Q}_{HVAC}$ represents heat transfer into the building zone by CEF 300 (i.e., the heating load) and therefore has a positive sign. However, if cooling is applied to the building zone rather than heating, the sign on $\dot{Q}_{HVAC}$ can be switched to a negative sign such that $\dot{Q}_{HVAC}$ represents the amount of cooling applied to the building zone by CEF 300 (i.e., the cooling load). Several techniques for developing zone temperature models and relating the zone temperature $T_{zone}$ to the decision variables in the predictive cost function J are described in greater detail in U.S. Pat. No. 9,436,179 granted Sep. 6, 2016, U.S. patent application Ser. No. 14/694,633 filed Apr. 23, 2015, and U.S. patent application Ser. No. 15/199,910 filed Jun. 30, 2016. The entire disclosure of each of these patents and patent applications is incorporated by reference herein.

The previous energy balance combines all mass and air properties of the building zone into a single zone temperature. Other heat transfer models which can be used by economic controller 510 include the following air and mass zone models:

$$C_z \frac{dT_{zone}}{dt} = H_{az}(T_a - T_{zone}) + H_{mz}(T_m - T_{zone}) + \dot{Q}_{HVAC} + \dot{Q}_{other}$$

$$C_m \frac{dT_m}{dt} = H_{mz}(T_{zone} - T_m)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_m$ and $T_m$ are the thermal capacitance and temperature of the non-air mass within the building zone, and $H_{mz}$ is the heat transfer coefficient between the air of the building zone and the non-air mass.

The previous equation combines all mass properties of the building zone into a single zone mass. Other heat transfer models which can be used by economic controller 510 include the following air, shallow mass, and deep mass zone models:

$$C_z \frac{dT_{zone}}{dt} = H_{az}(T_a - T_{zone}) + H_{sz}(T_s - T_{zone}) + \dot{Q}_{HVAC} + \dot{Q}_{other}$$

$$C_s \frac{dT_s}{dt} = H_{sz}(T_{zone} - T_s) + H_{ds}(T_d - T_s)$$

$$C_d \frac{dT_d}{dt} = H_{ds}(T_s - T_d)$$

where $C_z$ and $T_{zone}$ are the thermal capacitance and temperature of the air in the building zone, $T_a$ is the ambient air temperature, $H_{az}$ is the heat transfer coefficient between the air of the building zone and ambient air outside the building zone (e.g., through external walls of the building zone), $C_s$ and $T_s$ are the thermal capacitance and temperature of the shallow mass within the building zone, $H_{sz}$ is the heat transfer coefficient between the air of the building zone and the shallow mass, $C_d$ and $T_d$ are the thermal capacitance and temperature of the deep mass within the building zone, and $H_{ds}$ is the heat transfer coefficient between the shallow mass and the deep mass.

In some embodiments, economic controller 510 uses the weather forecasts from weather service 416 to determine appropriate values for the ambient air temperature $T_a$ and/or the external disturbance $\dot{Q}_{other}$ at each time step of the optimization period. Values of C and H can be specified as parameters of the building zone, received from tracking controller 512, received from a user, retrieved from memory 508, or otherwise provided as an input to economic controller 510. Accordingly, the temperature of the building zone $T_{zone}$ can be defined as a function of the amount of heating or cooling $\dot{Q}_{HVAC}$ applied to the building zone by CEF 300 using any of these heat transfer models. The manipulated variable $\dot{Q}_{HVAC}$ can be adjusted by economic controller 510 by adjusting the variables $P_{chiller}$, $P_{HRC}$, $F_{gas}$ and/or $P_{total}$ in the predictive cost function J.

In some embodiments, economic controller 510 uses a model that defines the amount of heating or cooling $\dot{Q}_{HVAC}$ applied to the building zone by CEF 300 as a function of the power setpoints $P_{sp,grid}$ and $P_{sp,bat}$ provided by economic controller 510. For example, economic controller 510 can add the power setpoints $P_{sp,grid}$ and $P_{sp,bat}$ to determine the total amount of power $P_{total}$ that will be consumed by powered CEF components 402. Economic controller 510 can use $P_{total}$ to determine the total amount of heating or cooling $\dot{Q}_{HVAC}$ applied to the building zone by CEF 300.

In some embodiments, economic controller 510 uses one or more models that define the amount of heating or cooling applied to the building zone by CEF 300 (i.e., $\dot{Q}_{HVAC}$) as a function of the zone temperature $T_{zone}$ and the zone temperature setpoint $T_{sp,zone}$ as shown in the following equation:

$$\dot{Q}_{HVAC} = f(T_{zone}, T_{sp,zone})$$

The models used by economic controller 510 can be imposed as optimization constraints to ensure that the amount of heating or cooling $\dot{Q}_{HVAC}$ provided by CEF 300 is not reduced to a value that would cause the zone temperature $T_{zone}$ to deviate from an acceptable or comfortable temperature range.

In some embodiments, economic controller 510 relates the amount of heating or cooling $\dot{Q}_{HVAC}$ provided by CEF 300 to the zone temperature $T_{zone}$ and the zone temperature setpoint $T_{sp,zone}$ using multiple models. For example, economic controller 510 can use a model of equipment controller 514 to determine the control action performed by equipment controller 514 as a function of the zone temperature $T_{zone}$ and the zone temperature setpoint $T_{sp,zone}$. An example of such a zone regulatory controller model is shown in the following equation:

$$v_{air} = f_1(T_{zone}, T_{sp,zone})$$

where $v_{air}$ is the rate of airflow to the building zone (i.e., the control action). The function $f_1$ can be identified from data. For example, economic controller 510 can collect measurements of $v_{air}$ and $T_{zone}$ and identify the corresponding value of $T_{sp,zone}$. Economic controller 510 can perform a system identification process using the collected values of $v_{air}$, $T_{zone}$, and $T_{sp,zone}$ as training data to determine the function $f_1$ that defines the relationship between such variables.

Economic controller 510 can use an energy balance model relating the control action $v_{air}$ to the amount of heating or cooling $\dot{Q}_{HVAC}$ provided by CEF 300 as shown in the following equation:

$$\dot{Q}_{HVAC} = f_2(v_{air})$$

where the function $f_2$ can be identified from training data. Economic controller 510 can perform a system identification process using collected values of $v_{air}$ and $\dot{Q}_{HVAC}$ to determine the function $f_2$ that defines the relationship between such variables.

In some embodiments, a linear relationship exists between $\dot{Q}_{HVAC}$ and $v_{air}$. Assuming an ideal proportional-integral (PI) controller and a linear relationship between $\dot{Q}_{HVAC}$ and $v_{air}$, a simplified linear controller model can be used to define the amount of heating or cooling $\dot{Q}_{HVAC}$ provided by CEF 300 as a function of the zone temperature $T_{zone}$ and the zone temperature setpoint $T_{sp,zone}$. An example of such a model is shown in the following equations:

$$\dot{Q}_{HVAC} = \dot{Q}_{ss} + K_c\left[\varepsilon + \frac{1}{\tau_I}\int_0^t \varepsilon(t')dt'\right]$$

$$\varepsilon = T_{sp,zone} - T_{zone}$$

where $\dot{Q}_{ss}$ is the steady-state rate of heating or cooling rate, $K_c$ is the scaled zone PI controller proportional gain, $\tau_I$ is the zone PI controller integral time, and $\varepsilon$ is the setpoint error (i.e., the difference between the zone temperature setpoint $T_{sp,zone}$ and the zone temperature $T_{zone}$). Saturation can be represented by constraints on $\dot{Q}_{HVAC}$. If a linear model is not sufficiently accurate to model equipment controller 514 and heat transfer in CEF 300, a nonlinear heating/cooling duty model can be used instead.

In addition to constraints on the zone temperature $T_{zone}$, economic controller 510 can impose constraints on the state-of-charge (SOC) and charge/discharge rates of battery unit 302. In some embodiments, economic controller 510 generates and imposes the following power constraints on the predictive cost function J:

$$P_{bat} \leq P_{rated}$$

$$-P_{bat} \leq P_{rated}$$

where $P_{bat}$ is the amount of power discharged from battery unit 302 and $P_{rated}$ is the rated battery power of battery unit 302 (e.g., the maximum rate at which battery unit 302 can be charged or discharged). These power constraints ensure that battery unit 302 is not charged or discharged at a rate that exceeds the maximum possible battery charge/discharge rate $P_{rated}$.

In some embodiments, economic controller 510 generates and imposes one or more capacity constraints on the predictive cost function J The capacity constraints may be used to relate the battery power $P_{bat}$ charged or discharged during each time step to the capacity and SOC of battery unit 302. The capacity constraints may ensure that the capacity of battery unit 302 is maintained within acceptable lower and upper bounds at each time step of the optimization period. In some embodiments, economic controller 510 generates the following capacity constraints:

$$C_a(k) - P_{bat}(k)\Delta t \leq C_{rated}$$

$$C_a(k) - P_{bat}(k)\Delta t \geq 0$$

where $C_a(k)$ is the available battery capacity (e.g., kWh) at the beginning of time step k, $P_{bat}(k)$ is the rate at which battery unit 302 is discharged during time step k (e.g., kW), $\Delta t$ is the duration of each time step, and $C_{rated}$ is the maximum rated capacity of battery unit 302 (e.g., kWh). The term $P_{bat}(k)\Delta t$ represents the change in battery capacity during time step k. These capacity constraints ensure that the capacity of battery unit 302 is maintained between zero and the maximum rated capacity $C_{rated}$.

In some embodiments, economic controller 510 generates and imposes one or more capacity constraints on the operation of powered CEF components 402. For example, powered CEF components 402 may have a maximum operating point (e.g., a maximum pump speed, a maximum cooling capacity, etc.) which corresponds to a maximum power consumption $P_{total,max}$. Economic controller 510 can be configured to generate a constraint which limits the power $P_{total}$ provided to powered CEF components 402 between zero and the maximum power consumption $P_{total,max}$ as shown in the following equation:

$$0 \leq P_{total} \leq P_{total,max}$$

$$P_{total} = P_{sp,grid} + P_{sp,bat}$$

where the total power $P_{total}$ provided to powered CEF components 402 is the sum of the grid power setpoint $P_{sp,grid}$ and the battery power setpoint $P_{sp,bat}$.

In some embodiments, economic controller 510 generates and imposes one or more capacity constraints on the operation of the one or more subplants of CEF 300. For example, heating may be provided by heater subplant 202 and cooling may be provided by chiller subplant 206. The operation of heater subplant 202 and chiller subplant 206 may be defined by subplant curves for each of heater subplant 202 and chiller subplant 206. Each subplant curve may define the resource production of the subplant (e.g., tons refrigeration, kW heating, etc.) as a function of one or more resources consumed by the subplant (e.g., electricity, natural gas, water, etc.). Several examples of subplant curves which can be used by economic controller 510 are described in greater detail in U.S. patent application Ser. No. 14/634,609 filed Feb. 27, 2015.

Economic controller 510 can be configured to use the subplant curves to identify a maximum amount of heating that can be provided by heater subplant 202 and a maximum amount of cooling that can be provided by chiller subplant 206. Economic controller 510 can generate and impose a constraint that limits the amount of heating provided by heater subplant 202 between zero and the maximum amount of heating. Similarly, economic controller 510 can generate and impose a constraint that limits the amount of cooling provided by chiller subplant 206 between zero and the maximum amount of cooling.

Economic controller 510 can optimize the predictive cost function J subject to the constraints to determine optimal values for the decision variables $P_{total}$, $P_{chiller}$, $P_{HRC}$, $F_{gas}$, $P_{grid}$, and $P_{bat}$, where $P_{total} = P_{bat} + P_{grid} + P_{PV}$. In some embodiments, economic controller 510 uses the optimal values for $P_{total}$, $P_{bat}$, and/or $P_{grid}$ to generate power setpoints for tracking controller 512. The power setpoints can include battery power setpoints $P_{sp,bat}$, grid power setpoints $P_{sp,grid}$, and/or CEF power setpoints $P_{sp,total}$ for each of the time steps k in the optimization period. Economic controller 510 can provide the power setpoints to tracking controller 512.

Tracking Controller

Tracking controller 512 can use the optimal power setpoints $P_{sp,grid}$, $P_{sp,bat}$, and/or $P_{sp,total}$ generated by economic controller 510 to determine optimal temperature setpoints (e.g., a zone temperature setpoint $T_{sp,zone}$, a chilled water temperature setpoint $T_{sp,chw}$, etc.) and an optimal battery charge or discharge rate (i.e., $Bat_{C/D}$). In some embodiments, tracking controller 512 generates a zone temperature setpoint $T_{sp,zone}$ and/or a chilled water temperature setpoint $T_{sp,chw}$ that are predicted to achieve the power setpoint $P_{sp,total}$ for CEF 300. In other words, tracking controller 512 may generate a zone temperature setpoint $T_{sp,zone}$ and/or a chilled water temperature setpoint $T_{sp,chw}$ that cause CEF 300 to consume the optimal amount of power $P_{total}$ determined by economic controller 510.

In some embodiments, tracking controller 512 relates the power consumption of CEF 300 to the zone temperature $T_{zone}$ and the zone temperature setpoint $T_{sp,zone}$ using a power consumption model. For example, tracking controller 512 can use a model of equipment controller 514 to determine the control action performed by equipment controller 514 as a function of the zone temperature $T_{zone}$ and the zone temperature setpoint $T_{sp,zone}$. An example of such a zone regulatory controller model is shown in the following equation:

$$v_{air} = f_3(T_{zone}, T_{sp,zone})$$

where $v_{air}$ is the rate of airflow to the building zone (i.e., the control action).

Tracking controller 512 can define the power consumption $P_{total}$ of CEF 300 as a function of the zone temperature $T_{zone}$ and the zone temperature setpoint $T_{sp,zone}$. An example of such a model is shown in the following equation:

$$P_{total} = f_4(T_{zone}, T_{sp,zone})$$

The function $f_4$ can be identified from data. For example, tracking controller 512 can collect measurements of $P_{total}$ and $T_{zone}$ and identify the corresponding value of $T_{sp,zone}$. Tracking controller 512 can perform a system identification process using the collected values of $P_{total}$, $T_{zone}$, and $T_{sp,zone}$ as training data to determine the function $f_4$ that defines the relationship between such variables.

Tracking controller 512 may use a similar model to determine the relationship between the total power consumption $P_{total}$ of CEF 300 and the chilled water temperature setpoint $T_{sp,chw}$. For example, tracking controller 512 can define the power consumption $P_{total}$ of CEF 300 as a function of the zone temperature $T_{zone}$ and the chilled water temperature setpoint $T_{sp,chw}$. An example of such a model is shown in the following equation:

$$P_{total} = f_5(T_{zone}, T_{sp,chw})$$

The function $f_5$ can be identified from data. For example, tracking controller 512 can collect measurements of $P_{total}$ and $T_{zone}$ and identify the corresponding value of $T_{sp,chw}$. Tracking controller 512 can perform a system identification process using the collected values of $P_{total}$, $T_{zone}$, and $T_{sp,chw}$ as training data to determine the function $f_5$ that defines the relationship between such variables.

Tracking controller 512 can use the relationships between $P_{total}$, $T_{sp,zone}$, and $T_{sp,chw}$ to determine values for $T_{sp,zone}$ and $T_{sp,chw}$. For example, tracking controller 512 can receive the value of $P_{total}$ as an input from economic controller 510 (i.e., $P_{sp,total}$) and can use determine corresponding values of $T_{sp,zone}$ and $T_{sp,chw}$. Tracking controller 512 can provide the values of $T_{sp,zone}$ and $T_{sp,chw}$ as outputs to equipment controller 514.

In some embodiments, tracking controller 512 uses the battery power setpoint $P_{sp,bat}$ to determine the optimal rate $Bat_{C/D}$ at which to charge or discharge battery unit 302. For example, the battery power setpoint $P_{sp,bat}$ may define a power value (kW) which can be translated by tracking controller 512 into a control signal for power inverter 410 and/or equipment controller 514. In other embodiments, the battery power setpoint $P_{sp,bat}$ is provided directly to power inverter 410 and used by power inverter 410 to control the battery power $P_{bat}$.

Equipment Controller

Equipment controller 514 can use the optimal temperature setpoints $T_{sp,zone}$ or $T_{sp,chw}$ generated by tracking controller 512 to generate control signals for powered CEF components 402. The control signals generated by equipment controller 514 may drive the actual (e.g., measured) temperatures $T_{zone}$ and/or $T_{chw}$ to the setpoints. Equipment controller 514 can use any of a variety of control techniques to generate control signals for powered CEF components 402. For example, equipment controller 514 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for powered CEF components 402.

The control signals may include on/off commands, speed setpoints for fans of cooling towers 404, power setpoints for compressors of chillers 406, chilled water temperature setpoints for chillers 406, pressure setpoints or flow rate setpoints for pumps 408, or other types of setpoints for individual devices of powered CEF components 402. In other embodiments, the control signals may include the temperature setpoints (e.g., a zone temperature setpoint $T_{sp,zone}$, a chilled water temperature setpoint $T_{sp,chw}$, etc.) generated by predictive CEF controller 304. The temperature setpoints can be provided to powered CEF components 402 or local controllers for powered CEF components 402 which operate to achieve the temperature setpoints. For example, a local controller for chillers 406 may receive a measurement of the chilled water temperature $T_{chw}$ from chilled water temperature sensor and/or a measurement the zone temperature $T_{zone}$ from a zone temperature sensor.

In some embodiments, equipment controller 514 is configured to provide control signals to power inverter 410. The control signals provided to power inverter 410 can include a battery power setpoint $P_{sp,bat}$ and/or the optimal charge/discharge rate $Bat_{C/D}$. Equipment controller 514 can be configured to operate power inverter 410 to achieve the battery power setpoint $P_{sp,bat}$. For example, equipment controller 514 can cause power inverter 410 to charge battery unit 302 or discharge battery unit 302 in accordance with the battery power setpoint $P_{sp,bat}$.

Figure 6:
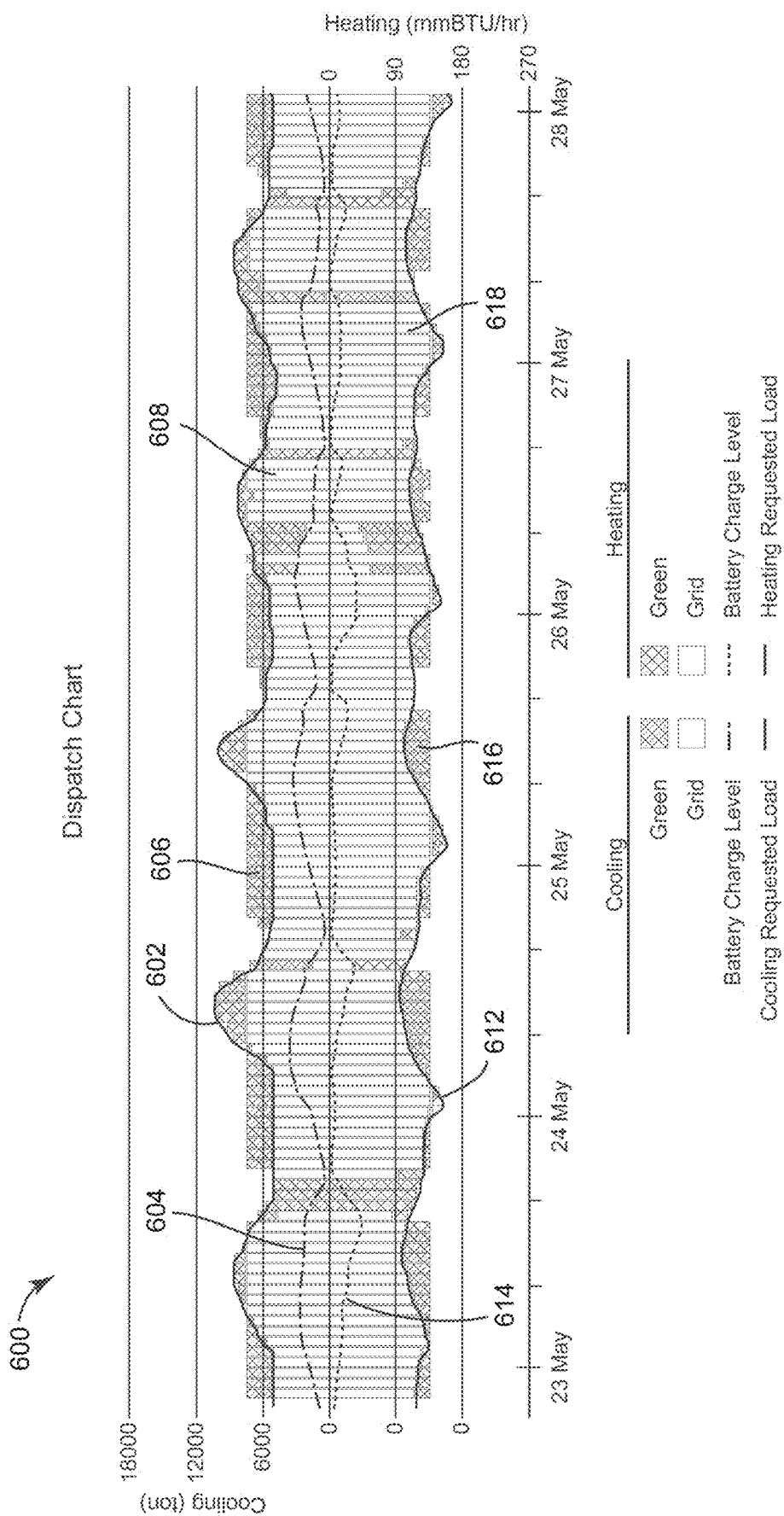
FIG. 6 is a graph of a user interface which can be generated by the predictive CEF controller of FIG. 3, according to some embodiments.

Referring now to FIG. 6, a user interface 600 which can be generated by predictive CEF controller 304 is shown, according to some embodiments. As discussed above, economic controller 510 can be configured to determine the portion of each power consumption value (e.g., $P_{chiller}$, $P_{HRC}$, etc.) that consists of grid power and/or battery power at each time step of the optimization period. User interface 600 can be used to convey to a user the relative portions of each power consumption value that consist of grid power and/or battery power.

Interface 600 illustrates a dispatch chart. The top half of the dispatch chart corresponds to cooling, whereas the bottom half of the dispatch chart corresponds to heating. The midline between the top and bottom halves corresponds to zero load/power for both halves. Positive cooling values are shown as displacement above the midline, whereas positive heating values are shown as displacement below the midline. Lines 602 and 612 represent the requested cooling load and the requested heating load, respectively, at each time step of the optimization period. Lines 604 and 614 represent the charge level of batteries used to power the cooling equipment (e.g., a chiller subplant) and the heating equipment (e.g., a heater subplant) over the duration of the optimization period.

As discussed above, economic controller 510 can be configured to determine optimal power setpoints for each time step of the optimization period. The results of the optimization performed by economic controller 510 can be represented in the dispatch chart. For example, the dispatch chart is shown to include a vertical column for each time step of the optimization period. Each column may include one or more bars representing the power setpoints determined by economic controller 510 for the corresponding time step. The color of each bar indicates the type of power setpoint. For example, gray bars 608 and 618 (shown as white bars in FIG. 6) may indicate the grid power setpoint (e.g., $P_{sp,grid}$) whereas green bars 606 and 616 (shown as shaded bars in FIG. 6) may indicate the battery power setpoint (e.g., $P_{sp,bat}$). The height of each bar indicates the magnitude of the corresponding power setpoint at that time step.

Green bars 606 positioned above requested cooling line 602 indicate that the cooling equipment battery is charging (i.e., excess energy used to charge the battery), whereas green bars 606 positioned below requested cooling line 602 indicate that the cooling equipment battery is discharging (i.e., battery power used to satisfy part of the requested cooling load). The charge level of the cooling equipment battery increases when the cooling equipment battery is charging and decreases when the cooling equipment battery is discharging.

Similarly, green bars 616 positioned below requested heating line 612 indicate that the heating equipment battery is charging (i.e., excess energy used to charge the battery), whereas green bars 616 positioned above requested heating line 612 indicate that the heating equipment battery is discharging (i.e., battery power used to satisfy part of the requested heating load). The charge level of the heating equipment battery increases when the heating equipment battery is charging and decreases when the heating equipment battery is discharging.

Air Cooled Chiller with Battery Unit and Predictive Control

Figure 7:
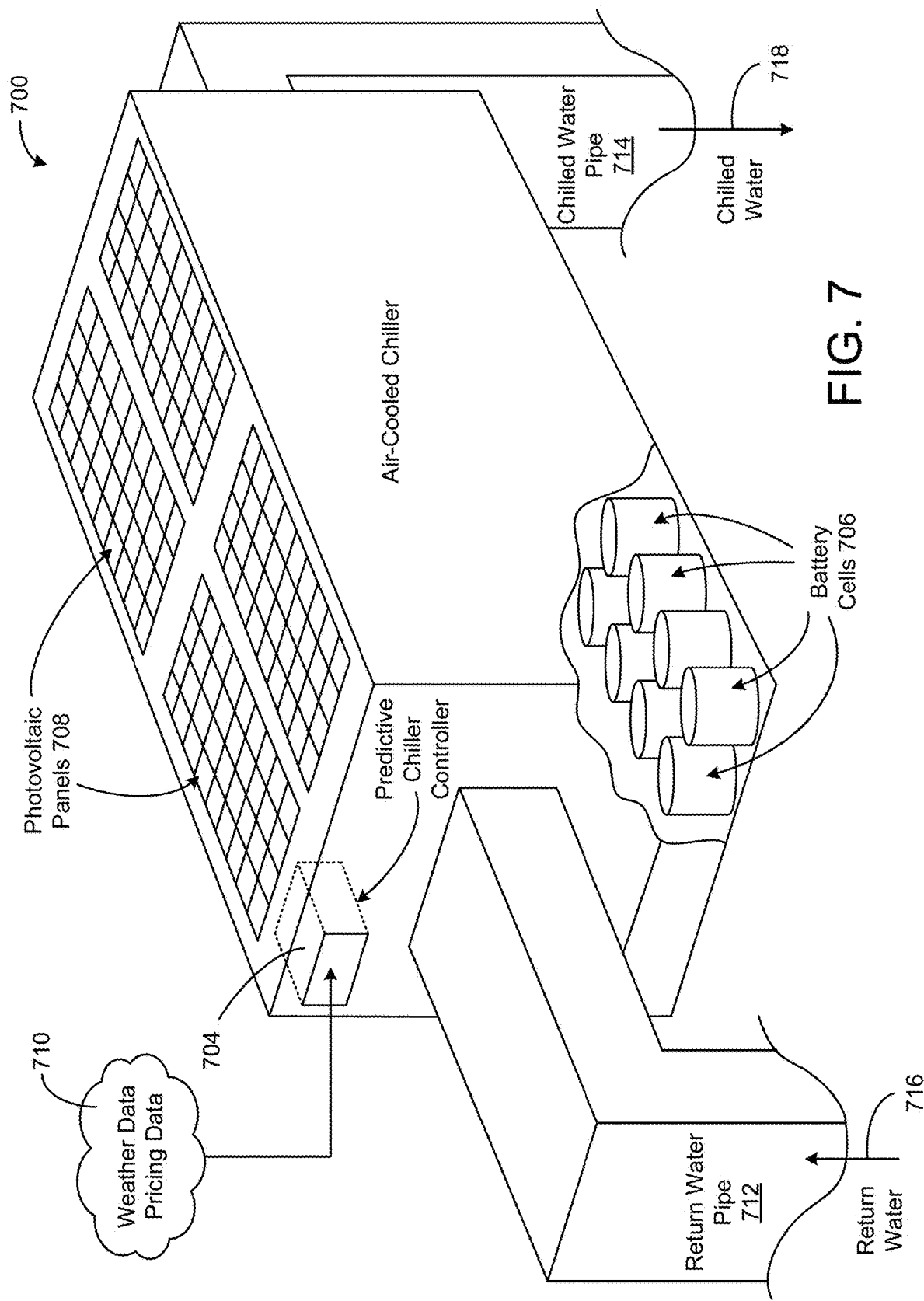
FIG. 7 is a drawing of an air-cooled chiller unit with a battery unit and a predictive chiller controller, according to some embodiments.
Figure 8:
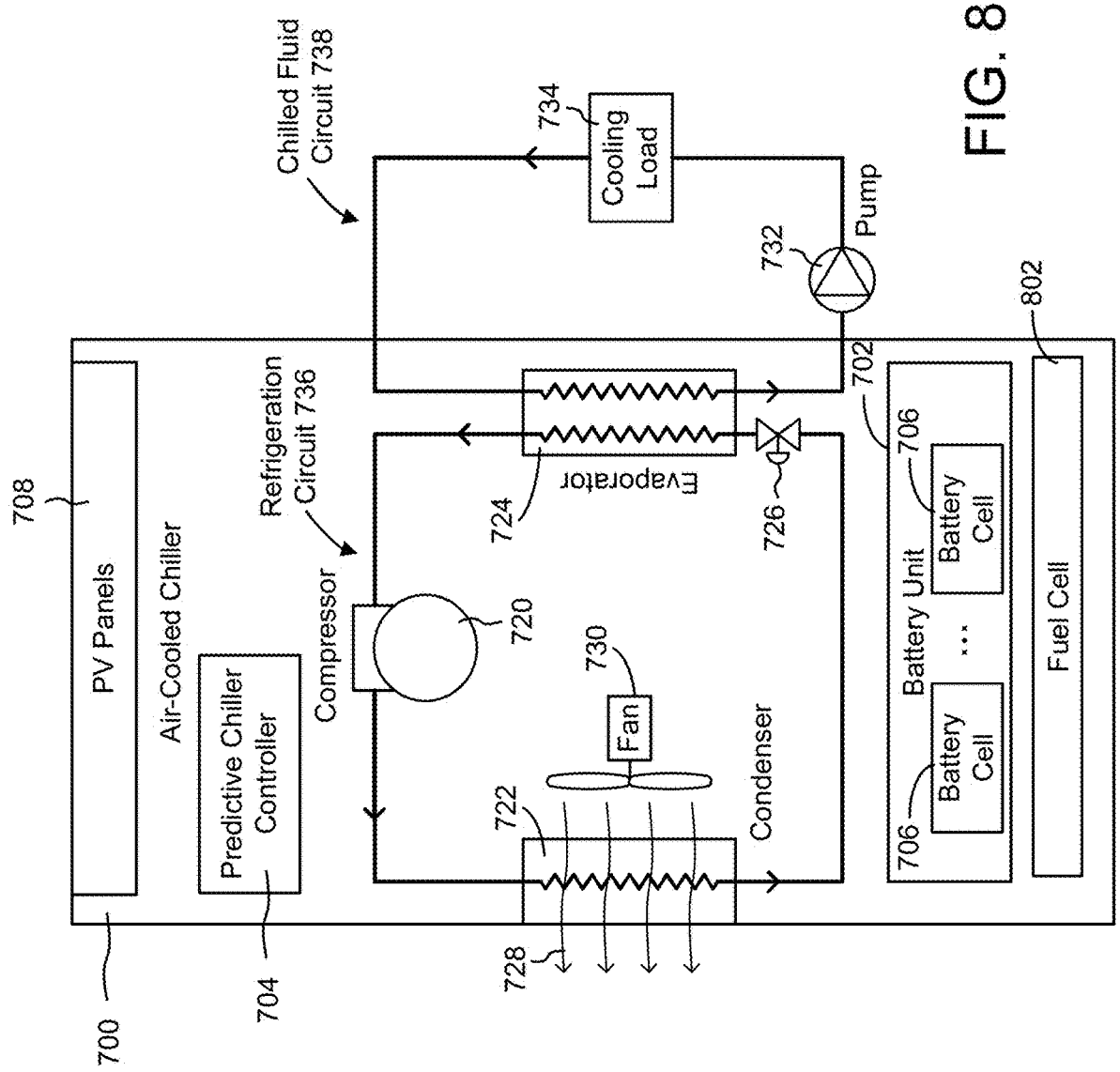
FIG. 8 is a block diagram of the air-cooled chiller unit of FIG. 7, according to some embodiments.

Referring now to FIGS. 7-8, an air-cooled chiller 700 with a battery unit 702 and predictive chiller controller 704 is shown, according to some embodiments. Chiller 700 can be configured to provide a chilled fluid (e.g., chilled water 718) to a cooling load 734 via chilled water pipe 714. Cooling load 734 can include, for example, a building zone, a supply airstream flowing through an air duct, an airflow in an air handling unit or rooftop unit, fluid flowing through a heat exchanger, a refrigerator or freezer, a condenser or evaporator, a cooling coil, or any other type of system, device, or space which requires cooling. In some embodiments, a pump 732 circulates a chilled fluid to cooling load 734 via a chilled fluid circuit 738. The chilled fluid can absorb heat from cooling load 734, thereby providing cooling to cooling load 734 and warming the chilled fluid. The warmed fluid (shown in FIG. 7 as return water 716) may return to chiller 700 via return water pipe 712.

Chiller 700 is shown to include a condenser 722, a compressor 720, an evaporator 724, an expansion device 726, and a fan 730. Compressor 720 can be configured to circulate a refrigerant between condenser 722 and evaporator 724 via refrigeration circuit 736. Compressor 720 operates to compress the refrigerant to a high pressure, high temperature state. The compressed refrigerant flows through condenser 722, which transfers heat from the refrigerant in refrigeration circuit 736 to an airflow 728. A fan 730 can be used to force airflow 728 through or over condenser 722 to provide cooling for the refrigerant in condenser 722. The cooled refrigerant then flows through expansion device 726, which expands the refrigerant to a low temperature, low pressure state. The expanded refrigerant flows through evaporator 724, which transfers heat from the chilled fluid in chilled fluid circuit 738 to the refrigerant in refrigeration circuit 736.

In some embodiments, chiller 700 includes one or more photovoltaic (PV) panels 708. PV panels 708 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form PV panels 708. Each PV panel 708 may include a plurality of linked photovoltaic cells. PV panels 708 may combine to form a photovoltaic array.

In some embodiments, PV panels 708 are configured to maximize solar energy collection. For example, chiller 700 may include a solar tracker (e.g., a GPS tracker, a sunlight sensor, etc.) that adjusts the angle of PV panels 708 so that PV panels 708 are aimed directly at the sun throughout the day. The solar tracker may allow PV panels 708 to receive direct sunlight for a greater portion of the day and may increase the total amount of power produced by PV panels 708. In some embodiments, chiller 700 includes a collection of mirrors, lenses, or solar concentrators configured to direct and/or concentrate sunlight on PV panels 708. The energy generated by PV panels 708 may be stored in battery unit 702 and/or used to power various components of chiller 700.

In some embodiments, battery unit 702 includes one or more battery cells 706. Battery cells 706 are configured to store and discharge electric energy (i.e., electricity). In some embodiments, battery unit 702 is charged using electricity from an external energy grid (e.g., provided by an electric utility). The electricity stored in battery unit 702 can be discharged to power one or more powered components of chiller 700 (e.g., fan 730, compressor 720, pump 732, etc.). Advantageously, battery unit 702 allows chiller 700 to draw electricity from the energy grid and charge battery unit 702 when energy prices are low and discharge the stored electricity when energy prices are high to time-shift the electric load of chiller 700. In some embodiments, battery unit 702 has sufficient energy capacity to power chiller 700 for approximately 4-6 hours when operating at maximum capacity such that battery unit 702 can be utilized during high energy cost periods and charged during low energy cost periods.

As shown in FIG. 8, the chiller 700 can include a fuel cell 802. In some embodiments, the fuel cell 802 is a fuel cell configured to generate electrical energy using chemical reactions. For example, the fuel cell 802 may convert the chemical energy of hydrogen and an oxidizing agent (e.g., oxygen) into electricity through a pair of redox reactions. In other embodiments, the fuel cell 802 is a hydrocarbon fuel cells that use one or more of diesel, methanol, natural gas, etc. to generate electricity. The fuel cell 802 can be controlled to generate electricity to augment grid energy or other energy sources, complement battery discharge during high energy cost periods, or generate electricity to charge the battery (e.g., during high energy cost periods). The fuel cell may require fuel replacement (e.g., a supply of hydrogen) which may be purchase periodically and added to the chiller 700, for example. In embodiments where the chiller 700 includes the fuel cell 802, the control and optimization processes herein are configured to account for the contributions of the fuel cell 802 and the cost of operating the fuel cell 802 when generating control outputs for the various components of the chiller 700, including the fuel cell 802. For example, an optimization performed by the predictive chiller controller 704 may determine whether to operate the fuel cell 802 to generate electricity for each time step in an optimization period.

In some embodiments, predictive chiller controller 704 performs an optimization process to determine whether to charge or discharge battery unit 702 during each of a plurality of time steps that occur during an optimization period. Predictive chiller controller 704 may use weather and pricing data 710 to predict the amount of heating/cooling required and the cost of electricity during each of the plurality of time steps. Predictive chiller controller 704 can optimize an objective function that accounts for the cost of electricity purchased from the energy grid over the duration of the optimization period. Predictive chiller controller 704 can determine an amount of electricity to purchase from the energy grid and an amount of electricity to store or discharge from battery unit 702 during each time step. The objective function and the optimization performed by predictive chiller controller 704 are described in greater detail with reference to FIGS. 9-10.

Predictive Chiller Control System

Figure 9:
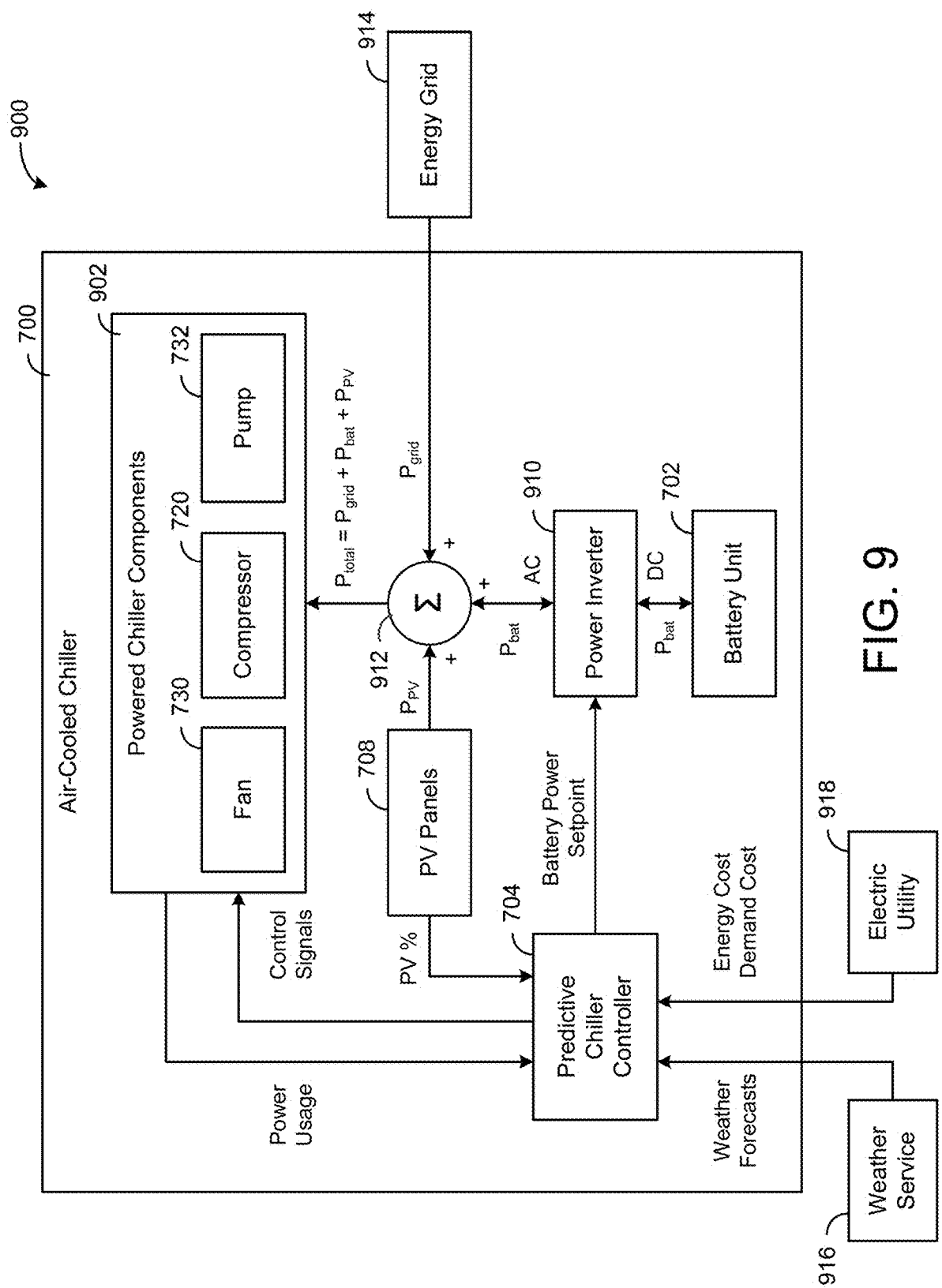
FIG. 9 is a block diagram of a predictive chiller control system including the battery unit and predictive chiller controller of FIG. 7, according to some embodiments.

Referring now to FIG. 9, a block diagram of a predictive chiller control system 900 is shown, according to some embodiments. Several of the components shown in control system 900 may be part of chiller 700. For example, chiller 700 may include powered chiller components 902, battery unit 702, predictive chiller controller 704, power inverter 910, and a power junction 912. Powered chiller components 902 may include any component of chiller 700 that consumes power (e.g., electricity) during operation. For example, powered chiller components 902 are shown to include cooling fan 730, compressor 720, and pump 732.

Power inverter 910 may be configured to convert electric power between direct current (DC) and alternating current (AC). For example, battery unit 702 may be configured to store and output DC power, whereas energy grid 914 and powered chiller components 902 may be configured to consume and provide AC power. Power inverter 910 may be used to convert DC power from battery unit 702 into a sinusoidal AC output synchronized to the grid frequency of energy grid 914 and/or powered chiller components 902. Power inverter 910 may also be used to convert AC power from energy grid 914 into DC power that can be stored in battery unit 702. The power output of battery unit 702 is shown as $P_{bat}$. $P_{bat}$ may be positive if battery unit 702 is providing power to power inverter 910 (i.e., battery unit 702 is discharging) or negative if battery unit 702 is receiving power from power inverter 910 (i.e., battery unit 702 is charging).

In some instances, power inverter 910 receives a DC power output from battery unit 702 and converts the DC power output to an AC power output that can be provided to powered chiller components 902. Power inverter 910 may synchronize the frequency of the AC power output with that of energy grid 914 (e.g., 50 Hz or 60 Hz) using a local oscillator and may limit the voltage of the AC power output to no higher than the grid voltage. In some embodiments, power inverter 910 is a resonant inverter that includes or uses LC circuits to remove the harmonics from a simple square wave in order to achieve a sine wave matching the frequency of energy grid 914. In various embodiments, power inverter 910 may operate using high-frequency transformers, low-frequency transformers, or without transformers. Low-frequency transformers may convert the DC output from battery unit 702 directly to the AC output provided to powered chiller components 902. High-frequency transformers may employ a multi-step process that involves converting the DC output to high-frequency AC, then back to DC, and then finally to the AC output provided to powered chiller components 902.

The power output of PV panels 708 is shown as $P_{PV}$. The power output $P_{PV}$ of PV panels 708 can be stored in battery unit 702 and/or used to power powered chiller components 902. In some embodiments, PV panels 708 measure the amount of power $P_{PV}$ generated by PV panels 708 and provides an indication of the PV power to predictive chiller controller 704. For example, PV panels 708 are shown providing an indication of the PV power percentage (i.e., PV %) to predictive chiller controller 704. The PV power percentage may represent a percentage of the maximum PV power at which PV panels 708 are currently operating.

Power junction 912 is the point at which powered chiller components 902, energy grid 914, PV panels 708, and power inverter 910 are electrically connected. The power supplied to power junction 912 from power inverter 910 is shown as $P_{bat}$. $P_{bat}$ may be positive if power inverter 910 is providing power to power junction 912 (i.e., battery unit 702 is discharging) or negative if power inverter 910 is receiving power from power junction 912 (i.e., battery unit 702 is charging). The power supplied to power junction 912 from energy grid 914 is shown as $P_{grid}$ and the power supplied to power junction 912 from PV panels 708 is shown as $P_{PV}$.

$P_{bat}$, $P_{PV}$, and $P_{grid}$ combine at power junction 912 to form $P_{total}$ (i.e., $P_{total} = P_{grid} + P_{bat} + P_{PV}$). $P_{total}$ may be defined as the power provided to powered chiller components 902 from power junction 912. In some instances, $P_{total}$ is greater than $P_{grid}$. For example, when battery unit 702 is discharging, $P_{bat}$ may be positive which adds to the grid power $P_{grid}$ and the PV power $P_{PV}$ when $P_{bat}$ and $P_{PV}$ combine with $P_{grid}$ to form $P_{total}$. In other instances, $P_{total}$ may be less than $P_{grid}$. For example, when battery unit 702 is charging, $P_{bat}$ may be negative which subtracts from the grid power $P_{grid}$ and the PV power $P_{PV}$ when $P_{bat}$, $P_{PV}$, and $P_{grid}$ combine to form $P_{total}$.

Predictive chiller controller 704 can be configured to control powered chiller components 902 and power inverter 910. In some embodiments, predictive chiller controller 704 generates and provides a battery power setpoint $P_{sp,bat}$ to power inverter 910. The battery power setpoint $P_{sp,bat}$ may include a positive or negative power value (e.g., kW) which causes power inverter 910 to charge battery unit 702 (when $P_{sp,bat}$ is negative) using power available at power junction 912 or discharge battery unit 702 (when $P_{sp,bat}$ is positive) to provide power to power junction 912 in order to achieve the battery power setpoint $P_{sp,bat}$.

In some embodiments, predictive chiller controller 704 generates and provides control signals to powered chiller components 902. Predictive chiller controller 704 may use a multi-stage optimization technique to generate the control signals. For example, predictive chiller controller 704 may include an economic controller configured to determine the optimal amount of power to be consumed by powered chiller components 902 at each time step during the optimization period. The optimal amount of power to be consumed may minimize a cost function that accounts for the cost of energy consumed by chiller 700. The cost of energy may be based on time-varying energy prices from electric utility 918. In some embodiments, predictive chiller controller 704 determines an optimal amount of power to purchase from energy grid 914 (i.e., a grid power setpoint $P_{sp,grid}$) and an optimal amount of power to store or discharge from battery unit 702 (i.e., a battery power setpoint $P_{sp,bat}$) at each of the plurality of time steps. Predictive chiller controller 704 may monitor the actual power usage of powered chiller components 902 and may utilize the actual power usage as a feedback signal when generating the optimal power setpoints.

Predictive chiller controller 704 may include a tracking controller configured to generate temperature setpoints (e.g., an air temperature setpoint $T_{sp,air}$, a chilled water temperature setpoint $T_{sp,water}$, etc.) that achieve the optimal amount of power consumption at each time step. In some embodiments, predictive chiller controller 704 uses equipment models for powered chiller components 902 to determine an amount of heating or cooling that can be generated by chiller components 902 based on the optimal amount of power consumption. Predictive chiller controller 704 can use a temperature model to predict how the temperature of the chilled water $T_{water}$ will change based on the power setpoints.

In some embodiments, predictive chiller controller 704 uses the temperature setpoints to generate the control signals for powered chiller components 902. The control signals may include on/off commands, speed setpoints for fan 730, power setpoints for compressor 720, chilled water temperature setpoints chiller 700, pressure setpoints or flow rate setpoints for pump 732, or other types of setpoints for individual devices of powered chiller components 902. In other embodiments, the control signals may include the temperature setpoints (e.g., an air temperature setpoint $T_{sp,air}$, a chilled water temperature setpoint $T_{sp,water}$, etc.) generated by predictive chiller controller 704. The temperature setpoints can be provided to powered chiller components 902 or local controllers for powered chiller components 902 which operate to achieve the temperature setpoints. For example, a local controller for fan 730 may receive a measurement of the chilled water temperature $T_{water}$ from a chilled water temperature sensor and/or a measurement the air temperature $T_{air}$ (i.e., the temperature of airflow 728) from an air temperature sensor. The local controller can use a feedback control process (e.g., PID, ESC, MPC, etc.) to increase or decrease the airflow provided by fan 730 to drive the measured temperature(s) to the temperature setpoint(s). Similar feedback control processes can be used to compressor 720 and/or pump 732. The multi-stage optimization performed by predictive chiller controller 704 is described in greater detail with reference to FIG. 10.

Predictive Chiller Controller

Figure 10:
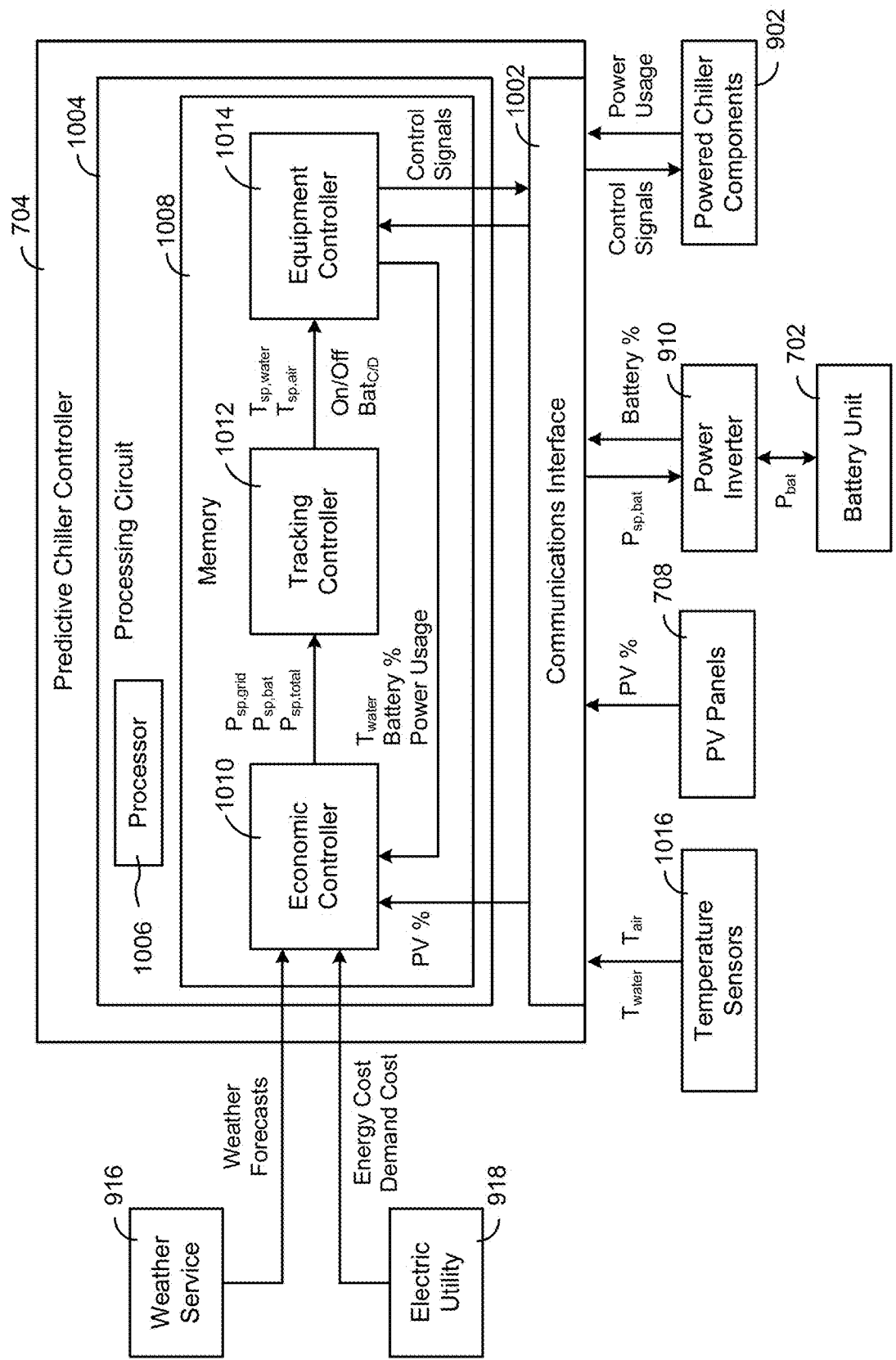
FIG. 10 is a block diagram illustrating the predictive chiller controller of FIG. 7 in greater detail, according to some embodiments.

Referring now to FIG. 10, a block diagram illustrating predictive chiller controller 704 in greater detail is shown, according to an exemplary embodiment. Predictive chiller controller 704 is shown to include a communications interface 1002 and a processing circuit 1004. Communications interface 1002 may facilitate communications between controller 704 and external systems or devices. For example, communications interface 1002 may receive measurements of the air temperature $T_{air}$ and the chilled water temperature $T_{water}$ from temperature sensors 1016 and measurements of the power usage of powered chiller components 902. In some embodiments, communications interface 1002 receives measurements of the state-of-charge (SOC) of battery unit 702, which can be provided as a percentage of the maximum battery capacity (i.e., battery %). Communications interface 1002 can receive weather forecasts from a weather service 916 and predicted energy costs and demand costs from an electric utility 918. In some embodiments, predictive chiller controller 704 uses communications interface 1002 to provide control signals powered chiller components 902 and power inverter 910.

Communications interface 1002 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 1002 can include an Ethernet card and port for sending and receiving data via an Ethernet-based communications link or network. In another example, communications interface 1002 can include a Wi-Fi transceiver for communicating via a wireless communications network or cellular or mobile phone communications transceivers.

Processing circuit 1004 is shown to include a processor 1006 and memory 1008. Processor 1006 may be a general purpose or specific purpose processor, an application specific integrated circuit (ASIC), one or more field programmable gate arrays (FPGAs), a group of processing components, or other suitable processing components. Processor 1006 is configured to execute computer code or instructions stored in memory 1008 or received from other computer readable media (e.g., CDROM, network storage, a remote server, etc.).

Memory 1008 may include one or more devices (e.g., memory units, memory devices, storage devices, etc.) for storing data and/or computer code for completing and/or facilitating the various processes described in the present disclosure. Memory 1008 may include random access memory (RAM), read-only memory (ROM), hard drive storage, temporary storage, non-volatile memory, flash memory, optical memory, or any other suitable memory for storing software objects and/or computer instructions. Memory 1008 may include database components, object code components, script components, or any other type of information structure for supporting the various activities and information structures described in the present disclosure. Memory 1008 may be communicably connected to processor 1006 via processing circuit 1004 and may include computer code for executing (e.g., by processor 1006) one or more processes described herein. When processor 1006 executes instructions stored in memory 1008 for completing the various activities described herein, processor 1006 generally configures controller 704 (and more particularly processing circuit 1004) to complete such activities.

Still referring to FIG. 10, predictive chiller controller 704 is shown to include an economic controller 1010, a tracking controller 1012, and an equipment controller 1014. Controllers 1010-1014 can be configured to perform a multi-state optimization process to generate control signals for power inverter 910 and powered chiller components 902. In brief overview, economic controller 1010 can optimize a predictive cost function to determine an optimal amount of power to purchase from energy grid 914 (i.e., a grid power setpoint $P_{sp,grid}$), an optimal amount of power to store or discharge from battery unit 702 (i.e., a battery power setpoint $P_{sp,bat}$), and/or an optimal amount of power to be consumed by powered chiller components 902 (i.e., a chiller power setpoint $P_{sp,total}$) at each time step of an optimization period. Tracking controller 1012 can use the optimal power setpoints $P_{sp,grid}$, $P_{sp,bat}$, and/or $P_{sp,total}$ to determine optimal temperature setpoints (e.g., an air setpoint $T_{sp,air}$, a chilled water temperature setpoint $T_{sp,water}$, etc.) and an optimal battery charge or discharge rate (i.e., $Bat_{C/D}$). Equipment controller 1014 can use the optimal temperature setpoints $T_{sp,air}$ or $T_{sp,water}$ to generate control signals for powered chiller components 902 that drive the actual (e.g., measured) temperatures $T_{air}$ and/or $T_{water}$ to the setpoints (e.g., using a feedback control technique). Each of controllers 1010-1014 is described in detail below.

Economic Controller

Economic controller 1010 can be configured to optimize a predictive cost function to determine an optimal amount of power to purchase from energy grid 914 (i.e., a grid power setpoint $P_{sp,grid}$), an optimal amount of power to store or discharge from battery unit 702 (i.e., a battery power setpoint $P_{sp,bat}$), and/or an optimal amount of power to be consumed by powered chiller components 902 (i.e., a chiller power setpoint $P_{sp,total}$) at each time step of an optimization period. An example of a predictive cost function which can be optimized by economic controller 1010 is shown in the following equation:

$$\min(J) = \sum_{k=1}^{h} C_{ec}(k)P_{fan}(k)\Delta t + \sum_{k=1}^{h} C_{ec}(k)P_{comp}(k)\Delta t + \sum_{k=1}^{h} C_{ec}(k)P_{pump}(k)\Delta t + C_{DC}\max_{k}(P_{grid}(k)) - \sum_{k=1}^{h} C_{ec}(k)P_{bat}(k)\Delta t$$

where $C_{ec}(k)$ is the cost per unit of electricity (e.g., $/kWh) purchased from electric utility 918 during time step k, $P_{fan}(k)$ is the power consumption (e.g., kW) of fan 730 during time step k, $P_{comp}(k)$ is the power consumption of compressor 720 at time step k, $P_{pump}(k)$ is the power consumption of pump 732 at time step k, $C_{DC}$ is the demand charge rate (e.g., \$/kW), where the max( ) term selects the maximum electricity purchase of chiller 700 (i.e., the maximum value of $P_{grid}(k)$) during any time step k of the optimization period, $P_{bat}(k)$ is the amount of power discharged from battery unit 702 during time step k, and $\Delta t$ is the duration of each time step k. Economic controller 1010 can optimize the predictive cost function J over the duration of the optimization period (e.g., from time step k=1 to time step k=h) to predict the total cost of operating chiller 700 over the duration of the optimization period.

The first, second, and third terms of the predictive cost function J represent the cost of electricity consumed by powered chiller components 902 over the duration of the optimization period. The values of the parameter $C_{ec}(k)$ at each time step k can be defined by the energy cost information provided by electric utility 918. In some embodiments, the cost of electricity varies as a function of time, which results in different values of $C_{ec}(k)$ at different time steps k. The variables $P_{fan}(k)$, $P_{comp}(k)$, and $P_{pump}(k)$ are decision variables which can be optimized by economic controller 1010. In some embodiments, the total power consumption $P_{total}(k)$ of powered chiller components 902 at time step k is equal to the sum of $P_{fan}(k)$, $P_{comp}(k)$, and $P_{pump}(k)$ (i.e., $P_{total}(k)=P_{fan}(k)+P_{comp}(k)+P_{pump}(k)$). Accordingly, the first three terms of the predictive cost function can be replaced with the summation $\Sigma_{k=1}^{h} C_{ec}(k) P_{total}(k)\Delta t$ in some embodiments.

The fourth term of the predictive cost function J represents the demand charge. Demand charge is an additional charge imposed by some utility providers based on the maximum power consumption during an applicable demand charge period. For example, the demand charge rate $C_{DC}$ may be specified in terms of dollars per unit of power (e.g., \$/kW) and may be multiplied by the peak power usage (e.g., kW) during a demand charge period to calculate the demand charge. In the predictive cost function J, the demand charge rate $C_{DC}$ may be defined by the demand cost information received from electric utility 918. The variable $P_{grid}(k)$ is a decision variable which can be optimized by economic controller 1010 in order to reduce the peak power usage max($P_{grid}(k)$) that occurs during the demand charge period. Load shifting may allow economic controller 1010 to smooth momentary spikes in the electric demand of chiller 700 by storing energy in battery unit 702 when the power consumption of powered chiller components 902 is low. The stored energy can be discharged from battery unit 702 when the power consumption of powered chiller components 902 is high in order to reduce the peak power draw $P_{grid}$ from energy grid 914, thereby decreasing the demand charge incurred.

The final term of the predictive cost function J represents the cost savings resulting from the use of battery unit 702. Unlike the previous terms in the cost function J, the final term subtracts from the total cost. The values of the parameter $C_{ec}(k)$ at each time step k can be defined by the energy cost information provided by electric utility 918. In some embodiments, the cost of electricity varies as a function of time, which results in different values of $C_{ec}(k)$ at different time steps k. The variable $P_{bat}(k)$ is a decision variable which can be optimized by economic controller 1010. A positive value of $P_{bat}(k)$ indicates that battery unit 702 is discharging, whereas a negative value of $P_{bat}(k)$ indicates that battery unit 702 is charging. The power discharged from battery unit 702 $P_{bat}(k)$ can be used to satisfy some or all of the total power consumption $P_{total}(k)$ of powered chiller components 902, which reduces the amount of power $P_{grid}(k)$ purchased from energy grid 914 (i.e., $P_{grid}(k)=P_{total}(k)-P_{bat}(k)-P_{PV}(k)$). However, charging battery unit 702 results in a negative value of $P_{bat}(k)$ which adds to the total amount of power $P_{grid}(k)$ purchased from energy grid 914.

In some embodiments, the power $P_{PV}$ provided by PV panels 708 is not included in the predictive cost function J because generating PV power does not incur a cost. However, the power $P_{PV}$ generated by PV panels 708 can be used to satisfy some or all of the total power consumption $P_{total}(k)$ of powered chiller components 902, which reduces the amount of power $P_{grid}(k)$ purchased from energy grid 914 (i.e., $P_{grid}(k)=P_{total}(k)-P_{bat}(k)-P_{PV}(k)$). The amount of PV power $P_{PV}$ generated during any time step k can be predicted by economic controller 1010. Several techniques for predicting the amount of PV power generated by PV panels are described in U.S. patent application Ser. No. 15/247,869, U.S. patent application Ser. No. 15/247,844, and U.S. patent application Ser. No. 15/247,788. Each of these patent applications has a filing date of Aug. 25, 2016, and the entire disclosure of each of these patent applications is incorporated by reference herein.

Economic controller 1010 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 1010 can use battery unit 702 to perform load shifting by drawing electricity from energy grid 914 when energy prices are low and/or when the power consumed by powered chiller components 902 is low. The electricity can be stored in battery unit 702 and discharged later when energy prices are high and/or the power consumption of powered chiller components 902 is high. This enables economic controller 1010 to reduce the cost of electricity consumed by chiller 700 and can smooth momentary spikes in the electric demand of chiller 700, thereby reducing the demand charge incurred.

Economic controller 1010 can be configured to impose constraints on the optimization of the predictive cost function J. In some embodiments, the constraints include constraints on the temperature $T_{water}$ of the chilled water produced by chiller 700. Economic controller 1010 can be configured to maintain the actual or predicted temperature $T_{water}$ between a minimum temperature bound $T_{min}$ and a maximum temperature bound $T_{max}$ (i.e., $T_{min} \leq T_{water} \leq T_{max}$) at all times. The parameters $T_{min}$ and $T_{max}$ may be time-varying to define different temperature ranges at different times.

In addition to constraints on the water temperature $T_{water}$, economic controller 1010 can impose constraints on the state-of-charge (SOC) and charge/discharge rates of battery unit 702. In some embodiments, economic controller 1010 generates and imposes the following power constraints on the predictive cost function J:

$$P_{bat} \leq P_{rated}$$

$$-P_{bat} \leq P_{rated}$$

where $P_{bat}$ is the amount of power discharged from battery unit 702 and $P_{rated}$ is the rated battery power of battery unit 702 (e.g., the maximum rate at which battery unit 702 can be charged or discharged). These power constraints ensure that battery unit 702 is not charged or discharged at a rate that exceeds the maximum possible battery charge/discharge rate $P_{rated}$.

In some embodiments, economic controller 1010 generates and imposes one or more capacity constraints on the predictive cost function J The capacity constraints may be used to relate the battery power $P_{bat}$ charged or discharged during each time step to the capacity and SOC of battery unit 702. The capacity constraints may ensure that the capacity of battery unit 702 is maintained within acceptable lower and upper bounds at each time step of the optimization period. In some embodiments, economic controller 1010 generates the following capacity constraints:

$$C_a(k) - P_{bat}(k)\Delta t \leq C_{rated}$$

$$C_a(k) - P_{bat}(k)\Delta t \geq 0$$

where $C_a(k)$ is the available battery capacity (e.g., kWh) at the beginning of time step k, $P_{bat}(k)$ is the rate at which battery unit 702 is discharged during time step k (e.g., kW), $\Delta t$ is the duration of each time step, and $C_{rated}$ is the maximum rated capacity of battery unit 702 (e.g., kWh). The term $P_{bat}(k)\Delta t$ represents the change in battery capacity during time step k. These capacity constraints ensure that the capacity of battery unit 702 is maintained between zero and the maximum rated capacity $C_{rated}$.

In some embodiments, economic controller 1010 generates and imposes one or more capacity constraints on the operation of powered chiller components 902. For example, powered chiller components 902 may have a maximum operating point (e.g., a maximum pump speed, a maximum cooling capacity, etc.) which corresponds to a maximum power consumption $P_{total,max}$. Economic controller 1010 can be configured to generate a constraint which limits the power $P_{total}$ provided to powered chiller components 902 between zero and the maximum power consumption $P_{total,max}$ as shown in the following equation:

$$0 \leq P_{total} \leq P_{total,max}$$

$$P_{total} = P_{sp,grid} + P_{sp,bat}$$

where the total power $P_{total}$ provided to powered chiller components 902 is the sum of the grid power setpoint $P_{sp,grid}$ and the battery power setpoint $P_{sp,bat}$.

Economic controller 1010 can optimize the predictive cost function J subject to the constraints to determine optimal values for the decision variables $P_{total}$, $P_{fan}$, $P_{comp}$, $P_{pump}$, $P_{grid}$, and $P_{bat}$, where $P_{total} = P_{bat} + P_{grid} + P_{PV}$. In some embodiments, economic controller 1010 uses the optimal values for $P_{total}$, $P_{bat}$, and/or $P_{grid}$ to generate power setpoints for tracking controller 1012. The power setpoints can include battery power setpoints $P_{sp,bat}$, grid power setpoints $P_{sp,grid}$, and/or chiller power setpoints $P_{sp,total}$ for each of the time steps k in the optimization period. Economic controller 1010 can provide the power setpoints to tracking controller 1012.

Tracking Controller

Tracking controller 1012 can use the optimal power setpoints $P_{sp,grid}$, $P_{sp,bat}$, and/or $P_{sp,total}$ generated by economic controller 1010 to determine optimal temperature setpoints (e.g., an air temperature setpoint $T_{sp,air}$, a chilled water temperature setpoint $T_{sp,water}$, etc.) and an optimal battery charge or discharge rate (i.e., $Bat_{C/D}$). In some embodiments, tracking controller 1012 generates an air temperature setpoint $T_{sp,air}$ and/or a chilled water temperature setpoint $T_{sp,water}$ that are predicted to achieve the power setpoint $P_{sp,total}$ for chiller 700. In other words, tracking controller 1012 may generate an air temperature setpoint $T_{sp,air}$ and/or a chilled water temperature setpoint $T_{sp,water}$ that cause chiller 700 to consume the optimal amount of power $P_{total}$ determined by economic controller 1010.

In some embodiments, tracking controller 1012 uses the battery power setpoint $P_{sp,bat}$ to determine the optimal rate $Bat_{C/D}$ at which to charge or discharge battery unit 702. For example, the battery power setpoint $P_{sp,bat}$ may define a power value (kW) which can be translated by tracking controller 1012 into a control signal for power inverter 910 and/or equipment controller 1014. In other embodiments, the battery power setpoint $P_{sp,bat}$ is provided directly to power inverter 910 and used by power inverter 910 to control the battery power $P_{bat}$.

Equipment Controller

Equipment controller 1014 can use the optimal temperature setpoints $T_{sp,air}$ or $T_{sp,water}$ generated by tracking controller 1012 to generate control signals for powered chiller components 902. The control signals generated by equipment controller 1014 may drive the actual (e.g., measured) temperatures $T_{air}$ and/or $T_{water}$ to the setpoints. Equipment controller 1014 can use any of a variety of control techniques to generate control signals for powered chiller components 902. For example, equipment controller 1014 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for powered chiller components 902.

The control signals may include on/off commands, speed setpoints for fan 730, power setpoints for compressor 720, pressure setpoints or flow rate setpoints for pump 732, or other types of setpoints for individual devices of powered chiller components 902. In other embodiments, the control signals may include the temperature setpoints (e.g., an air temperature setpoint $T_{sp,air}$, a chilled water temperature setpoint $T_{sp,water}$, etc.) generated by predictive chiller controller 704. The temperature setpoints can be provided to powered chiller components 902 or local controllers for powered chiller components 902 which operate to achieve the temperature setpoints. For example, a local controller for fan 730 may receive a measurement of the chilled water temperature $T_{water}$ from chilled water temperature sensor and/or a measurement the air temperature $T_{air}$ from an air temperature sensor and can modulate the speed of fan 730 to drive the measured temperatures to the temperature setpoints.

In some embodiments, equipment controller 1014 is configured to provide control signals to power inverter 910. The control signals provided to power inverter 910 can include a battery power setpoint $P_{sp,bat}$ and/or the optimal charge/discharge rate $Bat_{C/D}$. Equipment controller 1014 can be configured to operate power inverter 910 to achieve the battery power setpoint $P_{sp,bat}$. For example, equipment controller 1014 can cause power inverter 910 to charge battery unit 702 or discharge battery unit 702 in accordance with the battery power setpoint $P_{sp,bat}$.

Pump Unit with Battery and Predictive Control

Figure 11:
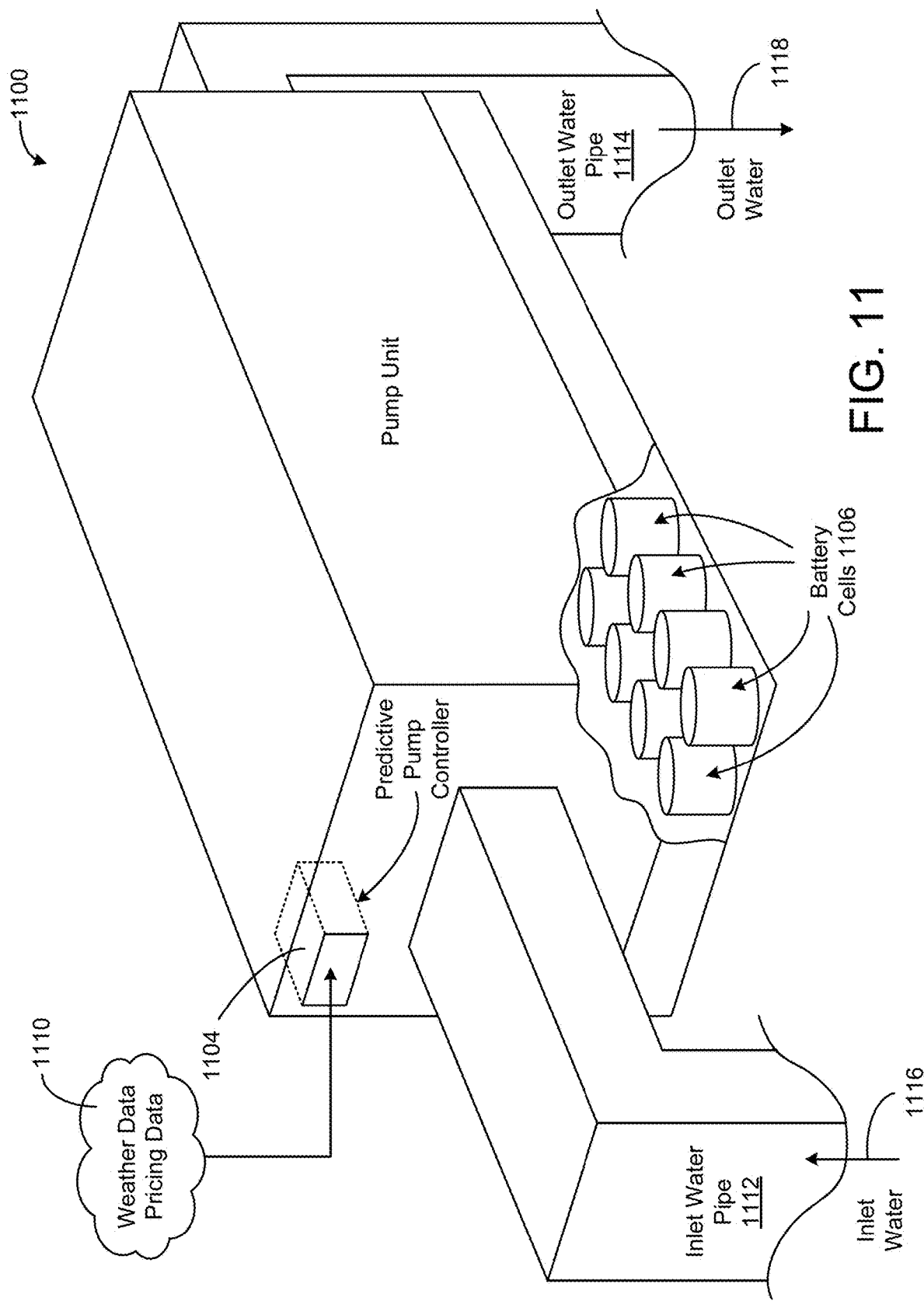
FIG. 11 is a drawing of a pump unit with a battery unit and a predictive pump controller, according to some embodiments.
Figure 12:
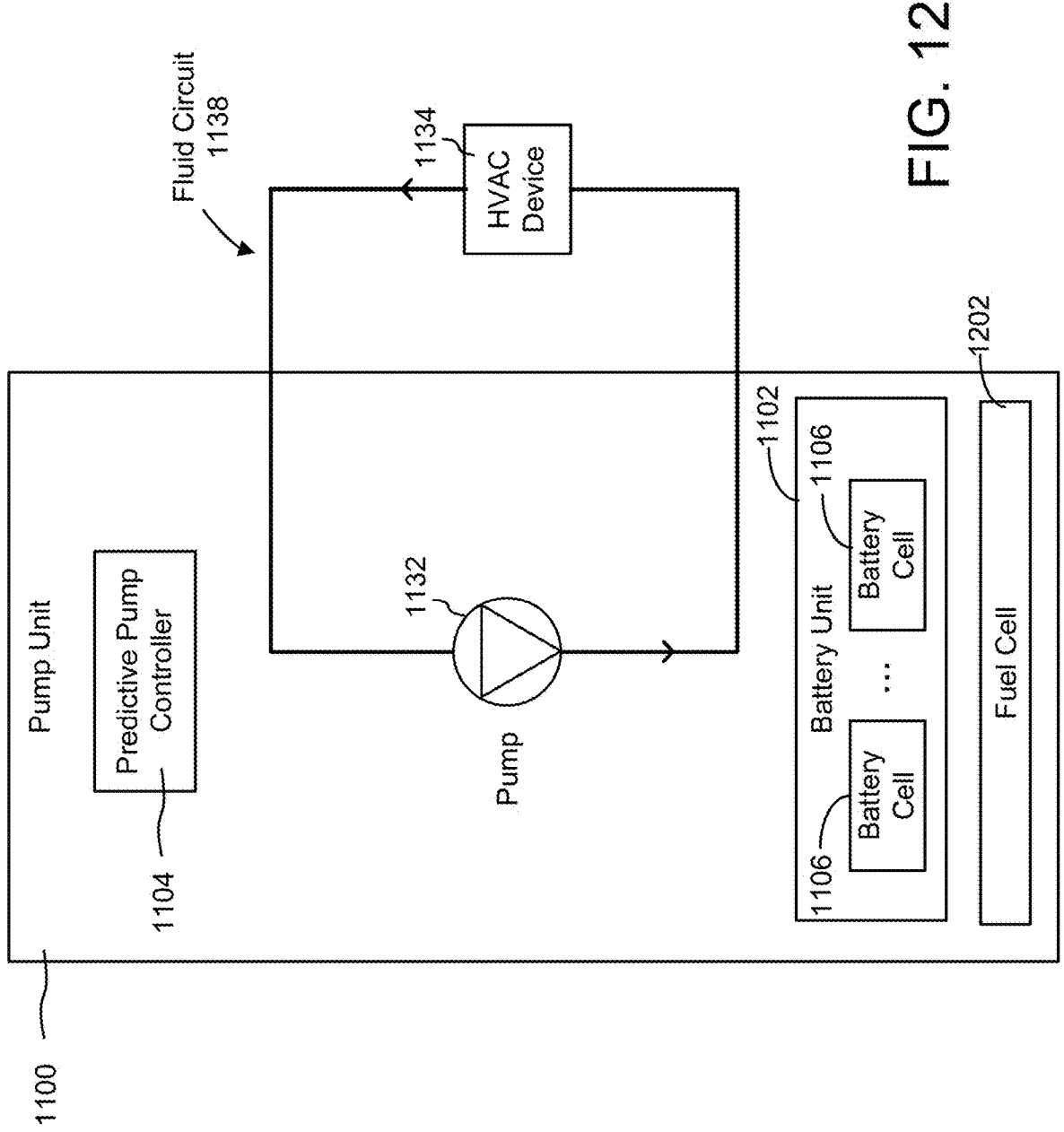
FIG. 12 is a block diagram of the pump unit of FIG. 11, according to some embodiments.

Referring now to FIGS. 11-12, a pump unit 1100 with a battery unit 1102 and predictive pump controller 1104 is shown, according to some embodiments. Pump unit 1100 can be configured to circulate a fluid through a HVAC device 1134 via a fluid circuit 1138. HVAC device 1134 can include, for example, a heating coil or cooling coil, an air handling unit, a rooftop unit, a heat exchanger, a refrigerator or freezer, a condenser or evaporator, a cooling tower, or any other type of system or device that receives a fluid in a HVAC system. In some embodiments, a pump 1132 receives the fluid (e.g., inlet water 1116) via an inlet water pipe 1112 and outputs the fluid (e.g., outlet water 1118) via an outlet water pipe 1114.

In some embodiments, battery unit 1102 includes one or more battery cells 1106. Battery cells 1106 are configured to store and discharge electric energy (i.e., electricity). In some embodiments, battery unit 1102 is charged using electricity from an external energy grid (e.g., provided by an electric utility). The electricity stored in battery unit 1102 can be discharged to power one or more powered components of pump unit 1100 (e.g., pump 1132). Advantageously, battery unit 1102 allows pump unit 1100 to draw electricity from the energy grid and charge battery unit 1102 when energy prices are low and discharge the stored electricity when energy prices are high to time-shift the electric load of pump unit 1100. In some embodiments, battery unit 1102 has sufficient energy capacity to power pump unit 1100 for approximately 4-6 hours when operating at maximum capacity such that battery unit 1102 can be utilized during high energy cost periods and charged during low energy cost periods.

As shown in FIG. 12, the pump unit 1100 can include a fuel cell 1202. In some embodiments, the fuel cell 1202 is a fuel cell configured to generate electrical energy using chemical reactions. For example, the fuel cell 1202 may convert the chemical energy of hydrogen and an oxidizing agent (e.g., oxygen) into electricity through a pair of redox reactions. In other embodiments, the fuel cell 1202 is a hydrocarbon fuel cells that use one or more of diesel, methanol, natural gas, etc. to generate electricity. The fuel cell 1202 can be controlled to generate electricity to augment grid energy or other energy sources, complement battery discharge during high energy cost periods, or generate electricity to charge the battery (e.g., during high energy cost periods). The fuel cell may require fuel replacement (e.g., a supply of hydrogen) which may be purchase periodically and added to the pump unit 1100, for example. In embodiments where the pump unit 1100 includes the fuel cell 1202, the control and optimization processes herein are configured to account for the power contributions of the fuel cell 1202 and the cost of operating the fuel cell 1202 when generating control outputs for the various components of the pump unit 1100, including for the fuel cell 1202. For example, an optimization performed by the predictive pump controller 1104 may determine whether to operate the fuel cell 1202 to generate electricity for each time step in an optimization period.

In some embodiments, predictive pump controller 1104 performs an optimization process to determine whether to charge or discharge battery unit 1102 during each of a plurality of time steps that occur during an optimization period. Predictive pump controller 1104 may use weather and pricing data 1110 to predict the amount of heating/cooling required and the cost of electricity during each of the plurality of time steps. Predictive pump controller 1104 can optimize an objective function that accounts for the cost of electricity purchased from the energy grid over the duration of the optimization period. Predictive pump controller 1104 can determine an amount of electricity to purchase from the energy grid and an amount of electricity to store or discharge from battery unit 1102 during each time step. The objective function and the optimization performed by predictive pump controller 1104 are described in greater detail with reference to FIGS. 13-14.

Predictive Pump Control System

Figure 13:
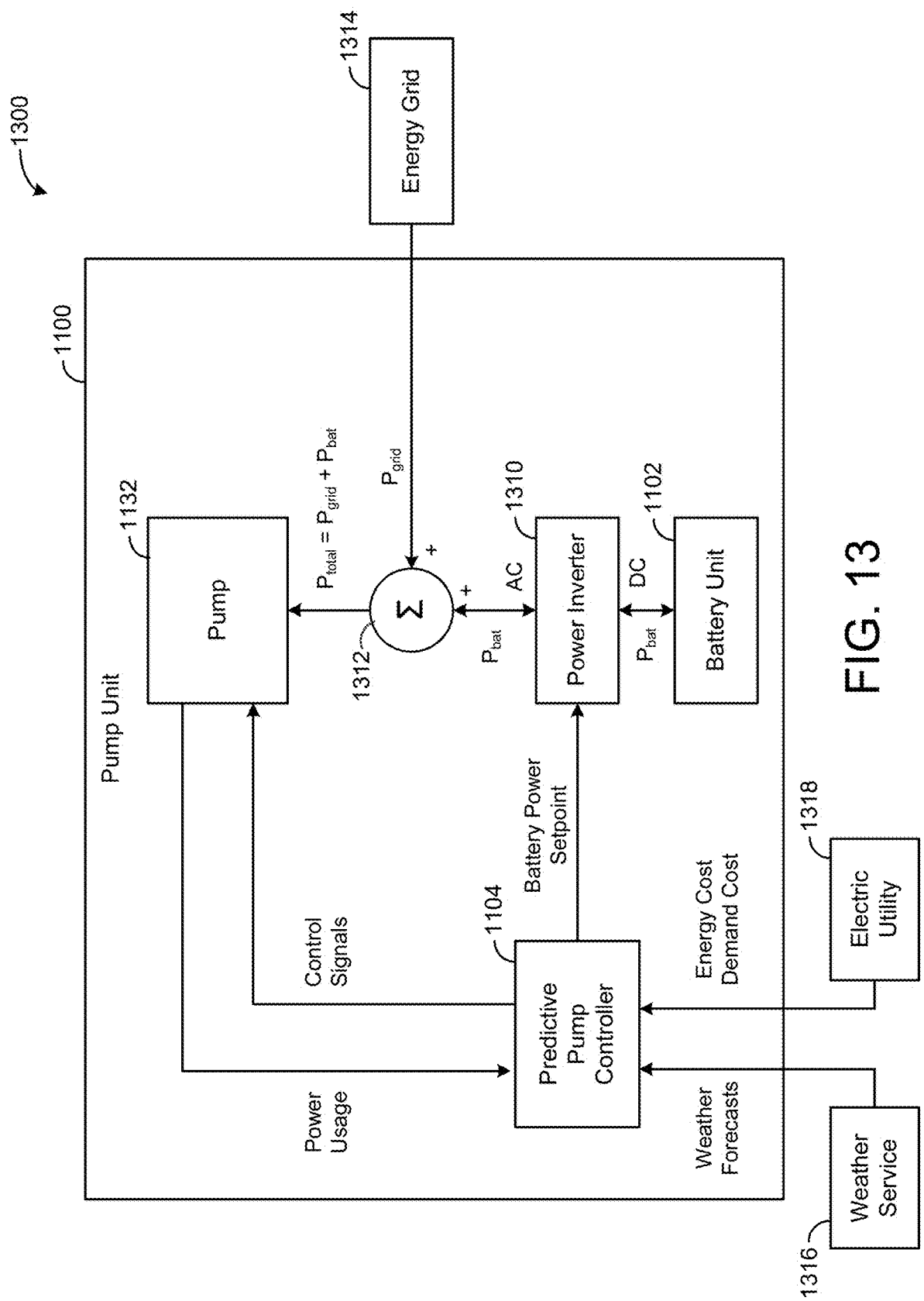
FIG. 13 is a block diagram of a predictive pump control system including the battery unit and predictive pump controller of FIG. 11, according to some embodiments.

Referring now to FIG. 13, a block diagram of a predictive pump control system 1300 is shown, according to some embodiments. Several of the components shown in control system 1300 may be part of pump unit 1100. For example, pump unit 1100 may include pump 1132, battery unit 1102, predictive pump controller 1104, power inverter 1310, and a power junction 1312.

Power inverter 1310 may be configured to convert electric power between direct current (DC) and alternating current (AC). For example, battery unit 1102 may be configured to store and output DC power, whereas energy grid 1314 and pump 1132 may be configured to consume and provide AC power. Power inverter 1310 may be used to convert DC power from battery unit 1102 into a sinusoidal AC output synchronized to the grid frequency of energy grid 1314 and/or pump 1132. Power inverter 1310 may also be used to convert AC power from energy grid 1314 into DC power that can be stored in battery unit 1102. The power output of battery unit 1102 is shown as $P_{bat}$. $P_{bat}$ may be positive if battery unit 1102 is providing power to power inverter 1310 (i.e., battery unit 1102 is discharging) or negative if battery unit 1102 is receiving power from power inverter 1310 (i.e., battery unit 1102 is charging).

In some instances, power inverter 1310 receives a DC power output from battery unit 1102 and converts the DC power output to an AC power output that can be provided to pump 1132. Power inverter 1310 may synchronize the frequency of the AC power output with that of energy grid 1314 (e.g., 50 Hz or 60 Hz) using a local oscillator and may limit the voltage of the AC power output to no higher than the grid voltage. In some embodiments, power inverter 1310 is a resonant inverter that includes or uses LC circuits to remove the harmonics from a simple square wave in order to achieve a sine wave matching the frequency of energy grid 1314. In various embodiments, power inverter 1310 may operate using high-frequency transformers, low-frequency transformers, or without transformers. Low-frequency transformers may convert the DC output from battery unit 1102 directly to the AC output provided to pump 1132. High-frequency transformers may employ a multi-step process that involves converting the DC output to high-frequency AC, then back to DC, and then finally to the AC output provided to pump 1132.

Power junction 1312 is the point at which pump 1132, energy grid 1314, and power inverter 1310 are electrically connected. The power supplied to power junction 1312 from power inverter 1310 is shown as $P_{bat}$. $P_{bat}$ may be positive if power inverter 1310 is providing power to power junction 1312 (i.e., battery unit 1102 is discharging) or negative if power inverter 1310 is receiving power from power junction 1312 (i.e., battery unit 1102 is charging). The power supplied to power junction 1312 from energy grid 1314 is shown as $P_{grid}$. $P_{bat}$ and $P_{grid}$ combine at power junction 1312 to form $P_{total}$ (i.e., $P_{total}=P_{grid}+P_{bat}$). $P_{total}$ may be defined as the power provided to pump 1132 from power junction 1312. In some instances, $P_{total}$ is greater than $P_{grid}$. For example, when battery unit 1102 is discharging, $P_{bat}$ may be positive which adds to the grid power $P_{grid}$ when $P_{bat}$ combines with $P_{grid}$ to form $P_{total}$. In other instances, $P_{total}$ may be less than $P_{grid}$. For example, when battery unit 1102 is charging, $P_{bat}$ may be negative which subtracts from the grid power $P_{grid}$ when $P_{bat}$ and $P_{grid}$ combine to form $P_{total}$.

Predictive pump controller 1104 can be configured to control pump 1132 and power inverter 1310. In some embodiments, predictive pump controller 1104 generates and provides a battery power setpoint $P_{sp,bat}$ to power inverter 1310. The battery power setpoint $P_{sp,bat}$ may include a positive or negative power value (e.g., kW) which causes power inverter 1310 to charge battery unit 1102 (when $P_{sp,bat}$ is negative) using power available at power junction 1312 or discharge battery unit 1102 (when $P_{sp,bat}$ is positive) to provide power to power junction 1312 in order to achieve the battery power setpoint $P_{sp,bat}$.

In some embodiments, predictive pump controller 1104 generates and provides control signals to pump 1132. Predictive pump controller 1104 may use a multi-stage optimization technique to generate the control signals. For example, predictive pump controller 1104 may include an economic controller configured to determine the optimal amount of power to be consumed by pump 1132 at each time step during the optimization period. The optimal amount of power to be consumed may minimize a cost function that accounts for the cost of energy consumed by pump unit 1100. The cost of energy may be based on time-varying energy prices from electric utility 1318. In some embodiments, predictive pump controller 1104 determines an optimal amount of power to purchase from energy grid 1314 (i.e., a grid power setpoint $P_{sp,grid}$) and an optimal amount of power to store or discharge from battery unit 1102 (i.e., a battery power setpoint $P_{sp,bat}$) at each of the plurality of time steps. Predictive pump controller 1104 may monitor the actual power usage of pump 1132 and may utilize the actual power usage as a feedback signal when generating the optimal power setpoints.

Predictive pump controller 1104 may include a tracking controller configured to generate flow setpoints $Flow_{sp}$ and differential pressure setpoints $DP_{sp}$ that achieve the optimal amount of power consumption at each time step. In some embodiments, predictive pump controller 1104 uses an equipment model for pump 1132 to determine an amount of fluid flow and/or differential pressure be generated by pump 1132 based on the optimal amount of power consumption.

In some embodiments, predictive pump controller 1104 uses the flow setpoints $Flow_{sp}$ and differential pressure setpoints $DP_{sp}$ to generate the control signals for pump 1132. The control signals may include on/off commands, speed setpoints, or other types of setpoints that affect the operation of pump 1132. In other embodiments, the control signals may include the flow setpoints $Flow_{sp}$ and differential pressure setpoints $DP_{sp}$ generated by predictive pump controller 1104. The setpoints can be provided to pump 1132 or local controllers for pump 1132 which operate to achieve the setpoints. For example, a local controller for pump 1132 may receive a measurement of the differential pressure DP across pump 1132 from one or more pressure sensors and/or a measurement of the fluid flow caused by pump 1132 from one or more flow sensors. The local controller can use a feedback control process (e.g., PID, ESC, MPC, etc.) to increase or decrease the speed of pump 1132 to drive the measured fluid flow and/or differential pressure to the setpoint(s). The multi-stage optimization performed by predictive pump controller 1104 is described in greater detail with reference to FIG. 14.

Predictive Pump Controller

Figure 14:
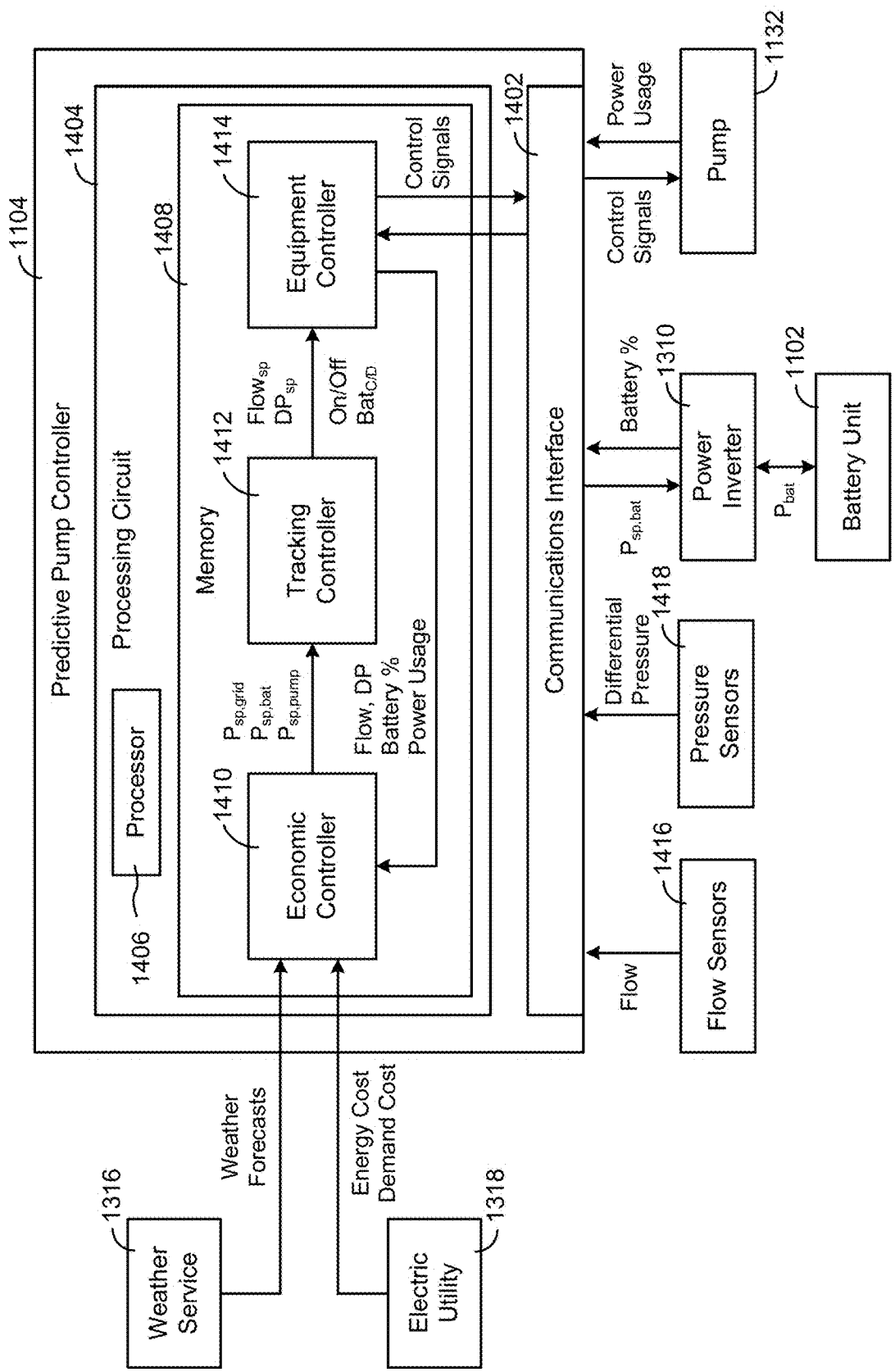
FIG. 14 is a block diagram illustrating the predictive pump controller of FIG. 11 in greater detail, according to some embodiments.

Referring now to FIG. 14, a block diagram illustrating predictive pump controller 1104 in greater detail is shown, according to an exemplary embodiment. Predictive pump controller 1104 is shown to include a communications interface 1402 and a processing circuit 1404. Communications interface 1402 may facilitate communications between controller 1104 and external systems or devices. For example, communications interface 1402 may receive measurements of the fluid flow Flow from flow sensors 1416, measurements of the differential pressure DP across pump 1132 from pressure sensors 1418, and measurements of the power usage of pump 1132. In some embodiments, communications interface 1402 receives measurements of the state-of-charge (SOC) of battery unit 1102, which can be provided as a percentage of the maximum battery capacity (i.e., battery %). Communications interface 1402 can receive weather forecasts from a weather service 916 and predicted energy costs and demand costs from an electric utility 1318. In some embodiments, predictive pump controller 1104 uses communications interface 1402 to provide control signals pump 1132 and power inverter 1310.

Communications interface 1402 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 1402 can include an Ethernet card and port for sending and receiving data via an Ethernet-based communications link or network. In another example, communications interface 1402 can include a Wi-Fi transceiver for communicating via a wireless communications network or cellular or mobile phone communications transceivers.

Processing circuit 1404 is shown to include a processor 1406 and memory 1408. Processor 1406 may be a general purpose or specific purpose processor, an application specific integrated circuit (ASIC), one or more field programmable gate arrays (FPGAs), a group of processing components, or other suitable processing components. Processor 1406 is configured to execute computer code or instructions stored in memory 1408 or received from other computer readable media (e.g., CDROM, network storage, a remote server, etc.).

Memory 1408 may include one or more devices (e.g., memory units, memory devices, storage devices, etc.) for storing data and/or computer code for completing and/or facilitating the various processes described in the present disclosure. Memory 1408 may include random access memory (RAM), read-only memory (ROM), hard drive storage, temporary storage, non-volatile memory, flash memory, optical memory, or any other suitable memory for storing software objects and/or computer instructions. Memory 1408 may include database components, object code components, script components, or any other type of information structure for supporting the various activities and information structures described in the present disclosure. Memory 1408 may be communicably connected to processor 1406 via processing circuit 1404 and may include computer code for executing (e.g., by processor 1406) one or more processes described herein. When processor 1406 executes instructions stored in memory 1408 for completing the various activities described herein, processor 1406 generally configures controller 1104 (and more particularly processing circuit 1404) to complete such activities.

Still referring to FIG. 14, predictive pump controller 1104 is shown to include an economic controller 1410, a tracking controller 1412, and an equipment controller 1414. Controllers 1410-1414 can be configured to perform a multi-state optimization process to generate control signals for power inverter 1310 and pump 1132. In brief overview, economic controller 1410 can optimize a predictive cost function to determine an optimal amount of power to purchase from energy grid 1314 (i.e., a grid power setpoint $P_{sp,grid}$), an optimal amount of power to store or discharge from battery unit 1102 (i.e., a battery power setpoint $P_{sp,bat}$), and/or an optimal amount of power to be consumed by pump 1132 (i.e., a pump power setpoint $P_{sp,pump}$) at each time step of an optimization period. Tracking controller 1412 can use the optimal power setpoints $P_{sp,grid}$, $P_{sp,bat}$, and/or $P_{sp,pump}$ to determine optimal flow setpoints $Flow_{sp}$, pressure setpoints $DP_{sp}$, and an optimal battery charge or discharge rate (i.e., $Bat_{C/D}$). Equipment controller 1414 can use the optimal setpoints $Flow_{sp}$ and/or $DP_{sp}$ to generate control signals for pump 1132 that drive the actual (e.g., measured) flowrate Flow and/or pressure DP to the setpoints (e.g., using a feedback control technique). Each of controllers 1410-1414 is described in detail below.

Economic Controller

Economic controller 1410 can be configured to optimize a predictive cost function to determine an optimal amount of power to purchase from energy grid 1314 (i.e., a grid power setpoint $P_{sp,grid}$), an optimal amount of power to store or discharge from battery unit 1102 (i.e., a battery power setpoint $P_{sp,bat}$), and/or an optimal amount of power to be consumed by pump 1132 (i.e., a pump power setpoint $P_{sp,pump}$) at each time step of an optimization period. An example of a predictive cost function which can be optimized by economic controller 1410 is shown in the following equation:

$$\min(J) = \sum_{k=1}^{h} C_{ec}(k) P_{pump}(k) \Delta t + C_{DC} \max_k (P_{grid}(k)) - \sum_{k=1}^{h} C_{ec}(k) P_{bat}(k) \Delta t$$

where $C_{ec}(k)$ is the cost per unit of electricity (e.g., $/kWh) purchased from electric utility 1318 during time step k, $P_{pump}(k)$ is the power consumption of pump 1132 at time step k, $C_{DC}$ is the demand charge rate (e.g., $/kW), where the max( ) term selects the maximum electricity purchase of pump unit 1100 (i.e., the maximum value of $P_{grid}(k)$) during any time step k of the optimization period, $P_{bat}(k)$ is the amount of power discharged from battery unit 1102 during time step k, and $\Delta t$ is the duration of each time step k. Economic controller 1410 can optimize the predictive cost function J over the duration of the optimization period (e.g., from time step k=1 to time step k=h) to predict the total cost of operating pump unit 1100 over the duration of the optimization period.

The first term of the predictive cost function j represents the cost of electricity consumed by pump 1132 over the duration of the optimization period. The values of the parameter $C_{ec}(k)$ at each time step k can be defined by the energy cost information provided by electric utility 1318. In some embodiments, the cost of electricity varies as a function of time, which results in different values of $C_{ec}(k)$ at different time steps k. The variable $P_{pump}(k)$ is a decision variable which can be optimized by economic controller 1410.

The second term of the predictive cost function J represents the demand charge. Demand charge is an additional charge imposed by some utility providers based on the maximum power consumption during an applicable demand charge period. For example, the demand charge rate $C_{DC}$ may be specified in terms of dollars per unit of power (e.g., $/kW) and may be multiplied by the peak power usage (e.g., kW) during a demand charge period to calculate the demand charge. In the predictive cost function J, the demand charge rate $C_{DC}$ may be defined by the demand cost information received from electric utility 1318. The variable $P_{grid}(k)$ is a decision variable which can be optimized by economic controller 1410 in order to reduce the peak power usage $\max(P_{grid}(k))$ that occurs during the demand charge period. Load shifting may allow economic controller 1410 to smooth momentary spikes in the electric demand of pump unit 1100 by storing energy in battery unit 1102 when the power consumption of pump 1132 is low. The stored energy can be discharged from battery unit 1102 when the power consumption of pump 1132 is high in order to reduce the peak power draw $P_{grid}$ from energy grid 1314, thereby decreasing the demand charge incurred.

The final term of the predictive cost function J represents the cost savings resulting from the use of battery unit 1102. Unlike the previous terms in the cost function J, the final term subtracts from the total cost. The values of the parameter $C_{ec}(k)$ at each time step k can be defined by the energy cost information provided by electric utility 1318. In some embodiments, the cost of electricity varies as a function of time, which results in different values of $C_{ec}(k)$ at different time steps k. The variable $P_{bat}(k)$ is a decision variable which can be optimized by economic controller 1410. A positive value of $P_{bat}(k)$ indicates that battery unit 1102 is discharging, whereas a negative value of $P_{bat}(k)$ indicates that battery unit 1102 is charging. The power discharged from battery unit 1102 $P_{bat}(k)$ can be used to satisfy some or all of the total power consumption $P_{total}(k)$ of pump 1132, which reduces the amount of power $P_{grid}(k)$ purchased from energy grid 1314 (i.e., $P_{grid}(k) = P_{total}(k) - P_{bat}(k)$). However, charging battery unit 1102 results in a negative value of $P_{bat}(k)$ which adds to the total amount of power $P_{grid}(k)$ purchased from energy grid 1314.

Economic controller 1410 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 1410 can use battery unit 1102 to perform load shifting by drawing electricity from energy grid 1314 when energy prices are low and/or when the power consumed by pump 1132 is low. The electricity can be stored in battery unit 1102 and discharged later when energy prices are high and/or the power consumption of pump 1132 is high. This enables economic controller 1410 to reduce the cost of electricity consumed by pump unit 1100 and can smooth momentary spikes in the electric demand of pump unit 1100, thereby reducing the demand charge incurred.

Economic controller 1410 can be configured to impose constraints on the optimization of the predictive cost function J. In some embodiments, the constraints include constraints on the flow rate Flow and/or differential pressure DP produced by pump 1132. Economic controller 1410 can be configured to maintain the actual or predicted flow rate Flow between a minimum flow bound $Flow_{min}$ and a maximum flow bound $Flow_{max}$ (i.e., $Flow_{min} \leq Flow \leq Flow_{max}$) at all times. The parameters $Flow_{min}$ and $Flow_{max}$ may be time-varying to define different flow ranges at different times. Similarly, economic controller 1410 can be configured to maintain the actual or predicted pressure DP between a minimum pressure bound $DP_{min}$ and a maximum pressure bound $DP_{max}$ (i.e., $DP_{min} \leq DP \leq DP_{max}$) at all times. The parameters $DP_{min}$ and $DP_{max}$ may be time-varying to define different flow ranges at different times.

In addition to constraints on the fluid flowrate Flow and the differential pressure DP, economic controller 1410 can impose constraints on the state-of-charge (SOC) and charge/discharge rates of battery unit 1102. In some embodiments, economic controller 1410 generates and imposes the following power constraints on the predictive cost function J:

$$P_{bat} \leq P_{rated}$$

$$-P_{bat} \leq P_{rated}$$

where $P_{bat}$ is the amount of power discharged from battery unit 1102 and $P_{rated}$ is the rated battery power of battery unit 1102 (e.g., the maximum rate at which battery unit 1102 can be charged or discharged). These power constraints ensure that battery unit 1102 is not charged or discharged at a rate that exceeds the maximum possible battery charge/discharge rate $P_{rated}$.

In some embodiments, economic controller 1410 generates and imposes one or more capacity constraints on the predictive cost function J The capacity constraints may be used to relate the battery power $P_{bat}$ charged or discharged during each time step to the capacity and SOC of battery unit 1102. The capacity constraints may ensure that the capacity of battery unit 1102 is maintained within acceptable lower and upper bounds at each time step of the optimization period. In some embodiments, economic controller 1410 generates the following capacity constraints:

$$C_a(k) - P_{bat}(k) \Delta t \leq C_{rated}$$

$$C_a(k) - P_{bat}(k) \Delta t \geq 0$$

where $C_a(k)$ is the available battery capacity (e.g., kWh) at the beginning of time step k, $P_{bat}(k)$ is the rate at which battery unit 1102 is discharged during time step k (e.g., kW), $\Delta t$ is the duration of each time step, and $C_{rated}$ is the maximum rated capacity of battery unit 1102 (e.g., kWh). The term $P_{bat}(k)\Delta t$ represents the change in battery capacity during time step k. These capacity constraints ensure that the capacity of battery unit 1102 is maintained between zero and the maximum rated capacity $C_{rated}$.

In some embodiments, economic controller 1410 generates and imposes one or more capacity constraints on the operation of pump 1132. For example, pump 1132 may have a maximum operating point (e.g., a maximum pump speed, a maximum differential pressure, etc.) which corresponds to a maximum power consumption $P_{pump,max}$. Economic controller 1410 can be configured to generate a constraint which limits the power $P_{pump}$ provided to pump 1132 between zero and the maximum power consumption $P_{pump,max}$ as shown in the following equation:

$$0 \leq P_{pump} \leq P_{pump,max}$$

$$P_{pump} = P_{sp,grid} - P_{sp,bat}$$

where the total power $P_{pump}$ provided to pump 1132 is the sum of the grid power setpoint $P_{sp,grid}$ and the battery power setpoint $P_{sp,bat}$.

Economic controller 1410 can optimize the predictive cost function J subject to the constraints to determine optimal values for the decision variables $P_{pump}$, $P_{grid}$, and $P_{bat}$, where $P_{pump} = P_{bat} + P_{grid}$. In some embodiments, economic controller 1410 uses the optimal values for $P_{pump}$, $P_{bat}$, and/or $P_{grid}$ to generate power setpoints for tracking controller 1412. The power setpoints can include battery power setpoints $P_{sp,bat}$, grid power setpoints $P_{sp,grid}$, and/or pump power setpoints $P_{sp,pump}$ for each of the time steps k in the optimization period. Economic controller 1410 can provide the power setpoints to tracking controller 1412.

Tracking Controller

Tracking controller 1412 can use the optimal power setpoints $P_{sp,grid}$, $P_{sp,bat}$, and/or $P_{sp,pump}$ generated by economic controller 1410 to determine optimal flow setpoints $Flow_{sp}$, optimal pressure setpoints $DP_{sp}$, and an optimal battery charge or discharge rate (i.e., $Bat_{C/D}$). In some embodiments, tracking controller 1412 generates a flow setpoint $Flow_{sp}$ and/or a pressure setpoint $DP_{sp}$ that are predicted to achieve the power setpoint $P_{sp,pump}$ for pump 1132. In other words, tracking controller 1412 may generate a flow setpoint $Flow_{sp}$ and/or a pressure setpoint $DP_{sp}$ that cause pump 1132 to consume the optimal amount of power $P_{pump}$ determined by economic controller 1410.

In some embodiments, tracking controller 1412 uses the battery power setpoint $P_{sp,bat}$ to determine the optimal rate $Bat_{C/D}$ at which to charge or discharge battery unit 1102. For example, the battery power setpoint $P_{sp,bat}$ may define a power value (kW) which can be translated by tracking controller 1412 into a control signal for power inverter 1310 and/or equipment controller 1414. In other embodiments, the battery power setpoint $P_{sp,bat}$ is provided directly to power inverter 1310 and used by power inverter 1310 to control the battery power $P_{bat}$.

Equipment Controller

Equipment controller 1414 can use the optimal flow setpoints $Flow_{sp}$ and/or a pressure setpoints $DP_{sp}$ generated by tracking controller 1412 to generate control signals for pump 1132. The control signals generated by equipment controller 1414 may drive the actual (e.g., measured) flow rate Flow and pressure DP to the setpoints. Equipment controller 1414 can use any of a variety of control techniques to generate control signals for pump 1132. For example, equipment controller 1414 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for pump 1132.

The control signals may include on/off commands, speed commands for pump 1132, power commands for pump 1132, or other types of operating commands for pump 1132. In other embodiments, the control signals may include the flow setpoints $Flow_{sp}$ and/or a pressure setpoints $DP_{sp}$ generated by predictive pump controller 1104. The setpoints can be provided to pump 1132 or a local controller for pump 1132 which operate to achieve the setpoints. For example, a local controller for pump 1132 may receive a measurement of the fluid flowrate Flow from flow sensors 1416 and/or a measurement the differential pressure DP from pressure sensors 1418 and can modulate the speed of pump 1132 to drive the measured flowrate and/or pressure to the setpoints.

In some embodiments, equipment controller 1414 is configured to provide control signals to power inverter 1310. The control signals provided to power inverter 1310 can include a battery power setpoint $P_{sp,bat}$ and/or the optimal charge/discharge rate $Bat_{C/D}$. Equipment controller 1414 can be configured to operate power inverter 1310 to achieve the battery power setpoint $P_{sp,bat}$. For example, equipment controller 1414 can cause power inverter 1310 to charge battery unit 1102 or discharge battery unit 1102 in accordance with the battery power setpoint $P_{sp,bat}$.

Cooling Tower with Battery Unit and Predictive Control

Figure 15:
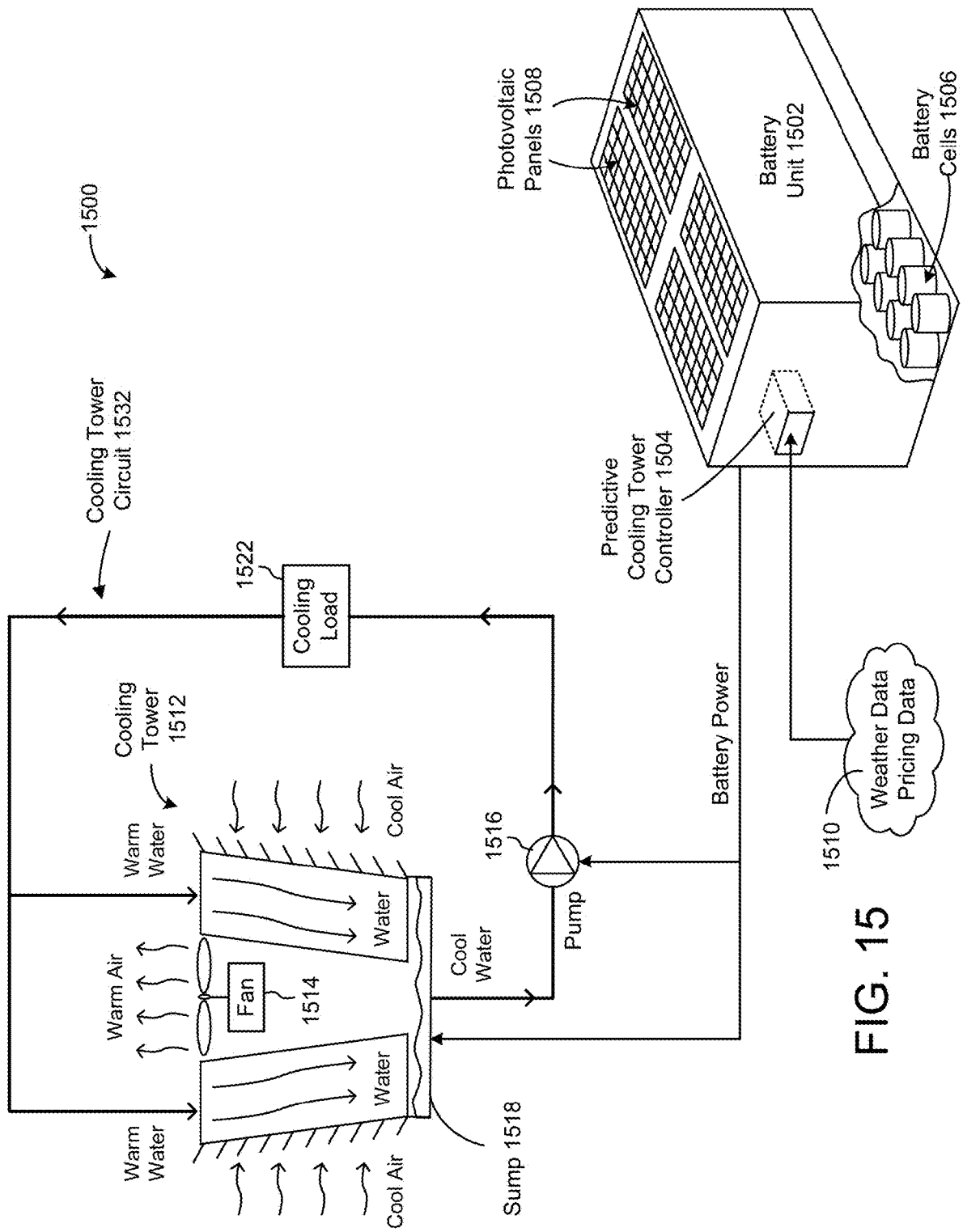
FIG. 15 is a drawing of a cooling tower unit with a battery unit and a predictive cooling tower controller, according to some embodiments.

Referring now to FIG. 15, a cooling tower system 1500 is shown, according to some embodiments. System 1500 is shown to include a cooling tower 1512 and a battery unit 1502 with a predictive cooling tower controller 1504. Cooling tower 1512 can be configured to provide cooling to a cooling load 1522. Cooling load 1522 can include, for example, a building zone, a supply airstream flowing through an air duct, an airflow in an air handling unit or rooftop unit, fluid flowing through a heat exchanger, a refrigerator or freezer, a condenser or evaporator, a cooling coil, or any other type of system, device, or space which requires cooling. In some embodiments, a pump 1516 circulates a chilled fluid to cooling load 1522 via a cooling tower circuit 1532. The chilled fluid can absorb heat from cooling load 1522, thereby providing cooling to cooling load 1522 and warming the chilled fluid.

Cooling tower 1512 can be configured to cool the water in cooling tower circuit 1532 by transferring heat from the water to outside air. Cooling tower 1512 may include a fan 1514 which causes cool air to flow through cooling tower 1512. Cooling tower 1512 places the cool air in a heat exchange relationship with the warmer water, thereby transferring heat from warmer water to the cooler air. Although cooling tower circuit 1532 is shown and described as circulating water, it should be understood that any type of coolant or working fluid (e.g., water, glycol, $CO_2$, etc.) can be used in cooling tower circuit 1532.

Still referring to FIG. 15, system 1500 is shown to include a battery unit 1502. In some embodiments, battery unit 1502 includes one or more photovoltaic (PV) panels 1508. PV panels 1508 may include a collection of photovoltaic cells. The photovoltaic cells are configured to convert solar energy (i.e., sunlight) into electricity using a photovoltaic material such as monocrystalline silicon, polycrystalline silicon, amorphous silicon, cadmium telluride, copper indium gallium selenide/sulfide, or other materials that exhibit the photovoltaic effect. In some embodiments, the photovoltaic cells are contained within packaged assemblies that form PV panels 1508. Each PV panel 1508 may include a plurality of linked photovoltaic cells. PV panels 1508 may combine to form a photovoltaic array.

In some embodiments, PV panels 1508 are configured to maximize solar energy collection. For example, battery unit 1502 may include a solar tracker (e.g., a GPS tracker, a sunlight sensor, etc.) that adjusts the angle of PV panels 1508 so that PV panels 1508 are aimed directly at the sun throughout the day. The solar tracker may allow PV panels 1508 to receive direct sunlight for a greater portion of the day and may increase the total amount of power produced by PV panels 1508. In some embodiments, battery unit 1502 includes a collection of mirrors, lenses, or solar concentrators configured to direct and/or concentrate sunlight on PV panels 1508. The energy generated by PV panels 1508 may be stored in battery cells 1506 and/or used to power various components of cooling tower 1512.

In some embodiments, battery unit 1502 includes one or more battery cells 1506. Battery cells 1506 are configured to store and discharge electric energy (i.e., electricity). In some embodiments, battery unit 1502 is charged using electricity from an external energy grid (e.g., provided by an electric utility). The electricity stored in battery unit 1502 can be discharged to power one or more powered components of cooling tower 1512 (e.g., fan 1514, pump 1516, etc.). Advantageously, battery unit 1502 allows cooling tower 1512 to draw electricity from the energy grid and charge battery unit 1502 when energy prices are low and discharge the stored electricity when energy prices are high to time-shift the electric load of cooling tower 1512. In some embodiments, battery unit 1502 has sufficient energy capacity to power cooling tower 1512 for approximately 4-6 hours when operating at maximum capacity such that battery unit 1502 can be utilized during high energy cost periods and charged during low energy cost periods.

In some embodiments, predictive cooling tower controller 1504 performs an optimization process to determine whether to charge or discharge battery unit 1502 during each of a plurality of time steps that occur during an optimization period. Predictive cooling tower controller 1504 may use weather and pricing data 1510 to predict the amount of heating/cooling required and the cost of electricity during each of the plurality of time steps. Predictive cooling tower controller 1504 can optimize an objective function that accounts for the cost of electricity purchased from the energy grid over the duration of the optimization period. In some embodiments, the objective function also accounts for the cost of operating various components of cooling tower 1512 (e.g., cost of natural gas used to fuel boilers). Predictive cooling tower controller 1504 can determine an amount of electricity to purchase from the energy grid and an amount of electricity to store or discharge from battery unit 1502 during each time step. The objective function and the optimization performed by predictive cooling tower controller 1504 are described in greater detail with reference to FIGS. 16-17.

Predictive Cooling Tower Control System

Figure 16:
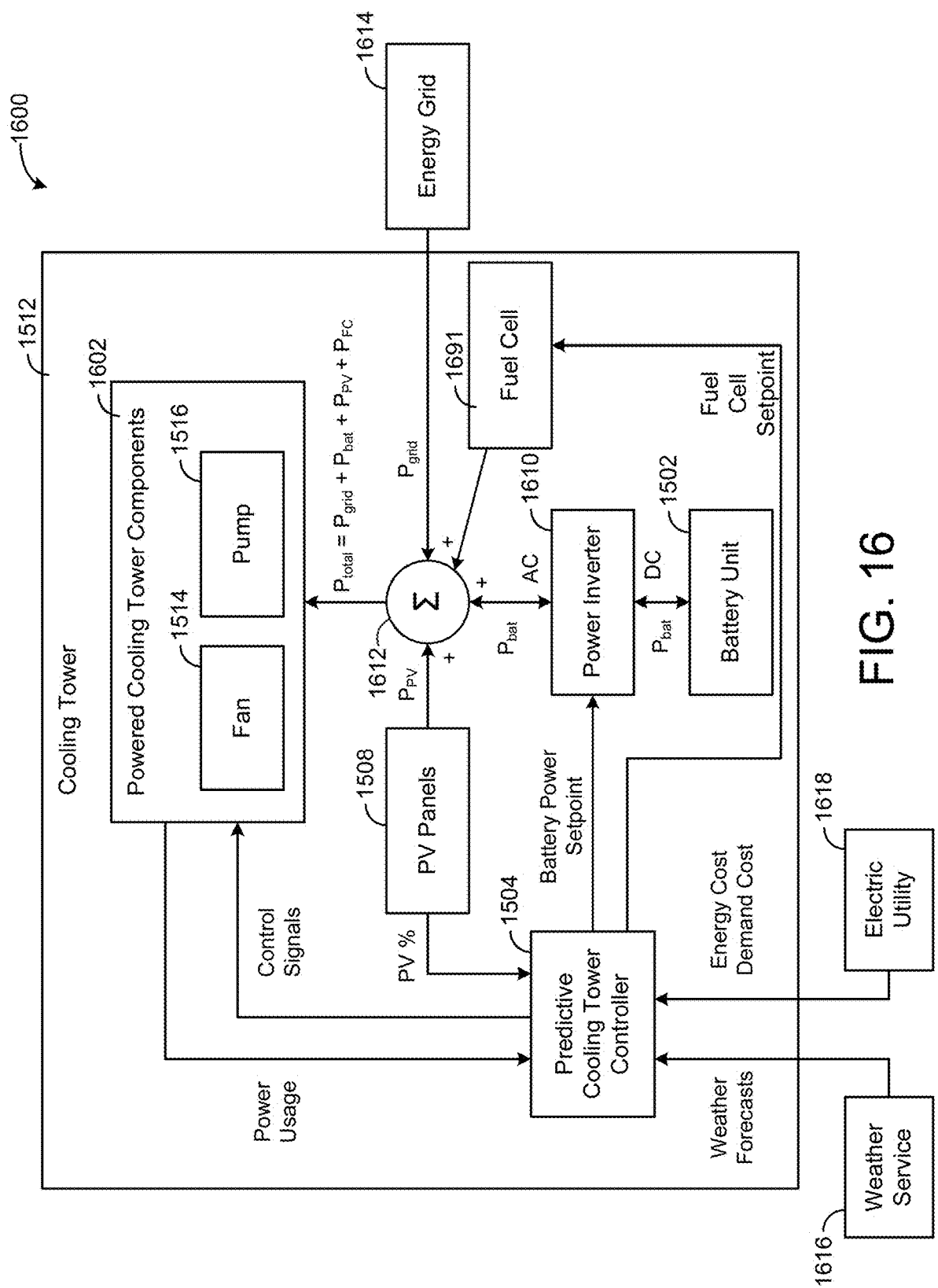
FIG. 16 is a block diagram of a predictive cooling tower control system including the battery unit and predictive cooling tower controller of FIG. 15, according to some embodiments.

Referring now to FIG. 16, a block diagram of a predictive cooling tower control system 1600 is shown, according to some embodiments. Several of the components shown in control system 1600 may be part of cooling tower 1512. For example, cooling tower 1512 may include powered cooling tower components 1602, battery unit 1502, fuel cell 1691, predictive cooling tower controller 1504, power inverter 1610, and a power junction 1612. Powered cooling tower components 1602 may include any component of cooling tower 1512 that consumes power (e.g., electricity) during operation. For example, powered cooling tower components 1602 are shown to include cooling fan 1514 and pump 1516.

The fuel cell 1691 is a fuel cell configured to generate electrical energy using chemical reactions. For example, the fuel cell 1691 may convert the chemical energy of hydrogen and an oxidizing agent (e.g., oxygen) into electricity through a pair of redox reactions. In other embodiments, the fuel cell 1691 is a hydrocarbon fuel cells that use one or more of diesel, methanol, natural gas, etc. to generate electricity. The fuel cell 1691 can be controlled to generate electricity to augment grid energy or other energy sources, complement battery discharge during high energy cost periods, or generate electricity to charge the battery (e.g., during high energy cost periods). The fuel cell may require fuel replacement (e.g., a supply of hydrogen) which may be purchase periodically, for example. In embodiments where the cooling tower 1512 includes the fuel cell 1691, the control and optimization processes herein are configured to account for the contributions of the fuel cell 1691 and the cost of operating the fuel cell 1691 when generating control outputs for the various components of the cooling tower 1512, including for the fuel cell 1691. For example, an optimization performed by the predictive cooling tower controller 1504 may determine whether to operate the fuel cell 1691 to generate electricity for each time step in an optimization period.

Power inverter 1610 may be configured to convert electric power between direct current (DC) and alternating current (AC). For example, battery unit 1502 may be configured to store and output DC power, whereas energy grid 1614 and powered cooling tower components 1602 may be configured to consume and provide AC power. Power inverter 1610 may be used to convert DC power from battery unit 1502 into a sinusoidal AC output synchronized to the grid frequency of energy grid 1614 and/or powered cooling tower components 1602. Power inverter 1610 may also be used to convert AC power from energy grid 1614 into DC power that can be stored in battery unit 1502. The power output of battery unit 1502 is shown as $P_{bat}$. $P_{bat}$ may be positive if battery unit 1502 is providing power to power inverter 1610 (i.e., battery unit 1502 is discharging) or negative if battery unit 1502 is receiving power from power inverter 1610 (i.e., battery unit 1502 is charging).

In some instances, power inverter 1610 receives a DC power output from battery unit 1502 and converts the DC power output to an AC power output that can be provided to powered cooling tower components 1602. Power inverter 1610 may synchronize the frequency of the AC power output with that of energy grid 1614 (e.g., 50 Hz or 60 Hz) using a local oscillator and may limit the voltage of the AC power output to no higher than the grid voltage. In some embodiments, power inverter 1610 is a resonant inverter that includes or uses LC circuits to remove the harmonics from a simple square wave in order to achieve a sine wave matching the frequency of energy grid 1614. In various embodiments, power inverter 1610 may operate using high-frequency transformers, low-frequency transformers, or without transformers. Low-frequency transformers may convert the DC output from battery unit 1502 directly to the AC output provided to powered cooling tower components 1602. High-frequency transformers may employ a multi-step process that involves converting the DC output to high-frequency AC, then back to DC, and then finally to the AC output provided to powered cooling tower components 1602.

The power output of PV panels 1508 is shown as $P_{PV}$. The power output $P_{PV}$ of PV panels 1508 can be stored in battery unit 1502 and/or used to power powered cooling tower components 1602. In some embodiments, PV panels 1508 measure the amount of power $P_{PV}$ generated by PV panels 1508 and provides an indication of the PV power to predictive cooling tower controller 1504. For example, PV panels 1508 are shown providing an indication of the PV power percentage (i.e., PV %) to predictive cooling tower controller 1504. The PV power percentage may represent a percentage of the maximum PV power at which PV panels 1508 are currently operating.

Power junction 1612 is the point at which powered cooling tower components 1602, energy grid 1614, PV panels 1508, and power inverter 1610 are electrically connected. The power supplied to power junction 1612 from power inverter 1610 is shown as $P_{bat}$. $P_{bat}$ may be positive if power inverter 1610 is providing power to power junction 1612 (i.e., battery unit 1502 is discharging) or negative if power inverter 1610 is receiving power from power junction 1612 (i.e., battery unit 1502 is charging). The power supplied to power junction 1612 from energy grid 1614 is shown as $P_{grid}$, the power supplied to power junction 1612 from PV panels 1508 is shown as $P_{PV}$, and the power supplied from the fuel cell 1891 is shown as $P_{FC}$. $P_{bat}$, $P_{PV}$, $P_{FC}$ and $P_{grid}$ combine at power junction 1612 to form $P_{total}$ (i.e., $P_{total}=P_{grid}+P_{bat}+P_{PV}+P_{FC}$). $P_{total}$ may be defined as the power provided to powered cooling tower components 1602 from power junction 1612. In some instances, $P_{total}$ is greater than $P_{grid}$. For example, when battery unit 1502 is discharging, $P_{bat}$ may be positive which adds to the grid power $P_{grid}$ and the PV power $P_{PV}$ when $P_{bat}$ and $P_{PV}$ combine with $P_{grid}$ to form $P_{total}$. In other instances, $P_{total}$ may be less than $P_{grid}$. For example, when battery unit 1502 is charging, $P_{bat}$ may be negative which subtracts from the grid power $P_{grid}$ and the PV power $P_{PV}$ when $P_{bat}$, $P_{PV}$, and $P_{grid}$ combine to form $P_{total}$.

Predictive cooling tower controller 1504 can be configured to control powered cooling tower components 1602 and power inverter 1610. In some embodiments, predictive cooling tower controller 1504 generates and provides a battery power setpoint $P_{sp,bat}$ to power inverter 1610. The battery power setpoint $P_{sp,bat}$ may include a positive or negative power value (e.g., kW) which causes power inverter 1610 to charge battery unit 1502 (when $P_{sp,bat}$ is negative) using power available at power junction 1612 or discharge battery unit 1502 (when $P_{sp,bat}$ is positive) to provide power to power junction 1612 in order to achieve the battery power setpoint $P_{sp,bat}$. In some embodiments, predictive cooling tower controller 1504 generates and provides a fuel cell setpoint $P_{sp,FC}$ to the fuel cell 1691.

In some embodiments, predictive cooling tower controller 1504 generates and provides control signals to powered cooling tower components 1602. Predictive cooling tower controller 1504 may use a multi-stage optimization technique to generate the control signals. For example, predictive cooling tower controller 1504 may include an economic controller configured to determine the optimal amount of power to be consumed by powered cooling tower components 1602 at each time step during the optimization period. The optimal amount of power to be consumed may minimize a cost function that accounts for the cost of energy consumed by cooling tower 1512. The cost of energy may be based on time-varying energy prices from electric utility 1618. In some embodiments, predictive cooling tower controller 1504 determines an optimal amount of power to purchase from energy grid 1614 (i.e., a grid power setpoint $P_{sp,grid}$) and an optimal amount of power to store or discharge from battery unit 1502 (i.e., a battery power setpoint $P_{sp,bat}$) at each of the plurality of time steps. Predictive cooling tower controller 1504 may monitor the actual power usage of powered cooling tower components 1602 and may utilize the actual power usage as a feedback signal when generating the optimal power setpoints.

Predictive cooling tower controller 1504 may include a tracking controller configured to generate temperature setpoints that achieve the optimal amount of power consumption at each time step. The temperature setpoints may include, for example, a sump water temperature setpoint $T_{sp,sump}$ (i.e., a temperature setpoint for the water in sump 1518) and/or a condenser water temperature setpoint $T_{sp,cond}$ (i.e., a temperature setpoint for the warm water returning to cooling tower 1512). In some embodiments, predictive cooling tower controller 1504 uses equipment models for powered cooling tower components 1602 to determine an amount of cooling that can be generated by cooling tower 1512 based on the optimal amount of power consumption.

In some embodiments, predictive cooling tower controller 1504 uses the temperature setpoints to generate the control signals for powered cooling tower components 1602. The control signals may include on/off commands, speed setpoints for fan 1514, differential pressure setpoints or flow rate setpoints for pump 1516, or other types of setpoints for individual devices of powered cooling tower components 1602. In other embodiments, the control signals may include the temperature setpoints (e.g., a sump water temperature setpoint $T_{sp,sump}$, a condenser water temperature setpoint $T_{sp,cond}$, etc.) generated by predictive cooling tower controller 1504. The temperature setpoints can be provided to powered cooling tower components 1602 or local controllers for powered cooling tower components 1602 which operate to achieve the temperature setpoints. For example, a local controller for fan 1514 may receive a measurement of the sump water temperature $T_{cump}$ from a sump water temperature sensor and/or a measurement the condenser temperature $T_{cond}$ from a condenser water temperature sensor. The local controller can use a feedback control process (e.g., PID, ESC, MPC, etc.) to increase or decrease the speed of fan 1514 to drive the measured temperature(s) to the temperature setpoint(s). Similar feedback control processes can be used to control pump 1516. The multi-stage optimization performed by predictive cooling tower controller 1504 is described in greater detail with reference to FIG. 17.

Predictive Cooling Tower Controller

Figure 17:
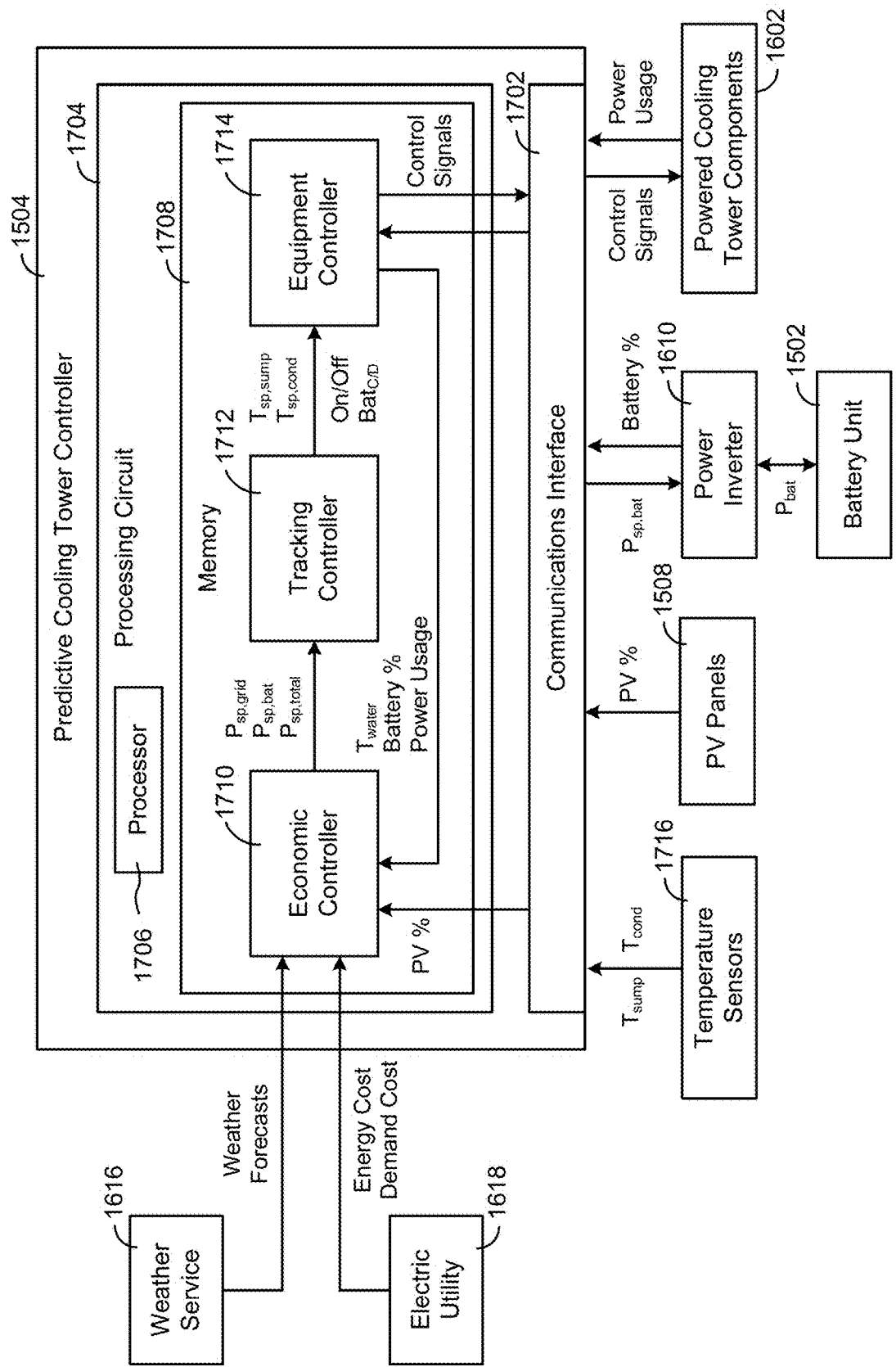
FIG. 17 is a block diagram illustrating the predictive cooling tower controller of FIG. 15 in greater detail, according to some embodiments.

Referring now to FIG. 17, a block diagram illustrating predictive cooling tower controller 1504 in greater detail is shown, according to an exemplary embodiment. Predictive cooling tower controller 1504 is shown to include a communications interface 1702 and a processing circuit 1704. Communications interface 1702 may facilitate communications between controller 1504 and external systems or devices. For example, communications interface 1702 may receive measurements of the sump water temperature $T_{sump}$ and the condenser water temperature $T_{cond}$ from temperature sensors 1716 and measurements of the power usage of powered cooling tower components 1602. In some embodiments, communications interface 1702 receives measurements of the state-of-charge (SOC) of battery unit 1502, which can be provided as a percentage of the maximum battery capacity (i.e., battery %). Communications interface 1702 can receive weather forecasts from a weather service 1616 and predicted energy costs and demand costs from an electric utility 1618. In some embodiments, predictive cooling tower controller 1504 uses communications interface 1702 to provide control signals powered cooling tower components 1602 and power inverter 1610.

Communications interface 1702 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 1702 can include an Ethernet card and port for sending and receiving data via an Ethernet-based communications link or network. In another example, communications interface 1702 can include a Wi-Fi transceiver for communicating via a wireless communications network or cellular or mobile phone communications transceivers.

Processing circuit 1704 is shown to include a processor 1706 and memory 1708. Processor 1706 may be a general purpose or specific purpose processor, an application specific integrated circuit (ASIC), one or more field programmable gate arrays (FPGAs), a group of processing components, or other suitable processing components. Processor 1706 is configured to execute computer code or instructions stored in memory 1708 or received from other computer readable media (e.g., CDROM, network storage, a remote server, etc.).

Memory 1708 may include one or more devices (e.g., memory units, memory devices, storage devices, etc.) for storing data and/or computer code for completing and/or facilitating the various processes described in the present disclosure. Memory 1708 may include random access memory (RAM), read-only memory (ROM), hard drive storage, temporary storage, non-volatile memory, flash memory, optical memory, or any other suitable memory for storing software objects and/or computer instructions. Memory 1708 may include database components, object code components, script components, or any other type of information structure for supporting the various activities and information structures described in the present disclosure. Memory 1708 may be communicably connected to processor 1706 via processing circuit 1704 and may include computer code for executing (e.g., by processor 1706) one or more processes described herein. When processor 1706 executes instructions stored in memory 1708 for completing the various activities described herein, processor 1706 generally configures controller 1504 (and more particularly processing circuit 1704) to complete such activities.

Still referring to FIG. 17, predictive cooling tower controller 1504 is shown to include an economic controller 1710, a tracking controller 1712, and an equipment controller 1714. Controllers 1710-1714 can be configured to perform a multi-state optimization process to generate control signals for power inverter 1610 and powered cooling tower components 1602. In brief overview, economic controller 1710 can optimize a predictive cost function to determine an optimal amount of power to purchase from energy grid 1614 (i.e., a grid power setpoint $P_{sp,grid}$), an optimal amount of power to store or discharge from battery unit 1502 (i.e., a battery power setpoint $P_{sp,bat}$), and/or an optimal amount of power to be consumed by powered cooling tower components 1602 (i.e., a cooling tower power setpoint $P_{sp,total}$) at each time step of an optimization period. Tracking controller 1712 can use the optimal power setpoints $P_{sp,grid}$, $P_{sp,bat}$, and/or $P_{sp,total}$ to determine optimal temperature setpoints (e.g., a sump water temperature setpoint $T_{sp,sump}$, a condenser water temperature setpoint $T_{sp,cond}$, etc.) and an optimal battery charge or discharge rate (i.e., $Bat_{C/D}$). Equipment controller 1714 can use the optimal temperature setpoints $T_{sp,zone}$ or $T_{sp,chw}$ to generate control signals for powered cooling tower components 1602 that drive the actual (e.g., measured) temperatures $T_{zone}$ and/or $T_{chw}$ to the setpoints (e.g., using a feedback control technique). Each of controllers 1710-1714 is described in detail below.

Economic Controller

Economic controller 1710 can be configured to optimize a predictive cost function to determine an optimal amount of power to purchase from energy grid 1614 (i.e., a grid power setpoint $P_{sp,grid}$), an optimal amount of power to store or discharge from battery unit 1502 (i.e., a battery power setpoint $P_{sp,bat}$), and/or an optimal amount of power to be consumed by powered cooling tower components 1602 (i.e., a cooling tower power setpoint $P_{sp,total}$) at each time step of an optimization period. An example of a predictive cost function which can be optimized by economic controller 1710 is shown in the following equation:

$$\min(J) = \sum_{k=1}^{h} C_{ec}(k) P_{fan}(k) \Delta t + \sum_{k=1}^{h} C_{ec}(k) P_{pump}(k) \Delta t + C_{DC} \max_k (P_{grid}(k)) - \sum_{k=1}^{h} C_{ec}(k) P_{bat}(k) \Delta t$$

where $C_{ec}(k)$ is the cost per unit of electricity (e.g., $/kWh) purchased from electric utility 1618 during time step k, $P_{fan}(k)$ is the power consumption (e.g., kW) of fan 1514 during time step k, $P_{pump}(k)$ is the power consumption of pump 1516 at time step k, $C_{DC}$ is the demand charge rate (e.g., $/kW), where the max( ) term selects the maximum electricity purchase of cooling tower 1512 (i.e., the maximum value of $P_{grid}(k)$) during any time step k of the optimization period, $P_{bat}(k)$ is the amount of power discharged from battery unit 1502 during time step k, and $\Delta t$ is the duration of each time step k. Economic controller 1710 can optimize the predictive cost function J over the duration of the optimization period (e.g., from time step k=1 to time step k=h) to predict the total cost of operating cooling tower 1512 over the duration of the optimization period.

The first and second terms of the predictive cost function J represent the cost of electricity consumed by powered cooling tower components 1602 over the duration of the optimization period. The values of the parameter $C_{ec}(k)$ at each time step k can be defined by the energy cost information provided by electric utility 1618. In some embodiments, the cost of electricity varies as a function of time, which results in different values of $C_{ec}(k)$ at different time steps k. The variables $P_{fan}(k)$ and $P_{cond}(k)$ are decision variables which can be optimized by economic controller 1710. In some embodiments, the total power consumption $P_{total}(k)$ of powered cooling tower components 1602 at time step k is equal to the sum of $P_{fan}(k)$ and $P_{pump}(k)$ (i.e., $P_{total}(k)=P_{fan}(k)+P_{pump}(k)$). Accordingly, the first two terms of the predictive cost function can be replaced with the summation $\Sigma_{k=1}^{h} C_{ec}(k) P_{total}(k) \Delta t$ in some embodiments.

The third term of the predictive cost function J represents the demand charge. Demand charge is an additional charge imposed by some utility providers based on the maximum power consumption during an applicable demand charge period. For example, the demand charge rate $C_{DC}$ may be specified in terms of dollars per unit of power (e.g., $/kW) and may be multiplied by the peak power usage (e.g., kW) during a demand charge period to calculate the demand charge. In the predictive cost function J, the demand charge rate $C_{DC}$ may be defined by the demand cost information received from electric utility 1618. The variable $P_{grid}(k)$ is a decision variable which can be optimized by economic controller 1710 in order to reduce the peak power usage $\max(P_{grid}(k))$ that occurs during the demand charge period. Load shifting may allow economic controller 1710 to smooth momentary spikes in the electric demand of cooling tower 1512 by storing energy in battery unit 1502 when the power consumption of powered cooling tower components 1602 is low. The stored energy can be discharged from battery unit 1502 when the power consumption of powered cooling tower components 1602 is high in order to reduce the peak power draw $P_{grid}$ from energy grid 1614, thereby decreasing the demand charge incurred.

The final term of the predictive cost function J represents the cost savings resulting from the use of battery unit 1502. Unlike the previous terms in the cost function J, the final term subtracts from the total cost. The values of the parameter $C_{ec}(k)$ at each time step k can be defined by the energy cost information provided by electric utility 1618. In some embodiments, the cost of electricity varies as a function of time, which results in different values of $C_{ec}(k)$ at different time steps k. The variable $P_{bat}(k)$ is a decision variable which can be optimized by economic controller 1710. A positive value of $P_{bat}(k)$ indicates that battery unit 1502 is discharging, whereas a negative value of $P_{bat}(k)$ indicates that battery unit 1502 is charging. The power discharged from battery unit 1502 $P_{bat}(k)$ can be used to satisfy some or all of the total power consumption $P_{total}(k)$ of powered cooling tower components 1602, which reduces the amount of power $P_{grid}(k)$ purchased from energy grid 1614 (i.e., $P_{grid}(k)=P_{total}(k)-P_{bat}(k)-P_{PV}(k)$). However, charging battery unit 1502 results in a negative value of $P_{bat}(k)$ which adds to the total amount of power $P_{grid}(k)$ purchased from energy grid 1614.

In some embodiments, the power $P_{PV}$ provided by PV panels 1508 is not included in the predictive cost function J because generating PV power does not incur a cost. However, the power $P_{PV}$ generated by PV panels 1508 can be used to satisfy some or all of the total power consumption $P_{total}(k)$ of powered cooling tower components 1602, which reduces the amount of power $P_{grid}(k)$ purchased from energy grid 1614 (i.e., $P_{grid}(k)=P_{total}(k)-P_{bat}(k)-P_{PV}(k)$). The amount of PV power $P_{PV}$ generated during any time step k can be predicted by economic controller 1710. Several techniques for predicting the amount of PV power generated by PV panels are described in U.S. patent application Ser. No. 15/247,869, U.S. patent application Ser. No. 15/247,844, and U.S. patent application Ser. No. 15/247,788. Each of these patent applications has a filing date of Aug. 25, 2016, and the entire disclosure of each of these patent applications is incorporated by reference herein.

Economic controller 1710 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 1710 can use battery unit 1502 to perform load shifting by drawing electricity from energy grid 1614 when energy prices are low and/or when the power consumed by powered cooling tower components 1602 is low. The electricity can be stored in battery unit 1502 and discharged later when energy prices are high and/or the power consumption of powered cooling tower components 1602 is high. This enables economic controller 1710 to reduce the cost of electricity consumed by cooling tower 1512 and can smooth momentary spikes in the electric demand of cooling tower 1512, thereby reducing the demand charge incurred.

Economic controller 1710 can be configured to impose constraints on the optimization of the predictive cost function J. In some embodiments, the constraints include constraints on the temperature $T_{sump}$ of the sump water produced by cooling tower 1512. Economic controller 1710 can be configured to maintain the actual or predicted temperature $T_{zump}$ between a minimum temperature bound $T_{min}$ and a maximum temperature bound $T_{max}$ (i.e., $T_{min} \leq T_{sump} \leq T_{max}$) at all times. Similarly, economic controller 1710 can be configured to maintain the actual or predicted temperature $T_{cond}$ between a minimum temperature bound $T_{min}$ and a maximum temperature bound $T_{max}$ (i.e., $T_{min} \leq T_{cond} \leq T_{max}$) at all times. The parameters $T_{min}$ and $T_{max}$ may be time-varying to define different temperature ranges at different times.

In order to ensure that the temperature constraints are satisfied, economic controller 1710 can model the temperatures $T_{sump}$ and $T_{cond}$ as a function of the decision variables optimized by economic controller 1710. Several techniques for developing temperature models and relating temperatures to the decision variables in the predictive cost function J are described in greater detail in U.S. Pat. No. 9,436,179 granted Sep. 6, 2016, U.S. patent application Ser. No. 14/694,633 filed Apr. 23, 2015, and U.S. patent application Ser. No. 15/199,910 filed Jun. 30, 2016. The entire disclosure of each of these patents and patent applications is incorporated by reference herein.

In addition to constraints on the temperature $T_{sump}$ and $T_{cond}$, economic controller 1710 can impose constraints on the state-of-charge (SOC) and charge/discharge rates of battery unit 1502. In some embodiments, economic controller 1710 generates and imposes the following power constraints on the predictive cost function J:

$$P_{bat} \leq P_{rated}$$

$$-P_{bat} \leq P_{rated}$$

where $P_{bat}$ is the amount of power discharged from battery unit 1502 and $P_{rated}$ is the rated battery power of battery unit 1502 (e.g., the maximum rate at which battery unit 1502 can be charged or discharged). These power constraints ensure that battery unit 1502 is not charged or discharged at a rate that exceeds the maximum possible battery charge/discharge rate $P_{rated}$.

In some embodiments, economic controller 1710 generates and imposes one or more capacity constraints on the predictive cost function J The capacity constraints may be used to relate the battery power $P_{bat}$ charged or discharged during each time step to the capacity and SOC of battery unit 1502. The capacity constraints may ensure that the capacity of battery unit 1502 is maintained within acceptable lower and upper bounds at each time step of the optimization period. In some embodiments, economic controller 1710 generates the following capacity constraints:

$$C_a(k) - P_{bat}(k)\Delta t \leq C_{rated}$$

$$C_a(k) - P_{bat}(k)\Delta t \geq 0$$

where $C_a(k)$ is the available battery capacity (e.g., kWh) at the beginning of time step k, $P_{bat}(k)$ is the rate at which battery unit 1502 is discharged during time step k (e.g., kW), $\Delta t$ is the duration of each time step, and $C_{rated}$ is the maximum rated capacity of battery unit 1502 (e.g., kWh). The term $P_{bat}(k)\Delta t$ represents the change in battery capacity during time step k. These capacity constraints ensure that the capacity of battery unit 1502 is maintained between zero and the maximum rated capacity $C_{rated}$.

In some embodiments, economic controller 1710 generates and imposes one or more capacity constraints on the operation of powered cooling tower components 1602. For example, powered cooling tower components 1602 may have a maximum operating point (e.g., a maximum pump speed, a maximum cooling capacity, etc.) which corresponds to a maximum power consumption $P_{total,max}$. Economic controller 1710 can be configured to generate a constraint which limits the power $P_{total}$ provided to powered cooling tower components 1602 between zero and the maximum power consumption $P_{total,max}$ as shown in the following equation:

$$0 \leq P_{total} \leq P_{total,max}$$

$$P_{total} = P_{sp,grid} + P_{sp,bat}$$

where the total power $P_{total}$ provided to powered cooling tower components 1602 is the sum of the grid power setpoint $P_{sp,grid}$ and the battery power setpoint $P_{sp,bat}$.

Economic controller 1710 can optimize the predictive cost function J subject to the constraints to determine optimal values for the decision variables $P_{total}$, $P_{fan}$, $P_{pump}$, $P_{grid}$, and $P_{bat}$, where $P_{total} = P_{bat} + P_{grid} + P_{PV}$. In some embodiments, economic controller 1710 uses the optimal values for $P_{total}$, $P_{bat}$, and/or $P_{grid}$ to generate power setpoints for tracking controller 1712. The power setpoints can include battery power setpoints $P_{sp,bat}$, grid power setpoints $P_{sp,grid}$, and/or cooling tower power setpoints $P_{sp,total}$ for each of the time steps k in the optimization period. Economic controller 1710 can provide the power setpoints to tracking controller 1712.

Tracking Controller

Tracking controller 1712 can use the optimal power setpoints $P_{sp,grid}$, $P_{sp,bat}$, and/or $P_{sp,total}$ generated by economic controller 1710 to determine optimal temperature setpoints (e.g., a sump water temperature setpoint $T_{sp,sump}$, a condenser water temperature setpoint $T_{sp,cond}$, etc.) and an optimal battery charge or discharge rate (i.e., $Bat_{C/D}$). In some embodiments, tracking controller 1712 generates a sump water temperature setpoint $T_{sp,sump}$ and/or a condenser water temperature setpoint $T_{sp,cond}$ that are predicted to achieve the power setpoint $P_{sp,total}$ for cooling tower 1512. In other words, tracking controller 1712 may generate a sump water temperature setpoint $T_{sp,sump}$ and/or a condenser water temperature setpoint $T_{sp,cond}$ that cause cooling tower 1512 to consume the optimal amount of power $P_{total}$ determined by economic controller 1710.

In some embodiments, tracking controller 1712 relates the power consumption of cooling tower 1512 to the sump water temperature $T_{sump}$ and the sump water temperature setpoint $T_{sp,sump}$ using a power consumption model. For example, tracking controller 1712 can use a model of equipment controller 1714 to determine the control action performed by equipment controller 1714 as a function of the sump water temperature $T_{sump}$ and the sump water temperature setpoint $T_{sp,sump}$. An example of such a zone regulatory controller model is shown in the following equation:

$$P_{total} = f_4(T_{sump}, T_{sp,sump})$$

The function $f_4$ can be identified from data. For example, tracking controller 1712 can collect measurements of $P_{total}$ and $T_{sump}$ and identify the corresponding value of $T_{sp,sump}$. Tracking controller 1712 can perform a system identification process using the collected values of $P_{total}$, $T_{sump}$, and $T_{sp,sump}$ as training data to determine the function $f_4$ that defines the relationship between such variables.

Tracking controller 1712 may use a similar model to determine the relationship between the total power consumption $P_{total}$ of cooling tower 1512 and the condenser water temperature setpoint $T_{sp,cond}$. For example, tracking controller 1712 can define the power consumption $P_{total}$ of cooling tower 1512 as a function of the condenser water temperature $T_{cond}$ and the condenser water temperature setpoint $T_{sp,cond}$. An example of such a model is shown in the following equation:

$$P_{total} = f_5(T_{cond}, T_{sp,cond})$$

The function $f_5$ can be identified from data. For example, tracking controller 1712 can collect measurements of $P_{total}$ and $T_{cond}$ and identify the corresponding value of $T_{sp,cond}$. Tracking controller 1712 can perform a system identification process using the collected values of $P_{total}$, $T_{cond}$, and $T_{sp,cond}$ as training data to determine the function $f_5$ that defines the relationship between such variables.

Tracking controller 1712 can use the relationships between $P_{total}$, $T_{sp,sump}$, and $T_{sp,cond}$ to determine values for $T_{sp,sump}$ and $T_{sp,cond}$. For example, tracking controller 1712 can receive the value of $P_{total}$ as an input from economic controller 1710 (i.e., $P_{sp,total}$) and can use determine corresponding values of $T_{sp,sump}$ and $T_{sp,cond}$. Tracking controller 1712 can provide the values of $T_{sp,sump}$ and $T_{sp,cond}$ as outputs to equipment controller 1714.

In some embodiments, tracking controller 1712 uses the battery power setpoint $P_{sp,bat}$ to determine the optimal rate $Bat_{C/D}$ at which to charge or discharge battery unit 1502. For example, the battery power setpoint $P_{sp,bat}$ may define a power value (kW) which can be translated by tracking controller 1712 into a control signal for power inverter 1610 and/or equipment controller 1714. In other embodiments, the battery power setpoint $P_{sp,bat}$ is provided directly to power inverter 1610 and used by power inverter 1610 to control the battery power $P_{bat}$.

Equipment Controller

Equipment controller 1714 can use the optimal temperature setpoints $T_{sp,sump}$ or $T_{sp,cond}$ generated by tracking controller 1712 to generate control signals for powered cooling tower components 1602. The control signals generated by equipment controller 1714 may drive the actual (e.g., measured) temperatures $T_{sump}$ and/or $T_{cond}$ to the setpoints. Equipment controller 1714 can use any of a variety of control techniques to generate control signals for powered cooling tower components 1602. For example, equipment controller 1714 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for powered cooling tower components 1602.

The control signals may include on/off commands, speed setpoints for fan 1514, pressure setpoints or flow rate setpoints for pump 1516, or other types of setpoints for individual devices of powered cooling tower components 1602. In other embodiments, the control signals may include the temperature setpoints (e.g., a sump water temperature setpoint $T_{sp,sump}$, a condenser water temperature setpoint $T_{sp,cond}$, etc.) generated by predictive cooling tower controller 1504. The temperature setpoints can be provided to powered cooling tower components 1602 or local controllers for powered cooling tower components 1602 which operate to achieve the temperature setpoints. For example, a local controller for fan 1514 may receive a measurement of the sump water temperature $T_{sump}$ and/or a measurement of the condenser water temperature $T_{cond}$ from temperature sensors 1716 and can modulate the speed of fan 1514 to drive the measured temperatures to the setpoints.

In some embodiments, equipment controller 1714 is configured to provide control signals to power inverter 1610. The control signals provided to power inverter 1610 can include a battery power setpoint $P_{sp,bat}$ and/or the optimal charge/discharge rate $Bat_{C/D}$. Equipment controller 1714 can be configured to operate power inverter 1610 to achieve the battery power setpoint $P_{sp,bat}$. For example, equipment controller 1714 can cause power inverter 1610 to charge battery unit 1502 or discharge battery unit 1502 in accordance with the battery power setpoint $P_{sp,bat}$.

Valve Unit with Battery and Predictive Control

Figure 18:
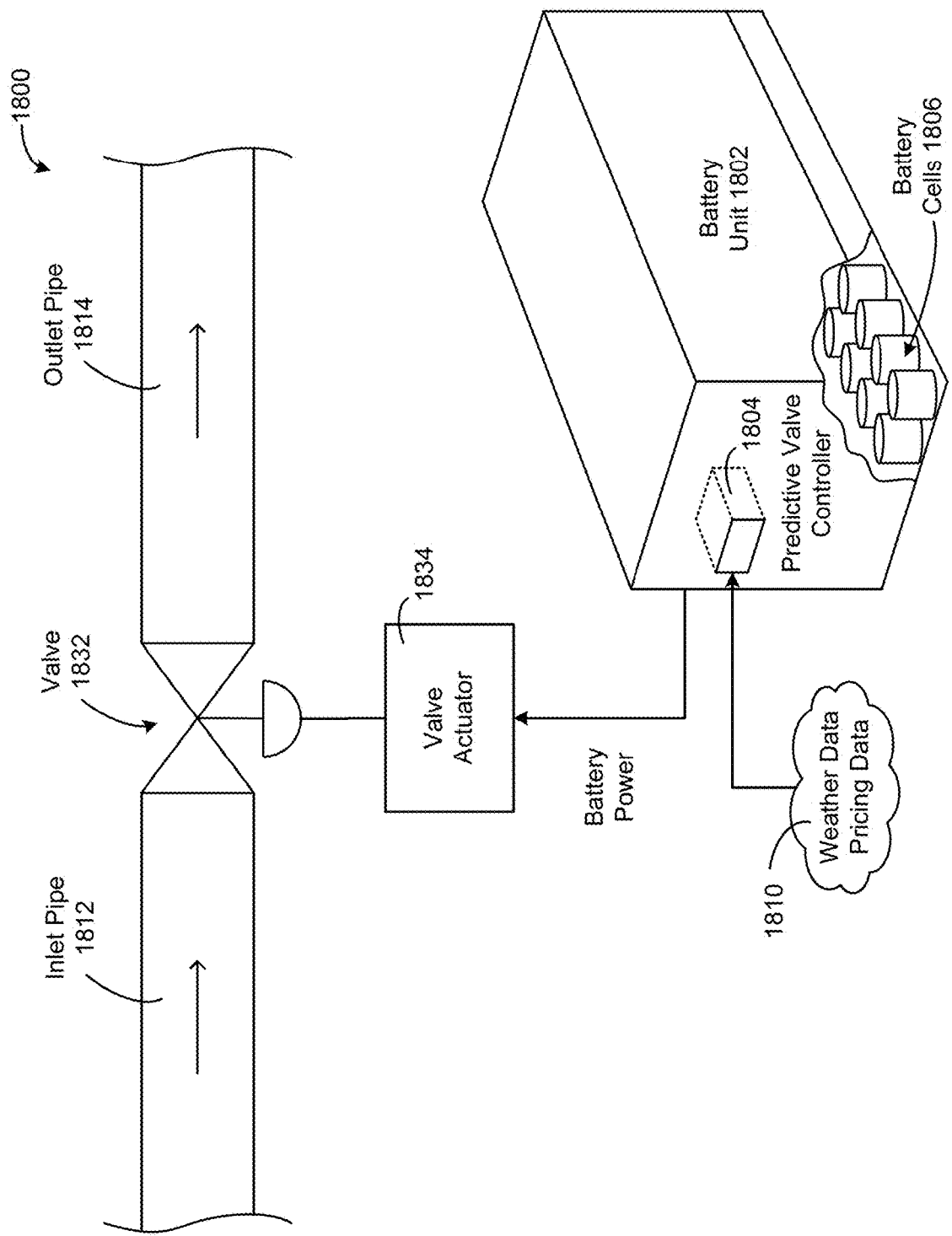
FIG. 18 is a drawing of a valve unit with a battery unit and a predictive valve controller, according to some embodiments.
Figure 19:
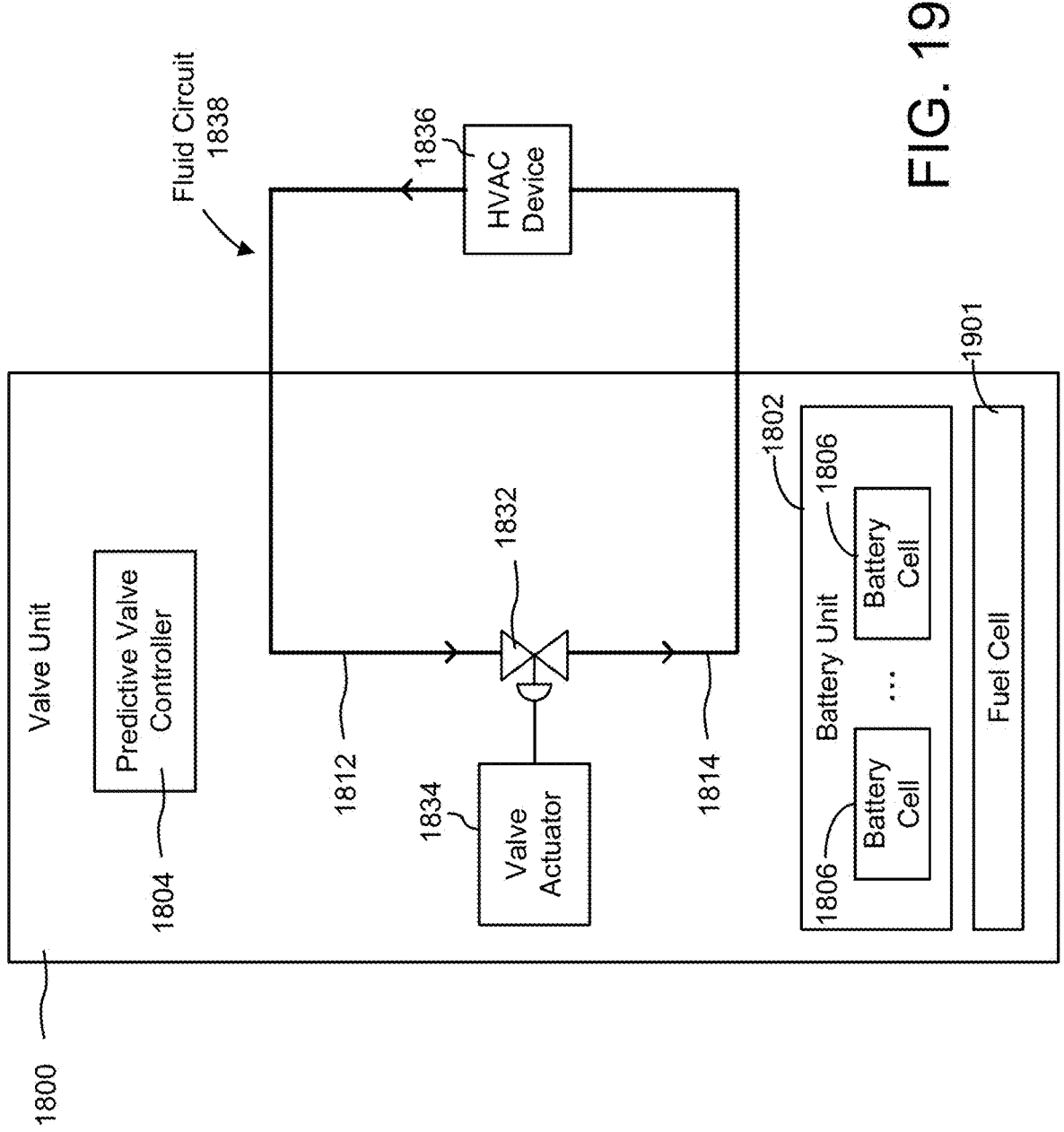
FIG. 19 is a block diagram of the valve unit of FIG. 18, according to some embodiments.

Referring now to FIGS. 18-19, a valve unit 1800 with a battery unit 1802 and predictive valve controller 1804 is shown, according to some embodiments. Valve unit 1800 can be configured to control a valve 1832 via a valve actuator 1834. Valve 1832 can be a fluid control valve configured to control the flowrate of fluid from an inlet pipe 1812 to an outlet pipe 1814. Actuator 1834 may include a motor or other powered component configured to modulate the position of valve 1832. In some embodiments, valve unit 1800 is configured to control the flow of fluid through a HVAC device 1836 via a fluid circuit 1838. HVAC device 1836 may include, for example, a heating coil or cooling coil, an air handling unit, a rooftop unit, a heat exchanger, a refrigerator or freezer, a condenser or evaporator, a cooling tower, or any other type of system or device that receives a fluid in a HVAC system.

In some embodiments, battery unit 1802 includes one or more battery cells 1806. Battery cells 1806 are configured to store and discharge electric energy (i.e., electricity). In some embodiments, battery unit 1802 is charged using electricity from an external energy grid (e.g., provided by an electric utility). The electricity stored in battery unit 1802 can be discharged to power one or more powered components of valve unit 1800 (e.g., actuator 1834). Advantageously, battery unit 1802 allows valve unit 1800 to draw electricity from the energy grid and charge battery unit 1802 when energy prices are low and discharge the stored electricity when energy prices are high to time-shift the electric load of valve unit 1800. In some embodiments, battery unit 1802 has sufficient energy capacity to power valve unit 1800 for approximately 4-6 hours when operating at maximum capacity such that battery unit 1802 can be utilized during high energy cost periods and charged during low energy cost periods.

As shown in FIG. 19, the valve unit 1800 can include a fuel cell 1901. In some embodiments, the fuel cell 1901 is a fuel cell configured to generate electrical energy using chemical reactions. For example, the fuel cell 1901 may convert the chemical energy of hydrogen and an oxidizing agent (e.g., oxygen) into electricity through a pair of redox reactions. In other embodiments, the fuel cell 1901 is a hydrocarbon fuel cells that use one or more of diesel, methanol, natural gas, etc. to generate electricity. The fuel cell 1901 can be controlled to generate electricity to augment grid energy or other energy sources, complement battery discharge during high energy cost periods, or generate electricity to charge the battery (e.g., during high energy cost periods). The fuel cell may require fuel replacement (e.g., a supply of hydrogen) which may be purchase periodically and added to the valve unit 1100, for example. In embodiments where the valve unit 1100 includes the fuel cell 1901, the control and optimization processes herein are configured to account for the contributions of the fuel cell 1901 and the cost of operating the fuel cell 1901 when generating control outputs for the various components of the valve unit 1100, including for the fuel cell fuel cell 1901. For example, an optimization performed by the predictive valve controller 1804 may determine whether to operate the fuel cell 1901 to generate electricity for each time step in an optimization period.

In some embodiments, predictive valve controller 1804 performs an optimization process to determine whether to charge or discharge battery unit 1802 during each of a plurality of time steps that occur during an optimization period. Predictive valve controller 1804 may use weather and pricing data 1810 to predict the amount of heating/cooling required and the cost of electricity during each of the plurality of time steps. Predictive valve controller 1804 can optimize an objective function that accounts for the cost of electricity purchased from the energy grid over the duration of the optimization period. Predictive valve controller 1804 can determine an amount of electricity to purchase from the energy grid and an amount of electricity to store or discharge from battery unit 1802 during each time step. The objective function and the optimization performed by predictive valve controller 1804 are described in greater detail with reference to FIGS. 20-21.

Predictive Valve Control System

Figure 20:
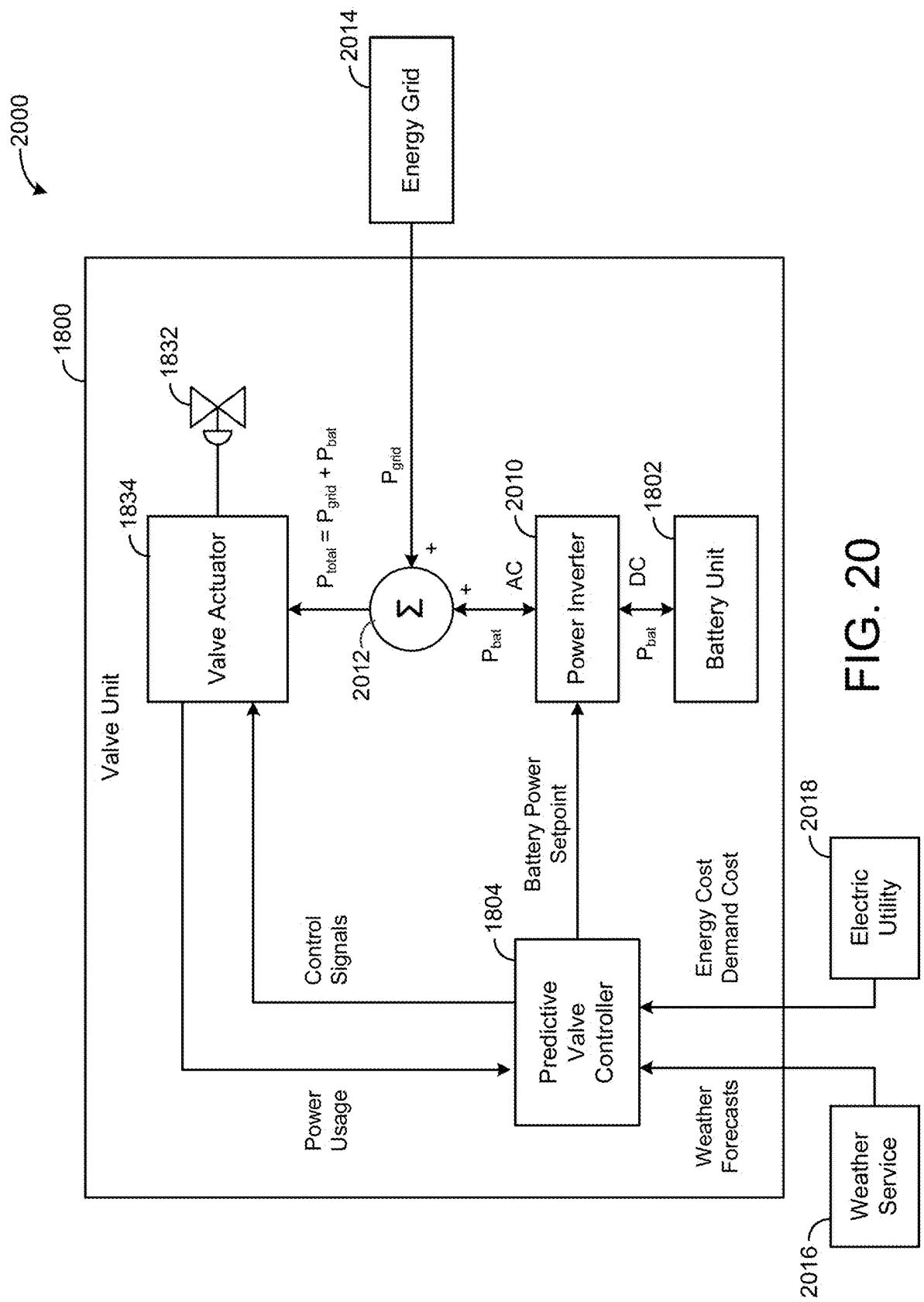
FIG. 20 is a block diagram of a predictive valve control system including the battery unit and predictive valve controller of FIG. 18, according to some embodiments.

Referring now to FIG. 20, a block diagram of a predictive valve control system 2000 is shown, according to some embodiments. Several of the components shown in control system 2000 may be part of valve unit 1800. For example, valve unit 1800 may include actuator 1834, battery unit 1802, predictive valve controller 1804, power inverter 2010, and a power junction 2012.

Power inverter 2010 may be configured to convert electric power between direct current (DC) and alternating current (AC). For example, battery unit 1802 may be configured to store and output DC power, whereas energy grid 2014 and actuator 1834 may be configured to consume and provide AC power. Power inverter 2010 may be used to convert DC power from battery unit 1802 into a sinusoidal AC output synchronized to the grid frequency of energy grid 2014 and/or actuator 1834. Power inverter 2010 may also be used to convert AC power from energy grid 2014 into DC power that can be stored in battery unit 1802. The power output of battery unit 1802 is shown as $P_{bat}$. $P_{bat}$ may be positive if battery unit 1802 is providing power to power inverter 2010 (i.e., battery unit 1802 is discharging) or negative if battery unit 1802 is receiving power from power inverter 2010 (i.e., battery unit 1802 is charging).

In some instances, power inverter 2010 receives a DC power output from battery unit 1802 and converts the DC power output to an AC power output that can be provided to actuator 1834. Power inverter 2010 may synchronize the frequency of the AC power output with that of energy grid 2014 (e.g., 50 Hz or 60 Hz) using a local oscillator and may limit the voltage of the AC power output to no higher than the grid voltage. In some embodiments, power inverter 2010 is a resonant inverter that includes or uses LC circuits to remove the harmonics from a simple square wave in order to achieve a sine wave matching the frequency of energy grid 2014. In various embodiments, power inverter 2010 may operate using high-frequency transformers, low-frequency transformers, or without transformers. Low-frequency transformers may convert the DC output from battery unit 1802 directly to the AC output provided to actuator 1834. High-frequency transformers may employ a multi-step process that involves converting the DC output to high-frequency AC, then back to DC, and then finally to the AC output provided to actuator 1834.

Power junction 2012 is the point at which actuator 1834, energy grid 2014, and power inverter 2010 are electrically connected. The power supplied to power junction 2012 from power inverter 2010 is shown as $P_{bat}$. $P_{bat}$ may be positive if power inverter 2010 is providing power to power junction 2012 (i.e., battery unit 1802 is discharging) or negative if power inverter 2010 is receiving power from power junction 2012 (i.e., battery unit 1802 is charging). The power supplied to power junction 2012 from energy grid 2014 is shown as $P_{grid}$. $P_{bat}$ and $P_{grid}$ combine at power junction 2012 to form $P_{total}$ (i.e., $P_{total}=P_{grid}+P_{bat}$). $P_{total}$ may be defined as the power provided to actuator 1834 from power junction 2012. In some instances, $P_{total}$ is greater than $P_{grid}$. For example, when battery unit 1802 is discharging, $P_{bat}$ may be positive which adds to the grid power $P_{grid}$ when $P_{bat}$ combines with $P_{grid}$ to form $P_{total}$. In other instances, $P_{total}$ may be less than $P_{grid}$. For example, when battery unit 1802 is charging, $P_{bat}$ may be negative which subtracts from the grid power $P_{grid}$ when $P_{bat}$ and $P_{grid}$ combine to form $P_{total}$.

Predictive valve controller 1804 can be configured to control actuator 1834 and power inverter 2010. In some embodiments, predictive valve controller 1804 generates and provides a battery power setpoint $P_{sp,bat}$ to power inverter 2010. The battery power setpoint $P_{sp,bat}$ may include a positive or negative power value (e.g., kW) which causes power inverter 2010 to charge battery unit 1802 (when $P_{sp,bat}$ is negative) using power available at power junction 2012 or discharge battery unit 1802 (when $P_{sp,bat}$ is positive) to provide power to power junction 2012 in order to achieve the battery power setpoint $P_{sp,bat}$.

In some embodiments, predictive valve controller 1804 generates and provides control signals to actuator 1834. Predictive valve controller 1804 may use a multi-stage optimization technique to generate the control signals. For example, predictive valve controller 1804 may include an economic controller configured to determine the optimal amount of power to be consumed by actuator 1834 at each time step during the optimization period. The optimal amount of power to be consumed may minimize a cost function that accounts for the cost of energy consumed by valve unit 1800. The cost of energy may be based on time-varying energy prices from electric utility 2018. In some embodiments, predictive valve controller 1804 determines an optimal amount of power to purchase from energy grid 2014 (i.e., a grid power setpoint $P_{sp,grid}$) and an optimal amount of power to store or discharge from battery unit 1802 (i.e., a battery power setpoint $P_{sp,bat}$) at each of the plurality of time steps. Predictive valve controller 1804 may monitor the actual power usage of actuator 1834 and may utilize the actual power usage as a feedback signal when generating the optimal power setpoints.

Predictive valve controller 1804 may include a tracking controller configured to generate position setpoints for actuator 1834 that achieve the optimal amount of power consumption at each time step. In some embodiments, predictive valve controller 1804 uses an equipment model for actuator 1834 to determine a position of actuator 1834 that corresponds to the optimal amount of power consumption.

In some embodiments, predictive valve controller 1804 uses the position setpoints to generate the control signals for actuator 1834. The control signals may include on/off commands, position commands, voltage signals, or other types of setpoints that affect the operation of actuator 1834. In other embodiments, the control signals may include the position setpoints generated by predictive valve controller 1804. The setpoints can be provided to actuator 1834 or local controllers for actuator 1834 which operate to achieve the setpoints. For example, a local controller for actuator 1834 may receive a measurement of the valve position from one or more position sensors. The local controller can use a feedback control process (e.g., PID, ESC, MPC, etc.) to adjust the position of actuator 1834 and/or valve 1832 to drive the measured position to the setpoint(s). The multi-stage optimization performed by predictive valve controller 1804 is described in greater detail with reference to FIG. 21.

Predictive Valve Controller

Figure 21:
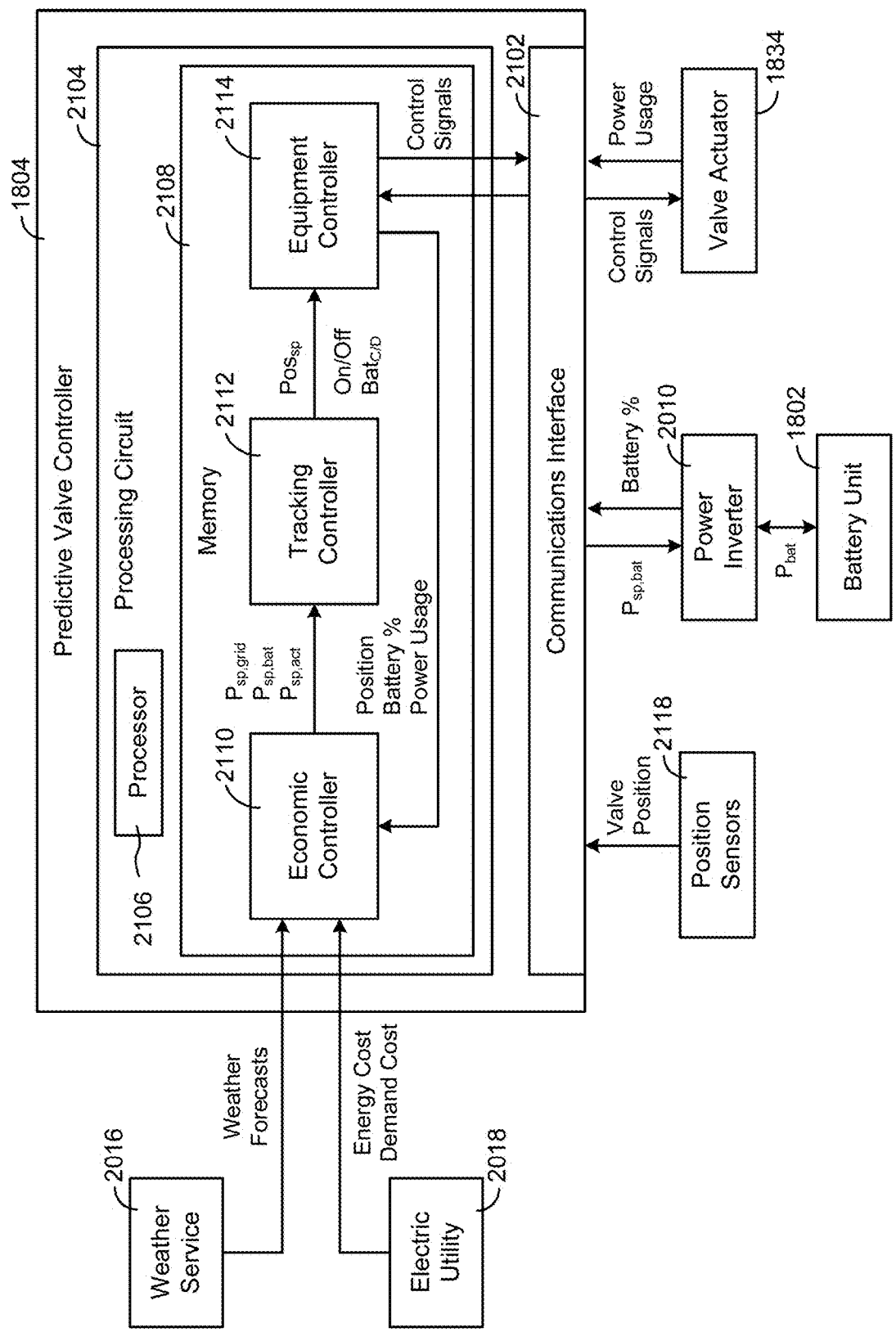
FIG. 21 is a block diagram illustrating the predictive valve controller of FIG. 18 in greater detail, according to some embodiments.

Referring now to FIG. 21, a block diagram illustrating predictive valve controller 1804 in greater detail is shown, according to an exemplary embodiment. Predictive valve controller 1804 is shown to include a communications interface 2102 and a processing circuit 2104. Communications interface 2102 may facilitate communications between controller 1804 and external systems or devices. For example, communications interface 2102 may receive measurements of the valve position from position sensors 2118 and measurements of the power usage of actuator 1834. In some embodiments, communications interface 2102 receives measurements of the state-of-charge (SOC) of battery unit 1802, which can be provided as a percentage of the maximum battery capacity (i.e., battery %). Communications interface 2102 can receive weather forecasts from a weather service 916 and predicted energy costs and demand costs from an electric utility 2018. In some embodiments, predictive valve controller 1804 uses communications interface 2102 to provide control signals actuator 1834 and power inverter 2010.

Communications interface 2102 may include wired or wireless communications interfaces (e.g., jacks, antennas, transmitters, receivers, transceivers, wire terminals, etc.) for conducting data communications external systems or devices. In various embodiments, the communications may be direct (e.g., local wired or wireless communications) or via a communications network (e.g., a WAN, the Internet, a cellular network, etc.). For example, communications interface 2102 can include an Ethernet card and port for sending and receiving data via an Ethernet-based communications link or network. In another example, communications interface 2102 can include a Wi-Fi transceiver for communicating via a wireless communications network or cellular or mobile phone communications transceivers.

Processing circuit 2104 is shown to include a processor 2106 and memory 2108. Processor 2106 may be a general purpose or specific purpose processor, an application specific integrated circuit (ASIC), one or more field programmable gate arrays (FPGAs), a group of processing components, or other suitable processing components. Processor 2106 is configured to execute computer code or instructions stored in memory 2108 or received from other computer readable media (e.g., CDROM, network storage, a remote server, etc.).

Memory 2108 may include one or more devices (e.g., memory units, memory devices, storage devices, etc.) for storing data and/or computer code for completing and/or facilitating the various processes described in the present disclosure. Memory 2108 may include random access memory (RAM), read-only memory (ROM), hard drive storage, temporary storage, non-volatile memory, flash memory, optical memory, or any other suitable memory for storing software objects and/or computer instructions. Memory 2108 may include database components, object code components, script components, or any other type of information structure for supporting the various activities and information structures described in the present disclosure. Memory 2108 may be communicably connected to processor 2106 via processing circuit 2104 and may include computer code for executing (e.g., by processor 2106) one or more processes described herein. When processor 2106 executes instructions stored in memory 2108 for completing the various activities described herein, processor 2106 generally configures controller 1804 (and more particularly processing circuit 2104) to complete such activities.

Still referring to FIG. 21, predictive valve controller 1804 is shown to include an economic controller 2110, a tracking controller 2112, and an equipment controller 2114. Controllers 2110-2114 can be configured to perform a multi-state optimization process to generate control signals for power inverter 2010 and actuator 1834. In brief overview, economic controller 2110 can optimize a predictive cost function to determine an optimal amount of power to purchase from energy grid 2014 (i.e., a grid power setpoint $P_{sp,grid}$), an optimal amount of power to store or discharge from battery unit 1802 (i.e., a battery power setpoint $P_{sp,bat}$), and/or an optimal amount of power to be consumed by actuator 1834 (i.e., a pump power setpoint $P_{sp,act}$) at each time step of an optimization period. Tracking controller 2112 can use the optimal power setpoints $P_{sp,grid}$, $P_{sp,bat}$, and/or $P_{sp,act}$ to determine optimal position setpoints $Pos_{sp}$ for valve 1832 and an optimal battery charge or discharge rate (i.e., $Bat_{C/D}$). Equipment controller 2114 can use the optimal position setpoints $Pos_{sp}$ to generate control signals for actuator 1834 that drive the actual (e.g., measured) position to the setpoints (e.g., using a feedback control technique). Each of controllers 2110-2114 is described in detail below.

Economic Controller

Economic controller 2110 can be configured to optimize a predictive cost function to determine an optimal amount of power to purchase from energy grid 2014 (i.e., a grid power setpoint $P_{sp,grid}$), an optimal amount of power to store or discharge from battery unit 1802 (i.e., a battery power setpoint $P_{sp,bat}$), and/or an optimal amount of power to be consumed by actuator 1834 (i.e., an actuator power setpoint $P_{sp,act}$) at each time step of an optimization period. An example of a predictive cost function which can be optimized by economic controller 2110 is shown in the following equation:

$$\min(J) = \sum_{k=1}^{h} C_{ec}(k) P_{act}(k) \Delta t + C_{DC} \max_{k}(P_{grid}(k)) - \sum_{k=1}^{h} C_{ec}(k) P_{bat}(k) \Delta t$$

where $C_{ec}(k)$ is the cost per unit of electricity (e.g., $/kWh) purchased from electric utility 2018 during time step k, $P_{act}(k)$ is the power consumption of actuator 1834 at time step k, $C_{DC}$ is the demand charge rate (e.g., $/kW), where the max( ) term selects the maximum electricity purchase of valve unit 1800 (i.e., the maximum value of $P_{grid}(k)$) during any time step k of the optimization period, $P_{bat}(k)$ is the amount of power discharged from battery unit 1802 during time step k, and $\Delta t$ is the duration of each time step k. Economic controller 2110 can optimize the predictive cost function j over the duration of the optimization period (e.g., from time step k=1 to time step k=h) to predict the total cost of operating valve unit 1800 over the duration of the optimization period.

The first term of the predictive cost function j represents the cost of electricity consumed by actuator 1834 over the duration of the optimization period. The values of the parameter $C_{ec}(k)$ at each time step k can be defined by the energy cost information provided by electric utility 2018. In some embodiments, the cost of electricity varies as a function of time, which results in different values of $C_{ec}(k)$ at different time steps k. The variable $P_{act}(k)$ is a decision variable which can be optimized by economic controller 2110.

The second term of the predictive cost function J represents the demand charge. Demand charge is an additional charge imposed by some utility providers based on the maximum power consumption during an applicable demand charge period. For example, the demand charge rate $C_{DC}$ may be specified in terms of dollars per unit of power (e.g., $/kW) and may be multiplied by the peak power usage (e.g., kW) during a demand charge period to calculate the demand charge. In the predictive cost function J, the demand charge rate $C_{DC}$ may be defined by the demand cost information received from electric utility 2018. The variable $P_{grid}(k)$ is a decision variable which can be optimized by economic controller 2110 in order to reduce the peak power usage $\max(P_{grid}(k))$ that occurs during the demand charge period. Load shifting may allow economic controller 2110 to smooth momentary spikes in the electric demand of valve unit 1800 by storing energy in battery unit 1802 when the power consumption of actuator 1834 is low. The stored energy can be discharged from battery unit 1802 when the power consumption of actuator 1834 is high in order to reduce the peak power draw $P_{grid}$ from energy grid 2014, thereby decreasing the demand charge incurred.

The final term of the predictive cost function J represents the cost savings resulting from the use of battery unit 1802. Unlike the previous terms in the cost function J, the final term subtracts from the total cost. The values of the parameter $C_{ec}(k)$ at each time step k can be defined by the energy cost information provided by electric utility 2018. In some embodiments, the cost of electricity varies as a function of time, which results in different values of $C_{ec}(k)$ at different time steps k. The variable $P_{bat}(k)$ is a decision variable which can be optimized by economic controller 2110. A positive value of $P_{bat}(k)$ indicates that battery unit 1802 is discharging, whereas a negative value of $P_{bat}(k)$ indicates that battery unit 1802 is charging. The power discharged from battery unit 1802 $P_{bat}(k)$ can be used to satisfy some or all of the total power consumption $P_{total}(k)$ of actuator 1834, which reduces the amount of power $P_{grid}(k)$ purchased from energy grid 2014 (i.e., $P_{grid}(k)=P_{total}(k)-P_{bat}(k)$). However, charging battery unit 1802 results in a negative value of $P_{bat}(k)$ which adds to the total amount of power $P_{grid}(k)$ purchased from energy grid 2014.

Economic controller 2110 can optimize the predictive cost function J over the duration of the optimization period to determine optimal values of the decision variables at each time step during the optimization period. In some embodiments, the optimization period has a duration of approximately one day and each time step is approximately fifteen minutes. However, the durations of the optimization period and the time steps can vary in other embodiments and can be adjusted by a user. Advantageously, economic controller 2110 can use battery unit 1802 to perform load shifting by drawing electricity from energy grid 2014 when energy prices are low and/or when the power consumed by actuator 1834 is low. The electricity can be stored in battery unit 1802 and discharged later when energy prices are high and/or the power consumption of actuator 1834 is high. This enables economic controller 2110 to reduce the cost of electricity consumed by valve unit 1800 and can smooth momentary spikes in the electric demand of valve unit 1800, thereby reducing the demand charge incurred.

Economic controller 2110 can be configured to impose constraints on the optimization of the predictive cost function J. In some embodiments, the constraints include constraints on the position of actuator 1834. Economic controller 2110 can be configured to maintain the actual or predicted position between a minimum position bound $Pos_{min}$ and a maximum position bound $Pos_{max}$ (i.e., $Pos_{min} \leq Pos \leq Pos_{max}$) at all times. The parameters $Pos_{min}$ and $Pos_{max}$ may be time-varying to define different position ranges at different times.

In addition to constraints on the position of valve 1832, economic controller 2110 can impose constraints on the state-of-charge (SOC) and charge/discharge rates of battery unit 1802. In some embodiments, economic controller 2110 generates and imposes the following power constraints on the predictive cost function J:

$$P_{bat} \leq P_{rated}$$

$$-P_{bat} \leq P_{rated}$$

where $P_{bat}$ is the amount of power discharged from battery unit 1802 and $P_{rated}$ is the rated battery power of battery unit 1802 (e.g., the maximum rate at which battery unit 1802 can be charged or discharged). These power constraints ensure that battery unit 1802 is not charged or discharged at a rate that exceeds the maximum possible battery charge/discharge rate $P_{rated}$.

In some embodiments, economic controller 2110 generates and imposes one or more capacity constraints on the predictive cost function J. The capacity constraints may be used to relate the battery power $P_{bat}$ charged or discharged during each time step to the capacity and SOC of battery unit 1802. The capacity constraints may ensure that the capacity of battery unit 1802 is maintained within acceptable lower and upper bounds at each time step of the optimization period. In some embodiments, economic controller 2110 generates the following capacity constraints:

$$C_a(k)-P_{bat}(k)\Delta t \leq C_{rated}$$

$$C_a(k)-P_{bat}(k)\Delta t \geq 0$$

where $C_a(k)$ is the available battery capacity (e.g., kWh) at the beginning of time step k, $P_{bat}(k)$ is the rate at which battery unit 1802 is discharged during time step k (e.g., kW), $\Delta t$ is the duration of each time step, and $C_{rated}$ is the maximum rated capacity of battery unit 1802 (e.g., kWh). The term $P_{bat}(k)\Delta t$ represents the change in battery capacity during time step k. These capacity constraints ensure that the capacity of battery unit 1802 is maintained between zero and the maximum rated capacity $C_{rated}$.

In some embodiments, economic controller 2110 generates and imposes one or more capacity constraints on the operation of actuator 1834. For example, actuator 1834 may have a maximum operating point (e.g., a maximum actuation speed, a maximum position, etc.) which corresponds to a maximum power consumption $P_{act,max}$. Economic controller 2110 can be configured to generate a constraint which limits the power $P_{act}$ provided to actuator 1834 between zero and the maximum power consumption $P_{act,max}$ as shown in the following equation:

$$0 \leq P_{act} \leq P_{act,max}$$

$$P_{act}=P_{sp,grid}+P_{sp,bat}$$

where the total power $P_{act}$ provided to actuator 1834 is the sum of the grid power setpoint $P_{sp,grid}$ and the battery power setpoint $P_{sp,bat}$.

Economic controller 2110 can optimize the predictive cost function J subject to the constraints to determine optimal values for the decision variables $P_{act}$, $P_{grid}$, and $P_{bat}$, where $P_{act}=P_{bat}+P_{grid}$. In some embodiments, economic controller 2110 uses the optimal values for $P_{act}$, $P_{bat}$, and/or $P_{grid}$ to generate power setpoints for tracking controller 2112. The power setpoints can include battery power setpoints $P_{sp,bat}$, grid power setpoints $P_{sp,grid}$, and/or actuator power setpoints $P_{sp,act}$ for each of the time steps k in the optimization period. Economic controller 2110 can provide the power setpoints to tracking controller 2112.

Tracking Controller

Tracking controller 2112 can use the optimal power setpoints $P_{sp,grid}$, $P_{sp,bat}$, and/or $P_{sp,act}$ generated by economic controller 2110 to determine optimal position setpoints $Pos_{sp}$ and an optimal battery charge or discharge rate (i.e., $Bat_{C/D}$). In some embodiments, tracking controller 2112 generates a position setpoint $Pos_{sp}$ predicted to achieve the power setpoint $P_{sp,act}$ for actuator 1834. In other words, tracking controller 2112 may generate a position setpoint Pos$_{sp}$ that causes actuator 1834 to consume the optimal amount of power P$_{act}$ determined by economic controller 2110.

In some embodiments, tracking controller 2112 uses the battery power setpoint P$_{sp,bat}$ to determine the optimal rate Bat$_{C/D}$ at which to charge or discharge battery unit 1802. For example, the battery power setpoint P$_{sp,bat}$ may define a power value (kW) which can be translated by tracking controller 2112 into a control signal for power inverter 2010 and/or equipment controller 2114. In other embodiments, the battery power setpoint P$_{sp,bat}$ is provided directly to power inverter 2010 and used by power inverter 2010 to control the battery power P$_{bat}$.

Equipment Controller

Equipment controller 2114 can use the optimal position setpoints Pos$_{sp}$ generated by tracking controller 2112 to generate control signals for actuator 1834. The control signals generated by equipment controller 2114 may drive the actual (e.g., measured) position of valve 1832 the setpoints. Equipment controller 2114 can use any of a variety of control techniques to generate control signals for actuator 1834. For example, equipment controller 2114 can use state-based algorithms, extremum seeking control (ESC) algorithms, proportional-integral (PI) control algorithms, proportional-integral-derivative (PID) control algorithms, model predictive control (MPC) algorithms, or other feedback control algorithms, to generate control signals for actuator 1834.

The control signals may include on/off commands, position commands, voltage signals, or other types of setpoints that affect the operation of actuator 1834. In other embodiments, the control signals may include the position setpoints generated by predictive valve controller 1804. The setpoints can be provided to actuator 1834 or local controllers for actuator 1834 which operate to achieve the setpoints. For example, a local controller for actuator 1834 may receive a measurement of the valve position from one or more position sensors. The local controller can use a feedback control process (e.g., PID, ESC, MPC, etc.) to adjust the position of actuator 1834 and/or valve 1832 to drive the measured position to the setpoint.

In some embodiments, equipment controller 2114 is configured to provide control signals to power inverter 2010. The control signals provided to power inverter 2010 can include a battery power setpoint P$_{sp,bat}$ and/or the optimal charge/discharge rate Bat$_{C/D}$. Equipment controller 2114 can be configured to operate power inverter 2010 to achieve the battery power setpoint P$_{sp,bat}$. For example, equipment controller 2114 can cause power inverter 2010 to charge battery unit 1802 or discharge battery unit 1802 in accordance with the battery power setpoint P$_{sp,bat}$.

Fuel Cell Optimization

Figure 22:
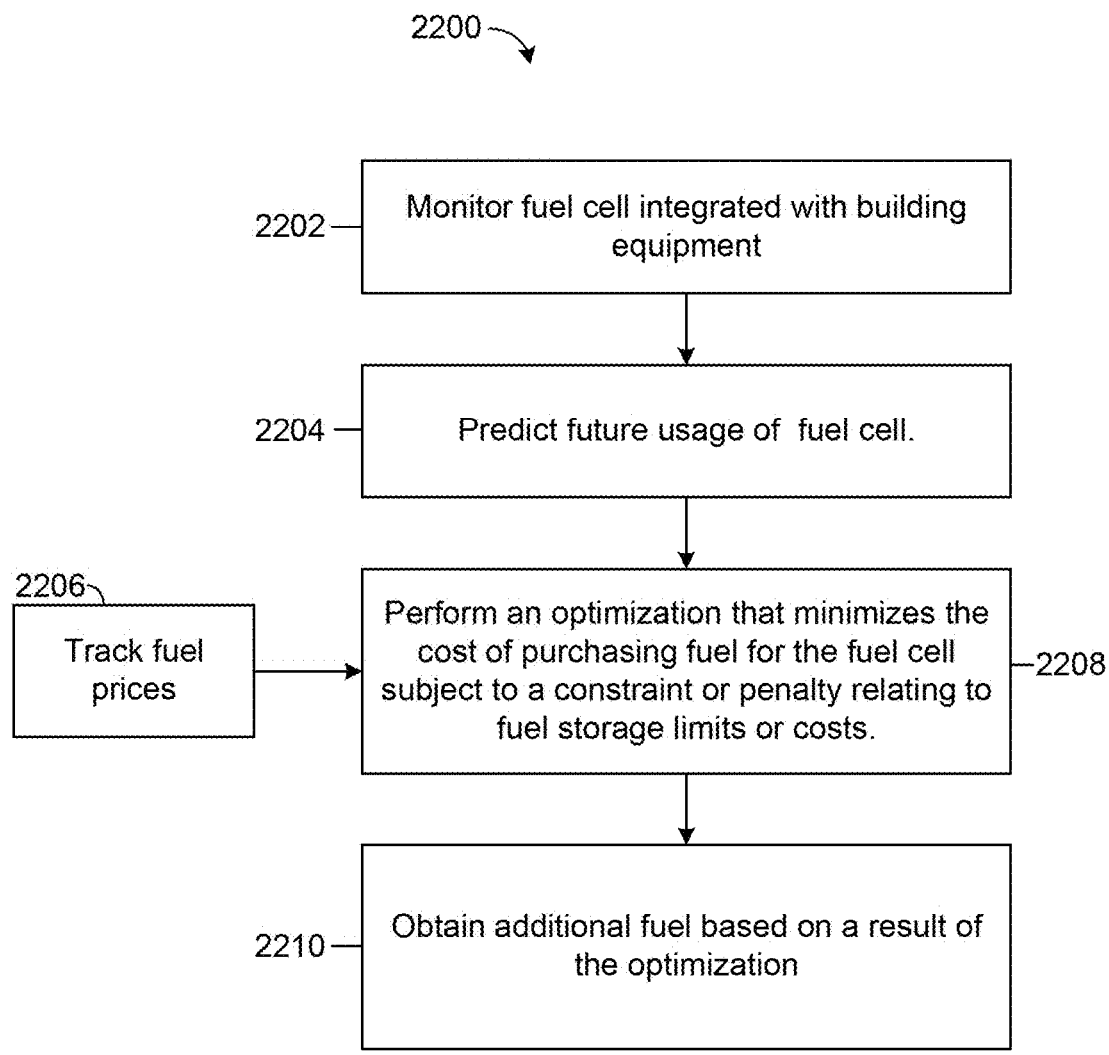
FIG. 22 is a flow chart of a process for fuel cell optimization, according to some embodiments.
Figure 29:
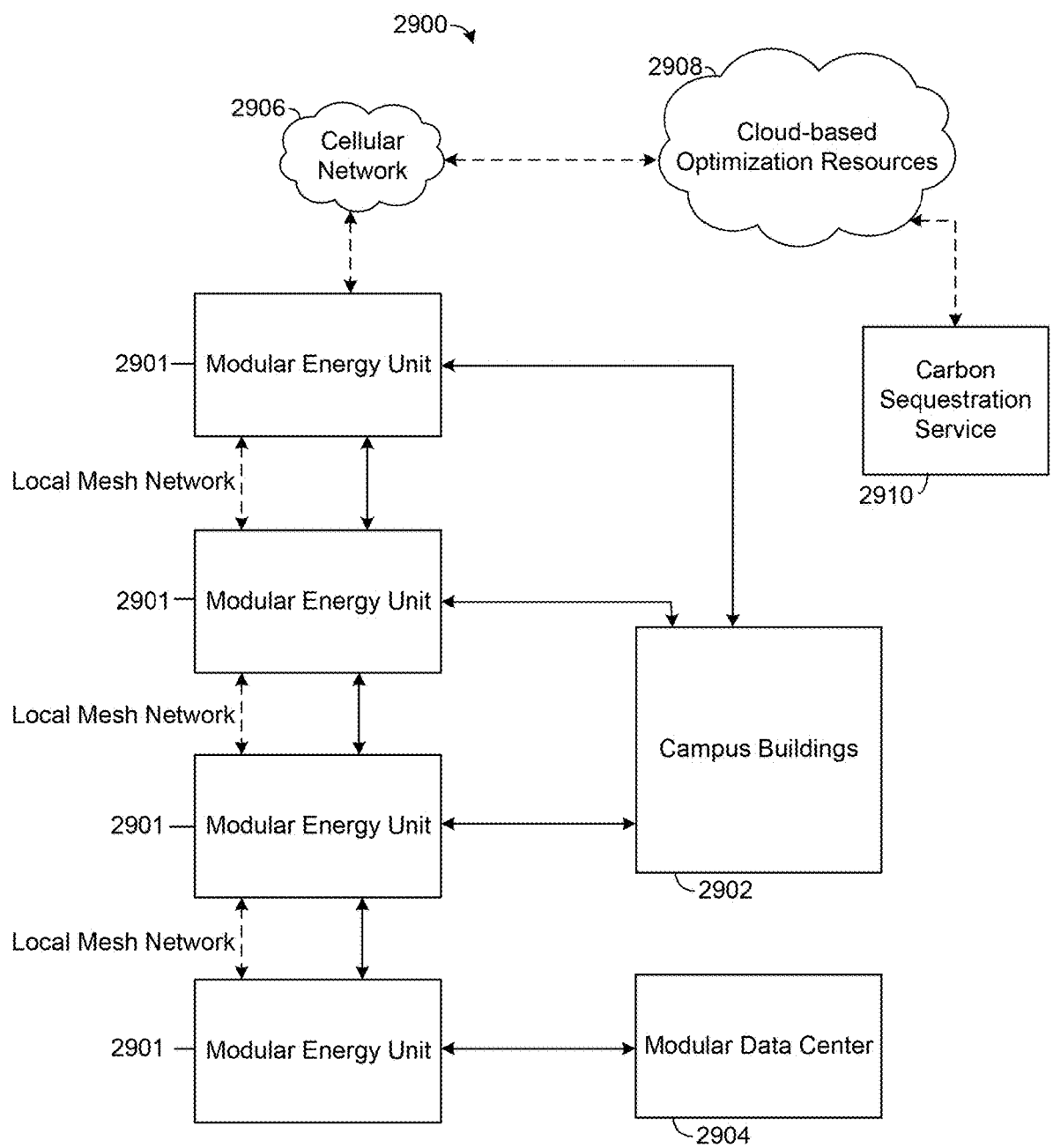
FIG. 29 is a block diagram of a system architecture for multiple modular energy units connected to cloud-based optimization resources, according to some embodiments.
Figure 30:
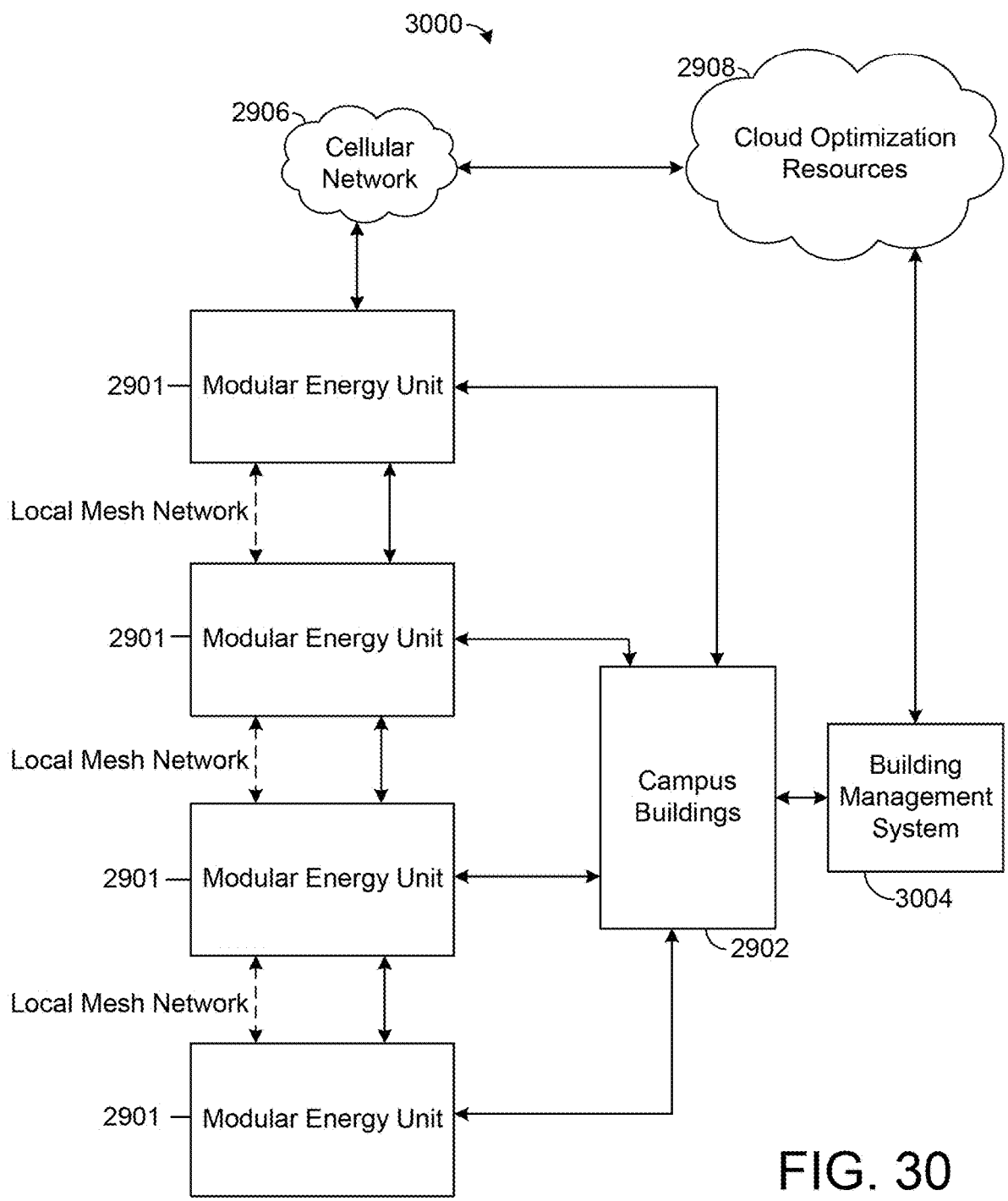
FIG. 30 is a block diagram of a system architecture for multiple modular energy units and a building management system connected to cloud-based optimization resources, according to some embodiments.

Referring now to FIG. 22, a flowchart of an process 2200 relating to optimization of operation of fuel cells integrated with building equipment (e.g., fuel cell 808 of FIG. 8, fuel cell 202 of FIG. 12, fuel cell 1691 of FIG. 16, or fuel cell 1901 of FIG. 19, discussed above) or included in a modular energy unit (e.g., see FIGS. 23-24, discussed below), for example. Process 2200 can be executed by the various predictive controllers or power management circuitry described herein, for example the predictive chiller controller 704, the predictive pump controller 1104, the predictive cooling tower controller 1504, etc. In other embodiments, the optimization process of FIG. 22 can be performed for a standalone fuel cell and executed by a controller for the standalone fuel cell. In other embodiments process 2200 is performed by cloud-based optimization resources, for example as shown in FIGS. 29-30 and discussed below.

At step 2202 a fuel cell integrated with building equipment (e.g., fuel cell 808 of FIG. 8, fuel cell 202 of FIG. 12, fuel cell 1691 of FIG. 16, or fuel cell 1901 of FIG. 19, discussed above) is monitored. For example, data relating to power generation, fuel level, fuel usage rates, on/off status, etc. can be collected to monitor the fuel cell. For example, step 2202 can included collecting a timeseries of fuel cell data indicating one or more fuel-cell-related variables for each time step in a timeseries. Step 2202 can result in collecting and aggregation of a set of fuel cell training data indicative historical usage, fuel consumption, etc. of the fuel cell. In some embodiments, data relating to the building equipment served by the fuel cell, building conditions affected by operation of the building equipment, or other variables that may influence demand on the fuel cells (e.g., weather, building schedules, etc.) may be collected as part of monitoring the fuel cell in step 2202.

At step 2204, future usage of the fuel cell is predicted. The future usage of the fuel cell can be predicted based on the monitoring of the fuel cell from step 2202, for example based on a model trained on the timeseries data collected by monitoring the fuel cell in step 2202. For example, the data collected in step 2202 may be used to train a neural network that predicts future usage of the fuel cell based on a set of inputs represented in the data collected in step 2202. For example, weather forecast data, building setpoints, time of day, current usage, etc. may be used to predict future fuel cell usage. Future usage of the fuel cell may be predicted in terms of an amount of fuel consumption (e.g., volume of hydrogen, percentage of fuel cell capacity, etc.).

At step 2206, fuel prices are tracked. Prices for fuel for the fuel cell (e.g., additional hydrogen to refill a hydrogen fuel cell) are tracked to see fluctuations in fuel prices over time. Tracking the fuel prices can include identifying average prices, modeling fluctuations in fuel cell prices, adaptively refining predictions of fuel prices, identifying low price times, identifying high price times, etc. Step 2206 can include monitoring multiple sources of fuel to identify a least-cost option for fuel for the fuel cell. In some embodiments, step 2206 can include identifying a preferred hydrogen production method (e.g., hydrogen produced from water electrolysis by wind power versus from fossil fuels) and generating a preference for sources of hydrogen with cleaner production.

At step 2208, an optimization is performed that minimizes the cost of purchasing fuel for the fuel cell subject to a constraint or penalty relating to fuel storage limits or costs. For example, a storage tank for the fuel may be included proximate the fuel cell (e.g., at a building) and may have a fixed capacity (i.e., a maximum of out fuel that it can hold). In such embodiments, a constraint is defined to prevent the optimization from arriving at a solution which would result in overfilling of the storage tank. As another example, it may cost a user more to store more fuel in some scenarios (e.g., leased storage areas, resource consumption required to maintain a storage tank in a suitable temperature range, etc.).

The optimization of step 2208 can be performed using the tracked fuel prices from step 2206 and the predicted future usage of the fuel cell from step 2204. For example, a predictive cost function can be formulated which indicates a total cost of purchasing fuel, where a time-of-purchase and amount-of-fuel-to-obtain are decision variables of the optimization, subject to constraints (e.g., balance equations, models) which predictively balances fuel consumption and fuel storage constraints to ensure that sufficient fuel is available to satisfy the predicted usage of the fuel cell. The total cost which still satisfies those constraints and requirements can be the output of the optimization. The optimization strategies and formulations can use similar techniques as described in detail above.

At step 2210, additional fuel is ordered or otherwise acquired in accordance with a result of the optimization of step 2208. For example, the optimization may indicate to purchase a certain amount of fuel from a particular fuel provider at a particular time, and step 2210 can include automatically executing that transaction or controlling distribution equipment or device to acquire fuel at that time. For example, step 2210 can include generating a notification to a technician (e.g., via a user mobile phone or other device) instructing the technician to obtain the optimal amount of fuel at a particular future time. As another example, step 2210 could include automatically causing an autonomous vehicle to mobilize to a provider fuel distribution site to acquire the optimized amount of fuel at the identified time. The fuel can then be added to the fuel cell or stored for later use by the fuel cell. Operational costs of integrating a fuel cell into building equipment or other building system can thereby be optimized.

Fuel cells can be integrated into various equipment for execution of process 2200. For example, the various equipment described above may be adapted to include one or more fuel cells. As another example, a fuel cell can be added to the AHU and RTU equipment described in U.S. patent application Ser. No. 15/963,860, filed Feb. 25, 2020, or VRF equipment described in U.S. patent application Ser. No. 16/314,277, filed Jun. 29, 2017 and incorporated by reference herein.

Modular Energy Unit

Figure 23:
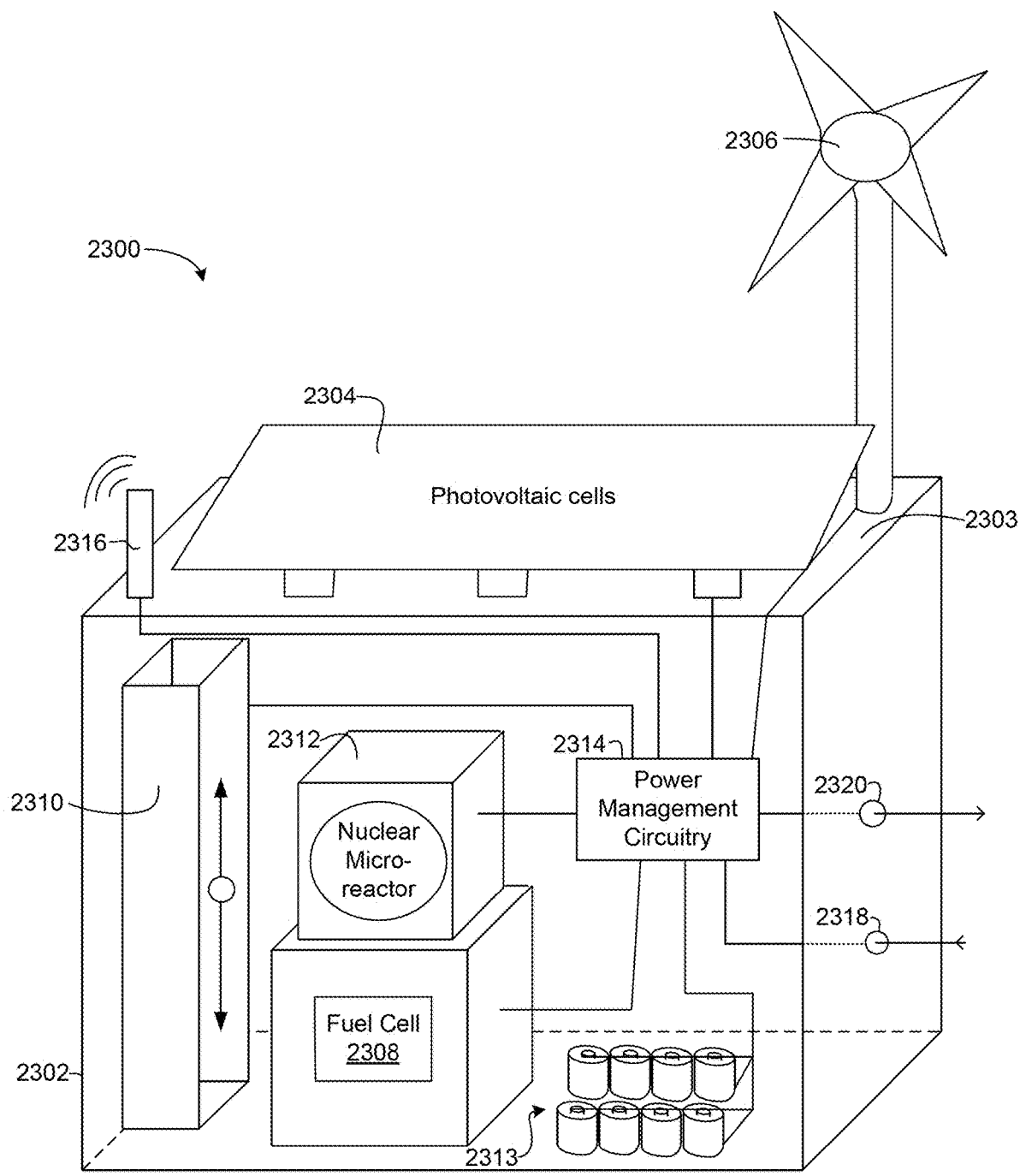
FIG. 23 is an illustration of a modular energy unit, according to some embodiments.
Figure 24:
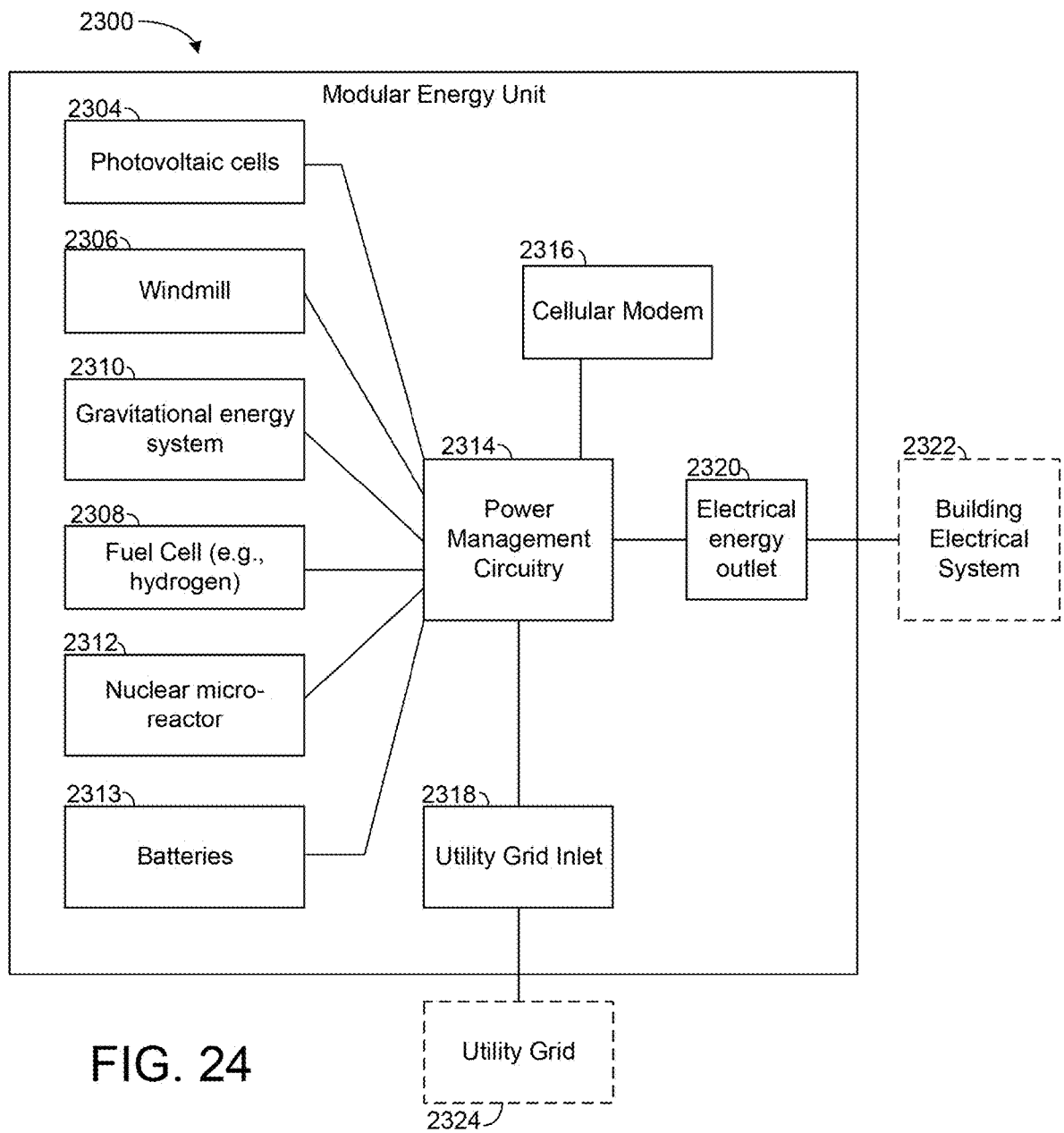
FIG. 24 is a block diagram of a modular energy unit, according to some embodiments.

Referring now to FIGS. 23-24, diagrams of a modular energy unit 2300 is shown, according to example embodiments. The modular energy unit 2300 is a contained, integrated product which can be deployed to a building or other site and electrically connected between a building and the utility grid to provide substantial energy costs savings, carbon emissions reductions, and reduce reliance on a third-party energy grid, in various embodiments. The modular energy unit 2300 may be sized similarly to other large building equipment (e.g., rooftop units, chillers, industrial boilers, etc.). In some examples, the modular energy unit 2300 may have physical dimensions similar to a shipping container or smaller than a shipping container suitable for transportation by truck on standard roadways. The modular energy unit 2300 can thus be easily deployed to provide the various advantages discussed below without significant on-site construction or customization. For example, as discussed in detail below, the modular energy unit 2300 can provide a plug-and-play service for achieving net-zero carbon emissions for a building.

As shown in FIGS. 23-24, the modular energy unit 2300 includes a housing 2302. The housing 2302 may be sized similar to a shipping container, as mentioned above for transportation by truck on standard roadways. In some embodiments, the housing 2302 is mobile (e.g., a trailer with wheels, etc.). The modular energy unit 2300 is shown as including, inside or on the housing 2302, photovoltaic cells 2304, windmill 2306, fuel cell 2308, nuclear micro-reactor 2310, gravitational energy system 2312, and batteries 2314. In various embodiments of these elements may be included. For example, in many examples, the nuclear micro-reactor 2310 and/or the gravitational energy system 2312 is omitted. As another example, the fuel cell 2308 may be omitted. As another example, in some cases only one of the windmill 2306 and the photovoltaic cells 2304 is included. All such variations are within the scope of the present disclosure. The modular energy unit 2300 is also shown as including power management circuitry 2314 connected to a wireless communications device (shown as cellular modem 2316), a utility grid electrical inlet 2318 for connection to utility grid 2324, and an electrical outlet 2320 for connection to a building electrical system 2322.

The modular energy unit 2300 thus includes multiple energy sources and storage solutions with complementary characteristics that facilitate reliable provision of electrical energy to meet building loads in various scenarios. Photovoltaic cells 2304 are mounted on the modular energy unit 2300 (e.g., on a roof 2303 of the housing 2302) and are configured to transform light (solar radiation) into electrical energy. The photovoltaic cells 2304 are conductively coupled to the power management circuit 2314 to provide electricity from the photovoltaic cells 2304 to the power management circuitry 2314. The photovoltaic cells 2304 can be substantially co-extensive with the roof 2303 of the housing, for example covering greater than 90% of the surface area of the roof 2303. The photovoltaic cells 2304 are thereby configured to provide free, renewable, zero-carbon electrical energy to the power management circuitry 2314 without requiring installation of additional solar panels or support structures separate from the modular energy unit 2300. In some embodiments, for example in scenarios where a building or campus includes supplemental photovoltaic cells (e.g., previously-installed elsewhere on the building or campus), additional photovoltaic cells can be conductively connected to the power management circuitry 2314 to enable the power management circuitry 2314 to manage electricity from such cells.

The modular energy unit 2300 is also shown as including a windmill 2306 extending from the roof 2303 of the housing 2302. The windmill 2306 may be configured to be easily erected without technical expertise (e.g., with simple tools, following simple instructions, etc.) upon delivery of the modular energy unit 2300 to its destination at a building or campus. The windmill 2306 is configured to transform wind energy into electricity through rotation of a wind-driven turbine. The windmill 2306 is conductively connected to the power management circuitry 2314 to provide electrical energy to the power management circuitry 2314. Although one windmill 2306 is shown in the examples, multiple windmills 2306 can be included in various embodiments. In some embodiments, for example in scenarios where a building or campus includes supplemental windmills (e.g., previously-installed wind energy harvesting equipment), such supplemental windmills can also be connected to the power management circuitry 2314 such that the power management circuitry 2314 receives and can manage electricity from the supplemental windmills.

The photovoltaic cells 2304 and the windmill 2306 thus provide the modular energy unit 2300 with the ability to transform environmental conditions (wind, sunlight) into electricity. In other embodiments, various other environmental energy harvesting devices and/or combinations thereof can be included. The environmental energy harvesting devices (e.g., the photovoltaic cells 2304 and the windmill 2306) provide free, zero-carbon electricity during times with suitable environmental conditions. As discussed in the following passages, the modular energy unit also include energy sources configured to provide baseload or supplemental energy generation, for example for use during times when environmental conditions are not providing sufficient energy to the photovoltaic cells 2304 and the windmills 2306 (e.g., low-wind nights, etc.).

The modular energy unit 2300 are shown as including baseload or supplemental energy generation devices, shown as nuclear micro-reactor 2312 and fuel cell 2308. The nuclear micro-reactor 2312 generates electrical power using energy from fission or fusion reactions, for example by transforming the heat from such reactions into electricity using a power conversion cycle. The nuclear micro-reactor 2312 may use an enriched uranium fuel, for example a high assay low-enriched uranium. The nuclear micro-reactor 2312 can be configured to controllable to provide various levels of electricity at various times. In some examples, the nuclear micro-reactor 2312 may provide a baseload energy which is complemented by other energy sources, and provides a reliable back-up energy source in the event of unavailability of other wind/solar energy, the energy grid, and other sources of energy. The nuclear micro-reactor 2312 may be thus be sufficiently small to be of very low risk and to fit inside and be operable within the housing 2302 of the modular energy unit 2300, and may run for multiple decades with need for handling of the fuel material. The nuclear micro-reactor 2312 is thus configured to provide electrical energy to the power management circuitry, with zero carbon emissions. In many embodiments, the nuclear-reactor 2312 is omitted.

The fuel cell 2308 is configured to generate electrical energy through chemical reactions, for example a redox reaction between hydrogen and oxygen in an embodiment where the fuel cell 2308 is a hydrogen fuel cell. The fuel cell 2308 may be substantially stable to sit dormant when other electricity sources are being used, while being controllable to initiate chemical reactions to transform chemical fuel into electrical energy on demand. The fuel cell 2308 can be a hydrogen fuel cell or some other type of fuel cell (e.g., hydrocarbon, etc.). In embodiments where the fuel cell 2308 is a hydrogen fuel cell, the fuel cell 2308 can operate to generate electricity while emitting only water and without carbon emissions. The fuel cell 2308 can be arranged in the housing 2300 to provide easy access for refueling of the fuel cell 2308 (e.g., via a port on an exterior wall of the housing 2302). In some embodiments, the fuel cell 2308 is configured to cause a signal to be transmitted via the cellular modem 2316 indicating that the fuel cell 2308 should be refilled, for example based on process 2200 of FIG. 22. The fuel cell 2308 is conductively connected to and provides electricity to the power management circuitry 2314. As discussed below, the power management circuitry 2314 can control the fuel cell 2308 between on and off states, to different power levels, etc. The modular energy unit 2300 thus includes electricity generation devices which are not reliant on environmental conditions.

The modular energy unit 2300 also includes rechargeable energy storage devices, shown as batteries 2313 and gravitational energy storage 2310. As discussed below, the rechargeable energy storage devices are able to release energy to the power management circuitry 2314 upon demand, and to store energy provided to the rechargeable energy storage device by the power management circuitry 2314. Other types of rechargeable energy storage can be used in various embodiments.

Figure 25:
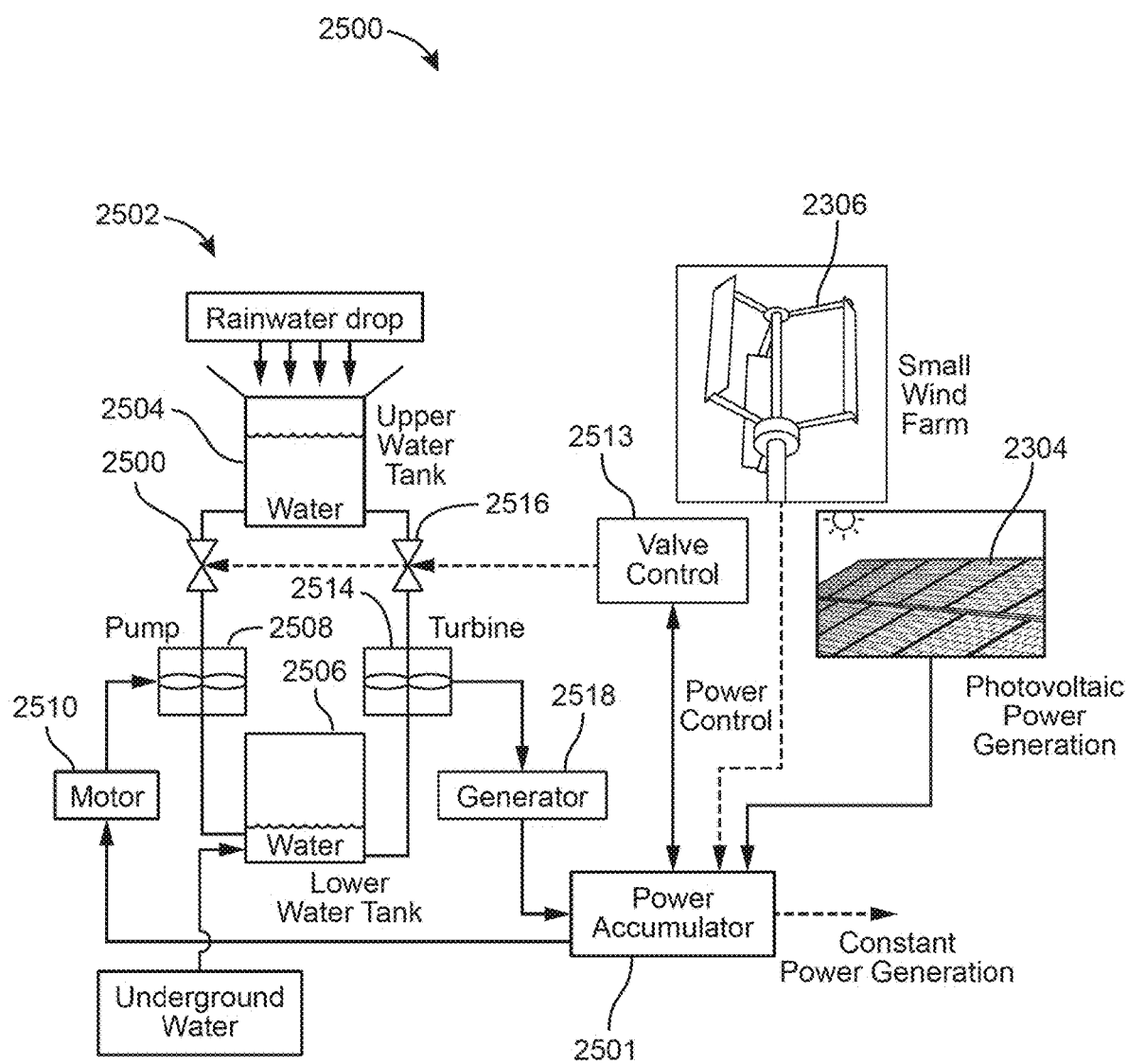
FIG. 25 is a schematic diagram of another embodiment of a modular energy unit, according to some embodiments.

As shown in FIGS. 23-24, the rechargeable energy storage devices includes a gravitational energy system 2310. The gravitational energy system 2310 is configured to transform electricity into gravitational potential energy (in order to store energy) and to transform gravitational potential energy into electricity (in order to release stored energy). The gravitational energy system 2310 can provide long-term energy storage without degradation. In some embodiments, the gravitational energy system 2310 is configured to move one or more high-mass objects (e.g., one or more blocks of dense metals) on cables connected to one or more winches which are configured to consume electrical energy to raise the high-mass objects via the cables and to extract electrical energy when the high-mass objects are lowered. In other embodiments, the gravitational energy system 2310 is configured to pump a fluid (e.g., water, a high-density fluid) upwards to consume and store electricity, and allow the fluid to flow downwards through one or more turbines to transform the gravitational potential energy into electricity, for example as shown in FIG. 25 and described with reference thereto. In some embodiments, the gravitational energy system 2310 is configured to collect rainwater in a rainwater tank at a high altitude or elevation (e.g., on the roof of a building, in a water tower, on a mountain or hill, etc.) and convert the gravitational energy in the stored rainwater to electricity as the rainwater flows downward, as described with reference to FIG. 25. FIG. 23 shows the gravitational energy system 2310 as being contained within the housing 2303. In other embodiments, the gravitational energy system 2310 may include an extension above the roof 2303 to increase the amount of gravitational potential energy that can be stored by the gravitational energy system 2310. The gravitational energy system 2310 is conductively connected to the power management circuitry 2314 to receive or provide electrical energy from or to the power management circuitry 2314, and to receive control signals from the power management circuitry 2314.

The modular energy unit 2300 is also shown as including batteries 2313. The batteries 2313 are conductively connected to the power management circuitry 2314 and are configured to store electrical energy from the power management circuitry 2314 and discharge energy to the power management circuitry 2314. The charge or discharge rates of the batteries 2313 can be controlled by the power management circuitry 2314. The batteries 2313 can be arranged in one or more battery packs including a multiple battery cells (e.g., 8, 50, 100, 1000, etc.). The batteries 2313 can be lithium-ion batteries, for example.

In some embodiments, the modular energy unit 2300 also includes heating and/or cooling devices configured to maintain the interior of the housing 2300 at or around a suitable temperature for operation of the components therein, for example an efficient temperature for the batteries 2313, nuclear micro-reactor 2312, and the fuel cell 2308.

The modular energy unit 2300 is also shown as including a utility grid inlet 2318 configured to connect to a utility grid 2324 in order to provide a conductive path between the utility grid 2324 and the power management circuitry 2314. The utility grid inlet 2318 may primarily allow the power management circuitry to receive electricity from the utility grid 2324. In some embodiments and in some scenarios, the utility grid inlet 2318 also allows the power management circuitry 2314 to push electricity back to the utility grid 2324 (e.g., to sell electricity back to the utility company, to participate in a frequency response or other incentive program, etc.).

The modular energy unit 2300 is also shown to include an electrical energy outlet 2320. The electrical energy outlet 2320 in configured to conductively connect the power management circuitry 2314 to the building electrical system 2322. The building electrical system 2322 includes building wiring, etc. configured to transfer electricity from the electrical energy outlet 2320 to various electrical devices, outlets, lighting, appliances, etc. in a building. The power management circuitry 2314 can detect the demand for electricity from the building electrical system 232 via the connection with the electrical energy outlet 2320.

The power management circuitry 2314 is configured manage the various flows of electricity being provided thereto by the components of the modular energy unit 2300 and manage the flows of electricity to the building electrical system 2322 and energy storage devices (e.g., batteries 2313 and gravitational energy system 2310). As discussed in detail below with reference to later figures, the power management circuitry 2314 is configured to optimally allocate demand across the components of the modular energy unit 2300 and the utility grid 2324 to minimize energy costs, minimize carbon emissions, or some combination thereof, while meeting building demands. The power management circuitry 2314 may locally including computing components (e.g., memory devices and processing circuitry) configured to locally perform optimizations as described below, or may communicate with a remote computing resource (e.g., cloud server) via cellular modem 2316 to facilitate optimal control of the modular energy unit.

The modular energy unit 2300 is thus configured to be positioned electrically between the utility grid 2324 and the building electrical system 2322 to manage usage of power from the utility grid 2324 and to supplement such power. The modular energy unit 2300 can therefore be easily installed at one point relative to the building, without requiring adjustments or installation of devices inside and throughout the building as for other building energy management systems. The modular energy unit 2300 is thus an easy-to-install, modular, integrated, plug-and-play solution for reduction energy costs and reduction or elimination of carbon emission associated with building operations.

Modular Energy Unit with Rainwater and Underground Water Features

Referring now to FIG. 25, a schematic illustration of an embodiment of a modular energy unit 2500 including a gravitational energy system which uses rainwater and underground water features is shown, according to an exemplary embodiment. The modular energy unit 2500 is shown as including a gravitational energy system implemented as water-based energy system 2502, one or more windmills 2306, photovoltaic cells 2304, and power management circuitry (shown as power accumulator 2501). The modular energy unit 2500 can include various elements of the modular energy unit 2300 of FIGS. 23-24 in various embodiments.

The water-based energy system 2502 is shown as including an upper water tank 2504 and a lower water tank 2506. The upper water tank 2504 is positioned to be exposed to rain (e.g., on a rooftop, on the roof 2303 of the housing 2302, connected to downspouts, gutters, etc.) and includes one or more openings configured to receive rain water from the environment. Filters may be included to prevent debris and other contaminants from entering the upper water tank 2504. The lower water tank 2506 is positioned physically below the lower water tank (i.e., closer to the center of the Earth), such that a unit of water in the upper water tank 2504 has a higher gravitational potential energy relative to a unit of water in the lower water tank 2506. In some implementations, the upper water tank 2504 and the lower water tank 2506 are both positioned on a housing of an integrated, shipping-container-sized modular energy unit. In other embodiments, the upper water tank 2504 is positioned on a rooftop of a building to be served by the modular energy unit, while the lower water tank is positioned at a ground, basement, or underground level, thus maximize the gravitational potential between the upper water tank and the lower water tank given the existing building structures. For example, some older industrial buildings still include out-of-use rooftop tanks which were previously render obsolete due to other innovations, but which can be repurposed for use with the water-based energy system 2502 without significant structural changes to the building. The lower tank 2506 and the upper tank 2504 are connected by pipes, tubes, hoses, etc. to enable fluid flow therebetween.

As shown in FIG. 25, the water-based energy system 2502 includes a pump 2508 and a motor 2510 positioned on a flow path between the lower tank 2506 and the upper tank 2504. The motor 2510 is configured to drive the pump 2508 to draw water from the lower tank 2506 to the upper tank 2504. The motor 2510 consumes electrical energy and, using the pump 2508, transforms the electrical energy into gravitational potential energy of the water raised by the pump 2508. The motor 2510 is controllable by the power accumulator 2501, for example when excess power is being generated by the windmill 2306 and the photovoltaic cells 2304. A first controllable valve 2512 is positioned along a pipe between the lower water tank 2506 and the upper water tank 2504, for example to prevent gravity from pulling water back through the pump when the pump is not operating. The first controllable valve 2512 is controllable by a valve controller 2513.

The water-based energy system 2502 is also shown as including a turbine 2514 connected along a flow path between the upper tank 2504 and the lower tank 2506. A second controllable valve 2516 is positioned between the upper tank 2504 and the turbine 2514 and is controllable by the valve control 2513. When the second controllable valve 2516 is controlled to open, gravity pulls water from the upper tank 2504, through the turbine 2514, and to the lower water tank 2506. The turbine 2514 may be located proximate the lower water tank 2506. The gravitational potential energy of the water is transformed to kinetic energy through gravitational acceleration as the water flows down from the upper tank to the turbine 2514. The turbine 2514 then transforms that kinetic energy into rotational kinetic energy of the turbine 2514, which is then converted into electricity via a generator 2518. The gravitational potential energy of the water in the upper tank 2504 is thereby converted into electricity which is provided to the power accumulator 2501. The power accumulator 2501 can cause the valve control 2513 to open the valve 2516 when the power accumulator 2501 needs additional electricity to meeting building demands, for example, or according to various other optimization techniques as described herein.

By remaining open to rainwater, the upper tank 2502 is able to receive water which does not require operation of the motor 2510, and thus does not require any electricity input. In particularly rainy seasons or climates, the water-based energy system 2502 can thus provide a substantial amount of free electricity (i.e., extracted from the environment). To avoid over-filling of the lower water tank, the lower water tank can include an overflow feature configured to drain into ground water (or drainage, sewer, etc. system) when the lower water tank reaches capacity.

The modular energy unit 2500 can thus provide substantially constant power generation or power generation that constantly meets time-varying demands. For example, in particularly sunny and/or windy periods solar and wind power is transformed into electricity to meet the demand and to store gravitational potential energy in the water-based energy system 2502. Then, during non-sunny or non-windy periods, that gravitational potential energy can be transformed back into electricity via turbine 2514. Additionally, because low-solar periods may correspond to high rainfall periods, the rainfall-capture feature of the upper tank 2504 is particularly well suited to complement the solar power generation of the photovoltaic cells 2304. The modular energy unit 2500 thus harnesses multiple energy sources and a storage solution to provide reliable, consistent zero-carbon-emission power.

Optimized Control of Modular Energy Unit

Figure 26:
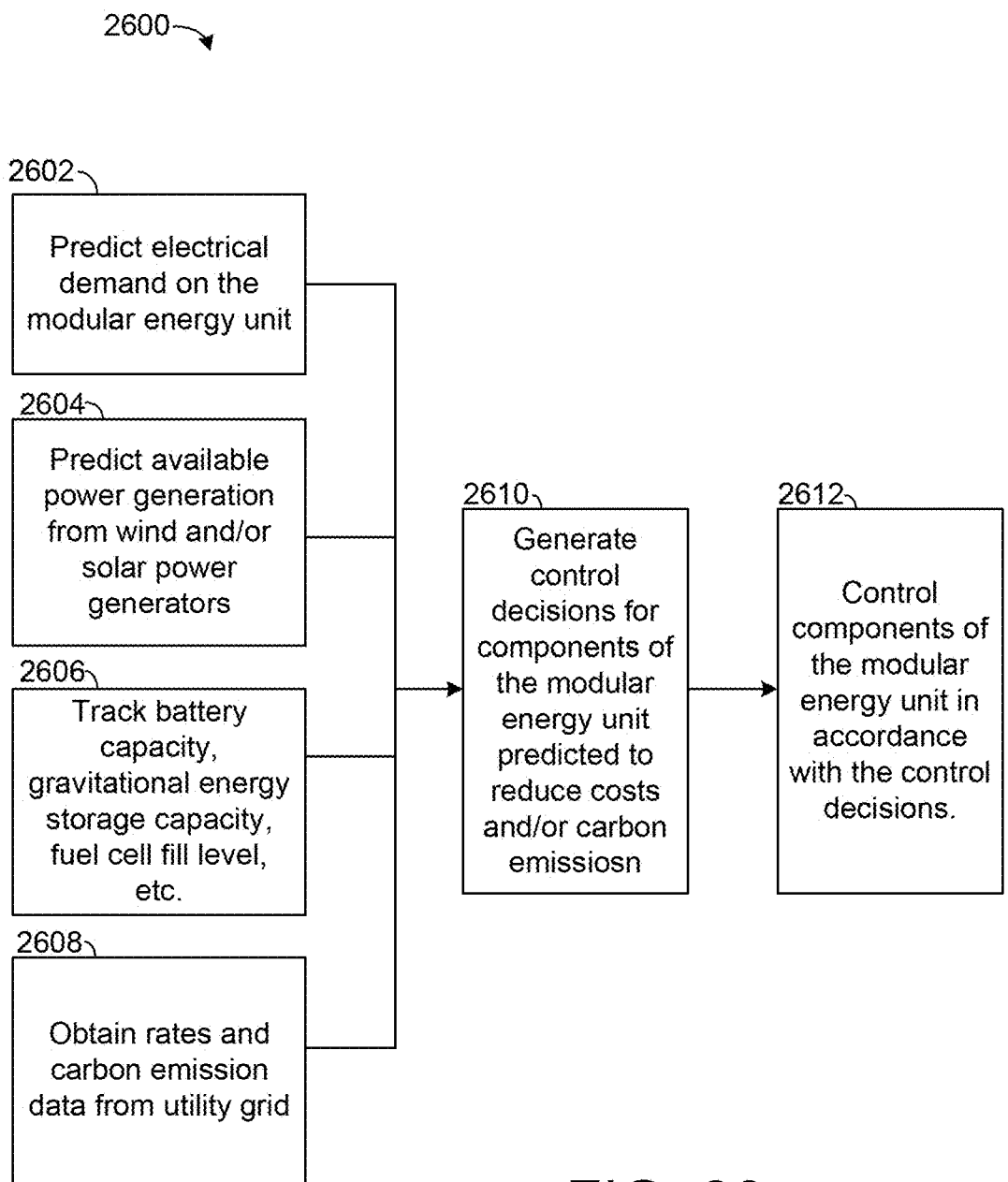
FIG. 26 is a flowchart of a process for controlling a modular energy unit, according to some embodiments.

Referring now to FIG. 26, a flowchart of a process 2600 for optimally controlling a modular energy unit (e.g., modular energy unit 2300 of FIG. 23) is shown, according to an exemplary embodiment. The process 2600 can be executed by the power management circuitry 2314 of FIG. 24, for example, and/or via a cloud-based optimization resource (e.g., server, memory and processing circuitry, etc.) communicable with the power management circuitry 2314 via cellular modem 2316. In some adaptations of FIG. 26, the process 2600 can be executed by the power accumulator 2501 of FIG. 25.

At step 2602 of process 2600, electrical demand on the modular energy unit is predicted. For example, predictions of electrical demand on the modular energy unit can include an electrical demand (e.g., instantaneous power in kilowatts, energy in Joules or kilowatt-hours over a small time increment) to be provided at each time step in an optimization period. The electrical demand on the modular energy unit may be predicted using one or more grey-box models, neural network models, or some other modeling approach. As one example, the electrical demand on the modular energy unit may be predicted using the load predictor features described in U.S. patent application Ser. No. 14/717,593, filed May 20, 2015, the entire disclosure of which is incorporated by reference herein.

At step 2604, available power generation form wind and/or solar power generators is predicted, for example based on weather forecasts, data relating to the capacity and past performance of the windmill 2306 and photovoltaic cells 2304, and/or other relevant data. For example, techniques for predicting the amount of renewal power that will be generated (e.g., PV power generated by PV panels) are described in U.S. patent application Ser. No. 15/247,869, U.S. patent application Ser. No. 15/247,844, and U.S. patent application Ser. No. 15/247,788, each of which has a filing date of Aug. 25, 2016 and is incorporated by reference herein.

At step 2606, battery capacity, gravitational energy storage capacity, fuel cell fill level, and any other variables that would affect the amount of energy or storage capacity available at components of the modular energy unit 2300 are tracked. By tracking these values, and indication of available power from and storage in the various components of the modular energy unit 2300 can be accounted for in real-time and forecasted into the future.

At step 2808, utility rates and carbon emissions data is obtained from the utility grid. For example, electricity from the utility grid may be subject to time-of-use pricing, such that pricing varies over time. Other pricing structures, incentive programs, penalties, etc. for example as described elsewhere herein, which may be relevant to energy from the utility grid may also be ascertained in step 2808. Additionally, in some scenarios, the utility grid may make available information indicating an amount of carbon emissions associated with grid power at a particular point in time (e.g., a time-varying power:carbon or carbon:power ratio, tonnes of $CO_2$ per kWh), which may vary due to the utility grid receiving power from multiple sources which emit carbon at different rates (e.g., where a natural gas plant, wind farm, and solar farm are connected to the energy grid).

At step 2610, the data from steps 2602, 2604, 2606, and 2608 is used to generate control decisions for components of the modular energy unit, in particular such that the control decisions are predicted to reduce cost and/or carbon emissions associated with serving the electrical demands on the modular energy unit. FIGS. 31-36 provide flowcharts of processes that can be adapted for use in generating control decisions for components of the modular energy unit, in various embodiments. As another example, the approach used by the predictive CEF controller described above can be adapted to handle the power contributions and constraints of the components of the modular energy unit 2300, for example.

As one such example, an optimization problem is formulated (e.g., using an objective function) that includes decision variables representing amounts of energy or power to discharge from or charge into the batteries 2313, amounts of energy or power to store in or extract from the gravitational energy system 2310, amounts of energy or power to generate with the fuel cell 2308, and/or amounts of energy or power to obtain from the utility grid. The optimization problem can include an objective function representing a total economic cost resulting from a selection of particular decision variables (e.g., due to a cost of purchasing electricity from the utility grid and a cost of fuel for the fuel cell 2308) plus a cost or penalty associated with carbon emissions. The cost or penalty associated with carbon emissions may be implemented by adding the cost of purchasing carbon offsets equal to the amount of carbon predicted to be emitted over the optimization period relating to the values of the decision variables being selected (e.g., to achieve net-zero emissions), or relating to a cost of carbon credits associated with the predicted emissions. Goals relating to carbon emissions can thus be quantified in a shared unit (e.g., dollars) as other technical goals for the modular energy unit 2300. The optimization problem can be run to determine values for the decision variables that minimize the objective function subject to constraints relating to the capacity or other limits on the various components of the modular energy unit 2300 and ensuring that an electricity demand of the building is met.

At step 2612, components of the modular energy unit are operated in accordance with the control decisions. For example, the values of the decision variables described above and resulting from the optimization can be used to control the fuel cell 2308, the gravitational storage system 2310, and the batteries 2313, for example. The power management circuitry 2314 is configured to route electricity between the various components of the modular energy unit 2300 (e.g., from the photovoltaic cells 2304 either to the building outlet 2320 or one of the gravitational energy system 2310 or the batteries 2313) according to the values of the decision variables. The modular energy unit 2300 is thereby controlled to operate in an optimal way that reduces both the cost of purchasing energy for operating the building and the carbon emissions associated with serving the electrical demands of the building.

Deployment of Carbon Neutrality for Buildings Using Modular Energy Units

Figure 27:
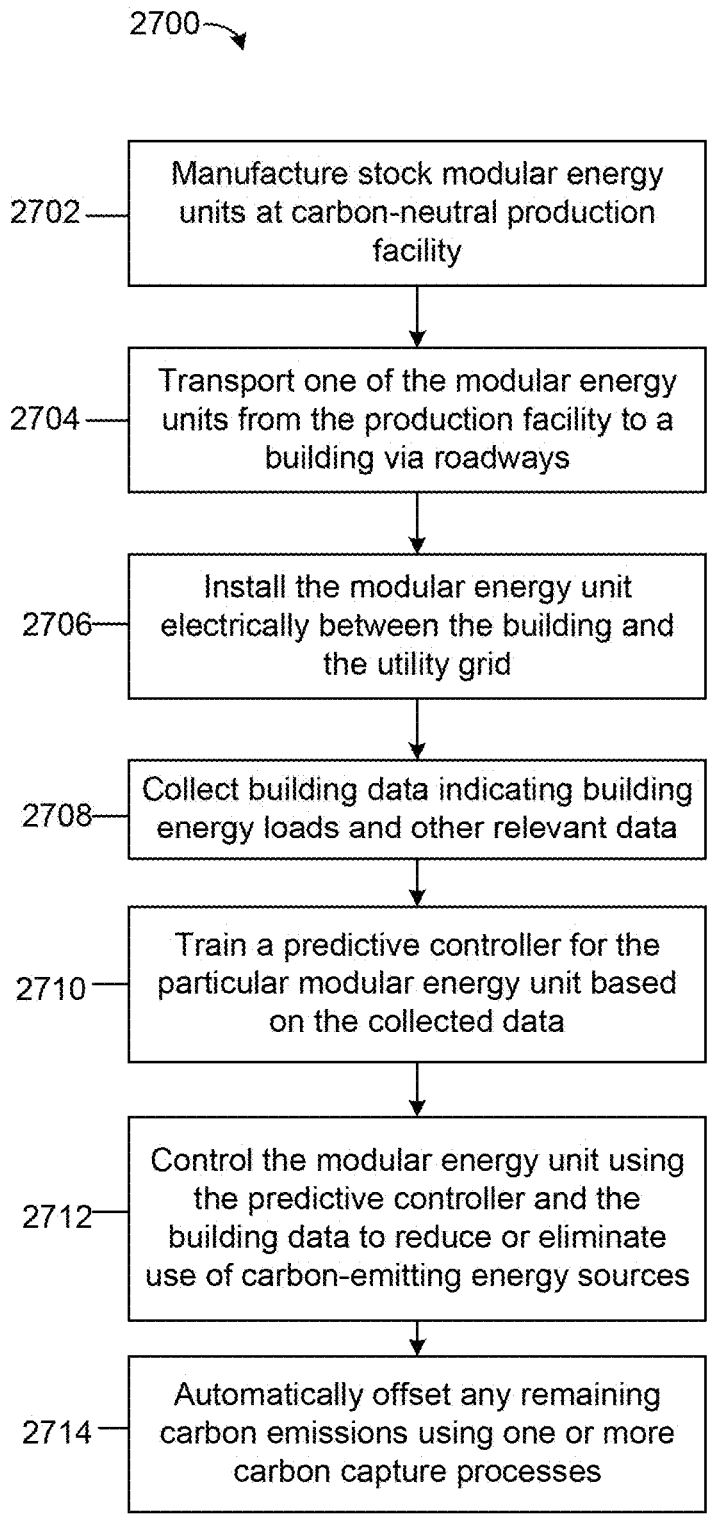
FIG. 27 is a flowchart of a process for achieving net-zero carbon emissions using a modular energy unit, according to some embodiments.

Referring to FIG. 27, a flowchart of a process for deploying modular energy units to achieve net-zero carbon emissions for buildings is shown, according to some embodiments. At step 2702, modular energy units are manufactured at a production facility. In some embodiments, the production facility itself is carbon-neutral (e.g., powered by green energy sources). In some embodiments, the modular energy units are manufactured of recycled materials (e.g., greater than 80% or 90% recycled materials). The modular energy units manufactured in step 27 may be stock units with the same design, configuration, etc. thus providing a simple and efficient process for providing modular energy units as compared to an alternative approach of selecting an installing separate energy devices at a building and then attempting to integrate the devices at a particular building site.

At step 2704, one of the modular energy units from the production facility is transported to a building via roadways. It should be understood that steps 2704-2714 can be performed separately for any or all of the modular energy units manufactured in step 2702. As described above, the modular energy unit can have physical dimensions suitable for transportation by semi-truck via stand roadways, preferably without special treatment as an oversized load or similar consideration.

At step 2706, the modular energy unit is installed electrically between the building and the utility grid (e.g., such that the modular energy unit) can manage demand on the utility grid. Step 2706 can include basic electrical wiring steps that can be easily accomplished by a typical electrician without special training or expertise in energy systems. Step 2706 can include simply placing the housing of the modular energy system in a desired location, for example alongside a building. In some scenarios, the modular energy system is installed on a rooftop of a building (e.g., to maximize solar exposure). Step 2706 can include some simple mechanical adjustments to the modular data center, for example to erect the windmill on the housing as described above, but preferably does not require any special expertise to achieve proper installation.

At step 2708, building data indicating building energy loads for the building is collected. For example, the modular data center can operate in an initial learning phase to collect data relating to building loads, solar power availability, wind power availability, etc. During this data collection phase, the modular data center may operating according to a default control scheme, may execute learning procedures (e.g., automated tests of system capabilities, etc.), and continuing to meet energy demands of the building.

At step 2710, a predictive controller for the particular modular energy unit is trained based on the collected data. Accordingly, a predictive controller for the modular energy unit can be customized in software based on the demands of the particular building that the modular energy unit serves and other relevant data (e.g., data indicative of availability of solar and wind energy). Thus, in the example of process 2700, the modular data center may be provided from a production facility without hardware customization but with software customization based on acquired training data in step 2710. The predictive controller can be trained based on a grey-box system identification approach (for example as described in U.S. patent application Ser. No. 16/447,724, filed 20 Jun. 2019, incorporated by reference herein), through a machine learning approach to train a neural network model, etc., or other approach suitable to a particular implementation of the predictive controller logic. Step 2710 can be executed locally on the modular energy unit or on a remote cloud-based optimization resource.

At step 2712, the modular energy unit is controlled using the trained predictive controller and the collected data to reduce or eliminate use of carbon-emitting energy sources. For example, the predictive controller may optimally utilize zero-emissions energy sources (e.g., wind and solar of the modular energy unit, hydrogen fuel cell, etc.) included in the modular energy unit over other energy sources to serve the building and charge the batteries 2313 and other energy storage devices. The predictive controller may also be capable of shifting utility purchases to times of day when the utility grid is being supplied primarily by renewable energies (e.g., solar, wind, geothermal, hydrodynamic, etc.). The predictive controller can thus reduce use of carbon-emitting energy sources to move building energy consumption toward zero carbon emissions. If carbon emissions are entirely eliminated, process 2700 can end at step 2712.

If a reduced level of carbon emission remains (e.g., due to continued reliance on carbon-emitting production in the energy grid under certain conditions), the process 2700 proceeds to step 2714 where any remaining carbon emissions are automatically offset using one or more carbon capture processes. The decisions of the predictive controller and data collected thereby can be used to estimate an amount of remaining carbon emissions (e.g., in tons of $CO_2$), which can be used to initiate and execute on a desired carbon offset program. In some embodiments, step 2714 includes automatically purchasing carbon offsets from a third-party carbon offset provider, for example a validated carbon offset provider engaged in carbon sequestration through forest preservation, reforestation efforts, etc. Carbon offset acquisition and management can be integrated with a cloud-based resource which also hosts the predictive controller for the modular energy unit. In some embodiments, step 2714 includes automatically operating a carbon capture/recovery technology to capture a corresponding amount of carbon from the atmosphere. Various other approaches to executing a carbon offset program as an automatic response to data generated by the modular energy unit are possible. The reliance on carbon capture, carbon sequestration, carbon offsets, etc. to achieve net-zero emissions is substantially reduced by installation and use of the modular energy unit, with step 2714 included to ensure that carbon neutrality targets are met by execution of step 2700.

Modular Energy Unit with Building Setpoint Optimizer

Figure 28:
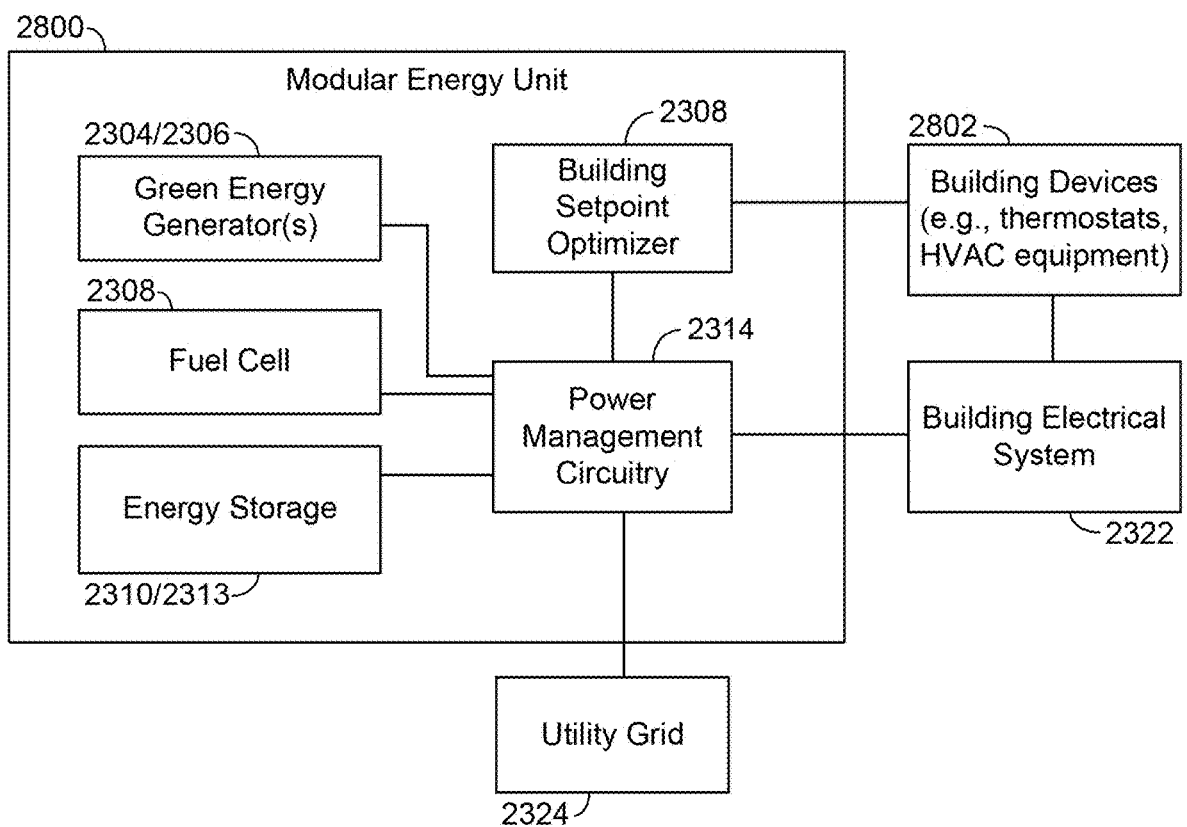
FIG. 28 is a block diagram of a modular energy unit adapted to optimize building setpoints, according to some embodiments.

Referring now to FIG. 28, a block diagram of a system including another embodiment of a modular energy unit is shown, according to some embodiments. In the embodiment of FIG. 28, the modular energy unit is configured to optimize building setpoints in order to affect the building energy demand, thereby increasing the ability of the modular energy unit to reduce energy costs and emissions. For example, time-shifting energy consumption may allow the modular energy unit to match consumption to periods of high availability of green energy while reducing demand during times when the modular energy unit needs to rely on carbon-emitting energy sources. The example of FIG. 28 enable such advantages.

As shown in FIG. 28, a modular energy unit 2800 can be communicable with building devices 2802. The building devices 2802 can include one or more thermostats of a building and/or HVAC equipment (e.g., air handling units, chillers, VAV boxes, variable refrigerant flow system indoor and/or outdoor units, etc.), or other equipment in a building. In the example shown, the building devices 2802 preferably include thermostats which are configured to control HVAC equipment to drive indoor air temperature toward a temperature setpoint. In such a case, changing the temperature setpoint can affect the resource demand of the building, in particular by HVAC equipment of the building. Accordingly, as described in the following passage, the modular energy unit 2800 is communicable with the building devices 2802 to provide time-varying temperature setpoints (or other setpoints, for example for airflow, humidity, lighting, etc.) to the building devices 2802 in order to coordinate building operations with the energy operations of the modular energy unit 2800.

FIG. 28 shows a building setpoint optimizer 2308 included in the modular energy unit 2800. The building setpoint optimizer 2308 is made of circuitry (e.g., memory and processing components) configured to optimize building setpoints in coordination with the power management circuitry 2314. For example, in some embodiments the power management circuitry 2314 provides, to the building setpoint optimizer 2308, an indication of an effective time-of-use pricing of power that can be provided by the modular energy unit 2800 (i.e., a cost of power resulting from use of the green energy generator(s) 2304/2306, fuel cell 2308, and energy storage 2310/2313 in addition to purchases made from the utility grid 2324). As another example, the power management circuitry 2314 may provide the building setpoint optimizer 2308 with an effective carbon-to-power ratio for power provided to the building electrical system 2322 from the modular energy unit 2800. Due to optimized operation of the power management circuitry, the effective time-of-use pricing or carbon-to-power ratio can be significantly less than the rate set by the utility company. The building setpoints optimizer 2308 can then use that effective time-of-use pricing as an input to a building setpoint optimization process to reduce cost and/or carbon emissions, for example using an optimization process as described in U.S. application Ser. No. 15/199,909, filed Jun. 30, 2016, U.S. application Ser. No. 13/802,154, filed Mar. 13, 2013, U.S. application Ser. No. 16/687,122, filed Nov. 18, 2019, and/or U.S. patent application Ser. No. 16/598,539, filed Oct. 10, 2019, the entire disclosures of which are incorporated by reference herein.

The building setpoint optimizer 2308 then distributes the optimized setpoints to the building devices 2802. The building devices 2802 then operate in accordance with the optimized setpoints, for example causing HVAC equipment to operate to drive building temperature to an indoor air temperature setpoint generated by the building setpoint optimizer 2308. Thus, in the embodiment of FIG. 28, the modular energy unit provides coordinated optimization of both building demand and energy production from multiple sources to meet the optimized demand.

Networked Modular Energy Units

Referring now to FIG. 29, a block diagram showing a network 2900 of modular energy units 2901 and other elements is shown, according to some embodiments. In particular, FIG. 29 shows multiple modular energy units 2900 provided to serve campus buildings 2902 and a modular data center 2904. The multiple modular energy units 2901 are communicable with one another over a local mesh network (e.g., mesh Wi-Fi network) (e.g., arranged in a daisy chain), with one of the modular energy units 2901 connected via a cellular network 2906 with cloud-based optimization resources 2908. The cloud-based optimization resources 2908 are shown as interoperable (e.g., via an application programming interface) with a carbon sequestration service 2910.

The multiple modular energy units 2900 can be configured according to any of the examples of FIGS. 22-28, for example. In this example, the modular energy units include wireless communication interfaces (e.g., Wi-Fi networking hardware) or wired communication interfaces (e.g., Ethernet ports) to enable communication directly between and amongst the modular energy units 2901. The modular energy units 2900 can connect to one another in a daisy chain architecture or a loop or ring architecture, for example. The architecture shown in FIG. 29 enables the cloud-based optimization resources 2908 to communicate with a single modular energy unit 2900 rather than all of the modular energy units 2900 separately, thereby simplifying communications and reducing potential access points for cybersecurity threats. The cellular network 2906 can include security features, for example using a tempered networks identity-defined networking paradigm or other security communications protocol. An approach for operating under intermittent connectivity to a cloud computing system as described in Ser. No. 16/680,881 (filed Nov. 12, 2019 and incorporated by reference herein) can be implemented on or for the modular energy units 2900 in some embodiments The modular energy units 2901 collaborate to serve energy demands of campus buildings 2902 and modular data center 2904. Campus buildings 2902 can included one or more buildings (e.g., two, three, five, ten, twenty, etc.). FIG. 29 illustrates that multiple modular energy units can be provided together when suitable for larger energy demands beyond the capacity of a single modular energy unit 2901 to sufficiently address. The multiple modular energy units can be electrically connected in series or in parallel as a collective between the campus buildings 2902 and the energy grid, or may each be connected to a different building of the campus buildings 2902, for example. In the example of FIG. 29, the multiple modular energy units are conductively connected and configured to share energy therebetween, so as to take full advantage of the available energy storage and generation capabilities of the modular energy units 2901.

The modular data center 2904 is configured to provide computing resources (servers, data storage media, etc.) for the campus, e.g., to facilitate tasks of people working or studying on the campus, and thus includes computing components (e.g., servers, etc.) and HVAC equipment for controlling temperature of the computing components. The modular data center 2904 can have a similar physical footprint as a modular energy unit 2901 and may thus be easily distributed and installed along with the modular energy units 2901. FIG. 29 illustrates that a modular data center 2901 can be installed with a modular energy unit 2901 which serves the energy loads of the modular data center, thus providing both the computing components and the energy storage and generation features needed to power those computing components in a cost-effective and low- or zero-carbon manner. In some embodiments, the processes described in this example as being executed by the cloud-based optimization resources 2908 are executed by servers of the modular data center 2904.

The cloud-based optimization resources 2908 are configured to generate optimal control decisions for the modular energy units 2901, including by coordinating operation of the multiple modular energy units 2901. For example, the cloud-based optimization resources 2908 can allocate energy storage or discharge across the various energy storage devices of the multiple modular energy units 2901. The cloud-based optimization resources can execute any of the optimization approaches described herein.

The cloud-based optimization resources 2908 can also estimate an amount of carbon emissions associated with operation of the campus buildings 2902 and the modular data center 2904. The cloud-based optimization resources 2908 can communicate with a carbon sequestration (offset, capture, etc.) service, for example to automatically obtain carbon offsets equal to the amount of carbon emissions associated with operation of the campus buildings 2902. The network 2900 is thus enabled to reduce energy costs and actual carbon emissions while automatically causing the network 2900 to reach carbon neutrality, for example. In another example, the cloud-based optimization resources 2908 can communicate with a carbon credits marketplace to automatically purchase carbon credits needed to permit (e.g., authorize in view of government regulations) the carbon emissions resulting from operation of the campus buildings 2902 and the modular data center 2904, thereby automatically ensuring compliance with applicable regulatory limits on carbon emissions.

Referring now to FIG. 30, a network 3000 is shown, according to some embodiments. The network 3000 is configured similarly as in FIG. 29, and includes the modular energy units 2901 connected to the cloud optimization resources 2908 via cellular network 2906 and installed to serve campus buildings 2902. The network 3000 additionally includes a building management system 3004 which serves the campus buildings 2902, in particular by monitoring building data, building equipment, building setpoints, etc. The building management system 3004 can include controllers, network devices, sensors, etc. arranged in the building to facilitate control of building equipment. The building management system 3004 is communicable with the cloud optimization resources 2908, for example via the cellular network 2906 or via some other communications pathway (e.g., wired internet connection, etc.).

In the example of FIG. 30, the cloud optimization resources 2908 provides coordinated predictive control of the modular energy units 2901 and building equipment via the building management system, for example active setpoint management. For example, the cloud optimization resources 2908 may formulate an optimization problem that includes, as decision variables, building setpoints (e.g., indoor air temperature setpoints), building equipment on/off decisions, amounts of energy to store or release from energy storage systems of each modular energy unit 2901, and amounts of energy to generate with fuel cells of the modular energy units 2901, all of which can be determined an integrated manner as a result of a single minimization process. The optimization problem may be subject to building temperature constraints, for example requiring predicted temperature or temperature setpoints to stay within comfortable temperature ranges, for example ranges defined using one or more neural networks as described in U.S. patent application Ser. No. 16/943,955, filed Jul. 30, 2020, incorporated by reference herein). The optimization problem may also be subject to load balancing constraints ensuring that all energy stored, generated, purchased, or consumed is accounted for by the results of the optimization problem. The optimization problem may also be subject to constraints based on maximum allowable carbon emissions, or penalties based on carbon emissions.

In some embodiments, the optimization problem seeks to minimize an objective function that includes a first term corresponding to an economic cost of operating the building (e.g., costs of purchasing energy from the grid, costs of wear on equipment) and a second term corresponding to an internalization of costs associated with carbon emissions (e.g., costs of purchasing carbon credits, costs of purchasing carbon offsets, weighted penalty terms, etc.). By solving the optimization problem, the cloud-based optimization resources 2908 can generate control decisions for both the modular energy units 2901 and the building management system 3002, thus enabling a high level of cost and carbon savings through coordinated operation of the modular energy units 2901 and the building equipment.

Predictive Control with Carbon Emissions Optimization

Figure 31A:
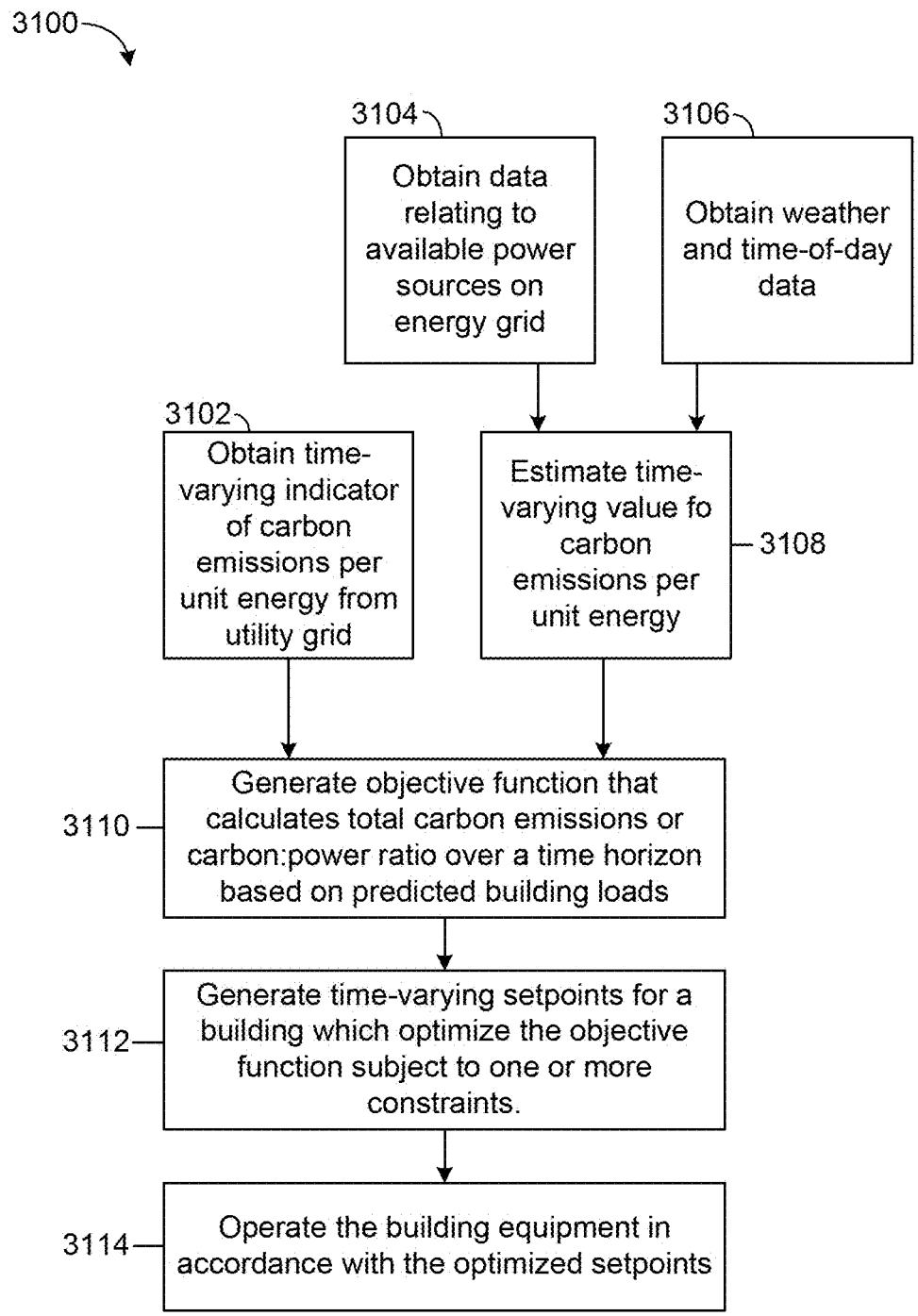
FIG. 31A is a flowchart of a process for operating building equipment to achieve an optimal level of carbon emissions or carbon-to-power ratio, according to some embodiments.

Referring now to FIG. 31, a flowchart of a process 3100 for predictive control with carbon emissions optimization is shown, according to an exemplary embodiment. Process 3100 can be executed by the cloud-based optimization resources 2908 for example. Process 3100 can also be executed by any of the predictive controllers described above (e.g., predictive CEF controller 304, predictive chiller controller 704, predictive pump controller 1104, predictive cooling tower controller 1504, or predictive valve controller 1804). Process 3100 can be executed by or for a smart thermostat, for example as described in U.S. patent application Ser. No. 16/598,539, filed Oct. 10, 2019, incorporated by reference herein. Process 3100 can also be executed by a building management system or controllers for building equipment, for example as described in U.S. application Ser. No. 15/199,909, filed Jun. 30, 2016, U.S. application Ser. No. 13/802,154, filed Mar. 13, 2013 or U.S. application Ser. No. 16/687,122, filed Nov. 18, 2019, the entire disclosures of which are incorporated by reference herein.

At step 3102, a time-varying indicator of carbon emissions per unit energy or power is received from the utility grid, for example a power:carbon ratio (i.e., average carbon per unit power provided by the grid) or a marginal operating emissions rate (MOER) (i.e., carbon per marginal unit power as described below). That is, in the scenario of step 3102, the operator of the utility grid provides an estimate of the amount of carbon emitted in order to produce each unit of energy or power provided to a customer of the utility grid. Because renewable energy may contribute different percentages of total grid energy under different environmental conditions, different times of day, etc. a carbon:power or carbon:energy ratio can be time-varying. Additionally, because different renewable sources and fossil-fuel consuming plants may come online at different times or under different total demands on the grid, the source of power that generates a marginal unit of energy also changes over time such that the carbon emissions associated with marginal energy consumption (i.e., consuming vs. not consuming the next unit of energy) also changes over time.

Figure 31B:
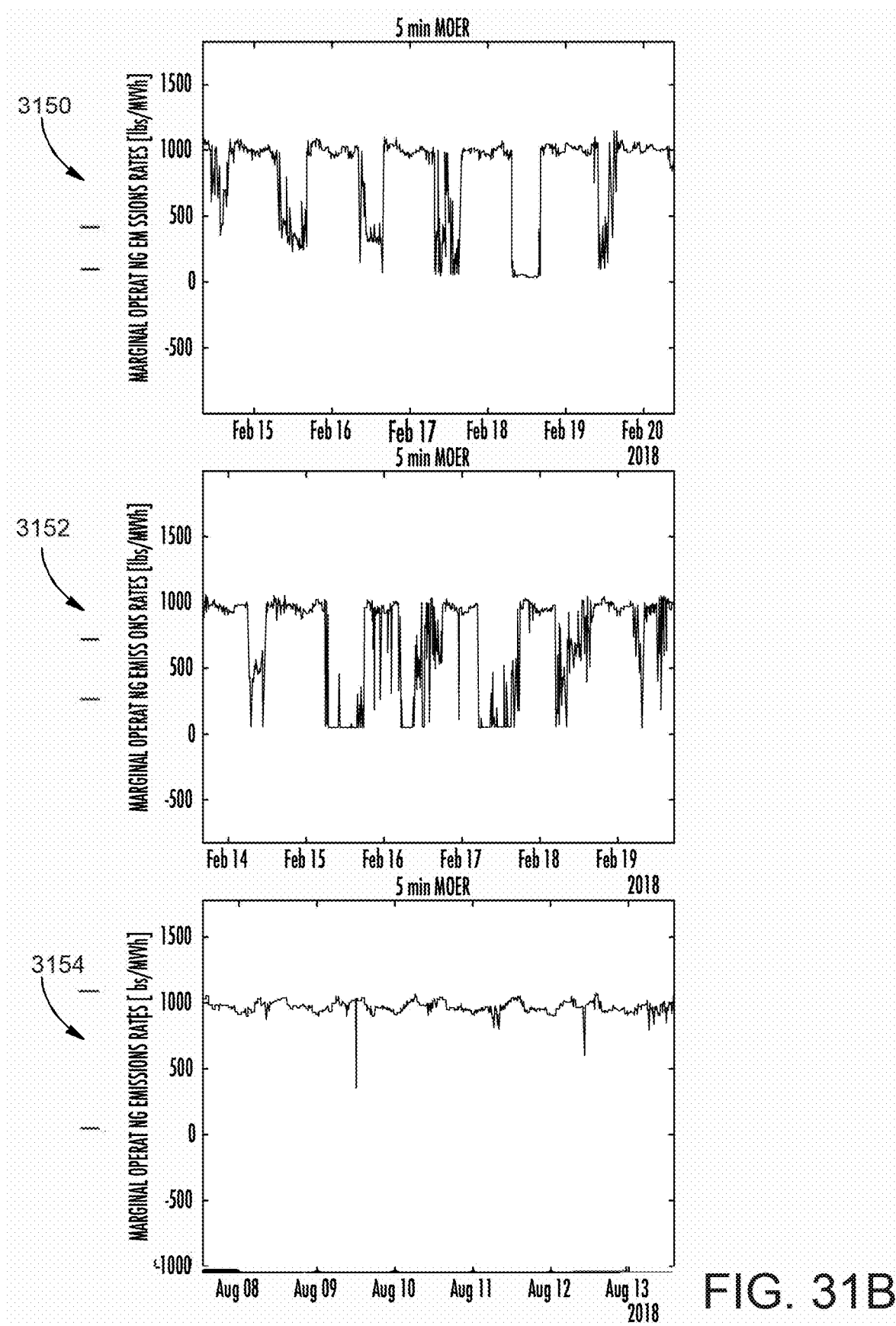
FIG. 31B is a depiction of example time-varying marginal operating emissions rates, according to some example scenarios.

The rate of emissions associated with marginal energy consumption is referred to herein as the marginal operating emissions rate (MOER) and can be broadcast by a utility grid operator to its customers in some embodiments, for example at a frequency of once every five minutes. To illustrate some examples, FIG. 31B shows graphs of MOER over time in different seasons. A first graph 3150 shows MOER over time for a week in February. In the example shown, the MOER can fluctuate between about 1000 lbs/MWh and 0 lbs/MWh. In the first graph 3150, the MOER is zero during parts of some days, for example during a middle portion of the day when photovoltaic energy production is sufficient to meet the demands of the grid. At night, in cloudy conditions, or in high-demand periods, the grid relies on fossil-fuel-based energy (coal, natural gas, etc.) to meet demand, such that the MOER jumps to a higher value when such plants are brought online to serve the marginal demand on the utility grid. In the second graph 3152, which shows MOER for a week in July, it can be seen that higher MOER can occur even during daytime (when solar power is available) under high-demand periods, showing that MOER can deviate from a standard pattern or oscillation. The first graph 3150 and the second graph 3152 show that there are opportunities to reduce marginal emissions by time-shifting consumption to periods with lower MOER, which can be achieved by process 3100 as described herein. In the third graph 3154, which shows MOER for a week in August, it can be seen that in high, constant demand periods (e.g., during a heat wave when air conditioners are constantly run to put a high demand on the utility grid), carbon-emitting sources will always remain online to serve the marginal energy demand, such that MOER stays substantially constant throughout such periods.

In step 3102, assuming such data is available from the utility grid, the time-varying indicator of carbon emissions (e.g., MOER) is received from the utility grid. In some scenarios, the utility grid may also provide predicted or expected MOER or carbon:power or carbon:energy ratios for future time periods.

In a scenario where such information is not directly available from the utility grid (or other third part), a predictive controller can be configured to generate estimates of the MOER or carbon:energy or carbon:power ratio itself, as illustrated steps 3104-3108 of process 3100. At step 3104, data relating to available power sources on the energy grid is collected, i.e., identifying the different energy sources and general information on production of the energy sources serving the energy grid. This information is typically available, even where detailed estimates of carbon emissions or real-time MOER are not shared by utility companies. Step 3104 can include collect this data and building a model of the various sources of energy on the utility gird. Step 3106 include obtaining weather and time-of-day data (e.g., what will the weather by a different times of day over a prediction horizon). At step 3108, the data from steps 3104 and 3106 are used to estimate a time-varying value of carbon emissions per unit energy or power (e.g., average, MOER) received from the energy grid. Step 3106 can include executing a modeling approach which simulates the energy grid based on the best available information to generate an estimate of the carbon:power or carbon:energy ratio or MOER and predictions thereof over a prediction horizon. In some embodiments, a stochastic optimization process is implemented where a plurality of scenarios comprising different time-series values of the MOER are generated and then used to optimize a total objective across all of the plurality of scenarios, for example as described for utility rates in U.S. patent application Ser. No. 16/115,290, filed Mar. 14, 2019, the entire disclosure of which is incorporated by reference here.

At step 3110, an objective function is generated that calculates total carbon emissions, total marginal carbon emissions, or an effective carbon-to-consumed-power ratio over a prediction horizon based on predicted building loads. The predictive building loads can be modeled as a function of building setpoints, for example building temperature setpoints, and other building-related variables (indoor air temperature, outdoor air temperature, etc.), for example using a system identification and grey-box modeling approach as described in U.S. patent application Ser. No. 16/418,715, file May 21, 2019, the entire disclosure of which is incorporated by reference herein. As another example, step 3110 can include adapting the objective functions used in U.S. application Ser. No. 14/717,593, filed May 20, 2015, U.S. application Ser. No. 16/115,290, filed Aug. 28, 2018, or Ser. No. 15/199,910, filed Jun. 30, 2016, all incorporated by reference herein, by replacing variables indicating utility rates with the time-varying MOER, time-varying value of the carbon:energy or carbon:power ratio. The objective function can include multiplying the carbon:energy ratio by a predicted energy consumption or target energy consumption of building equipment to calculate a total emissions value. For example, the objective function may be formulated as $J = \int_{t=1}^{t=T} MOER(t)*E(t)$ where MOER(t) is the marginal operating emissions rate at time t and E(t) is energy obtained from the grid at time t.

At step 3112, time-varying setpoints for the building are generate which optimize the objective function subject to one or more constraints. For example, a temperature setpoint for each time step over an optimization horizon may be generated at step 3112. As another example, energy consumption targets for building equipment may be generated at step 3112. Various details of such embodiments are provided in the applications cited above and incorporated by reference herein. Optimizing the objective function can include executing a gradient descent or other minimization process that seeks to achieve the minimum possible total carbon emissions while satisfy the one or more constraints (e.g., constraints ensuring occupant comfort, etc.).

At step 3114, the building equipment is operated in accordance with the optimized setpoints. Because step 3112 uses the time-varying MOER or carbon:power or carbon:energy ratio as an input, step 3114 may include time-shifting building equipment to low-carbon periods and away from high-carbon-emissions periods. For example, a building can be pre-cooled or pre-heated during a low-carbon period (e.g., cooled below a preferred temperature setpoint, heated above a preferred temperature setpoint) to reduce or eliminate operating of cooling equipment (chillers, etc.) during high-carbon periods. Process 3100 can thereby reduce carbon emissions associated with energy consumption of a building. In other embodiments, process 3100 is implemented as a planning tool and used to generate reports, analytics, projected carbon savings, projected costs savings, recommendations, etc. resulting from implementing the optimization strategy of process 3100, as an alternative to or in addition to controlling the building equipment as shown in the example of FIG. 31.

Figure 32:
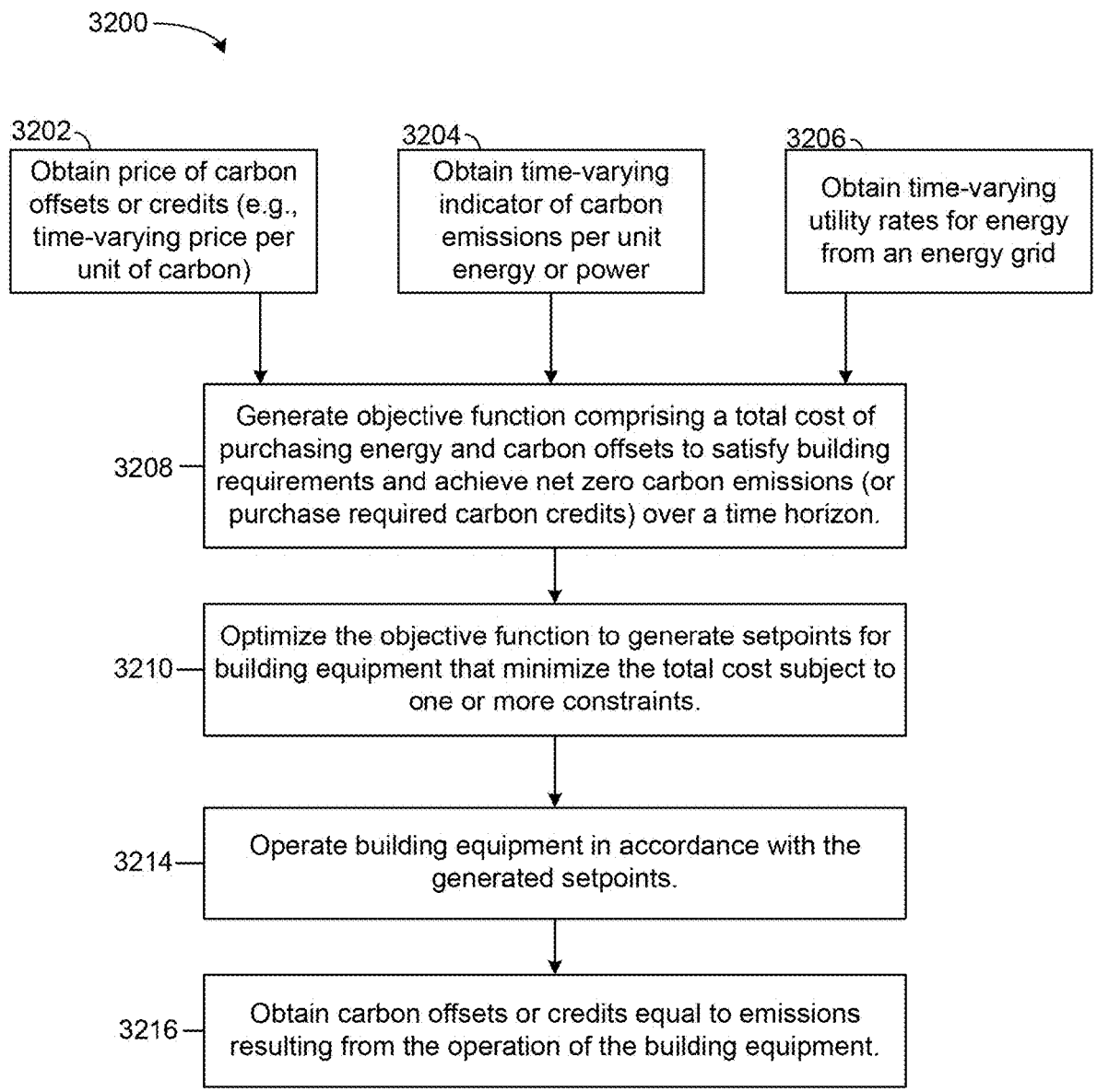
FIG. 32 is a flowchart of a process of cost optimization for building equipment which accounts for costs of carbon offsets to reach net-zero emissions, according to some embodiments.

Referring now to FIG. 32, a flowchart of a process 3200 for optimizing operation of building equipment while internalizing costs of carbon emissions is shown, according to some embodiments. Process 3200 can be executed by the same variety of controllers/processors/etc. as process 3100 described above, in various embodiments.

At step 3202, pricing for carbon offsets or carbon credits is obtained. Carbon offsets refers to markets for carbon sequestration and carbon capture services, for example reforestation or non-deforestation services, whereby a polluter can pay a third party to conduct activities which remove carbon from the atmospheres. Technologies or entities are said to be carbon neutral or net-zero carbon emitters when carbon offsets fully cover the technology's or entity's emissions (e.g., tons of $CO_2$ emitted=tons of $CO_2$ equivalent sequestered). Carbon credits refer to regulatory markets, active in some jurisdictions, in which companies cannot generate emissions beyond an amount defined by freely-transferable carbon credits which are traded in a marketplace. In both cases, a unit of carbon emissions (e.g., ton of $CO_2$) can be associated with an economic cost of offsetting or obtaining regulator permission for that emission.

Step 3202 can include providing interoperability between digital marketplaces for carbon offsets or credits and a predictive controller for building equipment, for example via one or more APIs and connection over the internet. Step 3202 may include monitoring pricing for carbon offsets or credits and building one or more models to predict future prices. In other embodiments, step 3202 includes obtaining data indicating a price that a building owner pre-paid or contracted to pay for carbon offsets or credits.

At step 3204, a time-varying indicator of carbon emissions per unit energy or power consumed by a building (e.g., MOER) is obtained, for example as described with reference to steps 3102-3108 of FIG. 31. In embodiments including one or more modular energy units (e.g., modular energy unit 2300), the time-varying indicator of carbon emissions per unit energy or power can be generated by the modular energy unit. For example, an effective MOER can be calculated which can account for MOER of energy obtained from a utility grid and contributions of green energy availability from the one or more modular energy units.

At step 3206, time-varying utility rates for energy or power from a utility grid is obtained. For example, utilities typically broadcast a real-time energy rate to customers, and sometimes provide the utility rate for an amount of time ahead (e.g., a few hours into the future). Step 3206 can also include predicting utility rates, for example as described in U.S. patent application Ser. No. 14/717,593, filed May 20, 2015, incorporated by reference herein.

At step 3208, and objective function that calculates a total cost of purchasing energy and purchasing carbon offsets or carbon credits to match carbon emissions associated with generation of the energy is generated. The objective function can include a first term representing the total cost of purchasing energy, for example $\Sigma_{i=1}^{i=H} r_i * E_i$, where $r_i$ is a utility rate at time step i, $Q_i$ is energy consumption at time step i and H indicates the duration of an optimization horizon. The objective function can also include a second term representing the cost of carbon offsets or credits, for example, $\Sigma_{i=1}^{i=H} P_i * \beta_i * E_i$, where $\beta_i$ represents carbon-emissions-per-unit-energy (e.g., MOER, average emissions per unit energy) at time step i and $P_i$ represents the price of either offsetting and/or purchasing a credit for a unit of carbon emission at time step i. The objection function can submit the first term and the second term to obtain a total cost of energy for operation of a building including internalized costs of carbon emissions.

In other embodiments, instead of using an actual price $P_i$ of offsetting emissions, a user-selectable weighting factor $\lambda_i$ is used to allow a user to tune how process 3200 balances trade-offs between energy costs and carbon emissions. The weighting factor can be constant or time-varying (as indicated by the subscript i), for example so that a user can set a low preference for reducing carbon emissions during some times of day and a higher preference for reducing emissions during other times of day, for example. In such examples, the objective function can be formulated as $J=\Sigma_{i=1}^{i=H} E_i * (r_i + \lambda_i \beta_i)$. User selection of a preferred trade-off between cost reductions and emissions reductions is discussed further with reference to FIGS. 35A-B below.

At step 3210, the objective function is optimized to generate setpoints for building equipment (e.g., indoor air temperature setpoints, battery charge/discharge setpoints, various other setpoints/controls decisions described herein) that minimize the total value represented by the objective function subject to one or more constraints (e.g., min J). The constraints and optimization process can be implemented in various ways as described elsewhere herein with reference to other examples. To provide another example, the optimization process may be an adapted version of the processes described in U.S. patent application Ser. No. 17/208,869, filed Mar. 22, 2021, the entire disclosure of which is incorporated by reference herein. At step 3214, the building equipment is operated in accordance with the generated setpoints in order to actualize the goal of minimizing the cost of operating the building equipment while internalizing the costs associated with carbon emissions. As on example, the building equipment includes air conditioning equipment and operating the building equipment in accordance with the generated setpoints includes pre-cooling a building during a first time period to reduce operations of the air conditioning equipment in a subsequent second time period, in particular where the time-varying values of carbon emissions per unit of the power from the utility grid are predicted to be higher in the first time period than the subsequent time period.

At step 3216, carbon offsets or credits equaling emissions resulting from the operation of the building equipment can be automatically obtained, for example by a building management system. The entire process of achieving carbon neutrality and/or obtaining regulatory permission to emit a certain level of carbon dioxide is thus provided as an integrated solution. Process 3200 can thereby dynamically adjust for trade-offs between costs of purchasing energy and internalized costs of carbon emissions while minimizing overall costs and serving the needs of a building or campus.

Figure 33:
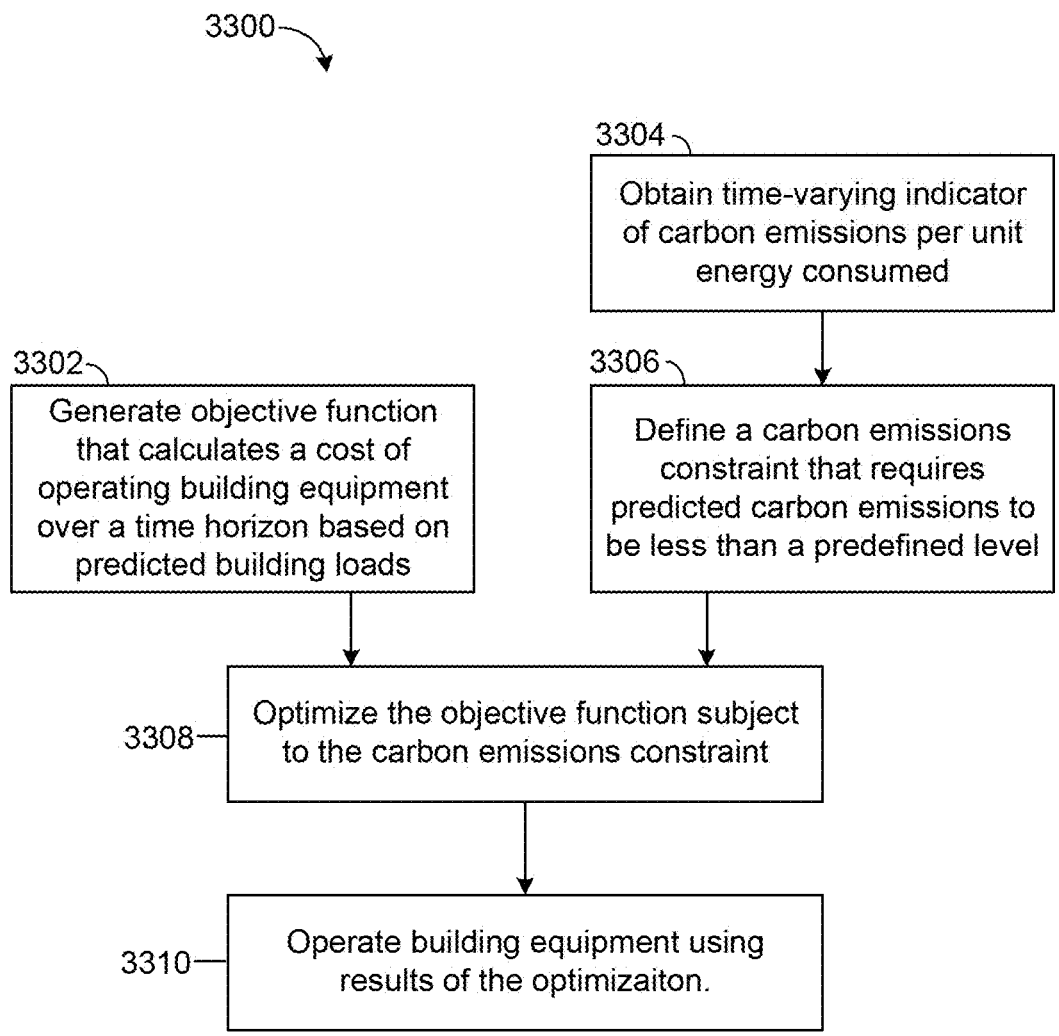
FIG. 33 is a flowchart of a process for optimization of operation of building equipment subject to a constraint on carbon emissions, according to some embodiments.

Referring now to FIG. 33, a flowchart of another process (shown as process 3300) for predictive control that accounts for carbon emissions is shown, according to an example embodiment. In particular, process 3300 accounts for carbon emissions by defining a carbon emissions constraint that prevents or penalizes carbon emissions exceeding a predefined level. Process 3300 can be executed by the various controllers, mentioned above with reference to process 3200 and process 3100 or in the references incorporated by reference herein according to various embodiments.

At step 3302, an objective function that calculates a cost of operating building equipment over a time horizon based on predicted building loads in generated. The objective function may be formulated as discussed with reference to FIG. 32, or as used in U.S. application Ser. No. 14/717,593, filed May 20, 2015, U.S. application Ser. No. 16/115,290, filed Aug. 28, 2018, or Ser. No. 15/199,910, filed Jun. 30, 2016, for example.

At step 3304, a time-varying indicator of carbon emissions per unit energy or power consumed is obtained. For example, step 3304 may be executed according to the examples of steps 3102-3108 of process 3100.

At step 3306, a carbon emissions constraint is defined. The carbon emissions constraint may be defined as an inequality constraints that requires predicted carbon emissions to be less than a predefined level. The predefined level can be defined based on a government regulation, a level defined by an amount of carbon offsets purchased by a company, a level defined by an amount of carbon credits purchased, and amount input by a user, etc. The carbon emissions constraint can be defined as a hard constraints which prevents all solutions to the optimization problem where emissions exceed the predefined level, or as a soft constraint that adds a penalty to the objective function for any excess emissions.

At step 3308, the objective function is optimized subject to the carbon emissions constraint. The carbon emissions constraint can ensure that the solution to the optimization problem (e.g., a result of minimizing a value of the objective function) achieves less than the predefined (maximum allowable) level of carbon emissions, in embodiments where the constraint is a hard constraint, or disincentives exceeding the predefined level in embodiments where the constraint is a soft constraint. At step 3310, the building equipment is operated using results of the optimization.

Figure 34:
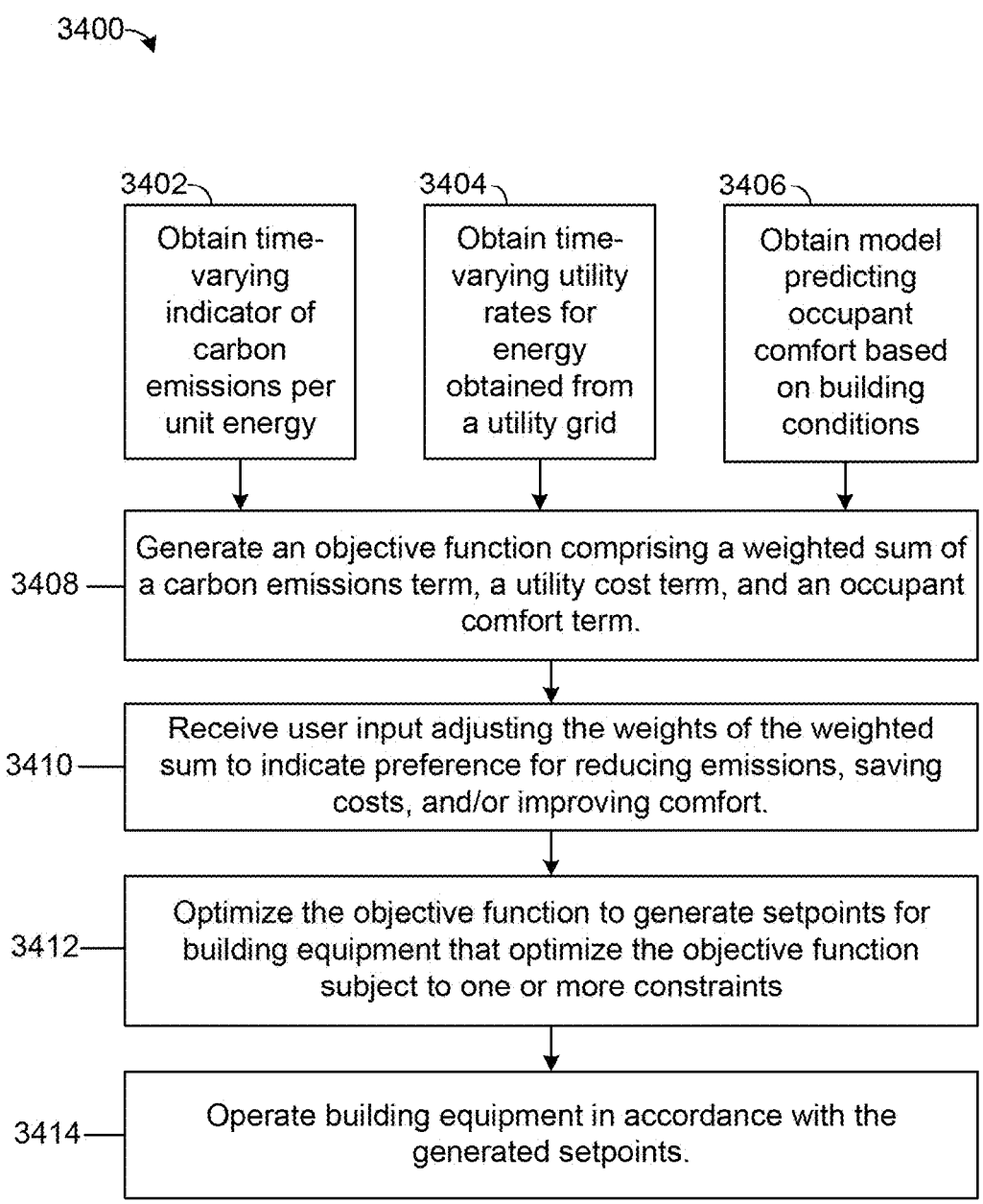
FIG. 34 is a flowchart of a process for customized optimization based on a user input indicating a weighted preference for reducing emissions, saving costs, and/or improving occupant comfort, according to some embodiments.

Referring now to FIG. 34, yet another process for predictive control incorporating carbon emissions considerations is shown, according to some embodiments. In particular, FIG. 34 shows a flowchart of a process 3400 which allows a user to adjust weights to indicate relative preferences for reducing emissions, saving costs, and improving occupant comfort. Process 3400 can be executed by the processors, controllers, etc. mentioned elsewhere herein, in various embodiments.

At step 3402, an indication of time-varying carbon emissions per unit energy or power (e.g., MOER) is obtained, for example as described above with reference to steps 3102-3108. At step 3404, time-varying utility rates for energy obtained from a utility grid are obtained, for example as described with reference to step 3206.

At step 3406, a model predicting occupant comfort based on building conditions is obtained, for example as described in in U.S. patent application Ser. No. 16/943,955, filed Jul. 30, 2020 and incorporated by reference herein, where occupant comfort is quantified based on predicted occupant overrides of temperature setpoints. As another example, occupant comfort may be based on predicted mean vote calculations. Various models for quantifying occupant comfort are possible.

At step 3408, an objective function is generated using the inputs from steps 3402, 3404, and 3406. The objective function can include a weighted sum of a carbon emissions term, a utility costs term and an occupant cost term, reflecting a sum or integral over a prediction horizon. For example, the objective function can be formulated as $J=\int_{t=0}^{T}\lambda*\text{Emissions}(t)+\alpha*\text{UtilityCosts}(t)+\xi*\text{Discomfort}(t) dt$, for example, where $\alpha$, $\lambda$, $\xi$ are weighting and scaling factors. As another example, the objective function can be formulated as $J=\Sigma_{t=0}^{T}(\lambda*\text{MOER}_t+\alpha*r_t)*E(t)+\xi*\text{Discomfort}_t$, where $\text{MOER}_t$ is the marginal operating emissions rate at time t, $r_t$ is the price per unit energy purchased from the grid at time t, and E(t) is the amount of energy obtained from the energy grid at time t.

At step 3410, user input is received, for example via a graphical user interface presented on user computing device (e.g., smartphone, tablet, laptop, desktop computer, etc.). The user input indicates an adjustment to the weights of the weighted sum (e.g., $\alpha$, $\beta$, $\gamma$) to indicate a user relative preference for reduction emissions, saving costs, and/or improving comfort. For example, increasing $\alpha$ while decrease $\beta$ in the example above will cause the process 3400 to prefer reducing emissions over saving costs, and vice versa. As another example, increase $\gamma$ while decreasing $\alpha$ will cause process 3400 to prefer improving occupant comfort over reducing emissions, and vice versa. A user interface can be provided with slider bars, numerical inputs, etc. to allow a user to visualize the relative selection and to understand the adjustments. In some embodiments, a graphical interface showing predicted outcomes for give adjustments is shown to allow a user to compare options and effects of changing the weights.

At step 3412, the objective function (with the user-selected weights of step 3410) is optimized to generate setpoints for building equipment that minimize a value of the objective function (e.g., of the weighted sum) subject to one or more constraints. The minimization approach and constraints can be implemented as described elsewhere herein, and can provide for active setpoint management of a building or buildings. Any of the various settings, setpoints, load values, control decisions, resource allocations, charge/discharge rates, etc. described herein can be optimized by minimization of the objective function in various embodiments. At step 3414, the building equipment is operated in accordance with the generated setpoints to achieve the user's desired balance of emissions, cost, and occupant comfort.

Figure 35A:
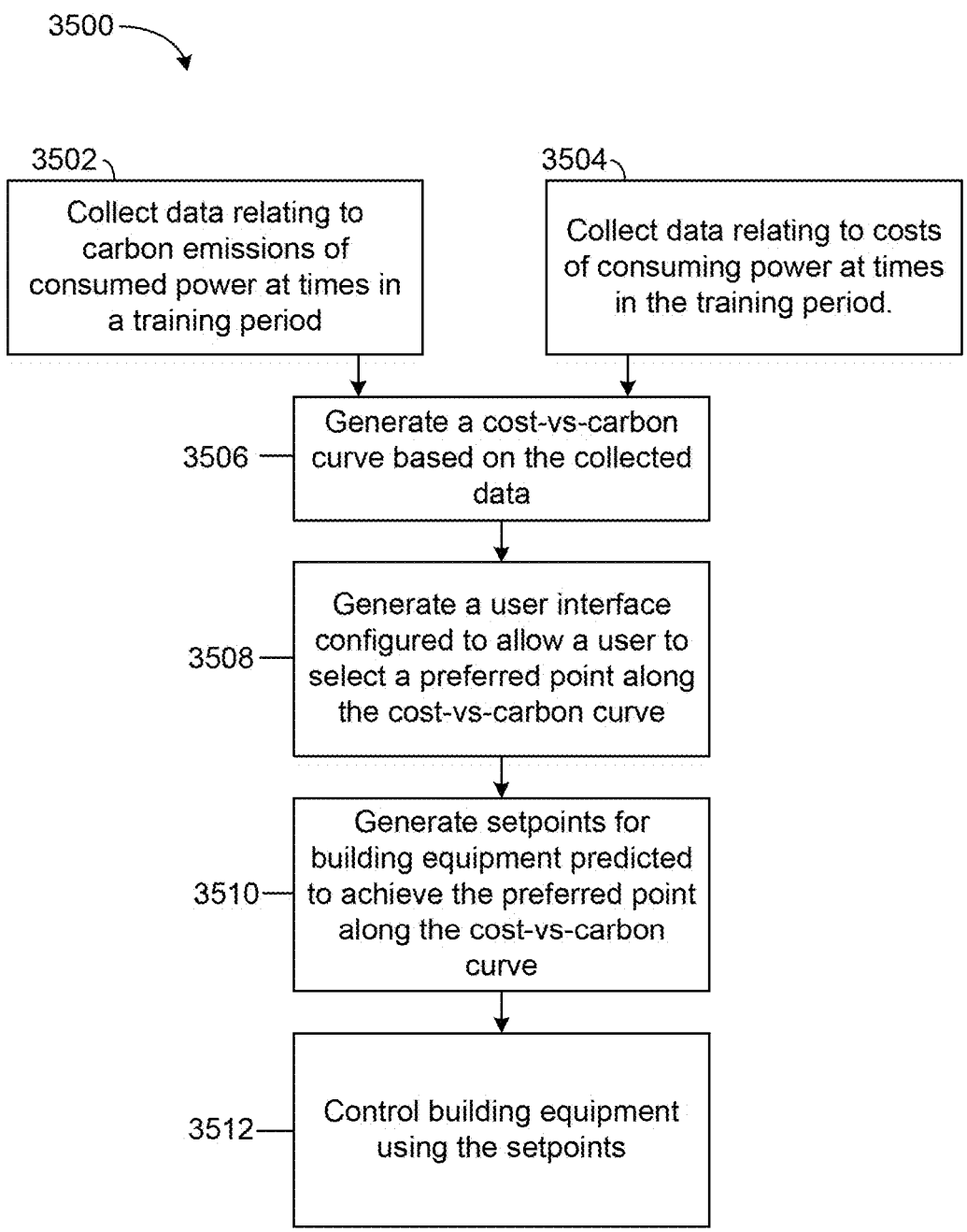
FIG. 35A is a flowchart of a process for selecting and controlling equipment to achieve a target point on a cost-vs-carbon curve, according to some embodiments.
Figure 35B:
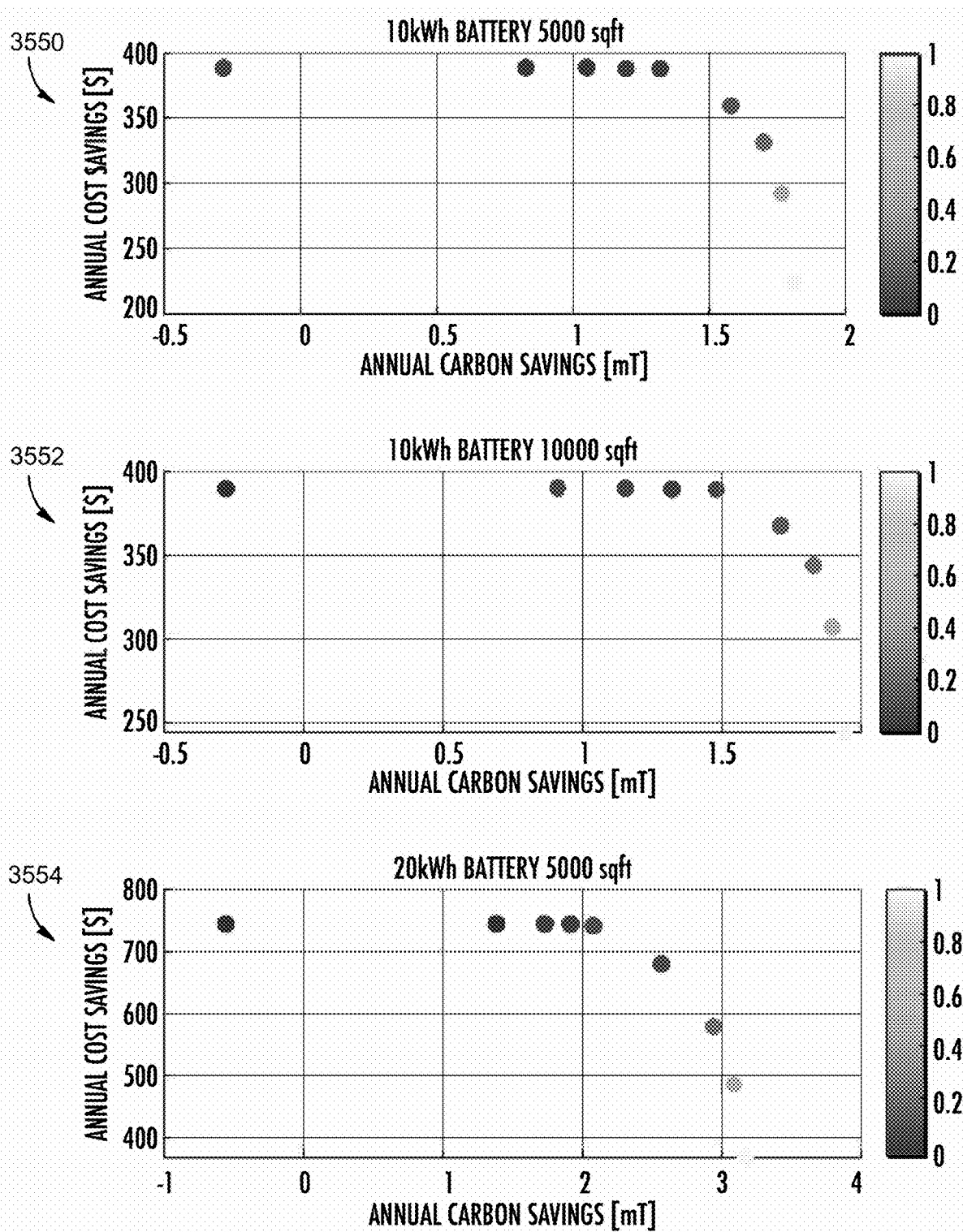
FIG. 35B is an illustration of example cost-vs-carbon curves, according to some embodiments.

Referring now to FIG. 35A, a flowchart of a process 3500 for controlling building equipment to achieve a target point on a cost-vs-carbon curve is shown, according to some embodiments. The process 3500 can be executed by the processors, controllers, etc. mentioned elsewhere herein, in various embodiments. FIG. 35B is also referred to here to facilitate explanation of process 3500, and shows example cost-vs-carbon curves, according to some embodiments.

At step 3502, data relating to carbon emissions of consumed power at a plurality of times in a training period is collected, while at step 3504 data is collected relating to costs of consuming the power at the times in the training period. For example, steps 3502 and 3504 can combine to amount to collecting a dataset of carbon emissions and cost pairs, with each pair corresponding to a historical point in time (or small segment in time). In some embodiments, steps 3502 and 3504 can include performing an experiment to generate suitable data, for example by controlling building equipment across the selectable range of user preferences in order to generate data reflecting the options available to a user.

Steps 3502 and 3504 can include running simulations using different control approaches or control approaches with different parameter values (e.g., different values of a weighting factor in an objective function) to generate the carbon and cost related data, for example as described in U.S. patent application Ser. No. 17/686,320, filed Mar. 3, 2022, the entire disclosure of which is incorporated by reference herein.

At step 3506, a cost-vs-carbon curve is generated based on the collected data from steps 3502 and 3504. For example, a curve can be fit to the data using regression modeling or some suitable fitting approach. The curve take on various shapes in various scenarios dependent on the collected data, for example as shown in FIG. 35B.

FIG. 35B shows cost-vs-carbon curves for different building sizes and different equipment availability, in particular different battery sizes, in particular a first graph 3550, a second graph 3552, and a third graph 3554. The first graph 3550, second graph 3552, and third graph 3554 each has cost savings on the y-axis (with greater values indicating more savings/less cost) and carbon savings on the x-axis (with greater values indicating more savings/less emissions). For example, the first graph 3550 and the third graph 3554 show data for the same sized space but supplied with a much larger battery in the scenario of third graph 3554, which is shown as unlocking substantially more cost savings and emissions savings. The points shown on the graphs 3550, 3552, 3554 are coded to show that the points correspond to values of a user-selectable weighting factor (e.g., values of $\lambda$ in an objective function $J=\Sigma_{i=1}^{i=H}E_i*(r_i+\lambda\beta_i)$). In other examples, the control approaches associated with the different points can differ in a variety of other ways (e.g., different constraints, different parameters, different types of models or functions used, etc.).

As shown in the first graph 3550, the second graph 3552, and the third graph 3554, cost savings and carbon savings may have an exponential relationship, such that cost savings are relative constant up to a certain amount of carbon savings, and then decrease quickly (exponentially) beyond that point. A graph such as the first graph 3550, second graph 3552, and third graph 3554, for a particular building, group of buildings, etc. can be automatically generated at step 3508 and displayed via a graphical user interface to allow a user to directly view and assess the relationship between cost savings and carbon savings for the particular building or group of buildings managed by the user.

At step 3508, a user interface is generate that allows a user to select a preferred point along the cost-vs-carbon curve generated in step 3506. For example, a graphical user interface may show the cost-vs-carbon curve (e.g., a graph as in FIG. 35B) and allow the user to select a point on the curve by touching or clicking on the preferred point. Selecting a point on the cost-vs-carbon curve can amount to or result in selection of a value of a weighting factor used in an objective function, for example a value of $\lambda$ in an objective function $J=\Sigma_{i=1}^{i=H}E_i*(r_i+\lambda\beta_i))$. The user can thus directly select a desired tradeoff between cost and carbon emissions while seeing the actual relationship between the variables for a particular building, plant, or campus, and without needing to understand or manipulate the objective function itself, other optimization logic, software code, etc. These features can be extended to other control objectives (e.g., comfort as in FIG. 36, net energy usage, etc.) in objective functions having two or more objectives (e.g., emissions term, cost term, comfort term) and two or more weights.

At step 3510, setpoints for building equipment are generated which are predicted to achieve the preferred, selected point along the cost-vs-carbon curve. Step 3510 can be executed by optimizing an objective function with a weighting factor determined based on step 3508. In other embodiments, the selected point on the cost-vs-carbon curve can be treated as a target for an optimization, such that an error function is minimized to reduce or eliminate predicted deviations from the target (e.g., deviations of an actual or predict cost and emissions from the selected target cost and emissions). Decision variables of the optimization may include temperature setpoints for the building, equipment on/off decisions, variables relating to components of a modular energy system 2300, and various other variables in various implementations. The optimization can be performed subject to one or more constraints, for example temperature constraints on predicted indoor air temperature for the building.

In some embodiments, step 3510 includes adapting the value of the weight in the objective function over time based on actual performance of the building as compared to an expected performance associated with the user-selected point. For example, if actual emissions are higher than expected over a first portion of a time period, the weight may be adjusted (e.g., increased if multiplied by the emissions objective) so that the objective function increases the penalty on emissions. As a result, the control process using the objective function with the adjust weight will tend to prefer cost (or comfort, energy, etc. in various embodiment) savings at a higher level relative emissions savings as compared to before such an adjustment. Such an adjustment may occur, for example, when an actual marginal operating emissions rate is higher or lower than expected (e.g., than as used in a simulation that generated the data for the cost-vs-carbon curve). An approach for adapting weight values over time is shown in U.S. patent application Ser. No. 17/686,320, filed Mar. 3, 2022, the entire disclosure of which is incorporated by reference herein.

At step 3512, building equipment is controlled using the setpoints, for example a time-series of temperature setpoints output from step 3510. The building equipment is thereby operated to achieve the user-selected predicted point on the cost-vs-carbon curve.

Figure 36:
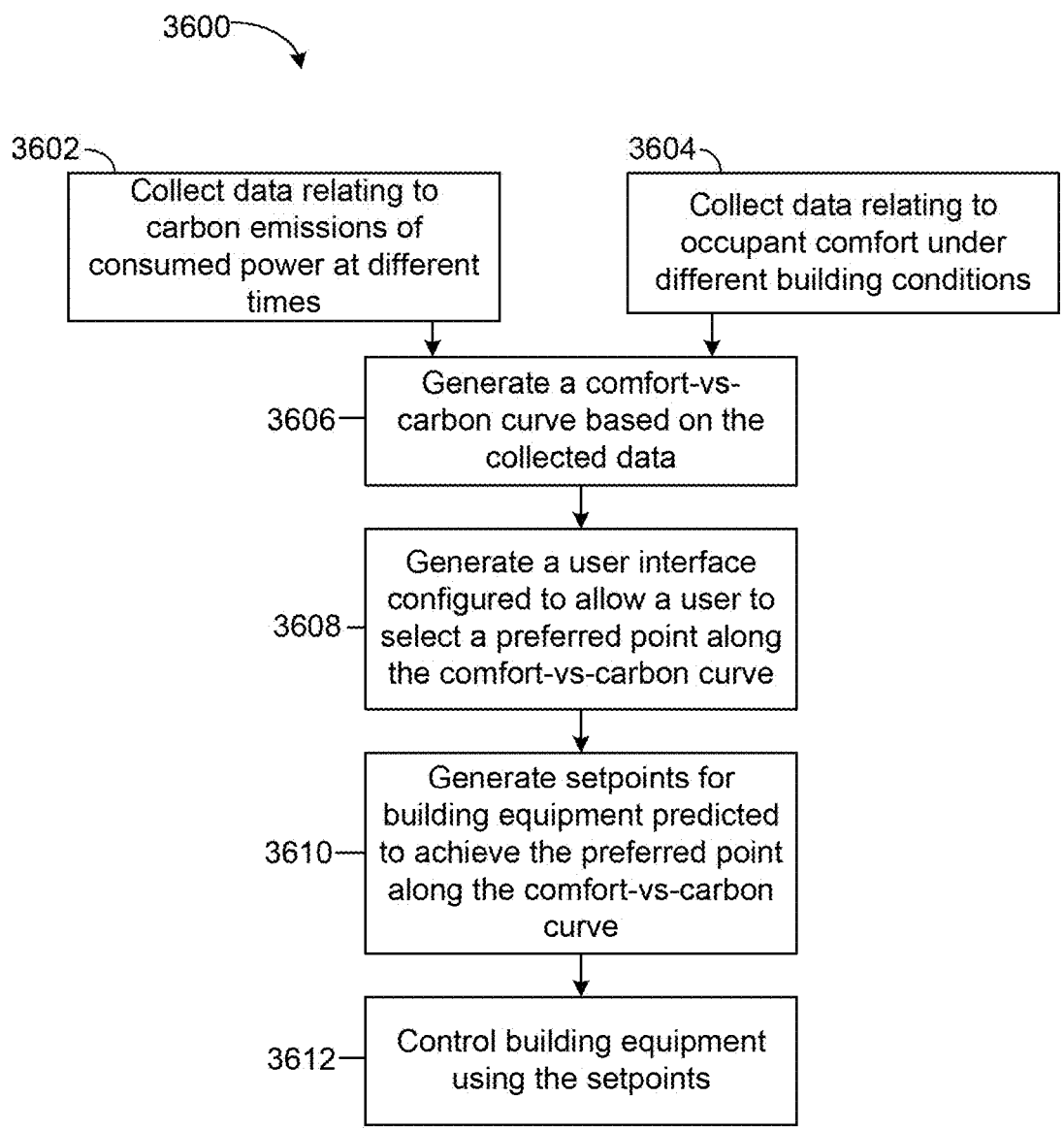
FIG. 36 is a flowchart of a process for selecting and controlling equipment to achieve a target point on a comfort-vs-carbon curve, according to some embodiments.

Referring now to FIG. 36, a flowchart of a process 3600 for controlling building equipment to achieve a target point on a comfort-vs-carbon curve is shown, according to some embodiments. The process 3600 can be executed by the processors, controllers, etc. mentioned elsewhere herein, in various embodiments.

At step 3602, data relating to carbon emissions of consumed power at a plurality of times in a training period is collected, while at step 3604 data is collected relating to occupant comfort at the times in the training period. Occupant comfort data can be sourced from surveys, polling, occupant overrides of building setpoints, estimates based on measured building conditions (e.g., temperature, humidity, etc.). In some embodiments, the occupant comfort data indicates a number of curtailments (e.g., load curtailments) occurring in the training period. Curtailments can include load reductions, setpoint adjustments, etc. corresponding to actions taken to improve an objective (e.g., reduce emissions and/or energy usage) while deviating from baseline or ideal building conditions. Curtailments can be counted as a number of instances or total duration of changes relative to settings that would be used if the control approaches described herein where not executed (e.g., relative to static or scheduled building setpoints). Curtailment data can be representative of occupant comfort or other condition preferences for a facility such as those driven by environmental conditions suitable for machines (e.g., computers, servers, robots, factory equipment) operating in a space, goods (e.g., perishable food, temperature-sensitive medicines, etc.), animals, or other use of a facility. In some embodiments, steps 3602 and 3604 can combine to amount to collecting a dataset of carbon emissions and comfort pairs, with each pair corresponding to a historical point in time (or small segment in time).

Steps 3602 and 3604 can include running simulations using different control approaches or control approaches with different parameter values (e.g., different values of a weighting factor in an objective function) to generate the carbon and comfort related data, for example as described in U.S. patent application Ser. No. 17/686,320, filed Mar. 3, 2022, the entire disclosure of which is incorporated by reference herein.

At step 3606, a comfort-vs-carbon curve is generated based on the collected data from steps 3602 and 3604. For example, a curve can be fit to the data using regression modeling or some suitable fitting approach. The curve take on various shapes in various scenarios dependent on the collected data, for example adapted from the examples shown in FIG. 35B At step 3608, a user interface is generated that allows a user to select a preferred point along the comfort-vs-carbon curve generated in step 3606. For example, a graphical user interface may show the comfort-vs-carbon curve and allow the user to select a point on the curve by touching or clicking on the preferred point. The user can thus directly select a desired tradeoff between occupant comfort and carbon emissions while seeing the actual relationship between the variables for a particular building, plant, or campus.

At step 3610, setpoints for building equipment are generated which are predicted to achieve the preferred, selected point along the comfort-vs-carbon curve. In some embodiments, the selected point can be treated as a target for an optimization, such that an error function is minimized to reduce or eliminate predicted deviations from the target. In some embodiments, each point is associated with a value of a weight on a carbon objective or a second objective (e.g., operating cost, energy usage, comfort metric, etc.) of an objective function (e.g., according to the various objective functions described elsewhere herein), and step 3610 includes generating control decisions using the objective function having the value of the weight associated with the user-selected point from the carbon-vs-comfort curve. An optimization process can be performed using the objective function, in some embodiments. Decision variables of the optimization may include temperature setpoints for the building, equipment on/off decisions, variables relating to components of a modular energy system 2300, emissions targets for different devices over time, and various other variables in various implementations. The optimization can be performed subject to one or more constraints, for example cost constraints on total cost of operating the building equipment.

In some embodiments, step 3610 includes adapting the value of the weight in the objective function over time based on actual performance of the building as compared to an expected performance associated with the user-selected point. For example, if actual emissions are higher than expected over a first portion of a time period, the weight may be adjusted (e.g., increased if multiplied by the emissions objective) so that the objective function increases the penalty on emissions. As a result, the control process using the objective function with the adjust weight will tend to prefer comfort (or cost, energy, etc.) savings at a higher level relative emissions savings as compared to before such an adjustment. Such an adjustment may occur, for example, when an actual marginal operating emissions rate is higher or lower than expected (e.g., than as used in a simulation that generated the data for the comfort-vs-carbon curve). An approach for adapting weight values over time is shown in U.S. patent application Ser. No. 17/686,320, filed Mar. 3, 2022, the entire disclosure of which is incorporated by reference herein.

At step 3612, building equipment is controlled using the setpoints. The building equipment is thereby operated to achieve the user-selected predicted point on the comfort-vs-carbon curve.

Automated Asset Recommendations for Carbon Emissions Reductions

Various passages above describe various assets (e.g., units of equipment) that can be added to a building system to reduce operational costs and carbon emissions, and, in some scenarios achieve carbon neutrality for a building. However, a technical challenge exists relating to selecting the appropriate assets or appropriate size of an asset needed to optimally operational goals and meet carbon reduction targets. For example, adding oversized equipment may actually increase a carbon footprint, whereas adding insufficient assets will not allow goals to be met. Accordingly, a technical solution for assessing and predicting building assets needs is a highly desirable technology.

Figure 37:
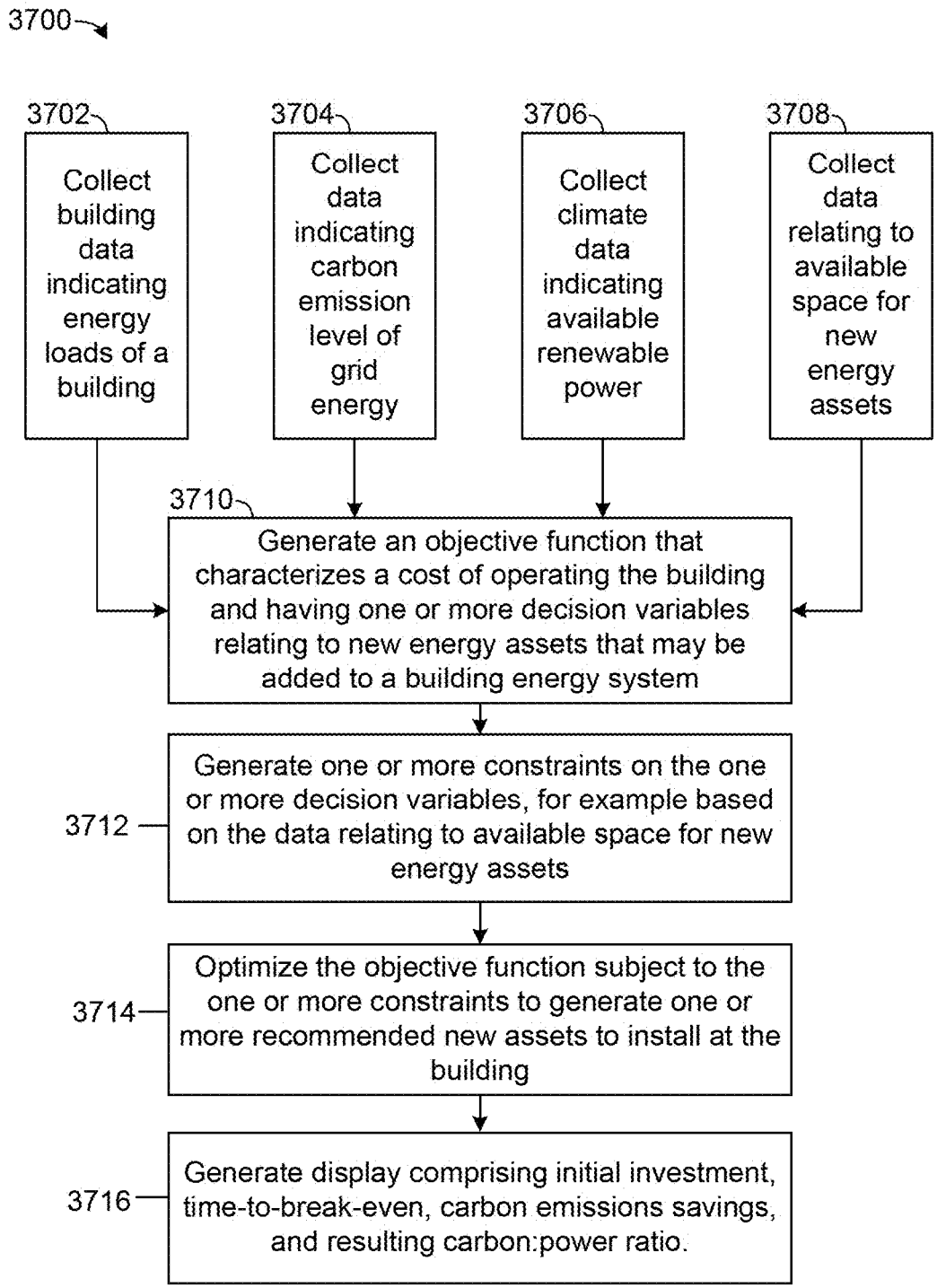
FIG. 37 is a flowchart of a process for automatically generating recommendations for new energy assets to be added to a building to achieve technical advantages such as optimal carbon emissions reductions, according to some embodiments.

Referring now to FIG. 37, a process 3700 for automatically recommending one or more building assets to add to a building to optimally achieve operational goals and carbon reduction targets is shown, according to some embodiments. The process 3700 can be executed by one or more computing elements of the building energy optimization system described in U.S. patent application Ser. No. 16/518,314, filed Jul. 22, 2019, the entire disclosure of which is incorporated by reference herein, for example.

At step 3702, building data indicating energy loads of a building (e.g., electrical demand) is collected. At step 3704, data indicating carbon emission levels of grid energy (e.g., time-varying carbon:power ratio as described above) is collected. At step 3706, climate data indicating available renewable power is collected (e.g., average number of sunny days, length of days, solar intensity, average wind speed, average number of windy days, etc.) is collected for the location of the building. At step 3708, data relating to available space for new energy assets is collected, i.e., physical limits on where a new asset could be positioned (indoor or outdoor, rooftop or ground level, etc.) or how big a new asset could be (roof size, volume of available space, area of available space, etc. in order to fit with an existing building and pre-existing building equipment.

At step 3710, an objective function is generated that characterizes a cost of operating the building over a future time period and has one or more decision variables relating to one or more new energy assets that could be added to the building system. For example, the objective function can include binary variables indicating whether or not a particular type of new asset will be added (e.g., add or do not add a modular energy unit 2300, add or do not add a chiller 700 having an integrated battery and fuel cell, etc.) and variables that can indicate available sizes of such assets that are available from an equipment supplier (e.g., different chillers indicated by capacity) or different numbers of such assets (e.g., two, three, four, etc. modular energy units 2300). The objective function can also account for initial investment and start-up costs relating to purchase and installation of new assets. The objective function may also include terms relating to carbon emissions, carbon offsets, carbon credits, occupant comfort, etc. as described in the various examples above.

At step 3712, one or more constraints are defined, for example based on the data collected in any of steps 3702-3708. For example, a physical size constraint can be defined based on the data relating to available space for new energy assets and stored information relating to the size and space requirements of the potential new energy assets, to ensure that only assets that will fit at the building will be considered. As another example, a carbon emissions constraint can be defined as in process 3300. As another example, constraints can be used to characterize the expected power outputs of renewable energy assets (e.g., photovoltaic cells of a modular energy unit 2300) based on the collected climate data and the data relating to available space/positioning for new assets. Various such considerations can be defined as constraints on an optimization process.

At step 3714, the objective function is optimized subject to the constraints to generate optimal values for the decisions variables (e.g., values that minimize the objective function subject to the constraints). The decision variables indicated recommended assets to add and recommended sizes or quantities of those assets. The optimization may include any of the various considerations, approaches, processes, etc. described in U.S. patent application Ser. No. 16/518,314, filed Jul. 22, 2019, the entire disclosure of which is incorporated by reference herein.

At step 3715, a display is generated that shows the recommendation output from step 3714, the required initial investment, a time-to-breakeven for the investment, predicted resulting carbon emissions savings, predicted resulting carbon-to-power ratio, and any other metrics that may be relevant to a decision maker. In some embodiments, the recommended assets are automatically ordered and installation technicians are automatically scheduled to complete the installation. The process can then continue by controlling the building equipment include the new assets to optimally serve the building according to various strategies described herein.

Enterprise-Wide Carbon Emissions Tracking and Mitigation

Figure 38:
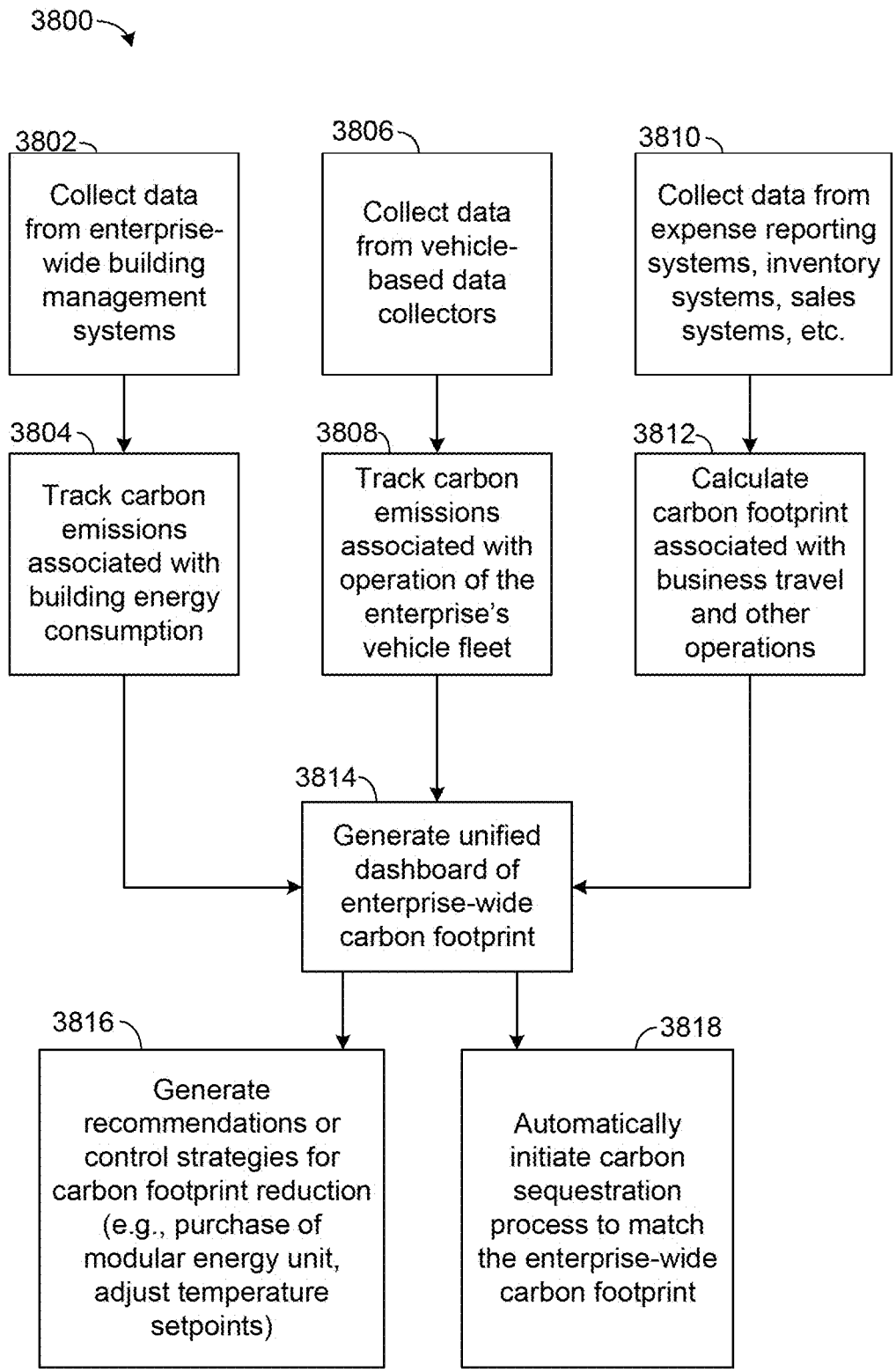
FIG. 38 is a flowchart of a process for generating an enterprise-wide dashboard of carbon emissions and initiating carbon footprint reduction, according to some embodiments.

Referring now to FIG. 38, a flowchart of a process 3800 for enterprise-wide carbon emissions tracking and mitigation is shown, according to an example embodiment. Process 3800 can be executed by processing and memory circuitry in communication with various data sources, according to some embodiments. For example, process 3800 can be executed by processing circuitry executing a software platform that supports a building management system.

At step 3802, data from an enterprise-wide building management system is collected. The data may indicate energy consumption of the enterprise's buildings and the source of the consumed energy. At step 3804, carbon emissions associated with the building energy consumption is tracked, for example at the building level and at the enterprise level. Calculating carbon emissions can be performed using the concepts described with reference to steps 3102-3108 of process 3100, for example.

At step 3806, data from vehicle-based data collectors is obtained. The vehicle-based data collectors can harvest data relating to operation, mileage, fuel consumption, etc. of an enterprise's vehicle fleet, including company cars, delivery trucks, etc. At step 3808, carbon emissions associated with operating of the enterprise's vehicle fleet is tracked, for example on an overall enterprise level and to see carbon emissions for different regions, business units, individual employees, etc.

At step 3810, data is collected from an expense reporting system or other enterprise software platform that collects data relating to employee travel and/or company orders and purchases. For example, a travel agency portal used to book employee travel could be used in some embodiments. The data collected in step 3810 indicates carbon emissions generated by employee travel (e.g., airplane flights, travel in third-party vehicles such as taxis, etc.) and other activities (e.g., delivery of ordered goods, etc.). At step 3812, the carbon footprint associated with business travel and other operations reflected in the data collected in step 3810 is calculated and tracked.

At step 3814, a unified dashboard showing the enterprise-wide carbon footprint is generated. The dashboard can display overall carbon emissions data, identify the contributing sources, and identify high-emitting buildings, business units, departments, regions, employees, for example. The unified dashboard can be provided via a graphical user interface.

At step 3816, recommendations are automatically generated for carbon footprint reduction. In some embodiments, step 3816 includes executed process 3700. In some embodiments, step 3816 comprises automatically adjusting building setpoints according to one of the control processes described above. In some embodiments, the recommendations include reducing business travel, purchasing electric vehicles for the company fleet, and investigating significant emissions by a particular employees. Various outcomes at step 3816 are possible.

At step 3818, a carbon sequestration process is automatically initiated to match the enterprise-wide carbon footprint, thereby achieving enterprise-wide net-zero emissions. The carbon sequestration process can include planting trees or other plants, for example. As another example, the carbon sequestration process includes operating a sequestration device configured to extract carbon from the atmosphere and store the carbon in a solid form. As another example, the carbon sequestration process includes purchasing carbon offsets from a third-party provider. Process 3800 thereby facilitates identification of carbon emission levels, management of carbon emissions, and helps facilitate achieving carbon neutrality.

Supervisory Control of Building Edge Devices Using Carbon Emissions Targets

Figure 39:
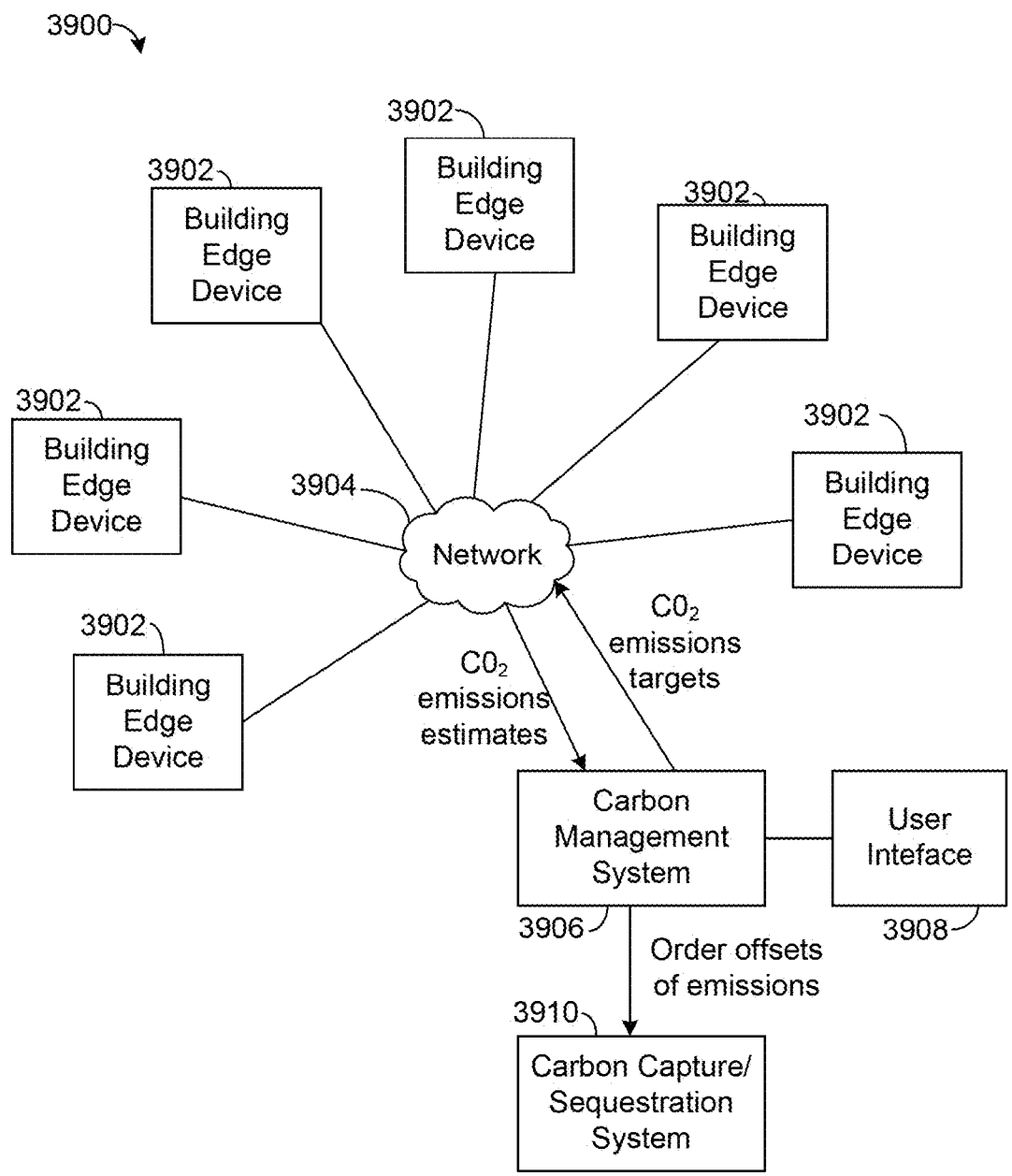
FIG. 39 is a block diagram of a system architecture for multiple building edge devices in a supervisory control scheme including a carbon management system, according to some embodiments.

Referring now to FIG. 39, a block diagram of a supervisory (e.g., cascaded) control system 3900 is shown, according to an example embodiment. As shown in FIG. 39, multiple building edge devices 3902 are communicable via a network 3904 with a carbon management system 3906. The carbon management system 3906 is also communicable with a user interface 3908 and a carbon capture/sequestration system 3910.

The carbon management system 3906 includes processing and memory circuitry configured to perform supervisory control functions for the building edge devices 3902. In particular, the carbon management system 3906 is configured to generate a carbon dioxide emission target for each of the plurality of building edge device 3902, and provide the carbon dioxide emission targets to the building edge devices 3902 via the network 3904. The carbon management system 3906 can be characterized as a supervisory controller in a cascaded control system. In some embodiments, the carbon management system 3906 is configured to generate carbon emissions targets for each of a plurality of subsystems (e.g., building edge devices 3902 or sets thereof) using a predictive control process that accounts for an aggregate carbon emissions of the plurality of subsystems predicted to result from the carbon emissions targets (e.g., emitted by the building edge devices 3902, emitted by power plants or other sources generating electricity or other resource used by the building edge devices 3902, etc.). The predictive control process can include an optimization process, for example a multi-factor optimization process and/or and optimization process using an objective function that accounts for emissions, operating costs, incentive programs, and/or occupant comfort as described elsewhere herein. The carbon management system 3906 can use various equipment models, subplant models, thermal models, resource balance constraints, etc. to perform a high level optimization (e.g., asset allocation), for example as described in U.S. patent application Ser. No. 17/733,786, filed Apr. 29, 2022, the entire disclosure of which is incorporated by reference herein.

In some embodiments, the carbon management system 3906 is configured to allocate a predefined amount of carbon emissions to the various building edge devices, for example an amount of carbon emissions dictated by company policy, regulatory requirements, carbon credit purchases, carbon offset purchases, etc. The carbon management system 3906 can allocate the carbon emissions between the building edge devices based on a prioritization scheme for ranking relative importance of the building edge devices, for example where the prioritization scheme varies based on time of day or building schedules. The carbon management system 3906 can also include one or more models relating carbon emission to performance of the building devices, for example to the ability of building edge devices to maintain comfortable building conditions, and can allocate carbon emissions to the building edge devices using such models. The allocation process may also be based on some sort of optimization process configured to achieve maximally-preferred operation outcomes without exceeding the predefined maximum carbon emissions. The carbon management system 3906 can be configured to account for carbon emissions uncontrollable by the cascaded control system but otherwise attributable to a business or other entity associated with the building (e.g., caused by transportation of goods or people of the entity, caused by production of goods bought or sold by the entity, etc.), which can be considered as a static baseline or calculated and/or predicted as a dynamic value as described elsewhere herein. In such embodiments, the carbon management system 3906 can cause the building devices to modify operations (e.g., curtail loads, move setpoints away from occupant preferences, etc.) to compensate for carbon emissions events uncontrolled by the cascaded control system (e.g., business travel event, large shipment of goods, etc.).

In some embodiments, the carbon management system 3906 is configured to minimize the total carbon consumption relative to constraints relating to performance demands on the building edge devices 3902. The carbon management system 3906 can execute an adaptation of any of the processes described above as part of generating carbon emissions targets for the building edge devices 3902. For example, the carbon management system 3906 may perform a multi-factor optimization that accounts for emissions, operating costs, occupant comfort and/or other considerations, in various embodiments. Occupant comfort can be accounted for by determining a number of curtailments (e.g., load reductions, deviations from occupant-preferred setpoints, extended off periods, etc.) predicted to be needed in order to meet the carbon emissions targets.

Each building edge device 3902 (e.g., local/edge controller(s) thereof) is configured to receive a carbon dioxide emission target from the carbon management system 3906 and then execute a control scheme configured to ensure that the building edge device 3902 and/or devices controlled by the building edge device 3902 operate to achieve the carbon emissions targets, e.g., to cause the emission of no more than the target amount of carbon dioxide emissions. Controllers of the building edge devices 3902 may execute a predictive control process that generates control decisions predicted to cause the building edge devices 3906 to operate to achieve the carbon emissions targets. For example, the building edge device 3902 may perform a local optimization to spread the emissions optimally over a time horizon or over multiple energy-using or carbon-emitting components of the building edge device 3902 or controlled by the building edge device 3902. Thus, across the multiple building edge devices 3902, a set of distributed optimizations is performed at the edge to ensure that the target amounts of carbon dioxide are achieved. The building edge devices 3902 can be adapted to execute edge-adapted machine learning models and/or event processing logic in a reactive, functional programming language to provide the predictive control processes, for example using model structures and/or programming approaches and tools as described in described in U.S. Pat. No. 10,572,230, filed Apr. 23, 2017, U.S. Pat. No. 10,564,941, filed Mar. 23, 2017, U.S. Pat. No. 10,977,010, filed Apr. 21, 2020, U.S. patent application Ser. No. 16/379,700, filed Apr. 9, 2019, and/or U.S. Pat. No. 10,628,135, filed Nov. 13, 2018, all of which are incorporated by reference herein.

The system 3900 shown in FIG. 39 thus allows carbon emissions targets to be met in an optimal manner and in a way that utilizes computing capabilities of building edge devices, in some embodiments. In some embodiments, the building edge devices 3902 execute predictive control processes (e.g., model predictive control) independently from one another (e.g., without communications therebetween). In other embodiments, the building edge devices 3902 collaborate to reach final control decisions for the respective building edge devices 3902.

FIG. 39 also shows a user interface 3908 connected to the carbon management system 3906. The carbon management system 3906 can generate and display via the user interface 3908 information relating to carbon emission of the building edge devices 3902, for example using data received from the building edge devices 3902. The user interface 3908 can also be used to modify the maximum total allowable carbon emissions for the system 3900, override automatically-generated emissions targets, etc. In some embodiments, the user interface 3908 can allow a user to select a preferred balance between two or more of carbon emissions, operating costs, and occupant comfort, for example as described with reference to FIGS. 35A-36, for example, which can then be used by the carbon management system 3906 in generating emissions targets for the building edge devices.

FIG. 39 also shows a carbon capture/sequestration system 3910. The carbon management system 3906 can be configured to order offsets of emissions by the carbon capture/sequestration system 3910, for example to match the same amount as the sum of the carbon dioxide targets pushed to the building edge devices 3902. The system 3900 thus enables simultaneous sequestration and emission of carbon in accordance with emissions targets.

Carbon Management Dashboards with Production- or Utilization-Based Metrics

Figure 40:
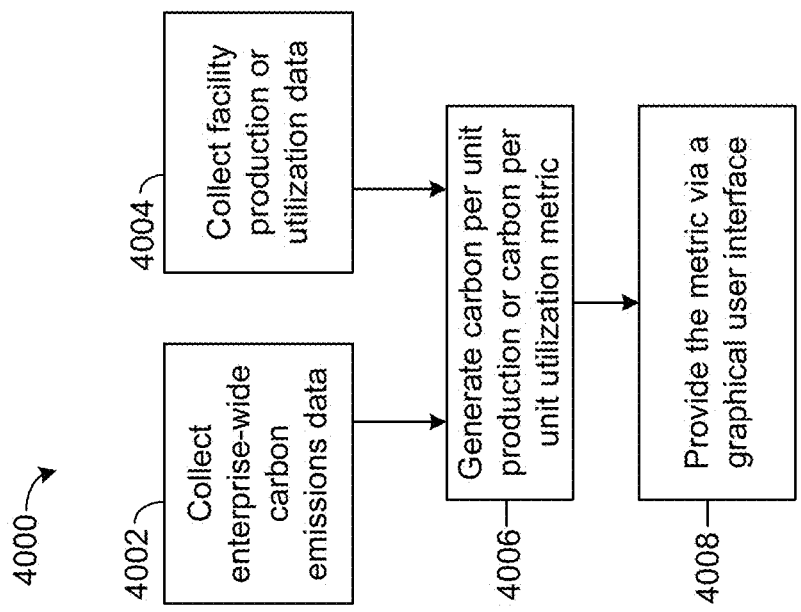
FIG. 40 is a flowchart of a process for providing a normalized carbon emissions metric based on production or utilization data, according to some embodiments.

Referring now to FIG. 40, a flowchart of a process 4000 for generating a metric relating to carbon emissions and facility production or utilization is shown, according to some embodiments. Process 4000 can be integrated with process 3800 in some embodiments. Process 4000 may also be integrated with the controllers, computing systems, and space utilization tools described in U.S. patent application Ser. No. 16/908,324, filed Jun. 22, 2020, the entire disclosure of which is incorporated by reference herein.

At step 4002, enterprise-wide carbon emissions data is collected, for example relating to multiple geographically-dispersed buildings or campuses. Step 4002 can be executed as described above with reference to steps 38002-3812 of process 3800.

Figure 41:
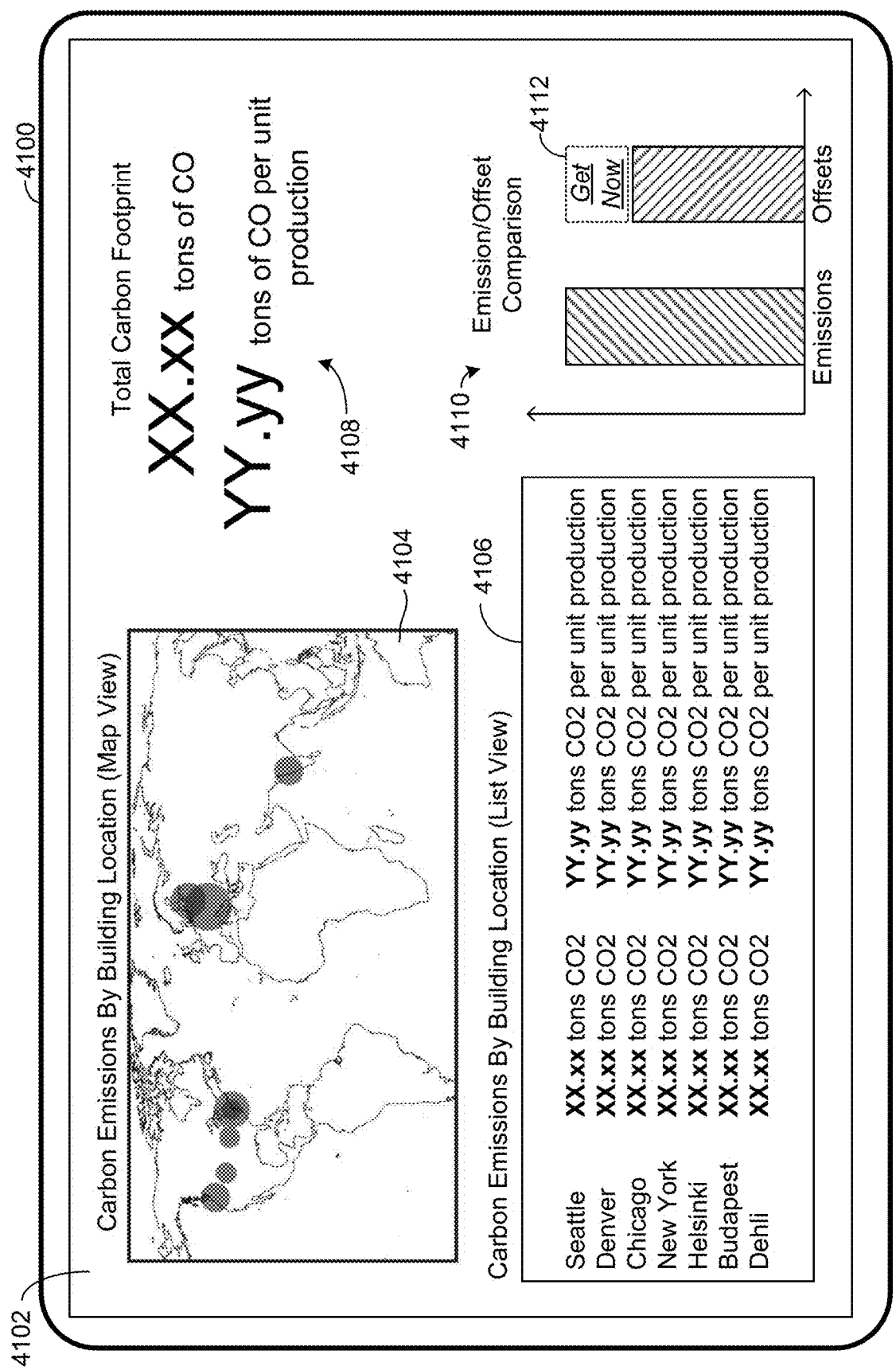
FIG. 41 is an illustration of an example dashboard that can be provided based on the example processes of FIGS. 38 and 40, according to some embodiments.

At step 4004, facilitate production or utilization data is collected. In an example where the facility is a production facility (e.g., factory, etc.), the production data may indicate a number of units or volume of products produced by the facility over a relevant time period. A production management computing system (e.g., running software that tracks production, inventory, ordering, etc.) can be intraoperatively connected to carbon management system that executes processes 3800 and 4000 and generates a dashboard as shown in FIG. 41, for example. To provide additional examples, in an example where the facility is a hospital or clinic, the production or utilization data may indicate a number of patients treated. As another example, in an example where the facility is a restaurant, the production or utilization data may indicate a number of meals served. The production or utilization data can take any form relevant to a particular type of facility or business goal (e.g., experiments run, customers served, dollars of inventory sold, number of items sold, number of items shipped, emails sent, amount of data processed, occupants entered, hotel rooms rented, etc.). In some embodiments, a normalized utilization metric can be used to characterize utilization across different types of facilities in a common system. Additional details of such production and utilization data and related processes are described in U.S. patent application Ser. No. 16/908,324, filed Jun. 22, 2020, the entire disclosure of which is incorporated by reference herein.

At step 4006, a carbon per unit production or carbon per unit utilization metric is generated. For example, an amount of carbon emission from step 4002 can be divided by an amount of production or utilization to obtain the metric. Resulting metrics such as carbon per number of widgets produced, carbon per volume of product produced, carbon per meals served, carbon per patients treated, carbon per experiments run, carbon per sales revenue, carbon per items shipped, carbon per emails sent, carbon per unit of data processed, carbon per occupant, carbon per occupied room, carbon per normalized utilization value, etc. can thereby be generated. Such metrics can be generated on an enterprise-wide basis (e.g., one value for the whole enterprise), on a building-by-building basis, on a campus-by-campus basis, by business unit/department, or by any other suitable division that may be desired by a user. In some scenarios, one enterprise can have many types of buildings, such that different carbon-per-unit-utilization metrics are shown for different buildings in the portfolio, or for different spaces of one or more buildings. A place profile approach as described in U.S. patent application Ser. No. 16/908,324, filed Jun. 22, 2020, the entire disclosure of which is incorporated by reference herein, can be used to easily and automatically define the suitable metric for a given space or place.

At step 4008, the metric or metrics are provided via a graphical user interface (e.g., via a browser-accessible webpage, an application running on a tablet or mobile phone, etc.). An example graphical user interface is shown in FIG. 41. Step 4008 allows the metrics to be communicated to a user, for example a building management professional or a sustainability provisional who can then take actions to mitigate carbon emissions, communicate the metric to consumers, and otherwise make decisions based on the metrics. As one example, prices of goods or services can be automatically modulated to adjust prices in real-time or near-real-time such that the cost of goods to consumers internalizes the time-varying costs of carbon emissions (e.g., so that a consumer is also purchasing corresponding carbon offsets when obtaining a good or service).

Referring now to FIG. 41, a user device 4100 with a graphical user interface showing a dashboard 4102 is shown, according to some embodiments. The user device 4100 is shown as a touchscreen tablet, but may be another display device in various embodiments.

The dashboard 4102 includes a map view 4104 showing carbon emissions by buildings in an enterprise building portfolio. In particular, the map view shows building locations indicated by a circle sized as a function of emissions of the corresponding building or campus (or as a function of the relevant metric generated via process 4000). A user can quickly see the relative carbon-emissions-related performance of the enterprise's different facilities and to see where emissions are being generated (e.g., in jurisdictions with higher or lower regulatory emissions standards). The map view can including zooming features, for example showing emissions for each campus grouped together at the highest view, while showing individual buildings of a campus separately when zoomed in on a particular campus.

The dashboard 4402 also shows a table 4106 with numerical data relating to carbon emissions and carbon-related metrics for the various buildings or campuses shown in the map view 4104. In the example of FIG. 41, table 4106 shows total emissions for each location (e.g., over a particular amount of time such as the latest day, latest week, latest month, etc.) and a carbon per unit production metric over the same time period (e.g., any of the examples described above with reference to FIG. 40).

The dashboard 4102 also shows an aggregated carbon footprint widget 4108. The aggregated carbon footprint widget 4108 shows the total emissions and an aggregated total emissions per total production metric e.g., any of the examples described above with reference to FIG. 40) over a particular time period (e.g., over a particular amount of time such as the latest day, latest week, latest month, all time, etc.). This gives a user a quick, overall view of the company performance. In some embodiments, a user can interact with the total carbon foot print widget 4108 and/or the table view 4106 to navigate to a view which shows a graph of the total emissions and emissions per production metric over time to allow a user to assess progress over time.

The dashboard 4102 also shows an emissions/offsets comparison chart 4110. The emissions/offsets comparison chart 4110 compares the enterprise's total carbon emissions to carbon offsets obtained by the company (e.g., obtained via carbon sequestration of company activities such as tree planting, forest conservation, etc.). The emissions/offsets comparison chart 4110 allows a user to quickly see any gap between emissions and offsets, so that the user can easily tell how far the enterprise is from achieving carbon neutrality. In the example of FIG. 41, a link 4112 is provided in the gap between total emissions and total offsets which can be selected by a user to access a process for obtaining the necessary carbon offsets to achieve carbon neutrality.

Battery Control Using Marginal Operating Emissions Rate

Figure 42:
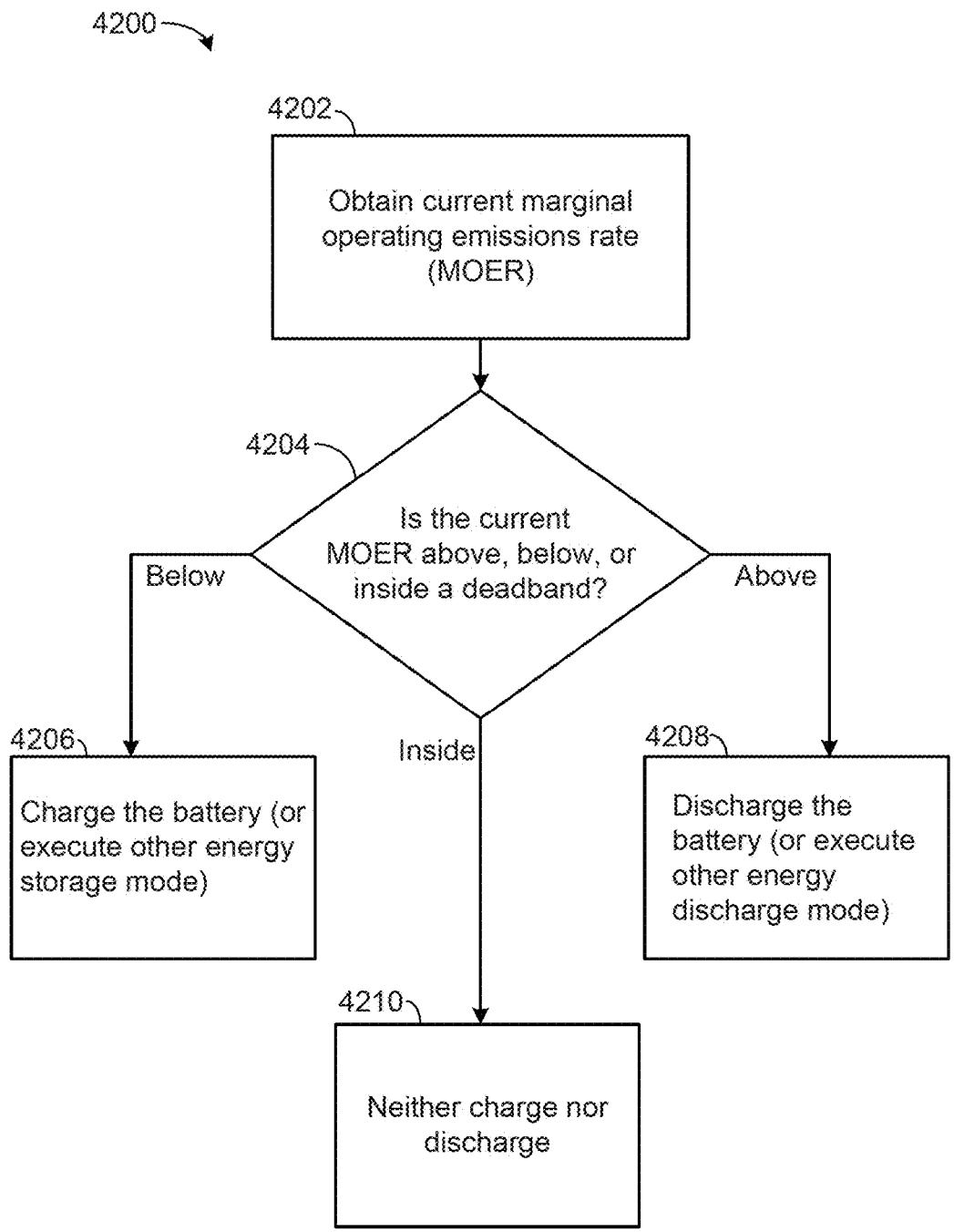
FIG. 42 is a flowchart of a process for controlling a battery based on a marginal operating emissions rate, according to some embodiments.

Referring now to FIG. 42, a flowchart of a process 4200 for controlling a battery using a marginal operating emissions rate is shown, according to some embodiments. The process 4200 can be executed by various controllers, systems, etc. described herein in various embodiments. Although the embodiment of process 4200 shown in FIG. 42 refers to a battery, it should be understood that the battery may include multiple battery cells and that the process 4200 could be adapted for use with other types of energy storage.

At step 4202, a current marginal operating emissions rate (MOER) is obtained. In some embodiments, steps 4202 includes receiving the MOER from the utility grid or from a third-party service provider (e.g., via the Internet). In some embodiments, step 4202 includes calculating or estimating the MOER based on weather data, historical MOER values, etc.

At step 4204, a determination is made as to whether the current MOER is above a deadband (i.e., greater than a value defining an upper limit of the deadband), below the deadband (i.e., less than a value defining a lower limit of the deadband), or inside the deadband (i.e., greater than the lower limit and less than the upper limit). The deadband can be defined based on historical values of the MOER in particular scenario, for example such at the lower limit of the deadband is at 20% of the maximum historical MOER and the upper limit of the deadband is at 80% of the maximum historical MOER (assuming a scenario where the MOER drops below 20% of its maximum value). The deadband can be defined based on frequency, such that the MOER is below the deadband 20% (or some other percentage) of the time on average and above the deadband 20% (or some other percentage) of the time on average. Thus, the deadband can be appropriately defined based on actual MOER values. The determination at step 4204 can be executed by comparing the numerical value of the MOER with the numerical values that define the deadband. In other embodiments, no deadband is used (e.g., deadband with zero width) such that the determinations in step 2404 are made as to whether the current MOER is above or below the a particular value. In some embodiments, the upper and lower limits (first and second values, threshold value, deadband position, deadband size, etc. are determined by performing an optimization, for example an optimization of an objective function that accounts for multiple objectives as discussed in detail elsewhere herein. The values used in step 4204 as limits can thus be dynamically determined as a function of predicted demand, predicted load, predicted emissions rates, weather, etc.

If a determination is made in step 4204 that the current MOER is less than the deadband, the process 4200 proceeds to step 4206 where the battery is charged, in some embodiments. Because a low MOER indicates that low marginal carbon emissions will be associated with energy obtained and charged into the battery, step 4206 corresponds to a low-carbon charging of the battery 4206. Step 4206 can continue until the battery is fully charged or until the MOER changes and process 4200 is re-run. In some embodiments, other actions in an energy storage mode are executed in step 4206. For example, step 4206 can include operating heating and/or cooling equipment to pre-heat or pre-cool one or more buildings to store thermal energy in the one or more buildings in an energy storage mode of step 4206 in response to the MOER below a threshold value in step 4204, such that the building is pre-heated or pre-cooled ahead of times with relatively higher MOER. In some embodiments, step 4206 can include performing a control process based on an objective function that uses the time-varying marginal operating emissions rate to determine time-varying setpoints for the equipment in the energy storage mode and the energy discharge mode.

If a determination is made in step 4204 that the current MOER is greater than the deadband, the process 4200 proceeds to step 4208 where the battery is discharged, some embodiments. Because a high MOER indicates that relative-high marginal carbon emissions will be associated with any energy obtained from a grid at that time, discharging the battery during such periods reduces the need to obtain power during such periods, thereby reducing emissions. Low-carbon energy can thus be time-shifted by storing it in step 4206 when the MOER is below the deadband and discharging it in step 4208 when the MOER is above the deadband. Step 4208 can continue until the battery is fully discharged or until the MOER changes and process 4200 is re-run. In some embodiments, other actions in an energy discharge mode are executed in step 4208. For example, step 4208 can include operating heating and/or cooling equipment can be controlled to allow temperature in a pre-heated or pre-cooled building to drift to take advantage of thermal energy stored during pre-heating or pre-cooling, in response to the MOER below a threshold value in step 4204, such that the building is pre-heated or pre-cooled ahead of times with relatively higher MOER. In some embodiments, step 4208 can include performing a control process based on an objective function that uses the time-varying marginal operating emissions rate to determine time-varying setpoints for the equipment in the energy storage mode and the energy discharge mode.

If a determination is made in step 4204 that the current MOER is inside the deadband, the process 4200 proceeds to step 4210. In the embodiment shown, the battery is neither charged nor discharged in step 4210, and a substantially constant amount of energy is maintained in the battery. The amount of energy stored for discharge in higher-MOER periods, while any extra capacity is kept open for charging during lower-MOER periods. In other embodiments, when the current MOER is inside the deadband, a hysteresis-type control is provided where the previous charge or discharge state of the battery is continued for a least a threshold amount of time, for example in order to prevent high-frequency switching between charging/discharging/neither states that can otherwise contributed to battery degradation. In some embodiments, step 4210 can include controlling heating and/or cooling equipment in a standard control approach, for example using a feedback controller (thermostat, etc.) to drive temperature to a preset or scheduled setpoint.

Process 4200 can thereby provide an efficient, easy-to-implement control solution that achieved emissions savings by controlling a battery or other equipment based on marginal operating emissions rates.

Example Implementations

One implementation of the present disclosure is a method. The method includes generating an objective function that calculates a predicted cost of operating building equipment over a future time horizon, predicting a time-varying indicator of carbon emissions per unit energy consumed for a plurality of time steps in the future time horizon, defining a carbon emissions constraint that requires predicted carbon emissions to be less than a predefined level, generating building setpoints by optimizing the objective function subject to the carbon emissions constraint, and operating building equipment in accordance with the building setpoints.

Another implementation of the present disclosure is another method of operating building equipment. The method includes generating an objective function comprising a weighted sum of a carbon emissions term, a utility cost term, and an occupant comfort term, receiving user input adjusting weights of the weighted sum to indicate relative preferences for reducing emissions, saving costs, and improving comfort, optimizing the objective function having the adjusted weights to generate setpoints for the building equipment, and operating the building equipment in accordance with the setpoints.

Another implementation of the present disclosure is another me92 thod of operating building equipment. The method includes collecting training data comprising amounts of carbon emissions corresponding to consumed power at times in a training period and costs of the consumed power at the times in the training period, fitting a cost-vs-carbon curve to the training data, generating a graphical user interface comprising the cost-vs-carbon curve, wherein the graphical user interface allows a user to selected a preferred point along the cost-vs-carbon curve, generating setpoints for the building equipment predicted to achieve the preferred point along the cost-vs-carbon curve, and controlling the building equipment using the setpoints.

Another implementation of the present disclosure is another method of operating building equipment. The method includes collecting training data indicating carbon emissions corresponding to consumed power at times in a training period and occupant comfort at the times in the training period, fitting a comfort-vs-carbon curve to the training data, generating a graphical user interface comprising the comfort-vs-carbon curve, wherein the graphical user interface allows a user to selected a preferred point along the comfort-vs-carbon curve, generating setpoints for the building equipment predicted to achieve the preferred point along the comfort-vs-carbon curve, and controlling the building equipment using the setpoints.

Another implementation of the present disclosure is a method. The method includes generating an objective function that characterizes a cost of operating a building. The objective function has one or more decision variables relating to new energy assets that could be added to a building energy system, and wherein the cost of operating the building comprises and internalized cost of carbon emissions resulting from energy consumption of the building. The method also includes generating one or more constraints on the one or more decisions variables, wherein the one or more constraints comprising a physical sizing constraint relating to available building space for housing new energy assets, optimizing the objective function subject to the one or more constraints to identify one or more recommended new assets to install at the building, and generating a graphical user interface identifying the one or more recommended new assets and a predicted carbon emissions savings estimated to result from installation of the one or more recommended new assets.

Another implementation of the present disclosure is a method of achieving enterprise-wide carbon neutrality. The method includes collecting building data from sensors of enterprise-wide building management systems, tracking building-related carbon emissions based on the building data, collecting vehicle fleet data from vehicle-based data collectors configured to indicate fuel consumption of vehicles, and tracking vehicle-related carbon emissions based on the vehicle fleet data. The method also includes collecting travel and operations data from an accounting system, wherein the travel and operations data is indicative of other carbon emissions from other carbon-emitting activities of an enterprise, generating a unified dashboard showing the building-related carbon emissions, the vehicle-related carbon emissions, and the other carbon emissions, generating recommendations or control decisions based on the building-related carbon emissions, the vehicle-related carbon emissions, and the other carbon emissions, and automatically initiating a carbon sequestration process based on a total enterprise carbon footprint indicated by the unified dashboard.

Another implementation of the present disclosure is a method of controlling building equipment to reduce or eliminate carbon emissions. The method includes obtaining an indication of time-varying carbon emissions per unit of power consumed from a utility grid, generating an objective function that calculates total carbon emissions or a carbon:power ratio over a time horizon corresponding to predicted building loads over a time horizon and based on the indication, generating time-varying setpoints for a building which by optimizing the objective function subject to one or more constraints to minimize the total carbon emissions or the carbon:power ratio, and operating the building equipment in accordance with the time-varying setpoints. In some embodiments, generating the time-varying setpoints includes shifting the building loads away from a first period where the indication has a first value to a second period where the indication has a second value, where the second value is less than the first value.

Another implementation of the present disclosure is another method of operating building equipment. The method includes generating an objective function that includes a total cost of purchasing energy from an utility grid or fuel supplier and purchasing carbon offsets to achieve net-zero carbon emissions. The method includes optimizing the objective function to generate setpoints for the building equipment that minimize the total cost over a time horizon subject to one or more constraints, and operating the building equipment in accordance with the setpoints.

In some embodiments, the method includes automatically obtaining the carbon offsets. An amount of the carbon offsets is equal to emissions estimated as resulting from the operating the building equipment. Optimizing the objective function may be performed using a model of time-varying carbon emissions per unit of the energy consumed.

Another implementation of the present disclosure is a method of operating building equipment. The method includes generating an objective function comprising a total cost of purchasing energy from an utility grid or fuel supplier and purchasing carbon credits to authorize an amount of carbon emissions estimated to result from production of the energy. The method also includes optimizing the objective function to generate setpoints for the building equipment that minimize the total cost over a time horizon subject to one or more constraints and operating the building equipment in accordance with the setpoints. In some embodiments, the method also includes automatically purchasing the carbon credits via a carbon credit marketplace.

Another implementation of the present disclosure is a method of deploying carbon neutrality for building operations. The method includes manufacturing stock modular energy units at a production facility, transporting a modular energy unit of the stock modular energy units from the production facility to a building via roadways, installing the modular energy unit electrically between the building an a utility grid, collecting building data indicating building energy loads, training a predictive controller for the modular energy unit based on the collected building data, controlling the modular unit using the predictive controller to reduce or eliminate use of carbon-emitting energy sources, and automatically offsetting any remaining carbon emissions using one or more carbon capture processes.

Another implementation of the present disclosure is a supervisory control system. The supervisory control system includes a plurality of building edge devices connected via a network and a carbon management system connected to the plurality of building edge devices via the network and configured to generate, for each of the building edge devices, a carbon emissions target indicating a target amount of carbon emissions for the building edge device, and transmit the carbon emissions targets to the building edge devices via the network. Each of the plurality of building edge devices is configured to perform a local optimization to generate control decisions predicted to result in operation of the building edge device that causes carbon emission equal to or less than the carbon emissions target while achieving one or more operational objectives of the building edge device.

Another implementation of the present disclosure is a modular energy unit. The modular energy unit includes power management circuitry, a green energy generator conductively coupled to the power management circuitry, a fuel cell conductively coupled to the power management circuitry, an energy storage system conductively coupled to the power management circuitry, a utility inlet configured to conductively connect the power management circuitry to a utility grid, and a building outlet configured to conductively connect the power management circuitry to a building electrical system.

In some embodiments, the power management circuitry is configured to allocate an electrical demand of the building electrical system amongst a green energy generator, the fuel cell, an energy storage system, and the utility inlet according to results of an optimization process.

In some embodiments, the modular energy unit also includes a housing. The green energy generator, the fuel cell, the energy storage system, the utility inlet, and the building outlet may be positioned on or in the housing. The housing is sized for transportation by a truck on standard roadways.

In various embodiments, the green energy generator includes photovoltaic cells, green energy generator includes a windmill, the green energy generator includes a nuclear micro-reactor, the fuel cell is a hydrogen fuel cell, the energy storage system includes a plurality of batteries, and/or the energy storage system is configured to store energy as gravitational potential energy. In some embodiments, the energy storage system includes an upper tank, a lower tank placed below and separated from the upper tank, a first flow path allowing fluid flow from the lower tank to the upper tank, a second flow path allowing the fluid flow from the upper tank to the lower tank, a pump on the first flow path and configured to convert electricity into the gravitational potential energy by moving the fluid from the lower tank to the upper tank, and a turbine on the second flow path and configured to convert the gravitational potential energy into generated electricity by harvesting kinetic energy of the fluid as gravity pulls the fluid from the upper tank to the lower tank.

In some embodiments, the modular energy unit also includes a cellular modem communicable with the power management circuitry. The cellular modem is configured to establish communications between the power management circuitry and cloud-based optimization resources. In some embodiments, the modular energy unit includes a building setpoint optimizer communicable with building devices served by the building electrical system. The building setpoint optimizer is configured to change setpoints for the building devices such that operation of the building devices is coordinated with operation of the modular energy unit.

In some embodiments, the modular energy unit is configured to reduce or eliminate carbon emissions associated with serving demands of the building electrical system.

Another implementation of the present disclosure is a method of operating a modular energy unit. The method includes predicting electrical demand on the modular energy unit, predicting available power generation from one or more green energy generators of the modular energy unit, tracking capacity of one or more energy storage systems of the modular energy unit, tracking fuel level in a fuel cell of the modular energy unit, obtaining utility rates and utility carbon emission data from a utility grid, generating control decisions for the modular energy unit predicted to reduce at least one of costs or carbon emission associated with satisfying the electrical demand on the modular energy unit, and controlling the one or more green energy generators, the one or more energy storage systems, and the fuel cell in accordance with the control decisions.

Another implementation of the present disclosure is a building system. The building system includes a plurality of modular energy units connected together using a local mesh network, and cloud-based optimization resources communicable with a first modular energy unit of the plurality of modular energy units via a cellular network. The cloud-based optimization resources are configured to generate optimal setpoints for the plurality of modular energy units and transmit the optimal setpoints to the plurality of modular energy units via the cellular network and the first modular energy unit.

In some embodiments, the building system also includes a modular data center served by a second modular energy unit of the plurality of modular energy units. In some embodiments, the building system includes a building management system configured to control building devices of a building or campus. The cloud-based optimization resources are configured to coordinate operations of the modular energy units and the building management system.

Another implementation of the present disclosure is an HVAC equipment unit. The HVAC equipment unit includes a plurality of powered HVAC components configured to provide heating, cooling, or airflow in building HVAC system, a fuel cell configured to generate electrical energy using a chemical reaction, a battery unit configured to store electric energy from an energy grid or the fuel cell and discharge the stored electric energy for use in powering the powered HVAC components, and a predictive HVAC controller configured to optimize a predictive cost function to determine an optimal amount of electric energy to purchase from the energy grid, an optimal amount of electric energy to generate with the fuel cell, and an optimal amount of electric energy to store in the battery unit or discharge from the battery unit for use in powering the powered HVAC components at each time step of an optimization period.

In some embodiments, the HVAC equipment unit also includes one or more photovoltaic panels configured to collect photovoltaic energy. The predictive chiller controller is configured to determine an optimal amount of the photovoltaic energy to store in the battery unit and an optimal amount of the photovoltaic energy to be consumed by the powered HVAC components at each time step of the optimization period.

In some embodiments, the predictive cost function accounts for a cost of the electric energy purchased from the energy grid and a cost of fuel for the fuel cell at each time step of the optimization period and a cost savings resulting from discharging stored electric energy from the battery unit at each time step of the optimization period. In some embodiments, the predictive cost function accounts for a demand charge based on a maximum power consumption of the HVAC equipment unit during a demand charge period that overlaps at least partially with the optimization period. The predictive chiller controller may be configured to receive energy pricing data defining the demand charge and to use the energy pricing data as inputs to the predictive cost function.

Another implementation of the present disclosure is a method of operating a fuel cell integrated with a unit of building equipment. The method includes monitoring the fuel cell by collecting data indicating historical usage of the fuel cell, predicting future usage of the fuel cell based on the historical usage of the fuel cell, tracking prices of fuel for refueling the fuel cell, performing an optimization that minimizes a cost of purchasing the fuel for refueling the fuel cell subject to a constraint or penalty relating to fuel storage limits or fuel storage costs, and obtaining the fuel for refueling the fuel cell based on a result of the optimization.

Another implementation of the present disclosure is a method including collecting building carbon emissions data, collecting production or utilization data, generating a carbon per unit production metric or a carbon per unit utilization metric, and providing the carbon per unit production metric or the carbon per unit utilization metric via a graphical user interface. In some embodiments, the graphical user interface displays a dashboard showing the carbon per unit production metric or the carbon per unit utilization metric. The dashboard also includes a map view of carbon emissions corresponding to different buildings at different geographic locations.

Another implementation of the present disclosure is a method that includes obtaining a time-varying marginal operating emissions rate for electricity purchased from an energy grid, generating an objective function comprising an emission term that calculates marginal emissions over a time horizon using the time-varying marginal operating emissions rate, generating building setpoints by optimizing the objective function, and operating building equipment in accordance with the building setpoints.

Another implementation of the present disclosure is a method. The method includes obtaining a marginal operating emissions rate, charging a battery if the marginal operating emissions rate is less than a first value, and discharging the battery if the marginal operating emissions rate is greater than a second value.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

As one example of modifications that may be made, it should be understood that the modeling, optimizations, formulations, etc. described above can be implemented using regression modeling techniques, grey-box or physics-based modeling techniques, etc., or can be implemented machine learning and artificial intelligence algorithms (e.g., neural networks, Bayesian modeling, etc.), or a combination thereof. Example approaches that can be used to implement the various teachings herein using such modeling approaches are described in U.S. patent application Ser. No. 16/413,946, filed May 16, 2019, the entire disclosure of which is incorporated by reference herein. For example, a neural network or other AI can be trained to estimated carbon emissions based on a set of inputs, for example, which can then be used by another AI or some other algorithm in further steps of the processes described herein.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method comprising:
   estimating a time-varying marginal operating emissions rate indicating carbon emissions associated with power consumed from a utility based upon a production of an energy source serving the utility;
   operating equipment during a time period by:
      operating the equipment in an energy storage mode when the time-varying marginal operating emissions rate is less than a first value; and
      operating the equipment in an energy discharge mode when the time-varying marginal operating emissions rate is greater than a second value; and
   adjusting the first value and the second value based on a comparison between expected carbon emissions expected to result from operating the equipment during the time period and actual carbon emissions resulting from operating the equipment during the time period.

2. The method of claim 1, further comprising performing a control process based on an objective function that uses the time-varying marginal operating emissions rate to determine time-varying setpoints for the equipment in the energy storage mode and the energy discharge mode.

3. The method of claim 2, wherein the control process is a cascaded control process.

4. The method of claim 1, wherein the equipment comprises heating and/or cooling equipment and the energy storage mode comprises pre-cooling or pre-heating a building.

5. The method of claim 1, wherein the equipment comprises a battery, the energy storage mode comprises charging the battery, and the energy discharge mode comprises discharging the battery.

6. The method of claim 1, wherein the second value is greater than the first value.

7. The method of claim 1, wherein the second value is equal to the first value.

8. The method of claim 1, further comprising determining the first value and the second value by performing an optimization.

9. One or more non-transitory computer-readable media storing program instructions that, when executed by one or more processors, cause the one or more processors to perform operations comprising:
   estimating a time-varying marginal operating emissions rate indicating carbon emissions associated with power consumed from a utility based upon a production of an energy source serving the utility;

operating equipment during a time period by:
  controlling the equipment in an energy storage mode when the time-varying marginal operating emissions rate is less than a first value; and
  controlling the equipment in an energy discharge mode when the time-varying marginal operating emissions rate is greater than a second value; and
adjusting the first value and the second value based on a comparison between expected carbon emissions expected to result from operating the equipment during the time period and actual carbon emissions resulting from operating the equipment during the time period.

10. The one or more non-transitory computer-readable media of claim 9, wherein the operations further comprise performing a control process based on an objective function that uses the time-varying marginal operating emissions rate to determine time-varying setpoints for the equipment in the energy storage mode and the energy discharge mode.

11. The one or more non-transitory computer-readable media of claim 10, wherein the control process is a cascaded control process.

12. The one or more non-transitory computer-readable media of claim 9, wherein the equipment comprises heating and/or cooling equipment and the energy storage mode comprises pre-cooling or pre-heating a building.

13. The one or more non-transitory computer-readable media of claim 9, wherein the equipment comprises a battery, the energy storage mode comprises charging the battery, and the energy discharge mode comprises discharging the battery.

14. The one or more non-transitory computer-readable media of claim 9, wherein the second value is greater than the first value.

15. The one or more non-transitory computer-readable media of claim 9, wherein the second value is equal to the first value.

16. The one or more non-transitory computer-readable media of claim 9, the operations further comprising determining the first value and the second value by performing an optimization.

17. A building system, comprising:
equipment for a building or campus; and
a controller for the equipment, the controller programmed to:
  estimate a time-varying marginal operating emissions rate indicating carbon emissions associated with power consumed from a utility based upon a production of an energy source serving the utility;
  control the equipment in an energy storage mode when the time-varying marginal operating emissions rate is less than a first value;
  control the equipment in an energy discharge mode when the time-varying marginal operating emissions rate is greater than a second value; and
  adjust the first value and the second value based on a comparison between expected carbon emissions expected to result from controlling the equipment during a time period and actual carbon emissions resulting from controlling the equipment during the time period.

18. The building system of claim 17, the controller is programmed to perform a control process based on an objective function that uses the time-varying marginal operating emissions rate to determine time-varying setpoints for the equipment in the energy storage mode and the energy discharge mode.

19. The building system of claim 17, wherein the equipment comprises thermal energy storage equipment.

20. The building system of claim 17, wherein the equipment comprises a battery.

21. The building system of claim 17, wherein the controller is further programmed to determine the first value and the second value by performing an optimization.

* * * * *